(12) United States Patent
Orlandini Von Niessen et al.

(10) Patent No.: US 12,516,333 B2
(45) Date of Patent: Jan. 6, 2026

(54) 3'-UTR SEQUENCES FOR STABILIZATION OF RNA

(71) Applicants: BioNTech SE, Mainz (DE); TRON-Translationale Onkologie an der Universitätsmedizin der Johannes Gutenberg-Universität Mainz gG, Mainz (DE)

(72) Inventors: Alexandra Orlandini Von Niessen, Mainz (DE); Stephanie Fesser, Mannheim (DE); Britta Vallazza, Darmstadt (DE); Tim Beissert, Gross-Gerau (DE); Andreas Kuhn, Mainz (DE); Ugur Sahin, Mainz (DE); Marco Alexander Poleganov, Egelsbach (DE)

(73) Assignees: BioNTech SE, Mainz (DE); TRON—Translationale Onkologie an der Universitätsmedizin der Johannes Gutenberg-Universität Mainz gGmbH, Mainz (DE)

( * ) Notice: Subject to any disclaimer, the term of this patent is extended or adjusted under 35 U.S.C. 154(b) by 121 days.

(21) Appl. No.: 17/936,377

(22) Filed: Sep. 28, 2022

(65) Prior Publication Data

US 2023/0272406 A1 Aug. 31, 2023

Related U.S. Application Data

(63) Continuation of application No. 15/763,709, filed as application No. PCT/EP2016/073814 on Oct. 5, 2016, now Pat. No. 11,492,628.

(30) Foreign Application Priority Data

Oct. 5, 2016 (WO) ................. PCT/EP2016/073814

(51) Int. Cl.
| | | |
|---|---|---|
| C12N 5/00 | (2006.01) |
| A47B 3/00 | (2006.01) |
| A47B 13/02 | (2006.01) |
| A47B 33/00 | (2006.01) |
| A47B 43/00 | (2006.01) |
| A47B 77/02 | (2006.01) |
| A47B 77/06 | (2006.01) |
| A47B 77/08 | (2006.01) |
| A47B 77/16 | (2006.01) |
| A47B 77/18 | (2006.01) |
| A47B 95/00 | (2006.01) |
| A47C 4/00 | (2006.01) |
| A47C 4/08 | (2006.01) |
| A47C 7/00 | (2006.01) |
| A47K 3/28 | (2006.01) |
| B60B 33/00 | (2006.01) |
| C12N 5/0735 | (2010.01) |
| C12N 15/113 | (2010.01) |
| C12N 15/67 | (2006.01) |
| C12N 15/90 | (2006.01) |
| E04H 1/12 | (2006.01) |
| F16C 11/04 | (2006.01) |

(52) U.S. Cl.
CPC .............. *C12N 15/67* (2013.01); *A47B 3/002* (2013.01); *A47B 13/02* (2013.01); *A47B 33/00* (2013.01); *A47B 43/00* (2013.01); *A47B 77/022* (2013.01); *A47B 77/06* (2013.01); *A47B 77/08* (2013.01); *A47B 77/16* (2013.01); *A47B 77/18* (2013.01); *A47B 95/00* (2013.01); *A47B 95/008* (2013.01); *A47C 4/00* (2013.01); *A47C 4/08* (2013.01); *A47C 7/002* (2013.01); *A47C 7/006* (2013.01); *A47K 3/284* (2013.01); *B60B 33/00* (2013.01); *C12N 5/0606* (2013.01); *C12N 15/113* (2013.01); *C12N 15/90* (2013.01); *E04H 1/1266* (2013.01); *F16C 11/04* (2013.01); *A47B 2003/006* (2013.01); *A47B 2200/0018* (2013.01); *C12N 2310/113* (2013.01)

(58) Field of Classification Search
CPC .... C12N 15/67; C12N 5/0606; C12N 15/113; C12N 15/90; C12N 2310/113
See application file for complete search history.

(56) References Cited

U.S. PATENT DOCUMENTS

| 4,897,355 A | 1/1990 | Eppstein et al. |
|---|---|---|
| 5,264,618 A | 11/1993 | Felgner et al. |

(Continued)

FOREIGN PATENT DOCUMENTS

| CN | 101855233 A | 10/2010 |
|---|---|---|
| CN | 104662156 A | 5/2015 |

(Continued)

OTHER PUBLICATIONS

Orlandini Von Niessen Dissertation 2016 (Year: 2016).*

(Continued)

*Primary Examiner* — Catherine S Hibbert
(74) *Attorney, Agent, or Firm* — Choate, Hall & Stewart LLP; Brenda Herschbach Jarrell; Beejan Asady

(57) ABSTRACT

The present invention relates to stabilization of RNA, in particular mRNA, and an increase in mRNA translation. The present invention particularly relates to a modification of RNA, in particular in vitro-transcribed RNA, resulting in increased transcript stability and/or translation efficiency. According to the invention, it was demonstrated that certain sequences in the 3'-untranslated region (UTR) of an RNA molecule improve stability and translation efficiency.

20 Claims, 20 Drawing Sheets

Figure 1:
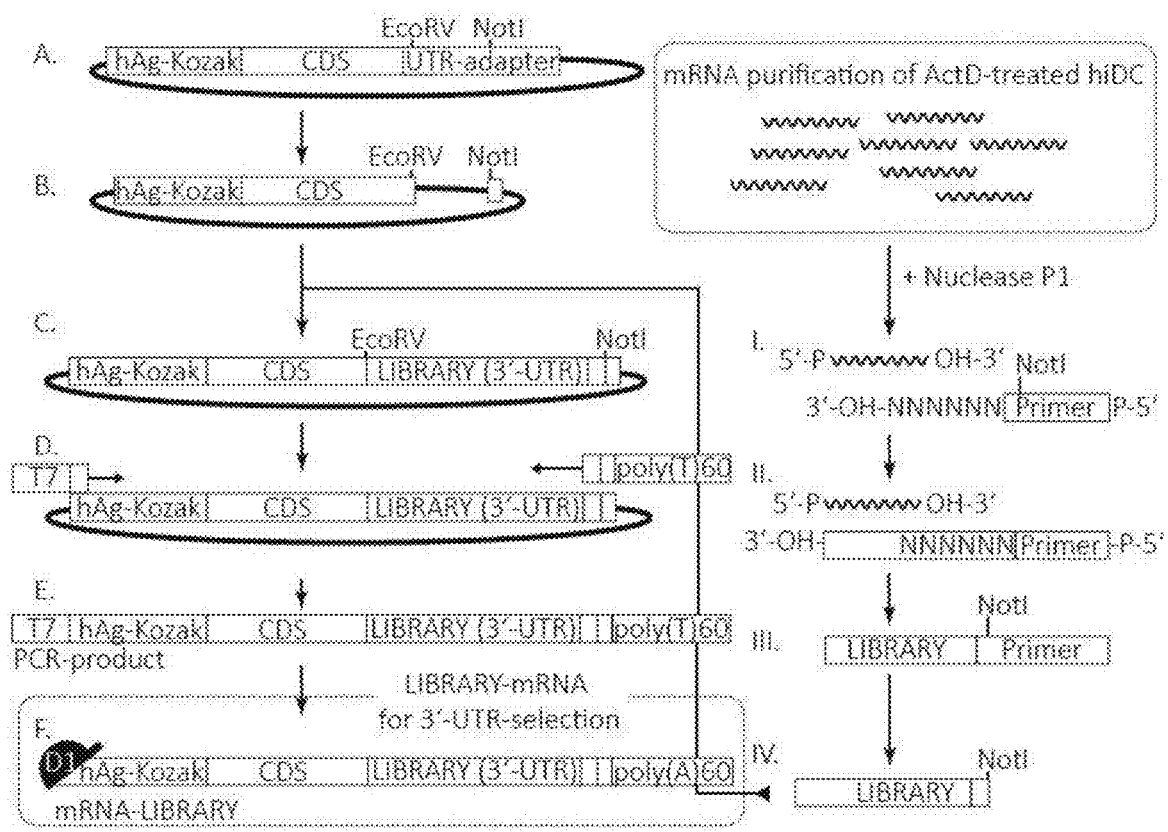
Figure 1:
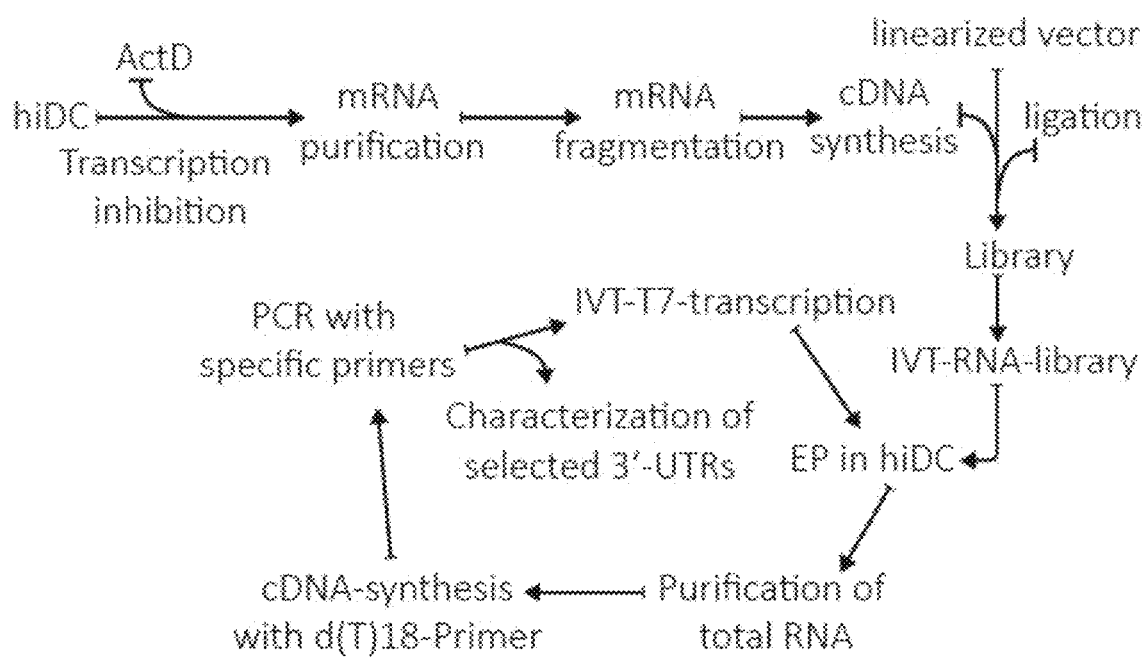

Specification includes a Sequence Listing.

(56) References Cited

U.S. PATENT DOCUMENTS

| | | |
|---|---|---|
| 5,703,055 A | 12/1997 | Felgner et al. |
| 6,251,399 B1 | 6/2001 | Diamond et al. |
| 6,472,176 B2 | 10/2002 | Kovesdi et al. |
| 6,500,641 B1 | 12/2002 | Chen et al. |
| 6,586,410 B1 | 7/2003 | Wheeler et al. |
| 7,303,881 B2 | 12/2007 | Huang et al. |
| 7,462,354 B2 | 12/2008 | Sette et al. |
| 7,790,696 B2 | 9/2010 | Gregoriadis |
| 8,017,326 B2 | 9/2011 | Jan et al. |
| 8,140,270 B2 | 3/2012 | Kingsmore et al. |
| 8,217,016 B2 | 7/2012 | Hoerr et al. |
| 8,349,558 B2 | 1/2013 | Fatho et al. |
| 8,703,142 B2 | 4/2014 | Diamond et al. |
| 8,853,283 B2 | 10/2014 | Platscher et al. |
| 8,877,206 B2 | 11/2014 | Chen et al. |
| 9,115,402 B2 | 8/2015 | Hacohen et al. |
| 11,492,628 B2 | 11/2022 | Orlandini Von Niessen et al. |
| 2005/0032730 A1 | 2/2005 | Von Der Mulbe et al. |
| 2005/0054011 A1 | 3/2005 | Jan et al. |
| 2007/0025968 A1 | 2/2007 | Van Der Burg et al. |
| 2009/0055944 A1 | 2/2009 | Korman et al. |
| 2009/0217401 A1 | 8/2009 | Korman et al. |
| 2012/0237975 A1 | 9/2012 | Schrum et al. |
| 2013/0115272 A1 | 5/2013 | de Fougerolles et al. |
| 2013/0123481 A1 | 5/2013 | de Fougerolles et al. |
| 2013/0156849 A1 | 6/2013 | de Fougerolles et al. |
| 2013/0203115 A1 | 8/2013 | Schrum et al. |
| 2013/0237593 A1 | 9/2013 | de Fougerolles et al. |
| 2013/0237594 A1 | 9/2013 | de Fougerolles et al. |
| 2013/0244243 A1 | 9/2013 | Matsuyama et al. |
| 2013/0244278 A1 | 9/2013 | de Fougerolles et al. |
| 2013/0244279 A1 | 9/2013 | de Fougerolles et al. |
| 2013/0245106 A1 | 9/2013 | de Fougerolles et al. |
| 2013/0245107 A1 | 9/2013 | de Fougerolles et al. |
| 2013/0255281 A1 | 10/2013 | Bray |
| 2013/0266640 A1 | 10/2013 | de Fougerolles et al. |
| 2014/0010861 A1 | 1/2014 | Bancel et al. |
| 2014/0147454 A1 | 5/2014 | Chakraborty et al. |
| 2014/0178438 A1* | 6/2014 | Sahin ............ G16B 40/00 424/277.1 |
| 2015/0017211 A1 | 1/2015 | de Fougerolles et al. |
| 2015/0030576 A1 | 1/2015 | Bancel |
| 2015/0167017 A1 | 6/2015 | Roy et al. |
| 2019/0071682 A1 | 3/2019 | Orlandini Von Niessen et al. |

FOREIGN PATENT DOCUMENTS

| | | |
|---|---|---|
| DE | 3856241 T2 | 3/1999 |
| DE | 69132916 T2 | 10/2002 |
| DE | 69332803 T2 | 3/2004 |
| EA | 006761 | 4/2006 |
| EA | 011557 | 4/2009 |
| EP | 242108 A1 | 10/1987 |
| EP | 0292435 A1 | 11/1988 |
| EP | 0839912 A1 | 5/1998 |
| EP | 2569633 A2 | 3/2013 |
| JP | 2020-190088 A | 11/2020 |
| JP | 6844060 B1 | 3/2021 |
| JP | 7084565 B2 | 6/2022 |
| RU | 2126047 C1 | 2/1999 |
| RU | 2148081 C1 | 4/2000 |
| RU | 2152997 C2 | 7/2000 |
| RU | 2307872 C2 | 10/2007 |
| RU | 2491343 C1 | 8/2013 |
| RU | 2535871 C1 | 12/2014 |
| WO | WO-91/19806 A1 | 12/1991 |
| WO | WO-94/14970 A1 | 7/1994 |
| WO | WO-1994/023031 A1 | 10/1994 |
| WO | WO-1998/014464 A1 | 4/1998 |
| WO | WO-1999/024566 A1 | 5/1999 |
| WO | WO-1999/052503 A2 | 10/1999 |
| WO | WO-2000/20029 A1 | 4/2000 |
| WO | WO-2000/050592 A1 | 8/2000 |
| WO | WO-2000/067761 A1 | 11/2000 |
| WO | WO-2001/047959 A2 | 7/2001 |
| WO | WO-01/73087 A1 | 10/2001 |
| WO | WO-2001/093902 A2 | 12/2001 |
| WO | WO-2002/048377 A2 | 6/2002 |
| WO | WO-2002/083714 A2 | 10/2002 |
| WO | WO-02/098443 A2 | 12/2002 |
| WO | WO-03/018760 A2 | 3/2003 |
| WO | WO-2003/051401 A2 | 6/2003 |
| WO | WO-2003/068257 A1 | 8/2003 |
| WO | WO-2003/106692 A2 | 12/2003 |
| WO | WO-2004/004743 A1 | 1/2004 |
| WO | WO-2004/033690 A1 | 4/2004 |
| WO | WO-2005/030250 A2 | 4/2005 |
| WO | WO-2005/039533 A1 | 5/2005 |
| WO | WO-2005/040816 A1 | 5/2005 |
| WO | WO-2005/110338 A2 | 11/2005 |
| WO | WO-2006/082398 A2 | 8/2006 |
| WO | WO-2006/121168 A1 | 11/2006 |
| WO | WO-2007/024708 A2 | 3/2007 |
| WO | WO-2007/025760 A2 | 3/2007 |
| WO | WO-2007/031222 A2 | 3/2007 |
| WO | WO-2007/036366 A2 | 4/2007 |
| WO | WO-2007/068265 A1 | 6/2007 |
| WO | WO-2007/101227 A2 | 9/2007 |
| WO | WO-2007/122369 A2 | 11/2007 |
| WO | WO-2008/080468 A1 | 7/2008 |
| WO | WO-2008/083174 A2 | 7/2008 |
| WO | WO-2008/085562 A2 | 7/2008 |
| WO | WO-2008/112127 A2 | 9/2008 |
| WO | WO-2008/116078 A2 | 9/2008 |
| WO | WO-2008/156712 A1 | 12/2008 |
| WO | WO-2009/042971 A2 | 4/2009 |
| WO | WO-2009/053041 A2 | 4/2009 |
| WO | WO-2009/118296 A2 | 10/2009 |
| WO | WO-2009/129227 A1 | 10/2009 |
| WO | WO-2010/037402 A1 | 4/2010 |
| WO | WO-2010/066418 A1 | 6/2010 |
| WO | WO-2011/012316 A2 | 2/2011 |
| WO | WO-2011/075838 A1 | 6/2011 |
| WO | WO-2011/143656 A2 | 11/2011 |
| WO | WO-2012/045075 A1 | 4/2012 |
| WO | WO-2012/045082 A2 | 4/2012 |
| WO | WO-2012/065143 A1 | 5/2012 |
| WO | WO-2012/135805 A2 | 10/2012 |
| WO | WO-2012/159729 A1 | 11/2012 |
| WO | WO-2013/040142 A2 | 3/2013 |
| WO | WO-2013/052523 A1 | 4/2013 |
| WO | WO-2013/090648 A1 | 6/2013 |
| WO | WO-2013/120629 A1 | 8/2013 |
| WO | WO-2013/124701 A2 | 8/2013 |
| WO | WO-2013/143698 A1 | 10/2013 |
| WO | WO-2013/143699 A1 | 10/2013 |
| WO | WO-2013/143700 A1 | 10/2013 |
| WO | WO-2013/151663 A1 | 10/2013 |
| WO | WO-2013/151664 A1 | 10/2013 |
| WO | WO-2013/151665 A2 | 10/2013 |
| WO | WO-2013/151672 A2 | 10/2013 |
| WO | WO-2014/012051 A1 | 1/2014 |
| WO | WO-2014/028295 A2 | 2/2014 |
| WO | WO-2014/071219 A1 | 5/2014 |
| WO | WO-2014/093924 A1 | 6/2014 |
| WO | WO-2014/144039 A1 | 9/2014 |
| WO | WO-2014/144711 A1 | 9/2014 |
| WO | WO-2014/144767 A1 | 9/2014 |
| WO | WO-2014/152027 A1 | 9/2014 |
| WO | WO-2014/152030 A1 | 9/2014 |
| WO | WO-2014/152031 A1 | 9/2014 |
| WO | WO-2014/152211 A1 | 9/2014 |
| WO | WO-2014/159813 A1 | 10/2014 |
| WO | WO-2014/160243 A1 | 10/2014 |
| WO | WO-2014/164253 A1 | 10/2014 |
| WO | WO-2014/168874 A2 | 10/2014 |
| WO | WO-2014/184684 A2 | 11/2014 |
| WO | WO-2015/014375 A1 | 2/2015 |
| WO | WO-2015/034925 A1 | 3/2015 |
| WO | WO-2015/034928 A1 | 3/2015 |
| WO | WO-2015/038892 A1 | 3/2015 |
| WO | WO-2015/043613 A1 | 4/2015 |
| WO | WO-2015/051169 A2 | 4/2015 |

(56) References Cited

FOREIGN PATENT DOCUMENTS

| WO | WO-2015/051173 A2 | 4/2015 |
|---|---|---|
| WO | WO-2015/058780 A1 | 4/2015 |
| WO | WO-2015/085318 A2 | 6/2015 |
| WO | WO-2015/089511 A2 | 6/2015 |
| WO | WO-2015/101414 A2 | 7/2015 |
| WO | WO-2015/101415 A1 | 7/2015 |
| WO | WO-2015/117620 A1 | 8/2015 |
| WO | WO-2015/138348 A1 | 9/2015 |
| WO | WO-2015/164674 A1 | 10/2015 |
| WO | WO-2015/172843 A1 | 11/2015 |
| WO | WO-2016/005004 A1 | 1/2016 |
| WO | WO-2016/005324 A1 | 1/2016 |
| WO | WO-2016/062323 A1 | 4/2016 |
| WO | WO-2016/091391 A1 | 6/2016 |
| WO | WO-2016/107877 A1 | 7/2016 |
| WO | WO-2016/155809 A1 | 10/2016 |
| WO | WO-2017/059902 A1 | 4/2017 |

OTHER PUBLICATIONS

Matoulkova_et_al_2012 (Year: 2013).*
Zeng et al entitled "Formulation and Delivery Technologies for mRNA Vaccines" (Curr Top Microbiol Immunol. Jun. 2, 2020). (Year: 2020).*
Kreiter, et al in "Mutant MHC class II epitopes drive therapeutic immune responses to cancer". (Nature 2015, 520, 692-696; IDS reference). (Year: 2015).*
Su et al in "In vivo mRNA delivery to virus-specific T cells by light-induced ligand exchange of MHC class I antigen-presenting nanoparticles" (Sci. Adv. vol. 8, Feb. 23, 2022, pp. 1-10). (Year: 2022).*
Database GenBank, Homo sapiens amino-terminal enhancer of split (AES), RefSeqGene on chromosome 19, retrieved from: http://www.ncbi.nlm.nih.gov/nuccore/345478736?sat=46&satkey=37372066, Accession No. NG_029870, 6 pages (Oct. 27, 2014).
Database GenBank, Homo sapiens isolate NEC1 mitochondrion, complete genome, retrieved from:http://www.ncbi.nlm.nih.gov/nuccore/379318070?sat=4&satkey=67380037, Accession No. JQ664547, 8 pages (Apr. 6, 2012).
Mar. 17, 2017—International Search Report and Written Opinion of PCT/EP2016/073814.
Dec. 13, 2013 (EP) Office Action—Application No. 16778784.5.
Sep. 6, 2016—International Search Report and Written Opinion of PCT/EP2015/073180.
Agrawal et al., Trend in Biotechnology, 14(10): 376-387, 1996.
Alexandra Gabriela Orlandi von Niessen: "Optimization of RNA cancer vaccines using 3' UTR sequence selected for stabilization of RNA (Dissertation)", Sep. 5, 2016 (Sep. 5, 2016), pp. FP-108, I-VII, XP002767665, Fachbereich Biologie der Johannes Gutenberg-Universitat in Mainz; Retrieved from the Internet: URL: https://publications.ub.unirnains.de/theses/volltexte/2016/1000000811/pdf/100000811.pdf [retrieved on Feb. 28, 2017].
Bei et al.J Immunolher. May 1998;21{3):159-69.
Boczkowski et al. (1996). Dendritic cells pulsed with RNA are potent antigen-presenting cells in vitro and in vivo, J Exp. Med. 184: 465-472.
Bowerman, NA. Engineering the binding properties of the T cell receptor: peptide: MHC ternary complex that governs T cell activity. Mal. Immun. 46: 3000-3008, 2009.
Brickner et al. J Exp. Med 193(2) 195-205 (2001).
Cao Jingxin et al: "A human homolog of the cavvinia virus Hindi II K4L gene is a member of the phospholipase D 6 superfamily", Virus Research, vol. 48, No. 1, Jan. 1, 1997 (Jan. 1, 1997), pp. 11-18, XP002209546, Amsterdam, NL, ISSN: 0168-1702, DOI: 10.1016/S0168-1702(96)01422-0.
Conry et al. (1994). Immune response to a carcinoembryonic antigen polynucleotide vaccine, Cancer Res. 54: 1164-1168.
Conry et al. (1995). Characterization of a messenger RNA polynucleotide vaccine vector, Cancer Res. 55: 1397-1400.
Coulie et al. (1995). A mutated intron sequence codes for an antigenic peptide recognized by cytolytic T lymphocytes on a human melanoma, Proc. Natl. Acad. Sci. USA 92: 7976-7980.
Del Val et al., Cell, vol. 66, Issue 6, Sep. 20, 1991, pp. 1145-1153.
Dengjel, J et al. Glycan side chains on naturally presented MHC class II ligands J Mass Spectrom, 2005.
Ding et al. Genome remodeling in a basal-like breast cancer metastasis and xenograft Nature, 464: 999-1005, 2010.
Dolgin, Nature 522:26.
Dolgin, The Billion-Dollar Biotech, Nature, vol. 522, pp. 26-28, Jun. 4, 2015.
Fritsch, E. F. et al. HLA-Binding Properties of Tumor Neoepitopes in Humans Cancer Immunology Research, 2: 522-529, 2014.
GenBank Accession No. FJ376737, pmirGLO Dual-Luciferase miRNA Target Expression Vector Protocol, 2 pages (revised Aug. 2016).
Gnirke, A. Solution hybrid selection with ultra-long oligonucleotides for massively parallel targeted sequencing Nat. Biotechnol, 2009.
Goya, R. et al. SNVMix: predicting single nucleotide variants from next-generation sequencing of tumors, Bioinformatics Bioinformatics, 26: 730-736, 2010.
Gryaznov et al., Biochim. Biophys. Acta, 1489: 131-140, 1999.
Guyre et al., Cancer Immunother (1997) 45:146-148.
Hacohen Decl. dated Feb. 16, 2014 filed in U.S. Appl. No. 13/108,610, 10 pages.
Hoerr et al. (2000). In vivo application of RNA leads to induction of specific cytotoxic T lymphocytes and antibodies, Eur. J Immunol. 30: 1-7.
International Preliminary Report on Patentability issued in corresponding International Application No. PCT/EP2016/073814, dated Apr. 19, 20118.
Jemiality et al., RNA, 9:1108-1122 (2003).
Johanning et al. Nucleic Acids Res. May 11, 1995; 23(9): 1495-1501.
Kenter, G. G. et al. Phase I Immunotherapeutic Trial with Long Peptides Spanning the E6 and E7 sequences of High-risk human papillomavirus 16 in End-stage cervical cancer patients shows low toxicity and robust immunogenicity. Clinical Cancer Research, 14: 169-177, 2008.
Keogh, E. et al. Identification of New Epitopes from Four Different Tumor-Associated Antigens: Recognition of Naturally Processed Epitopes Correlates with HLA-A*0201-Binding Affinity, J. Immunol. 167: 787-796, 2001.
Kim, J.S. et al., Reprogrammed Pluripotent Stem Cells from Somatic Cells, International Journal of Stem Cells, 4(1): 8 pages (2011).
Krause, A. and Worgall, S., Delivery of antigens by viral vectors for vaccination, Therapeutic Delivery, 2(1):51-70 (2011).
Ledda M. et al;"Effect of 3' UTR length on the translational regulation of 5'-terminal oligopyrimidine mRNAs", Gene, vol. 344, Jan. 3, 2004 (Jan. 3, 2005), pp. 213-220, XP027872598, Elsevier, Amsterdam, NL ISSN: 0378-1119 [retrieved on Jan. 3, 2005].
Lee Changhan et al: "The mitochondrial-derived peptide MOTS-c promotes metabolic homeostasis and reduces obesity and insulin resistance.", Cell Metabolism, vol. 21, No. 3, Mar. 3, 2015 (Mar. 3, 2015), pp. 443-454, KP002767664, ISSN: 1932-7420.
Lemmel, Claudia et al., Differential quantitative analysis of MHC ligands by mass spectrometry using stable isotope labeling, Nat Biolechnol, 2004.
Lennerz et al. (2005). The response of autologous T cells to a human melanoma is dominated by mutated neoantigens, Proc. Natl. Acad. Sci. USA 102: 16013-16018.
Ley et al. (2008). DNA sequencing of a cytogenetically normal acute myeloid leukaemia genome, Nature 456: 66-72.
Li et al., Cancer Genome Sequencing and Its Implications for Personalized Cancer Vaccine, Cancer 2011, 3, 4191-4211.
Maksyutov and Zagrebelnaya (1993). Adept: a computer program for prediction of protein antigenic determinants, Comput. Appl. Biosci. 9: 291-297.
Mandelboim et al. (1995). Regression of established murine carcinoma metastases following vaccination with tumour-associated antigen peptides, Nature Medicine 1: 1179-1183.

(56) References Cited

OTHER PUBLICATIONS

Mardis, ER., Recurring Mutations Found by Sequencing an Acute Myeloid Leukemia Genome, New England J. Med., 361:1058-1066 (2009).

Margulies, Marcel et al., Genome Sequencing in Open Microfabricated High Density Picolitre Reactors, Nature, 2005.

Martinez-Sanchez, A. et al., DICER Inactivation Identifies Pancreatic β-Cell "Disallowed" Genes Targeted by MicroRNAs, Mol. Endocrinol., 29(7):1067-1079 (2015).

Martinon et al. (1993). Induction of virus-specific cytotoxic T lymphocytes in vivo by liposome-entrapped mRNA. Eur. J. Immunol 23, 1719-1722.

Matoulkova et al., The role of the 3' untranslated region in post-transccriptional regulation of protein expresion in mammalian cells, RNA Biology, pp. 563-576 (2012).

Mayer et al., Anticancer Research 25:3917-3924 (2005).

Meyerson, M. et al. Advances in understanding cancer genomes through second-generation sequencing Nature Rev. Genetics. 11:685-695, 2010.

Mikulska J E et al: "Cloning and analysis of the gene encoding the human neonatal Fc receptor", European Journal of Immunogenetics, vol. 27, No. 4, Aug. 1, 2000 {Aug. 1, 2000), pp. 231-240, XP009093953, Oxford, GB ISSN: J960-7420, DOI: 10.1046/J 1365-2370.2000. 00225.X.

Monach et al. (1995). A unique tumor antigen produced by a single amino acid substitution, Immunity 2: 45-59.

Mortazavi (2008). Mapping and quantifying mammalian transcriptomes by RNA-Seq, Nature Methods 5: 621-628.

Osisami Mary et al: "A role for phospholipase 03 in myotube formation.", PLOS One, vol. 7, No. 3, E33341, Mar. 2012 (Mar. 2012), pp. 1-10, XP002767663, ISSN: 1932-6203.

Parker et al., J Immunol. 152 (1994), 163-175.

Parkhurst, MR. et al. Improved Induction of Melanoma-reactive CTL with peptides from the melanoma antigen gp100 modified at HLA-A*0201-binding residues. J Immunol. 157: 2549-2548, 1996.

Parmiani, G. et al. Unique Human Tumor Antigens: Immunobiology and Use in Clinical Trials. The Journal of Immunology, 178: 1975-1979, 2007.

Perissi et al., Electron Spin Resonance and Differential Scanning Calorimetry as Combined Tools for the Study of Liposomes in the Presence of Long Chain Nitroxides, 106 J_ of Phys. Chem. B 10468 (2002).

Pfohl et al., Biological Polyelectrolyte Complexes in Solution and Confined on Patterned Surfaces, 198-200 Colloids & Surfaces A: Physicochemical and Eng. Aspects 613 (2002).

Pieper Lisa A et al: "Secretory pathway optimization of CHO producer cells by co-engineering of the rnitosRNA-1978 target genes CerS2 and Tbc1D20." Metabolic Engineering, Jan. 11, 2017 {Jan. 11, 2017), KP002767666, ISSN: 1096-7184.

Pilla, L. et al. Multipeptide vaccination in cancer patients Expert Opinion on Biological Therapy, 9: 1043-1055, 2009.

Pleasance, E. et al. A small-cell lung cancer genome with complex signatures of tobacco exposure. Nature, 463: 184-190, 2010.

Pleasance, E. et al., A comprehensive catalogue of somatic mutations from a human cancer genome, Nature, 463:191-196 (2010).

PMIR-Report System, miRNA Expression Reporter Vector, Applied Biosystems, 12 pages (Oct. 24, 2008).

Pon, R and Yu, S., Tandem oligonucleotide synthesis using linker phosphoramidites, Nucleic Acids Res, 33(6):1940-1948 (2005).

U.S. Appl. No. 61/334,866, filed May 14, 2010.

Rammansee 2008, Chapter 50: Cancer Vaccines: Some Basic Considerations, Genomic and Personalized Medicine, Hungtington and Ginsburg. E-published on Nov. 11, 2008.

Rammensee (2006). Some considerations on the use of peptides and mRNA for therapeutic vaccination against cancer, Immunol Cell Biol. 84(3):290-4.

Rammensee et al. (2002). Toward patient-specific tumor antigen selection for vaccination, Immunol. Rev. 188:164-176.

Rammensee et al., Immunogenentics, 50 (1999), 213-219.

Rao (1994). Epitope-based vaccines: One step at a lime, Proc. Indian naln. Sci. Acad. B60: 419-424.

Ressing, M. et al. Human CTL epitopes encoded by human papillomavirus types 16E6. J Immunol. 154:5934-5943, 1995.

Roberts, R. et al., REBASE—enzymes and genes for DNA restriction and modification, Nucleic Acids Research, 35(Database issue):D269-70 (2007).

S. Holtkamp et al, Modification of antigen-encoding RNA increases stability, translational efficacy, and T cell stimulatory capacity of dendritic cells, Blood, vol. 108, No. 13, Dec. 15, 2006 (Dec. 25, 2006), pp. 4009-4017, KP055044965, ISSN: 0006-4971, DOI: 10.1182/blood-2006-04--015024.

Saenz-Badillos et al. (2001). RNA as a tumor vaccine: a review of the literature, Exp Dermatol. 10(3):143-54.

Segal et al. (2008). Epitope landscape in breast and colorectal cancer, Cancer Res. 68: 889-892.

Sensi and Aanichini, Unique Tumor Antigens: Evidence for Immune Control of Genome Integrity and Immunogenic Targets for T cell-mediated Patient-Specific Immunotherapy, Clin. Cancer Res. 2006:12(17), 5023.

Sette, A. et al. Peptide Binding to the Most Frequent HLA-A Class I Alleles Measured by Quantitative Molecular Binding Assays Mol. Immunol. 31: 813-822, 1994.

Sette, A. et al. The Relationship Between Class I Binding Affinity and Immunogenicity of Potential Cytotoxic T cell Epitopes. J Immunol. 153: 5586-5592, 1994.

Shah et al. (2009). Mutation of FOXL2 in granulosa-cell tumors of the ovary, N. Eng. J Med. 360: 2719-2729.

Sjoblom et al. (2006). The consensus coding sequences of human breast and colorectal cancers, Science 314: 268-274.

Stephens et al. (2005). A screen of the complete protein kinase gene family identifies diverse patterns of somatic mutations in human breast cancer, Nature Genetics, 37: 590-592.

Thomson et al., J Virology (1998), 72(3):2246-2252.

Toes et al. (1997). Protective anti-tumor immunity induced by vaccination with recombinant adenoviruses encoding multiple tumor-associated cytotoxic T lymphocyte epitopes in a string-of-beads fashion, Proc. Natl. Acad. Sci. USA 94:14660-14665.

UniProtKB-P36888 (FLT3_Human), last sequence update: Aug. 21, 2007.

UniProtKB-Q5SW79 (CE170_Human), last sequence update: Dec. 21, 2004.

UniProtKB-Q9NVD7 (PARVA_Human), last sequence update: Oct. 1, 2000.

UniProtKB, "Print-outs from the UniProtKB database concerning the CEP170, PARVA and FLT3 genes."

Van der Bruggen et al. (1991). A gene encoding an antigen recognized by cytolytic T lymphocytes on a human melanoma, Science 254: 1643-1647.

Van Laere AS, Nguyen M, Braunschweig M. et al. A regulatory mutation in IGF2 causes a major QTL effect on muscle growth in the pig. Nature. 2003;425(6960):832-836.

Wang Jun et al:"PLD3 in Alzheime(s disease." Molecular Neurobiology, vol. 51, No. 2, Apr. 2015 (Apr. 2015)m pp. 480-486, XP002767662, ISSN: 1559-1182, DOI: 10.1007/s12035-014-8779-5.

Weinschenk et al. (2002), Integrated functional genomics approach for the design of patient-individual antitumor vaccines, Cancer Res 62: 5818-5827.

Wolff et al. (1990). Direct gene transfer into mouse muscle in vivo, Science 247: 1465-1468.

Wood et al. (2007). The genomic landscapes of human breast and colorectal cancers, Science 318: 1108-1113.

Wortzel et al. (1983). Multiple tumour-specific antigens expressed on a single tumour cell, Nature 304: 165-167.

Xia Hongwei et al;: "Suppression of RND3 activity by AES downregulation promotes cancer cell proliferation and invasion.", International Journal of Molecular Medecine, vol. 31, No. 5, May 2013 (May 2013), pp. 1081-1086, XP002767661, ISSN: 1791-244X.

Xia, T. et al., MicroRNA-127 Inhibits Lung Inflammation by Targeting IgG Fc γ Receptor I, J Immunol., 188:2437-2444 (2012).

Zhou et al., Hum. Gene Ther., 10(16):2719-24, 1999.

(56) References Cited

OTHER PUBLICATIONS

Abril, J. et al., Altered Expression of 12S/MT-RNRI, MT-CO2/COX2, and MT-ATP6 Mitochondrial Genes in Prostate Cancer, The Prostate, 68:1086-1096 (2008).

* cited by examiner

A

B

A

| PBS: | Primer Binding Site |
| T7-P: | T7 promotor |
| LIB: | Library 3'-UTRs |

| 3'-UTR: | MT-RNR1 | AES | hBg |
| --- | --- | --- | --- |
| (bps) | 142 | 136 | 142 |

A

B

|  | RNA integrity | |
|---|---|---|
|  | unmodified | m1Y modified |
| D-2-hAg-Luc-F-I-UTR-[A30-L-A70] | 81 | 84 |
| D-2-hAg-Luc-2hBgUTR-[A30-L-A70] | 82 | 84 |

Figure 10

CUGGUACUGCAUGCACGCAAUGCUAGCUGCCCCUUUCCGUCCUGGGUACCCCGAGU
CUCCCCGACCUCGGGUCCCAGGUAUGCUCCCACCUCCACCUGCCCCACUCACCACC
UCUGCUAGUUCCAGACACCUCCaagcacgcagcaaugcagcucaaaacgcuuagcc
uagccacaccccacgggaaacagcagugauuaaccuuuagcaauaaacgaaaguuu
aacuaagcuauacuaaccccaggguuggucaauuucgugccagccacacc

A

B

A

B

D

E

F

G

SEQUENCE LISTING

Sequence total quantity: 235
SEQ ID NO: 1 moltype = RNA length = 208
FEATURE Location/Qualifiers
source 1..208
mol_type = other RNA
organism = Homo sapiens
SEQUENCE: 1
catcctgctg ctgctgctgc tgctgctgcg ggtcttcctg gaatctgacc attcgttgtc 60
tgctatgccc gtcctcacca agactgactg cctgctgctt tgctactgcc cgggcccatg 120
agactgactt cccactgctc tgcctgcctc tccccactgc actggcacag ccccgccttg 180
ccgctgctga tccattgccg gtgtgacc 208

SEQ ID NO: 2 moltype = RNA length = 202
FEATURE Location/Qualifiers
source 1..202
mol_type = other RNA
organism = Homo sapiens
SEQUENCE: 2
gctgctgctg ctgctgctgc tgcgggtctt cctggaatct gaccattcgt tgtctgctat 60
gcccgtcctc accaagactg actgcctgct gctttgctac tgcccgggcc catgagactg 120
acttcccact gctctgcctg cctctcccca ctgcactggc acagccccgc cttgccgctg 180
ctgatccatt gccggtgtga cc 202

SEQ ID NO: 3 moltype = RNA length = 210
FEATURE Location/Qualifiers
source 1..210
mol_type = other RNA
organism = Homo sapiens
SEQUENCE: 3
ttcctgctgc tgctgctgct gctgctgctg cgggtcttcc tagaatctga ccattcgttg 60
tctgctatgc ccgtcctcac caagactgac tgcctgctgc tttgctactg cccgggccca 120
tgagactgac ttcccactgc tctgcctgcc tctccccact gcactggcac agccccgcct 180
tgccgctgct gatccattgc cggtgagacc 210

SEQ ID NO: 4 moltype = RNA length = 193
FEATURE Location/Qualifiers
source 1..193
mol_type = other RNA
organism = Homo sapiens
SEQUENCE: 4
tgctgctgct gctgcgggtc ttcctggaat ctgaccattc gttgtctgct atgcccgtcc 60
tcaccaagac tgactgcctg ctgctttgct actgcccggg cccatgagac tgacttccca 120
ctgctctgcc tgcctctccc cactgcactg gcacagcccc gccttgccgc tgctgatcca 180
ttgccggcgg aca 193

SEQ ID NO: 5 moltype = RNA length = 186
FEATURE Location/Qualifiers
source 1..186
mol_type = other RNA
organism = Homo sapiens
SEQUENCE: 5
gctgctgcgg gtcttcctgg aatctgacca ttcgttgtct gctatgcccg tcctcaccaa 60
gactgactgc ctgctgcttt gctactgccc gggcccatga gactgacttc ccactgctct 120
gcctgcctct ccccactgca ctggcacagc cccgccttgc cgctgctgat ccattgccgg 180
cgtacc 186

-continued

```
SEQ ID NO: 6                moltype = RNA   length = 170
FEATURE                     Location/Qualifiers
source                      1..170
                            mol_type = other RNA
                            organism = Homo sapiens
SEQUENCE: 6
ctggaatctg accattcgtt gtctgctatg cccgtcctca ccaagactga ctgcctgctg    60
ctttgctact gcccgggccc atgagactga cttcccactg ctctgcctgc ctctccccac   120
tgcactggca cagccccgcc ttgccgctgc tgatccattg ccggcggacc              170

SEQ ID NO: 7                moltype = RNA   length = 206
FEATURE                     Location/Qualifiers
source                      1..206
                            mol_type = other RNA
                            organism = Homo sapiens
SEQUENCE: 7
tcctgctgct gctgctgctg ctgctgcggg tcttcctgga atctgaccat tcgttgtctg    60
ctatgcccgt cctcaccaag actgactgcc tgctgctttg ctactgcccg ggcccatgag   120
actgacttcc cactgctctg cctgcctctc cccactgcac tggcacagcc ccgccttgcc   180
gctgctgatc cattgccggt gggacc                                        206

SEQ ID NO: 8                moltype = RNA   length = 121
FEATURE                     Location/Qualifiers
source                      1..121
                            mol_type = other RNA
                            organism = Homo sapiens
SEQUENCE: 8
ctgcctgctg ctttgctact gcccgggccc atgagactga cttcccactg ctctgcctgc    60
ctctccccac tgcactggca cagccccgcc ttgccgctgc tgatccattg ccggtagaac   120
c                                                                   121

SEQ ID NO: 9                moltype = RNA   length = 206
FEATURE                     Location/Qualifiers
source                      1..206
                            mol_type = other RNA
                            organism = Homo sapiens
SEQUENCE: 9
tcctgctgct gctgctgctg ctgctgcggg tcttcctgga atctgaccat ttgttgtctg    60
ctatgcccgt cctcaccaag actgactgcc tgctgctttg ctactgcccg ggcccatgag   120
actgacttcc cactgctctg cctgcctctc cccactgcac tggcacagcc ccgccttgcc   180
gctgctgatc cattgccggt gggacc                                        206

SEQ ID NO: 10               moltype = RNA   length = 196
FEATURE                     Location/Qualifiers
source                      1..196
                            mol_type = other RNA
                            organism = Homo sapiens
SEQUENCE: 10
gctgctgctg ctgctgcggg tcttcctgga atctgaccat tcgttgtctg ctatgcccgt    60
cctcaccaag actgactgcc tgctgctttg ctactgcccg ggcccatgag actgacttcc   120
cactgctctg cctgcctctc cccactgcac tggcacagcc ccgccttgcc gctgctgatc   180
cattgccggt gtgacc                                                   196

SEQ ID NO: 11               moltype = RNA   length = 276
FEATURE                     Location/Qualifiers
source                      1..276
                            mol_type = other RNA
                            organism = Homo sapiens
SEQUENCE: 11
tctggcctca ctgagtctga agagctgtta actaccatgg ccagtcctcc ctgagtctga    60
ccatcttcca tcctgctgct gctgctgctg ctgctgcggg tcttcctgga atctgaccat   120
tcgttgtctg ctatgcccgt cctcaccaag actgactgcc tgctgctttg ctactgcccg   180
ggcccatgag actgacttcc cactgctctg cctgcctctc cccactgcac tggcacagcc   240
ccgccttgcc gctgctgatc cattgccggt gtgacc                             276

SEQ ID NO: 12               moltype = RNA   length = 276
FEATURE                     Location/Qualifiers
source                      1..276
                            mol_type = other RNA
                            organism = Homo sapiens
SEQUENCE: 12
tctggcctca ctgagtctga agagctgtta actaccatgg ccagtcctcc ctgagtctga    60
ccatcttcca tcctgctgct gctgctgctg ctgctgcggg tcttcctgga atctgaccat   120
tcgttgtctg ctatgcccgt cctcaccaag actgactgcc tgctgctttg ctactgcccg   180
ggcccatgag actgacttcc cactgctctg cctgcctctc cccactgcac tggcacagcc   240
ccgccttgcc gctgctgatc cattgccggt gtgacc                             276

SEQ ID NO: 13               moltype = RNA   length = 245
FEATURE                     Location/Qualifiers
```

```
source                  1..245
                        mol_type = other RNA
                        organism = Homo sapiens
SEQUENCE: 13
ctaccatggc cagtcctccc tgagtctgac catcttccat cctgctgctg ctgctgctgc    60
tgctgcgggt cttcctggaa tctgaccatt cgttgtctgc tatgcccgtc ctcaccaaga   120
ctgactgcct gctgctttgc tactgcccgg gccatgagac tgacttccc actgctctgc    180
ctgcctttcc ccactgcact ggcacagccc cgccttgccg ctgctgatcc attgccggtg   240
tgacc                                                               245

SEQ ID NO: 14           moltype = RNA  length = 233
FEATURE                 Location/Qualifiers
source                  1..233
                        mol_type = other RNA
                        organism = Homo sapiens
SEQUENCE: 14
gtcctccctg agtctgacca tcttccatcc tgctgctgct gctgctgctg ctgcgggtct    60
tcctggaatc tgaccattcg ttgtctgcta tgcccgtcct caccaagact gactgcctgc   120
tgctttgcta ctgcccgggc catgagact gacttcccac tgctctgcct gcctctcccc    180
actgcactgg cacagccccg ccttgccgct gctgatccat tgccggtctg aca           233

SEQ ID NO: 15           moltype = RNA  length = 232
FEATURE                 Location/Qualifiers
source                  1..232
                        mol_type = other RNA
                        organism = Homo sapiens
SEQUENCE: 15
gtcctccctg agtctgacca tcttccatcc tgctgctgct gctgctgctg ctgcgggtct    60
tcctggaatc tgaccatttg ttgtctgcta tgccctcct caccaagact gactgcctgc    120
tgctttgcta ctgcccgggc catgagact gacttcccac tgctctgcct gccttcccca    180
ctgcactgg acagccccgc cttgccgctg ctgatccatt gccggtgtga cc             232

SEQ ID NO: 16           moltype = RNA  length = 208
FEATURE                 Location/Qualifiers
source                  1..208
                        mol_type = other RNA
                        organism = Homo sapiens
SEQUENCE: 16
ccatcctgct gctgctgctg ctgctgctgc gggtcttcct ggaatctgac cattcgttgt    60
ctgctatgcc cgtcctcacc aagactgact gcctgctgct tgctactgcc cgggcccatg   120
agactgactt cccactgctc tgcctgcctc tccccactgc actggcacag ccccgccttg   180
ccgctgctga tccattgccg gtgtgacc                                      208

SEQ ID NO: 17           moltype = RNA  length = 237
FEATURE                 Location/Qualifiers
source                  1..237
                        mol_type = other RNA
                        organism = Homo sapiens
SEQUENCE: 17
gccagtcctc cctgagtctg accatcttcc atcctgctgc tgctgctgct gctgctgcgg    60
gtcttcctgg aatctgacca ttcgttgtct gctatgcccg tcctcaccaa gactgactgc   120
ctgctgattt gctactgccc gggcccatga gactgacttc ccactgctct gcctgcctct   180
ccccactgca ctggcacagc cccgccttgc cgctgctgat ccattgccgg tgtgacc      237

SEQ ID NO: 18           moltype = RNA  length = 297
FEATURE                 Location/Qualifiers
source                  1..297
                        mol_type = other RNA
                        organism = Homo sapiens
SEQUENCE: 18
tgccttccgt ctcctgctgc ttctggcctc actgagtctg aagagctgtt aactaccatg    60
gccagtcctc cctgagtctg accatcttcc atcctgctgc tgctgctgct gctgctgcgg   120
gtcttcctgg aatctgacca ttcgttgtct gctatgcccg tcctcaccaa gactgactgc   180
ctgctgcttt gctactgccc gggcccatga gactgacttc ccactgctct gcctgcctct   240
ccccactgca ctggcacagc cccgccttgc cgctgctgat ccattgccgg tgtgacc      297

SEQ ID NO: 19           moltype = RNA  length = 238
FEATURE                 Location/Qualifiers
source                  1..238
                        mol_type = other RNA
                        organism = Homo sapiens
SEQUENCE: 19
ggccagtcct ccctgagtct gaccatcttc catcctgctg ctgctgctgc tgctgctgcg    60
gtctttcctg gaatctgacc attcgttgtc tgctatgccc gtcctcacca agactgactg   120
cctgctgctt tgctactgcc cgggcccatg agactgactt cccactgctc tgcctgcctc   180
tccccactgc actggcacag ccccgccttg ccgctgctga tccattgccg gtgtgacc     238

SEQ ID NO: 20           moltype = RNA  length = 238
FEATURE                 Location/Qualifiers
```

```
source                     1..238
                           mol_type = other RNA
                           organism = Homo sapiens
SEQUENCE: 20
ggccagtcct ccctgagtct gaccatcttc catcctgctg ctgctgctg tgctgctgcg   60
ggtcttcctg gaatctgacc attcgttgtc tgctatgccc gtcctcacca agactgactg  120
cctgctgctt tgctactgcc cgggcccatg agactgactt cccactgctc tgcctgcctc  180
tccccactgc actggcacag cccgccttg ccgctgctga tccattgccg gtgtgacc     238

SEQ ID NO: 21              moltype = RNA    length = 219
FEATURE                    Location/Qualifiers
source                     1..219
                           mol_type = other RNA
                           organism = Homo sapiens
SEQUENCE: 21
tgaccatctt ccatcctgct gctgctgctg ctgctgctgc gggtcttcct ggaatctgac   60
cattcgttgt ctgctatgcc cgtcctcacc aagactgact gcctgctgct ttgctactgc  120
ccgggcccat gagactgact tcccactgct ctgcctgcct ctccccactg cactggcaca  180
gccccgcctt gccgctgctg atccattgcc ggtgtgacc                         219

SEQ ID NO: 22              moltype = RNA    length = 237
FEATURE                    Location/Qualifiers
source                     1..237
                           mol_type = other RNA
                           organism = Homo sapiens
SEQUENCE: 22
ccagtcctcc ctgagtctga ccatcttcca tcctgctgct gctgctgtg ctgctgcggg   60
tcttcctgga atctgaccat tcgttgtctg ctatgcccgt cctcaccaag actgactgcc  120
tgctgctttg ctactgcccg ggcccatgag actgacttcc ctctgctctg cctgcctctc  180
cccactgcac tggcacagcc ccgccttgcc gctgctgatc cattgctgt gtgacca      237

SEQ ID NO: 23              moltype = RNA    length = 214
FEATURE                    Location/Qualifiers
source                     1..214
                           mol_type = other RNA
                           organism = Homo sapiens
SEQUENCE: 23
tgaccatctt ccatcctgct gctgctgctg ctgcgggtct tcctggaatc tgaccattcg   60
ttgtctgcta tgcccgtcct taccaagact gactgcctgc tgctttgcta ctgcccgggc  120
ccatgagact gacttcccac tgctctgcct gcctctcccc actgcactgg cacagccccg  180
ccttgtcgct gctgatccat tgccggtgtg acac                              214

SEQ ID NO: 24              moltype = RNA    length = 128
FEATURE                    Location/Qualifiers
source                     1..128
                           mol_type = other RNA
                           organism = Homo sapiens
SEQUENCE: 24
gactgactgc ctgctgcttt gctactgccc gggcccatga gactgacttc ccactgctct   60
gcctgcctct ccccactgca ctggcacagc ccgccttgc cgctgctgat ccattgccgg   120
tgtgaccc                                                           128

SEQ ID NO: 25              moltype = RNA    length = 230
FEATURE                    Location/Qualifiers
source                     1..230
                           mol_type = other RNA
                           organism = Homo sapiens
SEQUENCE: 25
ctccctgagt ctgaccatct tccatcctgc tgctgctgct gctgctgctg cgggtcttcc   60
tggaatctga ccattcgttg tctgctatgc ccgtcctcac caagactgac tgcctgctgc  120
tttgctactg cccgggccca tgagactgac ttcccactgc tctgcctgcc tctccccact  180
gcactggcac agccccgcct tgccgctgct gatccattgc cggtgtgacc             230

SEQ ID NO: 26              moltype = RNA    length = 211
FEATURE                    Location/Qualifiers
source                     1..211
                           mol_type = other RNA
                           organism = Homo sapiens
SEQUENCE: 26
ttccatcctg ctgctgctgc tgctgctgct gcgggtcttc ctggaatctg accattcgtt   60
gtctgctatg cccgtcctca ccaagactga ctgcctgctg ctttgctact gcccgggccc  120
atgagactga cttcccactg ctctgcctgc ctctccccac tgcactggca cagccccgcc  180
ttgccgctgc tgatccattg ccggtgtgac c                                 211

SEQ ID NO: 27              moltype = RNA    length = 143
FEATURE                    Location/Qualifiers
source                     1..143
                           mol_type = other RNA
                           organism = Homo sapiens
```

-continued

```
SEQUENCE: 27
tgcccgtcct caccaagact gactgcctgc tgctttgcta ctcccgggc ccatgagact    60
gacttcccac tgctctgcct gcctctcccc actgcactgg cacagccccg ccttgccgct   120
gctgatccat tgccggtgtg acc                                           143

SEQ ID NO: 28              moltype = RNA   length = 143
FEATURE                    Location/Qualifiers
source                     1..143
                           mol_type = other RNA
                           organism = Homo sapiens
SEQUENCE: 28
tgcccgtcct caccaagact gactgcctgc tgctttgcta ctcccgggc ccatgagact    60
gacttcccac tgctctgcct gcctctcccc actgcactgg cacagccccg ccttgccgct   120
gctgatccat tgccggtgtg acc                                           143

SEQ ID NO: 29              moltype = RNA   length = 181
FEATURE                    Location/Qualifiers
source                     1..181
                           mol_type = other RNA
                           organism = Homo sapiens
SEQUENCE: 29
gcgggtcttc ctggaatctg aacattcgtt gtctgctatg cccgtcctca ccaagactga    60
ctgcctgctg ctttgctact gcccgggccc atgagactga cttcccactg ctctgcctgc   120
ctctccccac tgcactggca cagccccgcc ttgccgctgc tgatccattg ccggtgtgac   180
c                                                                   181

SEQ ID NO: 30              moltype = RNA   length = 154
FEATURE                    Location/Qualifiers
source                     1..154
                           mol_type = other RNA
                           organism = Homo sapiens
SEQUENCE: 30
gttgtctgct atgcccgtcc tcaccaagac tgactgcctg ctgctttgct actgcccggg    60
cccatgagac tgacttccca ctgctctgcc tgcctctccc cactgcactg gcacagcccc   120
gccttgccgc tgctgatcca ttgccggtgt gacc                               154

SEQ ID NO: 31              moltype = RNA   length = 130
FEATURE                    Location/Qualifiers
source                     1..130
                           mol_type = other RNA
                           organism = Homo sapiens
SEQUENCE: 31
caagactgac tgcctgctgc tttgctactg cccgggccca tgagactgac ttcccactgc    60
tctgcctgcc tctccccact gcactggcac agccccgcct tgccgctgct gatccattgc   120
cggtgtgacc                                                          130

SEQ ID NO: 32              moltype = RNA   length = 138
FEATURE                    Location/Qualifiers
source                     1..138
                           mol_type = other RNA
                           organism = Homo sapiens
SEQUENCE: 32
cctcaccaag actgactgcc tgctgctttg ctactgcccg gacccatgag actgacttcc    60
cactgctctg cctgcctctc cccactgcac tggcacagcc cgccttgcc gctgctgatc    120
cattgccggt gtgactgc                                                 138

SEQ ID NO: 33              moltype = RNA   length = 214
FEATURE                    Location/Qualifiers
source                     1..214
                           mol_type = other RNA
                           organism = Homo sapiens
SEQUENCE: 33
cttccatcct gctgctgctg ctgctgctgc tgcgggtctt cctggaatct gaccattcgt    60
tgtctgctat gcccgtcctc accaagactg actgcctgct gctttgctac tgcccgggcc   120
catgagactg acttcccact gctctgcctg cctctcccca ctgcactggc acagccccgc   180
cttgccgctg ctgatccatt gccggtgtga cccc                               214

SEQ ID NO: 34              moltype = RNA   length = 135
FEATURE                    Location/Qualifiers
source                     1..135
                           mol_type = other RNA
                           organism = Homo sapiens
SEQUENCE: 34
ctcaccaaga ctgactgcct gctgctttgc tactgcccgg gcccatgaga ctgacttccc    60
actgctctgc ctgcctctcc ccactgcact ggcacagccc cgccttgccg ctgctgatcc   120
attgccggtg tgacc                                                    135

SEQ ID NO: 35              moltype = RNA   length = 129
FEATURE                    Location/Qualifiers
```

```
source                  1..129
                        mol_type = other RNA
                        organism = Homo sapiens
SEQUENCE: 35
aagactgact gcctgctgct tgctactgc ccgggcccat gagactgact tcccactgct    60
ctgcctgcct ctccccactg cactggcaca gccccgcctt gccgctgctg atccattgcc  120
ggtgtgacc                                                           129

SEQ ID NO: 36           moltype = RNA   length = 541
FEATURE                 Location/Qualifiers
source                  1..541
                        mol_type = other RNA
                        organism = Homo sapiens
SEQUENCE: 36
ctccagctcg cttccatttg cttgcagaag ttctcgctgt gctcacgaag cttgcgctcc    60
ttggaggcct cagcaacagc atcatcaagc tgagcttcca gctctttcct gagcttctca  120
gctctccgca tttcctgccg catggcgtcc accttctgcg tggccaccte catctcctcc  180
tccttgtctc gcagctgccg ggacaccttc tgcgctaaga tgggatacgg cattgaggga  240
tcaatgtgta aggatccgat ctgcttctgt cctcactgag tctgaagagc tgttaactac  300
catggccagt cctccctgag tctgaccatc ttccatcctg ctgctgctgc tgctgctgct  360
gcgggtcttc ctggaatctg accattcgtt gtctgctatg tccgtcctca ccaagactga  420
ctgcctgctg ctttgctact gcccgggccc atgagactga cttcccactg ctctgcctgc  480
ctctccccac tgcactggca gccccgcc ttgccgctgc tgatccattg ccggtgtgac    540
c                                                                   541

SEQ ID NO: 37           moltype = RNA   length = 125
FEATURE                 Location/Qualifiers
source                  1..125
                        mol_type = other RNA
                        organism = Homo sapiens
SEQUENCE: 37
ctgactgcct gctgctttgc tactgcccgg gcccatgaga ctgacttccc actgctctgc    60
ctgcctctcc ccactgcact ggcacagccc cgccttgccg ctgctgatcc attgccggtg  120
tgacc                                                               125

SEQ ID NO: 38           moltype = RNA   length = 131
FEATURE                 Location/Qualifiers
source                  1..131
                        mol_type = other RNA
                        organism = Homo sapiens
SEQUENCE: 38
ccaagactga ctgcctgctg ctttgctact gcccgggccc atgagactga cttcccactg    60
ctctgcctgc ctctccccac tgcactggca gccccgcctt gccgctgctg atccattg    120
acggtgtgac c                                                        131

SEQ ID NO: 39           moltype = RNA   length = 245
FEATURE                 Location/Qualifiers
source                  1..245
                        mol_type = other RNA
                        organism = Homo sapiens
SEQUENCE: 39
taactaccat ggccagtcct ccctgagtct gaccatcttc catcctgctg ctgctgctgc    60
tgctgcgggt cttcctggaa tctgaccatt cgttgtctgc tatgcccgtc tcaccaaga  120
ctgactgcct gctgctttgc tactgcccgg gcccatgaga ctgacttccc actgctctgc  180
ctgcctctcc ccactgcact ggcacagccc cgccttgccg ctgttgatcc attgccggtg  240
tgacc                                                               245

SEQ ID NO: 40           moltype = RNA   length = 131
FEATURE                 Location/Qualifiers
source                  1..131
                        mol_type = other RNA
                        organism = Homo sapiens
SEQUENCE: 40
ccaagactga ctgcctgctg ctttgctact gcccgggccc atgagactga cttcccactg    60
ctctgcctgc ctctccccac tgcactggca gccccgcc ttgccgctgt gatccattg    120
tcggtgtgac c                                                        131

SEQ ID NO: 41           moltype = RNA   length = 131
FEATURE                 Location/Qualifiers
source                  1..131
                        mol_type = other RNA
                        organism = Homo sapiens
SEQUENCE: 41
ccaagactga ctgcctgctg ctttgctact gcccgggccc atgagactga cttcccactg    60
ctctgcctgc ctctccccac tgcactggca gccccgcc ttgccgctgc tgatccattg    120
ccggtgtgac c                                                        131

SEQ ID NO: 42           moltype = RNA   length = 149
FEATURE                 Location/Qualifiers
```

```
source                  1..149
                        mol_type = other RNA
                        organism = Homo sapiens
SEQUENCE: 42
ctgctatgcc tgtcctcacc aagactgact gcctgctgct tgctactgcc ccgggcccat    60
gagactgact tcccactgct ctgcctgcct ctccccaatg cactggcaca gccccgcctt   120
gccgctgctg atccattgcc ggtgtgacc                                     149

SEQ ID NO: 43           moltype = RNA   length = 149
FEATURE                 Location/Qualifiers
source                  1..149
                        mol_type = other RNA
                        organism = Homo sapiens
SEQUENCE: 43
ctgctatgcc cgtcctcacc aagactgact gcctgctgct tgctactgcc ccgggcccat    60
gagactgact tcccactgct ctgcctgcct ctcccactg cactggcaca gccccgcctt    120
gccgctgctg atccattgcc ggtgtgacc                                     149

SEQ ID NO: 44           moltype = RNA   length = 147
FEATURE                 Location/Qualifiers
source                  1..147
                        mol_type = other RNA
                        organism = Homo sapiens
SEQUENCE: 44
gctatgcccg tcctcaccaa gactgactgc ctgctgcttt gctactgccc gggcccatga    60
gactgacttc ccactgctct gcctgcctct cccactgca ctggcacagc ccgccttgc    120
cgctgctgat ccattgccgg tgtgacc                                       147

SEQ ID NO: 45           moltype = RNA   length = 176
FEATURE                 Location/Qualifiers
source                  1..176
                        mol_type = other RNA
                        organism = Homo sapiens
SEQUENCE: 45
tcttcctgga atctgaccat tcgttgtctg ctatgcccgt cctcaccaag actgactgcc    60
tgctgctttg ctactgcccg ggcccatgag actgacttcc cactgctctg cctgcctctc   120
cccactgcac tggcacagcc ccgccttgcc gctgctgatc cattgccggt gtgacc       176

SEQ ID NO: 46           moltype = RNA   length = 171
FEATURE                 Location/Qualifiers
source                  1..171
                        mol_type = other RNA
                        organism = Homo sapiens
SEQUENCE: 46
ctggaatctg accattcgtt gtctgctatg cccgtcctca ccaagactga ctgcctgctg    60
ctttgctact gcccgggccc atgagactga cttcccactg ctctgcctgc ctctccccac   120
tgcactggca gccccgcc ttgccgctgc tgatccattg ccggtgtgac c              171

SEQ ID NO: 47           moltype = RNA   length = 171
FEATURE                 Location/Qualifiers
source                  1..171
                        mol_type = other RNA
                        organism = Homo sapiens
SEQUENCE: 47
ctggaatctg accattcgtt gtctgctatg cccgtcctca ccaagactga ctgcctgctg    60
ctttgctact gcccgggccc atgagactga cttcccactg ctctgcctgc ctctccccac   120
tgcactggca gccccgcc ttgccgctgc tgatccattg ccggtgtgac c              171

SEQ ID NO: 48           moltype = RNA   length = 169
FEATURE                 Location/Qualifiers
source                  1..169
                        mol_type = other RNA
                        organism = Homo sapiens
SEQUENCE: 48
ggaatctgac cattcgttgt ctgctatgcc cgtcctcacc aagactgact gcctgctgct    60
ttgctactgc ccgggcccat gagactgact tcccactgct ctgcctgcct ctccccactg   120
cactggcaca gccccgcctt gccgctgctg atccattgcc ggtgtgacc               169

SEQ ID NO: 49           moltype = RNA   length = 131
FEATURE                 Location/Qualifiers
source                  1..131
                        mol_type = other RNA
                        organism = Homo sapiens
SEQUENCE: 49
ccaagactga ctgcctgctg ctttgctact gcccgggccc atgagactga cttcccactg    60
ctctgcctgc ctctccccac tgcactggca tagccccgcc ttgccgctgc tgatccattg   120
ccggtgtgac c                                                        131

SEQ ID NO: 50           moltype = RNA   length = 175
```

```
FEATURE              Location/Qualifiers
source               1..175
                     mol_type = other RNA
                     organism = Homo sapiens
SEQUENCE: 50
cttcctggaa tctgaccatt cgttgtctgc tatgcccgtc ctcaccaaga ctgactgcct    60
gctgctttgc tactgcccgg gcccatgaga ctgacttccc actgtctgc  ctgcctctcc   120
ccactgcact ggcatagccc cgccttgccg ctgctgatcc atttccggtg tgacc         175

SEQ ID NO: 51        moltype = RNA   length = 140
FEATURE              Location/Qualifiers
source               1..140
                     mol_type = other RNA
                     organism = Homo sapiens
SEQUENCE: 51
cagacacccg ccccccggcc ctggctaaga atttgcttcc tgttgccagc atgacctacc    60
ctcgcctctt tgatgccatc cgctgccacc tcctttttgct cctggaccct ttagcctctc   120
tgcccttcca ctctctgacc                                                140

SEQ ID NO: 52        moltype = RNA   length = 149
FEATURE              Location/Qualifiers
source               1..149
                     mol_type = other RNA
                     organism = Homo sapiens
SEQUENCE: 52
ttccagccag acacccgccc cccggccctg gctaagaagt tgcttcctgt tgccagcatg    60
acctaccctc gcctctttga tgccatccgc tgccacctcc ttttgctcct ggacccttta   120
gcctctctgc ccttccactc tctgacccc                                      149

SEQ ID NO: 53        moltype = RNA   length = 212
FEATURE              Location/Qualifiers
source               1..212
                     mol_type = other RNA
                     organism = Homo sapiens
SEQUENCE: 53
ctcgcttcct gggtctgcag gtccagccgg ctggcaccct ccatgtaccc aggggagatt    60
ccagccagac acccgccccc cggccctggc taagaagttg cttcctgttg ccagcatgac   120
ctaccctcgc ctctttgatg ccatccgctg ccacctcctt tgctcctgg acccttagc    180
ctctctgccc ttccactctc tgaccaccgc cc                                  212

SEQ ID NO: 54        moltype = RNA   length = 144
FEATURE              Location/Qualifiers
source               1..144
                     mol_type = other RNA
                     organism = Homo sapiens
SEQUENCE: 54
tccagccaga cacccgcccc ccggccctgg ctaagaagtt gcttcctgtt gccagcatga    60
cctaccctcg cctctttgat gccatccgct gccacctcct tttgctcctg gacccttag   120
cttctctgcc cttccactct ctgg                                           144

SEQ ID NO: 55        moltype = RNA   length = 207
FEATURE              Location/Qualifiers
source               1..207
                     mol_type = other RNA
                     organism = Homo sapiens
SEQUENCE: 55
cgcttcctgg gtctgcaggt ccagccggct ggcaccctcc acgtacccag ggagattcc     60
agccagacac ccgccccccg gccctggcta agaagttgct tcctgttgcc agcatgacct   120
accctcgcct ctttgatgcc atccgctgcc acctcctttt gctcctggac cctttagcct   180
ctctgccctt ccactctctg accaccg                                        207

SEQ ID NO: 56        moltype = RNA   length = 158
FEATURE              Location/Qualifiers
source               1..158
                     mol_type = other RNA
                     organism = Homo sapiens
SEQUENCE: 56
catgtaccca ggggagattc cagccagaca cccgcccccc ggccctggct aagaagttgc    60
ttcctgttgc cagcatgacc taccctcgcc tctttgatgc catccgctgc cacctccttt   120
tgctcctgga cccttagcc tctctgccct tccactcg                            158

SEQ ID NO: 57        moltype = RNA   length = 197
FEATURE              Location/Qualifiers
source               1..197
                     mol_type = other RNA
                     organism = Homo sapiens
SEQUENCE: 57
ctcgcttcct gggtctgcag gtccagccgg ctggcaccct ccatgtaccc aggggagatt    60
ccagccagac acccgccccc cggccctggc taagaagttg cttcctgttg ccagcatgac   120
```

```
ctaccctcgc ctcttcgatg ccatccgctg ccacctcctt ttgctcctgg acccttcagc    180
ctctctgccc ccccgat                                                   197

SEQ ID NO: 58          moltype = RNA   length = 236
FEATURE                Location/Qualifiers
source                 1..236
                       mol_type = other RNA
                       organism = Homo sapiens
SEQUENCE: 58
cccagctccc taggcgtccc atctcgcttc ctgggtctgc aggtccagcc ggctggcacc    60
ctccatgtac caggggaga ttccagccag acacccgccc ccggccctg gctaagaagt     120
tgcttcctgt tgccagcatg acctaccctc gcctctttga tgccatccgc tgccacctcc    180
ttttgctcct ggaccctta gcctctctgc ccttccactc tttgaccccc atctta         236

SEQ ID NO: 59          moltype = RNA   length = 273
FEATURE                Location/Qualifiers
source                 1..273
                       mol_type = other RNA
                       organism = Homo sapiens
SEQUENCE: 59
ggccaccggg catgggaagt atgagaaggt gcttgtggaa gggggcccgg ctccctaggc    60
gtcccatctc gcttcctggg tctgcaggtc agccggcgt gcaccctcca tgtacccagg    120
gagattccag ccagacaccc gccccccggc cctggctaag aagttgcttc ctgttgccag    180
catgacctac cctcgcctct tgatgccat ccgctgccac ctccttttgc tcctggaccc    240
tttagcctct ctgcccttcc actctctgac ccc                                 273

SEQ ID NO: 60          moltype = RNA   length = 171
FEATURE                Location/Qualifiers
source                 1..171
                       mol_type = other RNA
                       organism = Homo sapiens
SEQUENCE: 60
tgtacccagg ggagattcca gccagacacc cgcccccgg ccctggctaa gaagttgctt     60
cctgttgcca gcatgaccta ccctcgcctc tttgatgcca tccgctgcca ctccttttg    120
ctcctggacc ctttagcctc tctgcccttc cactctctga ccaccacccc c             171

SEQ ID NO: 61          moltype = RNA   length = 134
FEATURE                Location/Qualifiers
source                 1..134
                       mol_type = other RNA
                       organism = Homo sapiens
SEQUENCE: 61
ccggccctgg ctaagaagtt gcttcctgtt gccagcatga cctaccctcg cctctttgat    60
gccatccgct gccacctcct tttgctcctg gacccttag cctctctgcc cttccactct    120
ctgaccacag cccc                                                      134

SEQ ID NO: 62          moltype = RNA   length = 140
FEATURE                Location/Qualifiers
source                 1..140
                       mol_type = other RNA
                       organism = Homo sapiens
SEQUENCE: 62
cccggccct ggctaagaag ttgcttcctg ttgccagcat gacctaccct cgcctctttg     60
atgccatccg ctgccacctc cttttgctcc tggacccttt agcctctctg cccttccact    120
ctctgaccac cgccccgcc                                                 140

SEQ ID NO: 63          moltype = RNA   length = 188
FEATURE                Location/Qualifiers
source                 1..188
                       mol_type = other RNA
                       organism = Homo sapiens
SEQUENCE: 63
ccggctggca ccctccatgt acccagggga gattccagcc agacaccgc cccccggccc     60
tggctaagaa gttgcttcct gttgccagca tgacctaccc tcgcctcttt gatgccatcc    120
gctgccacct ccttttgctc ctggaccctt tagcctctct gcccttccac tctctgacca    180
ccgccccc                                                             188

SEQ ID NO: 64          moltype = RNA   length = 190
FEATURE                Location/Qualifiers
source                 1..190
                       mol_type = other RNA
                       organism = Homo sapiens
SEQUENCE: 64
gccggctggc accctccatg tacccagggg agattccagc cagacaccg ccccccggcc     60
ctggctaaga agttgcttcc tgttgccagc atgacctacc tcgcctctt tgatgccatc    120
cgctgccacc tccttttgc tcctggaccc tttagcctct ctgcccttcc actctctgac    180
caccgccccc                                                           190

SEQ ID NO: 65          moltype = RNA   length = 154
```

```
FEATURE              Location/Qualifiers
source               1..154
                     mol_type = other RNA
                     organism = Homo sapiens
SEQUENCE: 65
tccagccaga cacccgcccc ccggccctgg ctaagaagtt gcttcctgtt gccagcatga    60
cctaccctcg cctctttgat gccatccgct gccacctcct tttgctcctg gacccttttag  120
cctctctgcc cttccactct ctgaccacca cccc                               154

SEQ ID NO: 66         moltype = RNA   length = 146
FEATURE              Location/Qualifiers
source               1..146
                     mol_type = other RNA
                     organism = Homo sapiens
SEQUENCE: 66
gccagacacc cgccccccgg ccctggctaa gaagttgctt cctgttgcca gcatgaccta    60
ccctcgcctc tttgatgcca tccgctgcca cctccttttg ctcctggacc ctttagcctc   120
tctgcccttc cactctctga cccccc                                        146

SEQ ID NO: 67         moltype = RNA   length = 150
FEATURE              Location/Qualifiers
source               1..150
                     mol_type = other RNA
                     organism = Homo sapiens
SEQUENCE: 67
tccagccaga cacccgcccc ccggccctgg ctaagaagtt gcttcctgtt gccagcatga    60
cctaccctcg cctctttgat gccatccgct gccacctcct tttgctcctg gaccctttag   120
cctctctgcc cttccactct ctgacccccc                                    150

SEQ ID NO: 68         moltype = RNA   length = 233
FEATURE              Location/Qualifiers
source               1..233
                     mol_type = other RNA
                     organism = Homo sapiens
SEQUENCE: 68
cggctcccta ggcgtccat ctcgcttcct gggtctgcag gtccagccgg ctggcaccct    60
ccatgtaccc aggggagatt ccagccagac acccgccccc cggccctggc taagaagttg  120
cttcctgttg ccagcatgac ctaccctcgc ctctttgatg ccatccgctg ccacctcctt  180
ttgctcctgg acccttttagc ctctctgccc ttccactctc tgaccactgc ccc        233

SEQ ID NO: 69         moltype = RNA   length = 197
FEATURE              Location/Qualifiers
source               1..197
                     mol_type = other RNA
                     organism = Homo sapiens
SEQUENCE: 69
tgcaggtcca gccggctggc accctccatg tacccagggg agattccagc cagacaccca   60
ccccccggcc ctggctaaga agttgctcct gttgccagca tgacctaccc tcgcctcttt  120
gatgccatcc gctgccacct ccttttgctc ctggaccctt tagcctctct gcccttccac  180
tctctgacca ctaccc                                                  197

SEQ ID NO: 70         moltype = RNA   length = 155
FEATURE              Location/Qualifiers
source               1..155
                     mol_type = other RNA
                     organism = Homo sapiens
SEQUENCE: 70
ttccagccag acaccogccc ccggccctg gctaagaagt tgcttcctgt tgccagcatg    60
acctaccctc gcctctttga tgccatccgc tgccacctcc ttttgctcct ggaccctta   120
gcctctctgc ccttccactc tctgaccact gcccc                             155

SEQ ID NO: 71         moltype = RNA   length = 134
FEATURE              Location/Qualifiers
source               1..134
                     mol_type = other RNA
                     organism = Homo sapiens
SEQUENCE: 71
cccgccccc ggccctggct aagaagttgc ttcctgttgc cagcatgacc taccctcgcc    60
tctttgatgc catccgctgc cacctccttt tgctcctgga cctttagcc tctctgccct   120
tccactctct gacc                                                    134

SEQ ID NO: 72         moltype = RNA   length = 147
FEATURE              Location/Qualifiers
source               1..147
                     mol_type = other RNA
                     organism = Homo sapiens
SEQUENCE: 72
cagccagaca cccgccccc ggccctggct aagaagttgc ttcctgttgc cagcatgacc    60
taccctcgcc tctttgatgc catccgctgc cacctccttt gctcctgga ccctttagcc   120
```

```
tctctgccct tccactctct gaacacc                                              147

SEQ ID NO: 73           moltype = RNA   length = 192
FEATURE                 Location/Qualifiers
source                  1..192
                        mol_type = other RNA
                        organism = Homo sapiens
SEQUENCE: 73
gagcctactc tgatgaccgt ggccttggct cctccaggaa ggctcaggag ccctacctcc           60
ctgccattat agctgctccc cgccagaagc ctgtgccaac tctctgcatt ccctgatctc          120
ctgtggctgt cacccttggt cacctccgtg ctgtcactgc catctccccc ctgacccctc          180
gaacccatcc ta                                                              192

SEQ ID NO: 74           moltype = RNA   length = 191
FEATURE                 Location/Qualifiers
source                  1..191
                        mol_type = other RNA
                        organism = Homo sapiens
SEQUENCE: 74
gagcctactc tgatgaccgt ggccttggct cctccaggaa ggctcaggcg ccctacctcc           60
ctgccattat agctgctccc cgccagaagc ctgtgccaac tctctgcatt ccctgatctc          120
catccctgtg gctgtcaccc ttggtcacct ccgtgctgtc actgccatct cccccctgac          180
ccctctaacc c                                                               191

SEQ ID NO: 75           moltype = RNA   length = 162
FEATURE                 Location/Qualifiers
source                  1..162
                        mol_type = other RNA
                        organism = Homo sapiens
SEQUENCE: 75
gcctactctg atgaccgtgg ccttggctcc tccaggaagg ctcaggagcc tacctccct            60
gccattatag ctgctccccg ccagaagcct gtgccaactc tctgcattcc ctgatctcca         120
tccctgtggc tgtcacccttg ggtccactgc catctccccc cc                           162

SEQ ID NO: 76           moltype = RNA   length = 183
FEATURE                 Location/Qualifiers
source                  1..183
                        mol_type = other RNA
                        organism = Homo sapiens
SEQUENCE: 76
gagcctactc tgatgaccgt ggccttggct cctccaggaa ggctcaggag ccctacctcc           60
ctgccattat agctgctccc cgccagaagc ctgtgccaac tctctgcatt ccctgatctc          120
catccctgtg gctgtcaccc ttggtcacct ccgtgctgtt actgccatct cccccctgac          180
ccc                                                                        183

SEQ ID NO: 77           moltype = RNA   length = 240
FEATURE                 Location/Qualifiers
source                  1..240
                        mol_type = other RNA
                        organism = Homo sapiens
SEQUENCE: 77
gaagagccta ctctgatgac cgtggccttg gctcctccag gaaggctcag gagccctacc           60
tccctgccat tatagctgct ccccgccaga agcctgtgcc aactctctgc attccctgat          120
ctccatccct gtggctgtca tccttggtca cctccgtgct gtcactgcca tctccccct           180
gacccctcta acccatcctc tgcctccctc cctgcagtca gagggtcctg ttcccaacca          240

SEQ ID NO: 78           moltype = RNA   length = 166
FEATURE                 Location/Qualifiers
source                  1..166
                        mol_type = other RNA
                        organism = Homo sapiens
SEQUENCE: 78
tgtggccttg gctcctccag gaaggctaag gagccctacc tccctgccat tatagctgct           60
ccccgccaga agcctgtgcc aactctctgc attccctgat ctccatccct gtggctgtca          120
cccttggtca cctccgtgct gtcactgcca tctccccct gacccc                          166

SEQ ID NO: 79           moltype = RNA   length = 155
FEATURE                 Location/Qualifiers
source                  1..155
                        mol_type = other RNA
                        organism = Homo sapiens
SEQUENCE: 79
gccttggctc tccaggaag gctcaggagc cctacctccc tgccattata gctgctcccc            60
gccagaagcc tgtgccaact ctctgcattc cctgatctc atccctgtgg ctgtcaccct           120
tggtcacctc cgtgctgtca ctgccatctc cccc                                      155

SEQ ID NO: 80           moltype = RNA   length = 310
FEATURE                 Location/Qualifiers
source                  1..310
```

```
                       mol_type = other RNA
                       organism = Homo sapiens
SEQUENCE: 80
agagcctact ctgatgaccg tggccttggc tcctccagga aggctcagga gccctacctc    60
cctgccatta tagctgctcc ccgcagaag  cctgtgccaa ctctctgcat tccctgatct   120
ccatccctgt ggctgtcacc cttggtcacc tccgtgctgt cactgccatc tcccccctga   180
cccctctaac ccatcctctg cctccctccc tgcagtcaga gggtcctgtt cccatcagcg   240
attcccctgc ttaaaccctt ccatgactcc ccactgccct aagctgaggt cagtctccca   300
agcctgacat                                                          310

SEQ ID NO: 81          moltype = RNA   length = 204
FEATURE                Location/Qualifiers
source                 1..204
                       mol_type = other RNA
                       organism = Homo sapiens
SEQUENCE: 81
tatagctgct ccccgccaga agcctgtgcc aactctctgc attccctgat ctccatccct    60
gtggctgtca cccttggtca cctccgtgct gtcactgcca tctcccccct gaccctcta    120
acccatcctc tgcctccctc cctgcagtca gagggtcctg ttcccatcag cgattcccct   180
gcttaaaccc ttccatgaca gccc                                          204

SEQ ID NO: 82          moltype = RNA   length = 169
FEATURE                Location/Qualifiers
source                 1..169
                       mol_type = other RNA
                       organism = Homo sapiens
SEQUENCE: 82
tctgcattcc ctgatctcca tccctgtggc tgtcacccct ggtcacctcc gtgctgtcac    60
tgccatctcc ccctgaccc  ctctaaccca tcctctgcct ccctcccctgc agtcagaggg  120
tcctgttccc atcagcgatt cccctgctta agcccttcca tgactcccc                169

SEQ ID NO: 83          moltype = RNA   length = 217
FEATURE                Location/Qualifiers
source                 1..217
                       mol_type = other RNA
                       organism = Homo sapiens
SEQUENCE: 83
ctccctgcca ttatagctgc tccccgccag aagcctgtgc caactctctg cattccctga    60
tctccatccc tgtggctgtc acccttggtc acctccgtgc tgtcactgcc atctcccccc   120
tgacccctct aacccatcct ctgcctcccct cctgcagtc agagggtcct gttcccatca   180
gcgattcccc tgcttaaacc cttccatgac tccccaa                            217

SEQ ID NO: 84          moltype = RNA   length = 272
FEATURE                Location/Qualifiers
source                 1..272
                       mol_type = other RNA
                       organism = Homo sapiens
SEQUENCE: 84
gcctactctg atgaccgtgg ccttgggtcc tccaggaagg ctcaggagcc ctacctccct    60
gccattatag ctgctccccg ccagaagtct gtgccaactc tctgcattcc ctgatctcca   120
tccctgtggc tgtcacccctt ggtcacctcc gtgctgtcac tgccatctcc ccctgaccc   180
ctctaaccca tcctctgcct ccctccctgc agtcagaggg tcctgttccc atcagcgatt   240
cccctgctta aaccttcca  tgactcccct ct                                 272

SEQ ID NO: 85          moltype = RNA   length = 131
FEATURE                Location/Qualifiers
source                 1..131
                       mol_type = other RNA
                       organism = Homo sapiens
SEQUENCE: 85
ctacctccct gccattatag ctgctccccg ccagaagcct gtgccaactc tgcattcc     60
ctgatctcca tccctgtggc tgtcacccctt ggtcacctcc gtgctgtcac tgccatctcc  120
ccctgacccc c                                                        131

SEQ ID NO: 86          moltype = RNA   length = 136
FEATURE                Location/Qualifiers
source                 1..136
                       mol_type = other RNA
                       organism = Homo sapiens
SEQUENCE: 86
ctggtactgc atgcacgcaa tgctagctgc cccttcccg  tcctgggtac cccgagtctc    60
ccccgacctc gggtcccagg tatgctccca cctccacctg ccccactcac cacctctgct   120
agttccagac acctcc                                                   136

SEQ ID NO: 87          moltype = RNA   length = 203
FEATURE                Location/Qualifiers
source                 1..203
                       mol_type = other RNA
                       organism = Homo sapiens
```

```
SEQUENCE: 87
ccggccttc  ccccgttttg  aacatgtgta  accgacagtc  tgcctgggcc  acagccctct   60
caccctggta  ctgcatgcac  gcaatgctag  ctgccccttt  cccgtcctgg  gcaccccgag  120
tctcccccga  ccccgggtcc  caggtatgct  cccacctcca  cctgcccac   tcaccacctc  180
tgctagttcc  agacaccccc  gcg                                             203

SEQ ID NO: 88           moltype = RNA  length = 197
FEATURE                 Location/Qualifiers
source                  1..197
                        mol_type = other RNA
                        organism = Homo sapiens
SEQUENCE: 88
ccttccccg   ttttgaacat  gtgtaaccga  cagtctgcct  gggccacagc  cctctcaccc   60
tggtactgca  tgcacgcaat  gctagctgcc  cctttcccgc  cctgggcacc  ccgagtctcc  120
cccgaccccg  ggtcccaggt  atgctcccac  ctccacctgc  cccactcacc  acctctgcta  180
gttccagaca  cctccac                                                     197

SEQ ID NO: 89           moltype = RNA  length = 273
FEATURE                 Location/Qualifiers
source                  1..273
                        mol_type = other RNA
                        organism = Homo sapiens
SEQUENCE: 89
tctgctgggg  ccacagccct  ctcaccctgg  tactgcatgc  acgcaatgct  agctgccct    60
ttcccgtcct  gggcaccccg  agtctccccc  gaccccgggt  cccaggtatg  ctcccacctc  120
cacctgcccc  actcaccacc  tctgctagtt  ccagacacct  ccacgccac   ctggtcctct  180
cccatcgccc  acaaaagggg  gggcacgagg  gacgagctta  gctgagctgg  gaggagcagg  240
gtgagggtgg  gcgacccagg  attccccac   ccc                                 273

SEQ ID NO: 90           moltype = RNA  length = 199
FEATURE                 Location/Qualifiers
source                  1..199
                        mol_type = other RNA
                        organism = Homo sapiens
SEQUENCE: 90
tgacacctca  gctgacagcg  tgggcaacgc  ctgccgcctg  tctctgaggcc  cgatccagtg   60
ggcaggccaa  ggcctgctgg  gccccgcgg   acccaggtgc  tctgggtcac  ggtccctgtc  120
cccgcacccc  cgcttctgtc  tgccccattg  tggctcctca  ggctctctcc  cctgctctcc  180
cacctctacc  tccacccca                                                   199

SEQ ID NO: 91           moltype = RNA  length = 193
FEATURE                 Location/Qualifiers
source                  1..193
                        mol_type = other RNA
                        organism = Homo sapiens
SEQUENCE: 91
ctcagctgac  agcgtgggca  acgcctgccg  cctgctctga  ggcccgatcc  agtgggcagg   60
ccaaggcctg  ctgggcccc   gcggaccag   gtgctctggg  tcacggtccc  tgtccccgca  120
cccccgcttc  tgtctgcccc  attgtggctc  tcaggctct   ctccctgct   ctcccacctc  180
tacctccact  ccc                                                         193

SEQ ID NO: 92           moltype = RNA  length = 158
FEATURE                 Location/Qualifiers
source                  1..158
                        mol_type = other RNA
                        organism = Homo sapiens
SEQUENCE: 92
tctgaggccc  gatccagtgg  gcaggccaag  gcctgctggg  ccccgcgga   cccaggtgct   60
ctgggtcacg  gtccctgtcc  ccgcacccc   gcttctgtct  gccccattgt  ggctcctcag  120
gctctctccc  ctgctctccc  acctctacct  ccacccc                             158

SEQ ID NO: 93           moltype = RNA  length = 153
FEATURE                 Location/Qualifiers
source                  1..153
                        mol_type = other RNA
                        organism = Homo sapiens
SEQUENCE: 93
ggcccgatcc  agtgggcagg  ccaaggcctg  ctgggcccc   gcggacccag  gtgctctggg   60
tcacggtccc  tgtccccgca  ccccgcttc   tgtctgcccc  attgtggctc  tcaggctct   120
ctccctgct   ctcccacctc  tacctccacc  ccc                                 153

SEQ ID NO: 94           moltype = RNA  length = 128
FEATURE                 Location/Qualifiers
source                  1..128
                        mol_type = other RNA
                        organism = Homo sapiens
SEQUENCE: 94
gcctgctggg  ccccgcgga   cccaggtgct  ctgggtcacg  gtccctgtcc  ccgcacccc    60
gcttctgtct  gccccattgt  ggctcctcag  gctctctccc  ctgctctccc  acctctacct  120
```

```
                                                                    ccgccccc                                                                128

SEQ ID NO: 95            moltype = RNA   length = 116
FEATURE                  Location/Qualifiers
source                   1..116
                         mol_type = other RNA
                         organism = Homo sapiens
SEQUENCE: 95
cgcggaccca ggtgctctgg gtcacggtcc ctgtcccgc accccgctt ctgtctgccc         60
cattgtggct ccttaggctc tctccctgc tctcccacct ttacctccac ccctac           116

SEQ ID NO: 96            moltype = RNA   length = 190
FEATURE                  Location/Qualifiers
source                   1..190
                         mol_type = other RNA
                         organism = Homo sapiens
SEQUENCE: 96
ctgacagcgt gggcaacgcc tgccgcctgc tctgaggccc gatccagtgg gcaggccaag       60
gcctgctggg ccccgcgga cccaggtgct ctgggtcacg gtccctgtcc ccgcacccc        120
gcttctgtct gccccattgt ggctcctcag gctctctccc ctgctctccc acctctacct     180
ccaccccac                                                             190

SEQ ID NO: 97            moltype = RNA   length = 191
FEATURE                  Location/Qualifiers
source                   1..191
                         mol_type = other RNA
                         organism = Homo sapiens
SEQUENCE: 97
ctgacagcgt gggcaacgcc tgccgcctgc tctgaggccc gatccagtgg gcaggccaag       60
gcctgctggg ccccgcgga cccaggtgct ctgggtcacg gtccctgtcc ccgcacccc        120
gcttctgtct gccccattgt ggctcctcag gctctctccc ctgctctccc acctctacct     180
ccaccccaa c                                                           191

SEQ ID NO: 98            moltype = RNA   length = 191
FEATURE                  Location/Qualifiers
source                   1..191
                         mol_type = other RNA
                         organism = Homo sapiens
SEQUENCE: 98
ctgacagcgt gggcaacgcc tgccgcctgc tctgaggccc gatccagtgg gcaggccaag       60
gcctgctggg ccccgcgga cccaggtgct ctgggtcacg gtccctgtcc ccgcacccc        120
gcttctgtct gccccattgt ggctcctcag gctctctccc ctgctctccc acctctacct     180
ccaccccaa c                                                           191

SEQ ID NO: 99            moltype = RNA   length = 184
FEATURE                  Location/Qualifiers
source                   1..184
                         mol_type = other RNA
                         organism = Homo sapiens
SEQUENCE: 99
cgtgggcaac gcctgccgcc tgctctgagg cccgatccag tgggcaggcc aaggcctgct       60
gggccccgc ggacccaggt gctctgggtc acggtccctg tccccgcacc ccgcttctg        120
tctgccccat tgtggctcct caggctctct ccctgctctc ccacctcta cctccaccca     180
cacc                                                                  184

SEQ ID NO: 100           moltype = RNA   length = 238
FEATURE                  Location/Qualifiers
source                   1..238
                         mol_type = other RNA
                         organism = Homo sapiens
SEQUENCE: 100
tcctgaggga ctgggactcc ccttacagcc atgaccttga cacctcagct gacagcgtgg       60
gcaacgcctg ccgcctgctc tgaggcccga tccagtggg aggccaaggc ctgctgggc       120
ccgcggacc caggtgctct gggtcacggt ccctgtcccc gcaccccgc ttctgtctgc       180
cccattgtgg ctcctcaggc tctctcccct gctctcccac ctctacctcc acgccac        238

SEQ ID NO: 101           moltype = RNA   length = 234
FEATURE                  Location/Qualifiers
source                   1..234
                         mol_type = other RNA
                         organism = Homo sapiens
SEQUENCE: 101
ctgagggact gggactcccc ttacagccat gaccttgaca cctcagctga cagcgtgggc       60
aacgcctgc cgcctgctctg aggcccgatc cagtgggac gcaaggcct gctgggccc        120
cgcggaccca ggtgctctgg gtcacggtcc ctgtcccgc accccgctt ctgtctgccc       180
cattgtggct cctcaggctc tctccctgc tctcccacct ctacctccac acct             234

SEQ ID NO: 102           moltype = RNA   length = 258
FEATURE                  Location/Qualifiers
```

```
source                  1..258
                        mol_type = other RNA
                        organism = Homo sapiens
SEQUENCE: 102
tgcggagcca gctggaggcc attttcctga gggactggga ctccccttac agccatgacc    60
ttgacacctc agctgacagc gtgggcaacg cctgccgcct gctctgaggc ccgatccagt   120
gggcaggcca aggcctgctg gcccccgcg gacccaggtg tctgggtca cggtccctgt    180
ccccgcaccc ccgcttctgt ctgccccatt gtggctcctc aggctctctc ccctgctctc   240
ccacctctac ctccaccc                                                 258

SEQ ID NO: 103          moltype = RNA   length = 249
FEATURE                 Location/Qualifiers
source                  1..249
                        mol_type = other RNA
                        organism = Homo sapiens
SEQUENCE: 103
ctggaggcca ttttcctgag ggactgggac tcccttaca gccatgacct tgacacctca    60
gctgacagcg tgggcaacgc ctgccgcctg tctgaggcc cgatccagtg ggcaggccaa   120
ggcctgctgg gccccgcgg acccaggtgt ctgggtcac ggtccctgtc ccgcacccc    180
cgcttctgtc tgccccattg tggctcctca ggctctctcc cctgctctcc cacctctacc   240
tccccccac                                                           249

SEQ ID NO: 104          moltype = RNA   length = 226
FEATURE                 Location/Qualifiers
source                  1..226
                        mol_type = other RNA
                        organism = Homo sapiens
SEQUENCE: 104
ctgggactcc ccttacagcc atgaccttga cacctcagct gacagcgtgg gcaacgcctg    60
ccgcctgctc tgaggcccaa tccagtgggc aggccaaggc ctgctgggcc ccgcgggacc   120
caggtgctct gggtcacggt ccctgtcccg caccccgc ttctgtctgc cccattgtgc    180
ctccttaggc tctctcccct gctcccac ctctacctcc accccc                  226

SEQ ID NO: 105          moltype = RNA   length = 133
FEATURE                 Location/Qualifiers
source                  1..133
                        mol_type = other RNA
                        organism = Homo sapiens
SEQUENCE: 105
gcagcaatgc agctcaaaac gcttagccta gccacacccc cacgtaaac agcagtgatt    60
aacttttagc aataaacgaa agtttaacta agctatacta accccagggt tggtcaattt   120
cgtgccagcc acc                                                      133

SEQ ID NO: 106          moltype = RNA   length = 233
FEATURE                 Location/Qualifiers
source                  1..233
                        mol_type = other RNA
                        organism = Homo sapiens
SEQUENCE: 106
cttttctatta gctcttagta agattacaca tgcaagcatc cccgttccag tgagttcacc    60
ctctaaatca ccacgataaa aagggacaag catcaagcac gcagcaatgc agctcaaaac   120
gcttagccta gccacacccc cacgggaaac agcagtgatt aacctttagc aataaacgaa   180
agtttaacta agctatacta accccagggt tggtcaattt cgtgccagct acc           233

SEQ ID NO: 107          moltype = RNA   length = 190
FEATURE                 Location/Qualifiers
source                  1..190
                        mol_type = other RNA
                        organism = Homo sapiens
SEQUENCE: 107
gttccagtga gttcaccctc taaatcacca cgatcaaaag gacaagcat caagcacgca    60
gcaatgcagc tcaaaacgct tagcctagcc acaccccac gggaaacagc agtgattaac   120
cttttagcaat aaacgaaagt ttaactaagc tatactaacc cagggttgg tcaatttcgt   180
gccagccacc                                                          190

SEQ ID NO: 108          moltype = RNA   length = 154
FEATURE                 Location/Qualifiers
source                  1..154
                        mol_type = other RNA
                        organism = Homo sapiens
SEQUENCE: 108
aaagggacaa gcatcaagca cgcagcaatg cagctcaaaa cgcttagcct agccacaccc    60
ccacgggaaa cagcagtgat taacctttag caataaacga agtttaact aagctatact   120
aaccccaggg ttggtcaatt tcgtgccagc cacc                               154

SEQ ID NO: 109          moltype = RNA   length = 158
FEATURE                 Location/Qualifiers
source                  1..158
                        mol_type = other RNA
```

```
                         organism = Homo sapiens
SEQUENCE: 109
tcaaaaggga caagcatcaa gcacgcaaca atgcagctca aaaacgctta gcctagccac    60
accccacgg gaaacagcag tgattaacct ttagcaataa acgaaagttt aactaagcta    120
cactaacccc agggttggtc aatttcgtgc cagccacc                           158

SEQ ID NO: 110           moltype = RNA   length = 210
FEATURE                  Location/Qualifiers
source                   1..210
                         mol_type = other RNA
                         organism = Homo sapiens
SEQUENCE: 110
tacacatgca agcatcccg ttccagtgag ttcaccctct aaatcaccac gatcaaaagg     60
gacaagcatc aagcacgcag caatgcagct caaaaacgct tagcctagcc acaccccac   120
gggaaacagc agtgattaac ctttagcaat aaacgaaagt ttaactaagc tatactaacc  180
ccagggttgg tcaatttcgt gccagccacc                                   210

SEQ ID NO: 111           moltype = RNA   length = 143
FEATURE                  Location/Qualifiers
source                   1..143
                         mol_type = other RNA
                         organism = Homo sapiens
SEQUENCE: 111
catcaagcac gcagcaatgc agctcaaaac gcttagccta gccacacccc cacgggaaac   60
agcagtgatt aacctttagc aataaacgaa agtttaacta agctatacta accccagggt  120
tggtcaattt cgtgccaacc acc                                          143

SEQ ID NO: 112           moltype = RNA   length = 154
FEATURE                  Location/Qualifiers
source                   1..154
                         mol_type = other RNA
                         organism = Homo sapiens
SEQUENCE: 112
aaagggacaa gcatcaagca cgcagcaatg cagctcaaaa cgcttagcct agccacaccc   60
ccacgggaaa cagcagtgat taacctttag caataaacga agtttaact aagctatact   120
aaccccaggg ttggtcaatt tcgtgccaac cacc                              154

SEQ ID NO: 113           moltype = RNA   length = 140
FEATURE                  Location/Qualifiers
source                   1..140
                         mol_type = other RNA
                         organism = Homo sapiens
SEQUENCE: 113
caagcacgca acaatgcagc tcaaaacgct tagcctagcc acaccccac gggaaacagc   60
agtgattaac ctttagcaat aaacgaaagt ttaactaagc tatactaacc ccagggttgg  120
tcaatttcgt gccaaccacc                                              140

SEQ ID NO: 114           moltype = RNA   length = 144
FEATURE                  Location/Qualifiers
source                   1..144
                         mol_type = other RNA
                         organism = Homo sapiens
SEQUENCE: 114
catcaagcac gcagcaatgc agctcaaaac gcttagccta gccacacccc catgggaaac   60
agcagtgatt aacctttagc aataaacgaa agtttaacta agctatacta accccagggt  120
tggtcaattt cgtgccagct cacc                                         144

SEQ ID NO: 115           moltype = RNA   length = 142
FEATURE                  Location/Qualifiers
source                   1..142
                         mol_type = other RNA
                         organism = Homo sapiens
SEQUENCE: 115
caagcacgca gcaatgcagc tcaaaacgct tagcctagcc acaccccac gggaaacagc   60
agtgattaac ctttagcaat aaacgaaagt ttaactaagc tatactaacc ccagggttgg  120
tcaatttcgt gccagccaca cc                                           142

SEQ ID NO: 116           moltype = RNA   length = 140
FEATURE                  Location/Qualifiers
source                   1..140
                         mol_type = other RNA
                         organism = Homo sapiens
SEQUENCE: 116
caagcacgca gcaatgcagc tcaaaacgct tagcctagcc acaccccac gggaaacagc   60
agtgattaac ctttagcaat aaacgaaagt ttaactaagc tatactaacc ccagggttgg  120
tcaatttcgt gccagccacc                                              140

SEQ ID NO: 117           moltype = RNA   length = 162
FEATURE                  Location/Qualifiers
```

| | | |
|---|---|---|
| source | 1..162<br>mol_type = other RNA<br>organism = Homo sapiens | |
| SEQUENCE: 117 | | |
| cacgatcaaa agggacaagc atcaagcacg cagcaatgca gctcaaaacg cttagcctag | | 60 |
| ccacaccccc acgggaaaca gcagtgatta acctttagca ataaacgaaa gtttaactaa | | 120 |
| gctatactaa ccccagggtt ggtcaatttc gtgccagcca cc | | 162 |
| | | |
| SEQ ID NO: 118<br>FEATURE<br>source | moltype = RNA length = 170<br>Location/Qualifiers<br>1..170<br>mol_type = other RNA<br>organism = Homo sapiens | |
| SEQUENCE: 118 | | |
| taaatcacca cgatcaaaag ggacaagcat caagcacgca gcaatgcagc tcaaaacgct | | 60 |
| tagcctagcc acacccccac gggaaacagc agtgattaac ctttagcaat aaacgaaagt | | 120 |
| ttaactaagc tatactaacc ccagggttgg tcaatttcgt gccagccacc | | 170 |
| | | |
| SEQ ID NO: 119<br>FEATURE<br>source | moltype = RNA length = 236<br>Location/Qualifiers<br>1..236<br>mol_type = other RNA<br>organism = Homo sapiens | |
| SEQUENCE: 119 | | |
| agcctttcta ttagctctta gtaagattac acatgcaagc atccccgttc cagtgagttc | | 60 |
| accctctaaa tcaccacgat caaaagggac aagcatcaag cacgcagcaa tgcagctcaa | | 120 |
| aacgcttagc ctagccacac ccccacggga aacagcagtg attaaccttt agcaataaac | | 180 |
| gaaagtttaa ctaagctata ctaacccag ggttggtcaa tttcgtgcca gccacc | | 236 |
| | | |
| SEQ ID NO: 120<br>FEATURE<br>source | moltype = RNA length = 151<br>Location/Qualifiers<br>1..151<br>mol_type = other RNA<br>organism = Homo sapiens | |
| SEQUENCE: 120 | | |
| gggacaagca tcaagcacgc agcaatgcag ctcaaaacgc ttagcctagc cacacccca | | 60 |
| cgggaaacag cagtgattaa cctttagcaa taaacgaaag tttaactaag ctatactaac | | 120 |
| cccagggttg gtcaatttcg tgccagccac c | | 151 |
| | | |
| SEQ ID NO: 121<br>FEATURE<br>source | moltype = RNA length = 151<br>Location/Qualifiers<br>1..151<br>mol_type = other RNA<br>organism = Homo sapiens | |
| SEQUENCE: 121 | | |
| gggacaagca tcaagcacgc agcaatgcag ctcaaaacgc ttagcctagc cacacccca | | 60 |
| cgggaaacag cagtgattaa cctttagcaa taaacgaaag tttaactaag ctatactaac | | 120 |
| cccagggttg gtcaatttcg tgccagccac c | | 151 |
| | | |
| SEQ ID NO: 122<br>FEATURE<br>source | moltype = RNA length = 253<br>Location/Qualifiers<br>1..253<br>mol_type = other RNA<br>organism = Homo sapiens | |
| SEQUENCE: 122 | | |
| ttctgcccca gctttgcagg atgaaacact tccccgcttg gctctcattc ttccacaaga | | 60 |
| gagcctttc tccggacctg gttgctactg gttcagcaac tctgcagaaa atgtcctccc | | 120 |
| ctgtggctgc ctcagctcat gcctttggcc tgaagtccca gcattgatgg cagcccctca | | 180 |
| tcttccaagt tttgtgctcc cctttaccta acgcttcctg cctcccatgc atctgtactc | | 240 |
| cttctgtgcc act | | 253 |
| | | |
| SEQ ID NO: 123<br>FEATURE<br>source | moltype = RNA length = 253<br>Location/Qualifiers<br>1..253<br>mol_type = other RNA<br>organism = Homo sapiens | |
| SEQUENCE: 123 | | |
| ttctgcccca gctttgcagg atgaaacact tccccgcttg gctctcattc ttccacaaga | | 60 |
| gagcctttc tccggacctg gttgctactg gttcagcaac tctgcagaaa atgtcctccc | | 120 |
| ctgtggctgc ctcagctcat gcctttggcc tgaagtccca gcattgatgg cagcccctca | | 180 |
| tcttccaagt tttgtgctcc cctttaccta acgcttcctg cctcccatgc atctgtactc | | 240 |
| cttctgtgcc act | | 253 |
| | | |
| SEQ ID NO: 124<br>FEATURE<br>source | moltype = RNA length = 250<br>Location/Qualifiers<br>1..250<br>mol_type = other RNA<br>organism = Homo sapiens | |
| SEQUENCE: 124 | | |

```
ccccagcttt gcaggatgaa acacttcccc gcttggctct cattcttcca caagagagac    60
ctttctccgg acctggttgc tactggttca gcaactctgc agaaaatgtc ctcccctgtg   120
gctgcctcag ctcatgcctt tggcctgaag tcccagcatt gatggcagcc cctcatcttc   180
caagttttgt gctccccttt acctaacgct tcctgcctcc catgcatctg tactcctcct   240
gtgccacaaa                                                          250

SEQ ID NO: 125            moltype = RNA   length = 250
FEATURE                   Location/Qualifiers
source                    1..250
                          mol_type = other RNA
                          organism = Homo sapiens
SEQUENCE: 125
ccccagcttt gcaggatgaa acacttcccc gcttggctct cattcttcca caagagagac    60
ctttctccgg acctggttgc tactggttca gcaactctgc agaaaatgtc ctcccctgtg   120
gctgcctcag ctcatgcctt tggcctgaag tcccagcatt gatggcagcc cctcatcttc   180
caagttttgt gctccccttt acctaacgct tcctgcctcc catgcatctg tactcctcct   240
gtgccacaaa                                                          250

SEQ ID NO: 126            moltype = RNA   length = 233
FEATURE                   Location/Qualifiers
source                    1..233
                          mol_type = other RNA
                          organism = Homo sapiens
SEQUENCE: 126
cttttgcagga tgaaacactt cccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tcc          233

SEQ ID NO: 127            moltype = RNA   length = 228
FEATURE                   Location/Qualifiers
source                    1..228
                          mol_type = other RNA
                          organism = Homo sapiens
SEQUENCE: 127
tgcaggatga acacttccc cgcttggctc tcattcttcc acaggagaga cctttctccg    60
gacctggttg ctactggttc agcaactctg cagaaaatgt cctcccctgt ggctgcctca   120
gctcatgcct ttggctgaa gtcccagcat tgatggcagc ccctcatctt ccaagttttg   180
tgctccccttt acctaacgc ttcctgcctc ccatgcatct gtactcca              228

SEQ ID NO: 128            moltype = RNA   length = 280
FEATURE                   Location/Qualifiers
source                    1..280
                          mol_type = other RNA
                          organism = Homo sapiens
SEQUENCE: 128
gtgaagatga ccacattcaa ggaagaacct tctgccccag ctttgcagga tgaaacactt    60
ccccgcttgg ctctccttct tccacaagag agacctttct ccggacctgg ttgctactgg   120
ttcagcagct ctgcagaaaa tgtcctccct gtggctgcc tcagctcgta cctttggcct   180
gaagtcccag cattaatggc agcccctcat cttccaagtt ttgtgctccc ctttacctaa   240
tgcttcctgc ctcccatgca tctgtactcc tgctgtgcca                        280

SEQ ID NO: 129            moltype = RNA   length = 207
FEATURE                   Location/Qualifiers
source                    1..207
                          mol_type = other RNA
                          organism = Homo sapiens
SEQUENCE: 129
tccacaagag agacctttct ccggacctgg ctgctactgg ttcagcagct ctgcagaaaa    60
tgtcctccct gtggctgcc tcagctcgta cctttggcct gaagtcccag cattaatggc   120
agcccctcat cttccaagtt ttgtgctccc ctttacctaa tgcttcctgc ctcccatgca   180
tctgtactcc tgctgtgcca caaacac                                      207

SEQ ID NO: 130            moltype = RNA   length = 207
FEATURE                   Location/Qualifiers
source                    1..207
                          mol_type = other RNA
                          organism = Homo sapiens
SEQUENCE: 130
tccacaagag agacctttct ccggacctgg ctgctactgg ttcagcagct ctgcagaaaa    60
tgtcctccct gtggctgcc tcagctcgta cctttggcct gaagtcccag cattaatggc   120
agcccctcat cttccaagtt ttgtgctccc ctttacctaa tgcttcctgc ctcccatgca   180
tctgtactcc tgctgtgcca caaacac                                      207

SEQ ID NO: 131            moltype = RNA   length = 163
FEATURE                   Location/Qualifiers
source                    1..163
                          mol_type = other RNA
                          organism = Homo sapiens
```

```
SEQUENCE: 131
gctactggtt cagcagctct gcagaaaatg tcctcccttg tggctgcctc agctcgtacc    60
tttggcctga agtcccagca ttaatggcag ccctcatct tccaagtttt gtgctcccct    120
ttacctaatg cttcctgcct cccatgcatc tgtactcctg cgt                    163

SEQ ID NO: 132         moltype = RNA   length = 249
FEATURE                Location/Qualifiers
source                 1..249
                       mol_type = other RNA
                       organism = Homo sapiens
SEQUENCE: 132
agaaccttct gccccagctt tgcaggatga aacacttccc cgcttggctc tcattcttcc    60
acaagagaga cctttctccg gacctggttg ctactggttc agcagctctg cagaaaatgt    120
cctcccttgt ggctgcctca gctcgtacct ttggctgaa gtcccagcat taatggcagc    180
ccctcatctt ccaagttttg tgctcccctt acctaatgc ttcctgcctc ccatgcatct    240
gtactcctg                                                          249

SEQ ID NO: 133         moltype = RNA   length = 249
FEATURE                Location/Qualifiers
source                 1..249
                       mol_type = other RNA
                       organism = Homo sapiens
SEQUENCE: 133
agaaccttct gccccagctt tgcaggatga aacacttccc cgcttggctc tcattcttcc    60
acaagagaga cctttctccg gacctggttg ctactggttc agcagctctg cagaaaatgt    120
cctcccttgt ggctgcctca gctcgtacct ttggctgaa gtcccagcat taatggcagc    180
ccctcatctt ccaagttttg tgctcccctt acctaatgc ttcctgcctc ccatgcatct    240
gtactcctg                                                          249

SEQ ID NO: 134         moltype = RNA   length = 264
FEATURE                Location/Qualifiers
source                 1..264
                       mol_type = other RNA
                       organism = Homo sapiens
SEQUENCE: 134
tgaagatgac cacattcaag gaagaacctt ctgccccagc tttgcaggat gaaacacttc    60
cccgcttggc tctcattctt ccacaagaga ccctttctc cggacctggt tgttcagcag    120
ctctgcagaa aatgtcctcc cttgtggctg cctcagctcg tacctttggc ctgaagtccc    180
agcattaatg gcagcccctc atcttccaag ttttgtgctc ccctttacct aatgcttcct    240
gcctcccatg catctgtact cctg                                         264

SEQ ID NO: 135         moltype = RNA   length = 270
FEATURE                Location/Qualifiers
source                 1..270
                       mol_type = other RNA
                       organism = Homo sapiens
SEQUENCE: 135
tgaagatgac cacattcaag gaagaacctt ctgccccagc tttgcaggat gaaacacttc    60
cccgcttggc tctcattctt ccacaagaga ccctttctc cggacctggt tgctactggt    120
tcagcagctc tgcagaaaat gtcctccctt gtggctgcct cagctcgtac ctttggcctg    180
aagtcccagc attaatggca gcccctcatc ttccaagttt gtgctccccc tttacctaat    240
gcttcctgcc tccatgcat ctgtactccc                                    270

SEQ ID NO: 136         moltype = RNA   length = 245
FEATURE                Location/Qualifiers
source                 1..245
                       mol_type = other RNA
                       organism = Homo sapiens
SEQUENCE: 136
ccacattcaa ggaagaacct tctgccccag ctttgcagga tgaaacactt ccccgcttgg    60
ctctcattct tccacaagag agacctttct ccggacctgg ttgctactgg ttcagcagct    120
ctgcagaaaa tgtcctccct gtggctgcc tcagctcgta cctttggcct gaagtcccag    180
cattaatggc agcccctcat cttccaagtt ttgtgctccc ctttacctaa tgcttcctgc    240
ccccc                                                              245

SEQ ID NO: 137         moltype = RNA   length = 257
FEATURE                Location/Qualifiers
source                 1..257
                       mol_type = other RNA
                       organism = Homo sapiens
SEQUENCE: 137
gtgaagatga ccacattcaa ggaagaacct tctgccccag ctttgcagga tgaaacactt    60
ccccgcttgg ctctcattct tccacaagag agacctttct ccggacctgg ttgctactgg    120
ttcagcagct ctgcagaaaa tgtcctcccct gtggctgcc tcagctcgta cctttggcct    180
gaagtcccag cattaatggc agcccctcat cttccaagtt ttgtgctccc ctttacctaa    240
tgcttcctgc ccccat                                                  257

SEQ ID NO: 138         moltype = RNA   length = 209
FEATURE                Location/Qualifiers
```

```
source                    1..209
                          mol_type = other RNA
                          organism = Homo sapiens
SEQUENCE: 138
agaaccttct gccccagctt tgcaggatga aacacttccc cgcttggctc tcattcttcc    60
acaagagaga cctttctccg gacctggttg ctactggttc agcagctctg cagaaaatgt   120
cctcccttgt ggctgcctca gctcgtacct ttggcctgaa gtcccagcat taatggcagc   180
ccctcatctt ccaagttttg tgctccccc                                     209

SEQ ID NO: 139            moltype = RNA   length = 276
FEATURE                   Location/Qualifiers
source                    1..276
                          mol_type = other RNA
                          organism = Homo sapiens
SEQUENCE: 139
ctgaagtgaa gatgaccaca ttcaaggaag aaccttctgc cccagctttg caggatgaaa    60
cacttccccg cttggctctc attcttccac aagagagacc tttctccgga cctggttgct   120
actggttcag cagctctgca gaaaatgtcc tcccttgtgg ctgcctcagc tcgtaccttt   180
ggcctgaagt cccagcatta atggcagccc tcatcttcc aagttttgtg ctccccttta   240
cctaatgctt cctgcctccc atgcatctgt actcct                             276

SEQ ID NO: 140            moltype = RNA   length = 276
FEATURE                   Location/Qualifiers
source                    1..276
                          mol_type = other RNA
                          organism = Homo sapiens
SEQUENCE: 140
ctgaagtgaa gatgaccaca ttcaaggaag aaccttctgc cccagctttg caggatgaaa    60
cacttccccg cttggctctc attcttccac aagagagacc tttctccgga cctggttgct   120
actggttcag cagctctgca gaaaatgtcc tcccttgtgg ctgcctcagc tcgtaccttt   180
ggcctgaagt cccagcatta atggcagccc tcatcttcc aagttttgtg ctccccttta   240
cctaatgctt cctgcctccc atgcatctgt actcct                             276

SEQ ID NO: 141            moltype = RNA   length = 270
FEATURE                   Location/Qualifiers
source                    1..270
                          mol_type = other RNA
                          organism = Homo sapiens
SEQUENCE: 141
aagatgacca cattcaagga agaaccttct gccccagctt tgcaggatga aacacttccc    60
cgcttggctc tcattcttcc acaagagaga cctttctccg gacctggttg ctactggttc   120
agcagctctg cagaaaatgt cctcccttgt ggctgcctca gctcgtacct ttggcctgaa   180
gtcccagcat taatggcagc ccctcatctt ccaagttttg tgctccccctt tacctaatgc   240
ttcctgcctc ccatgcatct gtactcctgc                                    270

SEQ ID NO: 142            moltype = RNA   length = 211
FEATURE                   Location/Qualifiers
source                    1..211
                          mol_type = other RNA
                          organism = Homo sapiens
SEQUENCE: 142
ccccgcttgg ctctcattct tccacaagag agacctttct ccggacctgg ttgctactgg    60
ttcagcagct ctgcagaaaa tgtcctccct tgtggctgcc tcagctcgta cctttggcct   120
gaagtcccag cattaatggc agcccctcat cttccaagtt ttgtgctccc ctttacctaa   180
tgcttcctgc ctcccatgca tctgtactcc t                                  211

SEQ ID NO: 143            moltype = RNA   length = 211
FEATURE                   Location/Qualifiers
source                    1..211
                          mol_type = other RNA
                          organism = Homo sapiens
SEQUENCE: 143
ccccgcttgg ctctcattct tccacaagag agacctttct ccggacctgg ttgctactgg    60
ttcagcagct ctgcagaaaa tgtcctccct tgtggctgcc tcagctcgta cctttggcct   120
gaagtcccag cattaatggc agcccctcat cttccaagtt ttgtgctccc ctttacctaa   180
tgcttcctgc ctcccatgca tctgtactcc t                                  211

SEQ ID NO: 144            moltype = RNA   length = 286
FEATURE                   Location/Qualifiers
misc_feature              1..286
                          note = Description of Artificial Sequence:
                          SyntheticCombination of 3'-UTR sequence elements
source                    1..286
                          mol_type = other RNA
                          organism = synthetic construct
SEQUENCE: 144
tgcccgtcct caccaagact gactgcctgc tgctttgcta ctgccgggc ccatgagact    60
gacttccac tgctctgcct gcctctcccc actgcactgg cacagcccg ccttgccgct   120
gctgatccat tgccggtgtg acctgccgt cctcaccaag actgactgcc tgctgctttg   180
```

```
ctactgcccg ggcccatgag actgacttcc cactgctctg cctgcctctc cccactgcac    240
tggcacagcc ccgccttgcc gctgctgatc cattgccggt gtgacc                   286

SEQ ID NO: 145         moltype = RNA   length = 292
FEATURE                Location/Qualifiers
misc_feature           1..292
                       note = Description of Artificial Sequence:
                       SyntheticCombination of 3'-UTR sequence elements
source                 1..292
                       mol_type = other RNA
                       organism = synthetic construct
SEQUENCE: 145
tgcccgtcct caccaagact gactgcctgc tgctttgcta ctgcccgggc ccatgagact    60
gacttcccac tgctctgcct gcctctcccc actgcactgg cacagcccg ccttgccgct    120
gctgatccat tgccggtgtg accttccagc cagacacccg ccccccggcc ctggctaaga   180
agttgcttcc tgttgccagc atgacctacc ctcgcctctt tgatgccatc cgctgccacc   240
tccttttgct cctggaccct ttagcctctc tgcccttcca ctctctgacc cc            292

SEQ ID NO: 146         moltype = RNA   length = 298
FEATURE                Location/Qualifiers
misc_feature           1..298
                       note = Description of Artificial Sequence:
                       SyntheticCombination of 3'-UTR sequence elements
source                 1..298
                       mol_type = other RNA
                       organism = synthetic construct
SEQUENCE: 146
tgcccgtcct caccaagact gactgcctgc tgctttgcta ctgcccgggc ccatgagact    60
gacttcccac tgctctgcct gcctctcccc actgcactgg cacagcccg ccttgccgct    120
gctgatccat tgccggtgtg accgccttgg ctcctccagg aaggctcagg agccctacct   180
ccctgccatt atagctgctc cccgccagaa gcctgtgcca actctctgca ttccctgatc   240
tccatccctg tggctgtcac ccttggtcac ctccgtgctg tcactgccat ctccccc      298

SEQ ID NO: 147         moltype = RNA   length = 279
FEATURE                Location/Qualifiers
misc_feature           1..279
                       note = Description of Artificial Sequence:
                       SyntheticCombination of 3'-UTR sequence elements
source                 1..279
                       mol_type = other RNA
                       organism = synthetic construct
SEQUENCE: 147
tgcccgtcct caccaagact gactgcctgc tgctttgcta ctgcccgggc ccatgagact    60
gacttcccac tgctctgcct gcctctcccc actgcactgg cacagcccg ccttgccgct    120
gctgatccat tgccggtgtg accctggtac tgcatgcacg caatgctagc tgcccctttc   180
ccgtcctggg taccccgagt ctcccccgac ctcgggtccc aggtatgctc ccacctccac   240
ctgccccact caccacctct gctagttcca gacacctcc                          279

SEQ ID NO: 148         moltype = RNA   length = 333
FEATURE                Location/Qualifiers
misc_feature           1..333
                       note = Description of Artificial Sequence:
                       SyntheticCombination of 3'-UTR sequence elements
source                 1..333
                       mol_type = other RNA
                       organism = synthetic construct
SEQUENCE: 148
tgcccgtcct caccaagact gactgcctgc tgctttgcta ctgcccgggc ccatgagact    60
gacttcccac tgctctgcct gcctctcccc actgcactgg cacagcccg ccttgccgct    120
gctgatccat tgccggtgtg accctgacag cgtgggcaac gcctgccgcc tgctctgagg   180
cccgatccag tgggcaggcc aaggcctgct gggcccccgc ggacccaggt gctctgggtc   240
acggtccctg tccccgcacc cccgcttctg tctgccccat tgtggctcct caggctctct   300
ccctgctct cccacctcta cctccacccc cac                                 333

SEQ ID NO: 149         moltype = RNA   length = 285
FEATURE                Location/Qualifiers
misc_feature           1..285
                       note = Description of Artificial Sequence:
                       SyntheticCombination of 3'-UTR sequence elements
source                 1..285
                       mol_type = other RNA
                       organism = synthetic construct
SEQUENCE: 149
tgcccgtcct caccaagact gactgcctgc tgctttgcta ctgcccgggc ccatgagact    60
gacttcccac tgctctgcct gcctctcccc actgcactgg cacagcccg ccttgccgct    120
gctgatccat tgccggtgtg accgagagct cgctttcttg ctgtccaatt tctattaaag   180
gttcctttgt tccctaagtc caactactaa actgggggat attatgaagg gccttgagca   240
tctggattct gcctaataaa aaacattat tttcattgct gcgtc                    285
```

```
SEQ ID NO: 150          moltype = RNA   length = 285
FEATURE                 Location/Qualifiers
misc_feature            1..285
                        note = Description of Artificial Sequence:
                        SyntheticCombination of 3'-UTR sequence elements
source                  1..285
                        mol_type = other RNA
                        organism = synthetic construct
SEQUENCE: 150
tgcccgtcct caccaagact gactgcctgc tgctttgcta ctgcccgggc ccatgagact    60
gacttcccac tgctctgcct gcctctcccc actgcactgg cacagccccg ccttgccgct   120
gctgatccat tgccggtgtg acccaagcac gcagcaatgc agctcaaaac gcttagccta   180
gccacacccc cacgggaaac agcagtgatt aacctttagc aataaacgaa agtttaacta   240
agctatacta accccagggt tggtcaattt cgtgccagcc acacc                   285

SEQ ID NO: 151          moltype = RNA   length = 376
FEATURE                 Location/Qualifiers
misc_feature            1..376
                        note = Description of Artificial Sequence:
                        SyntheticCombination of 3'-UTR sequence elements
source                  1..376
                        mol_type = other RNA
                        organism = synthetic construct
SEQUENCE: 151
tgcccgtcct caccaagact gactgcctgc tgctttgcta ctgcccgggc ccatgagact    60
gacttcccac tgctctgcct gcctctcccc actgcactgg cacagccccg ccttgccgct   120
gctgatccat tgccggtgtg acccttttgca ggatgaaaca cttccccgct tggctctcat  180
tcttccacaa gagagacctt tctccggacc tggttgctac tggttcagca actctgcaga   240
aaatgtcctc cctgtggct gcctcagctc atgcctttgg cctgaagtcc cagcattgat    300
ggcagcccct catcttccaa gttttgtgct ccccttacc taacgcttcc tgcctcccat    360
gcatctgtac tcctcc                                                   376

SEQ ID NO: 152          moltype = RNA   length = 292
FEATURE                 Location/Qualifiers
misc_feature            1..292
                        note = Description of Artificial Sequence:
                        SyntheticCombination of 3'-UTR sequence elements
source                  1..292
                        mol_type = other RNA
                        organism = synthetic construct
SEQUENCE: 152
ttccagccag acaccgccc cccggccctg gctaagaagt tgcttcctgt tgccagcatg      60
acctaccctc gcctctttga tgccatccgc tgccacctcc ttttgctcct ggacccttta   120
gcctctctgc ccttccactc tctgacccct gccgtcctc accaagactg actgcctgct    180
gctttgctac tgcccgggcc catgagactg acttcccact gctctgcctg cctctcccca   240
ctgcactggc acagccccgc cttgccgctg ctgatccatt gccggtgtga cc           292

SEQ ID NO: 153          moltype = RNA   length = 298
FEATURE                 Location/Qualifiers
misc_feature            1..298
                        note = Description of Artificial Sequence:
                        SyntheticCombination of 3'-UTR sequence elements
source                  1..298
                        mol_type = other RNA
                        organism = synthetic construct
SEQUENCE: 153
ttccagccag acaccgccc cccggccctg gctaagaagt tgcttcctgt tgccagcatg      60
acctaccctc gcctctttga tgccatccgc tgccacctcc ttttgctcct ggacccttta   120
gcctctctgc ccttccactc tctgacccct tccagcagga cacccgcccc cggccctgg    180
ctaagaagtt gcttcctgtt gccagcatga cctaccctcg cctctttgat gccatccgct   240
gccacctcct tttgctcctg gaccctttag cctctctgcc cttccactct ctgacccc     298

SEQ ID NO: 154          moltype = RNA   length = 304
FEATURE                 Location/Qualifiers
misc_feature            1..304
                        note = Description of Artificial Sequence:
                        SyntheticCombination of 3'-UTR sequence elements
source                  1..304
                        mol_type = other RNA
                        organism = synthetic construct
SEQUENCE: 154
ttccagccag acaccgccc cccggccctg gctaagaagt tgcttcctgt tgccagcatg      60
acctaccctc gcctctttga tgccatccgc tgccacctcc ttttgctcct ggacccttta   120
gcctctctgc ccttccactc tctgacccct cctggaaag tccaggaagg ctcaggagcc    180
ctacctccct gccattatag ctgctccccg ccagaagcct gtgccaactc tctgcattcc   240
ctgatctcca tcctgtggc tgtcacccg ggtcacctcc gtgctgtcac tgccatctcc    300
cccc                                                                304

SEQ ID NO: 155          moltype = RNA   length = 285
```

```
FEATURE              Location/Qualifiers
misc_feature         1..285
                     note = Description of Artificial Sequence:
                     SyntheticCombination of 3'-UTR sequence elements
source               1..285
                     mol_type = other RNA
                     organism = synthetic construct
SEQUENCE: 155
ttccagccag acacccgccc cccggccctg gctaagaagt tgcttcctgt tgccagcatg   60
acctaccctc gcctctttga tgccatccgc tgccacctcc ttttgctcct ggaccctta    120
gcctctctgc ccttccactc tctgaccccc tggtactgca tgcacgcaat gctagctgcc   180
cctttcccgt cctgggtacc ccgagtctcc cccgacctcg ggtcccaggt atgctcccac   240
ctccacctgc cccactcacc acctctgcta gttccagaca cctcc                  285

SEQ ID NO: 156       moltype = RNA   length = 339
FEATURE              Location/Qualifiers
misc_feature         1..339
                     note = Description of Artificial Sequence:
                     SyntheticCombination of 3'-UTR sequence elements
source               1..339
                     mol_type = other RNA
                     organism = synthetic construct
SEQUENCE: 156
ttccagccag acacccgccc cccggccctg gctaagaagt tgcttcctgt tgccagcatg   60
acctaccctc gcctctttga tgccatccgc tgccacctcc ttttgctcct ggaccctta    120
gcctctctgc ccttccactc tctgaccccc tgacagcgtg ggcaacgcct gccgcctgct   180
ctgaggcccg atccagtggg caggccaagg cctgctgggc cccgcggac ccaggtgctc    240
tgggtcacgg tccctgtccc cgcacccccg cttctgtctg ccccattgtg gctcctcagg   300
ctctctcccc tgctctccca cctctacctc caccccac                          339

SEQ ID NO: 157       moltype = RNA   length = 291
FEATURE              Location/Qualifiers
misc_feature         1..291
                     note = Description of Artificial Sequence:
                     SyntheticCombination of 3'-UTR sequence elements
source               1..291
                     mol_type = other RNA
                     organism = synthetic construct
SEQUENCE: 157
ttccagccag acacccgccc cccggccctg gctaagaagt tgcttcctgt tgccagcatg   60
acctaccctc gcctctttga tgccatccgc tgccacctcc ttttgctcct ggaccctta    120
gcctctctgc ccttccactc tctgacccg agagctcgct ttcttgctgt ccaatttcta    180
ttaaaggttc ctttgttccc taagtccaac tactaaactg ggggatatta tgaagggcct   240
tgagcatctg gattctgcct aataaaaaac atttattttc attgctgcgt c            291

SEQ ID NO: 158       moltype = RNA   length = 291
FEATURE              Location/Qualifiers
misc_feature         1..291
                     note = Description of Artificial Sequence:
                     SyntheticCombination of 3'-UTR sequence elements
source               1..291
                     mol_type = other RNA
                     organism = synthetic construct
SEQUENCE: 158
ttccagccag acacccgccc cccggccctg gctaagaagt tgcttcctgt tgccagcatg   60
acctaccctc gcctctttga tgccatccgc tgccacctcc ttttgctcct ggaccctta    120
gcctctctgc ccttccactc tctgaccccc aagcacgcag caatgcagct caaaacgctt   180
agcctagcca caccccacg ggaaacagca gtgattaacc tttagcaata aacgaaagtt    240
taactaagct atactaaccc cagggttggt caatttcgtg ccagccacac c            291

SEQ ID NO: 159       moltype = RNA   length = 382
FEATURE              Location/Qualifiers
misc_feature         1..382
                     note = Description of Artificial Sequence:
                     SyntheticCombination of 3'-UTR sequence elements
source               1..382
                     mol_type = other RNA
                     organism = synthetic construct
SEQUENCE: 159
ttccagccag acacccgccc cccggccctg gctaagaagt tgcttcctgt tgccagcatg   60
acctaccctc gcctctttga tgccatccgc tgccacctcc ttttgctcct ggaccctta    120
gcctctctgc ccttccactc tctgaccccc tttgcaggat gaaacacttc cccgcttggc   180
tctcattctt ccacaagaga gacctttctc cggacctggt tgctactggt tcagcaactc   240
tgcagaaaat gtcctcccct gtggctgcct cagctcatgc ctttggcctg aagtcccagc   300
attgatggca gccccctcatc ttccaagttt tgtgctcccc tttacctaac gcttcctgcc   360
tcccatgcat ctgtactcct cc                                           382

SEQ ID NO: 160       moltype = RNA   length = 298
FEATURE              Location/Qualifiers
```

```
misc_feature            1..298
                        note = Description of Artificial Sequence:
                        SyntheticCombination of 3'-UTR sequence elements
source                  1..298
                        mol_type = other RNA
                        organism = synthetic construct
SEQUENCE: 160
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc ccccctgccc gtcctcacca agactgactg   180
cctgctgctt tgctactgcc cgggcccatg agactgactt cccactgctc tgcctgcctc   240
tccccactgc actggcacag ccccgccctg ccgctgctga tccattgccg gtgtgacc    298

SEQ ID NO: 161          moltype = RNA   length = 304
FEATURE                 Location/Qualifiers
misc_feature            1..304
                        note = Description of Artificial Sequence:
                        SyntheticCombination of 3'-UTR sequence elements
source                  1..304
                        mol_type = other RNA
                        organism = synthetic construct
SEQUENCE: 161
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc ccccttcca gccagacacc cgccccgg     180
ccctggctaa gaagttgctt cctgttgcca gcatgaccta ccctcgcctc tttgatgcca   240
tccgctgcca cctcctttg ctcctggacc ctttagcctc tctgcccttc cactctctga   300
cccc                                                                304

SEQ ID NO: 162          moltype = RNA   length = 310
FEATURE                 Location/Qualifiers
misc_feature            1..310
                        note = Description of Artificial Sequence:
                        SyntheticCombination of 3'-UTR sequence elements
source                  1..310
                        mol_type = other RNA
                        organism = synthetic construct
SEQUENCE: 162
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc ccccgcctt ggctcctcca ggaaggctca   180
ggagccctac ctccctgcca ttatagctgc tccccgccag aagcctgtgc caactctctg   240
cattcctga tctccatccc tgtggctgtc acccttggtc acctccgtgc tgtcactgcc   300
atctccccc                                                          310

SEQ ID NO: 163          moltype = RNA   length = 291
FEATURE                 Location/Qualifiers
misc_feature            1..291
                        note = Description of Artificial Sequence:
                        SyntheticCombination of 3'-UTR sequence elements
source                  1..291
                        mol_type = other RNA
                        organism = synthetic construct
SEQUENCE: 163
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc cccccctggt actgcatgca cgcaatgcta   180
gctgcccctt tcccgtcctg ggtaccccga gtctcccccg acctcgggtc ccaggtatgc   240
tcccacctcc acctgcccca ctcaccacct ctgctagttc cagacacctc c            291

SEQ ID NO: 164          moltype = RNA   length = 345
FEATURE                 Location/Qualifiers
misc_feature            1..345
                        note = Description of Artificial Sequence:
                        SyntheticCombination of 3'-UTR sequence elements
source                  1..345
                        mol_type = other RNA
                        organism = synthetic construct
SEQUENCE: 164
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc ccccctgac agcgtgggca acgcctgccg   180
cctgctctga ggcccgatcc agtgggcagg ccaaggcctg ctgggccccc gcggaccag   240
gtgctctggg tcacggtccc tgtccccgca ccccgcttc tgtctgcccc attgtggctc   300
ctcaggctct ctcccctgct ctcccacctc tacctccacc cccac                  345

SEQ ID NO: 165          moltype = RNA   length = 297
FEATURE                 Location/Qualifiers
misc_feature            1..297
```

```
                        note = Description of Artificial Sequence:
                        SyntheticCombination of 3'-UTR sequence elements
source                  1..297
                        mol_type = other RNA
                        organism = synthetic construct
SEQUENCE: 165
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc cccccgagag ctcgctttct tgctgtccaa   180
tttctattaa aggttccttt gttccctaag tccaactact aaaactggggg atattatgaa   240
gggccttgag catctggatt ctgcctaata aaaaacattt attttcattg ctgcgtc      297

SEQ ID NO: 166          moltype = RNA   length = 297
FEATURE                 Location/Qualifiers
misc_feature            1..297
                        note = Description of Artificial Sequence:
                        SyntheticCombination of 3'-UTR sequence elements
source                  1..297
                        mol_type = other RNA
                        organism = synthetic construct
SEQUENCE: 166
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc cccccaagc acgcagcaat gcagctcaaa   180
acgcttagcc tagccacacc cccacgggaa acagcagtga ttaacctta gcaataaacg    240
aaagtttaac taagctatac taaccccagg gttggtcaat ttcgtgccag ccacacc     297

SEQ ID NO: 167          moltype = RNA   length = 388
FEATURE                 Location/Qualifiers
misc_feature            1..388
                        note = Description of Artificial Sequence:
                        SyntheticCombination of 3'-UTR sequence elements
source                  1..388
                        mol_type = other RNA
                        organism = synthetic construct
SEQUENCE: 167
gccttggctc ctccaggaag gctcaggagc cctacctccc tgccattata gctgctcccc    60
gccagaagcc tgtgccaact ctctgcattc cctgatctcc atccctgtgg ctgtcaccct   120
tggtcacctc cgtgctgtca ctgccatctc ccccctttg caggatgaaa cacttcccg    180
cttggctctc attcttccac aagagagacc tttctccgga cctggttgct actggttcag   240
caactctgca gaaaatgtcc tcccctgtgg ctgcctcagc tcatgccttt ggcctgaagt   300
cccagcattg atggcagccc ctcatcttcc aagttttgtg ctccccttta cctaacgctt   360
cctgcctccc atgcatctgt actcctcc                                      388

SEQ ID NO: 168          moltype = RNA   length = 279
FEATURE                 Location/Qualifiers
misc_feature            1..279
                        note = Description of Artificial Sequence:
                        SyntheticCombination of 3'-UTR sequence elements
source                  1..279
                        mol_type = other RNA
                        organism = synthetic construct
SEQUENCE: 168
ctggtactgc atgcacgcaa tgctagctgc ccctttcccg tcctgggtac cccgagtctc    60
ccccgacctc gggtcccagg tatgctccca cctccacctg ccccactcac cacctctgct   120
agttccagac acctcctgcc cgtcctcacc aagactgact gcctgctgct ttgctactgc   180
ccgggcccat gagactgact tcccactgct ctgcctgcct ctccccactg cactggcaca   240
gccccgcctt gccgctgctg atccattgcc ggtgtgacc                          279

SEQ ID NO: 169          moltype = RNA   length = 285
FEATURE                 Location/Qualifiers
misc_feature            1..285
                        note = Description of Artificial Sequence:
                        SyntheticCombination of 3'-UTR sequence elements
source                  1..285
                        mol_type = other RNA
                        organism = synthetic construct
SEQUENCE: 169
ctggtactgc atgcacgcaa tgctagctgc ccctttcccg tcctgggtac cccgagtctc    60
ccccgacctc gggtcccagg tatgctccca cctccacctg ccccactcac cacctctgct   120
agttccagac acctccttcc agccagacac ccgcccccg gcctggcta agaagttgct   180
tcctgttgcc agcatgacct accctcgcct ctttgatgcc atccgctgcc acctcctttt   240
gctcctggac ccttagcct ctctgccctt ccactctctg accccc                   285

SEQ ID NO: 170          moltype = RNA   length = 291
FEATURE                 Location/Qualifiers
misc_feature            1..291
                        note = Description of Artificial Sequence:
                        SyntheticCombination of 3'-UTR sequence elements
```

```
                            source          1..291
                                            mol_type = other RNA
                                            organism = synthetic construct
SEQUENCE: 170
ctggtactgc atgcacgcaa tgctagctgc cccttcccg tcctgggtac cccgagtctc    60
ccccgacctc gggtcccagg tatgctccca cctccacctg ccccactcac cacctctgct  120
agttccagac acctccgcct tggctcctcc aggaaggctc aggagcccta cctccctgcc  180
attatagctc ctccccgcca gaagcctgtg ccaactctct gcattccctg atctccatcc  240
ctgtggctgt caccttggt cacctccgtg ctgtcactgc catctccccc c            291

SEQ ID NO: 171              moltype = RNA   length = 272
FEATURE                     Location/Qualifiers
misc_feature                1..272
                            note = Description of Artificial Sequence:
                                SyntheticCombination of 3'-UTR sequence elements
source                      1..272
                            mol_type = other RNA
                            organism = synthetic construct
SEQUENCE: 171
ctggtactgc atgcacgcaa tgctagctgc cccttcccg tcctgggtac cccgagtctc    60
ccccgacctc gggtcccagg tatgctccca cctccacctg ccccactcac cacctctgct  120
agttccagac acctccctgg tactgcatgc acgcaatgct agctgcccct ttcccgtcct  180
gggtaccccg agtctccccc gacctcgggt cccaggtatg ctcccacctc cacctgcccc  240
actcaccacc tctgctagtt ccagacacct cc                                272

SEQ ID NO: 172              moltype = RNA   length = 326
FEATURE                     Location/Qualifiers
misc_feature                1..326
                            note = Description of Artificial Sequence:
                                SyntheticCombination of 3'-UTR sequence elements
source                      1..326
                            mol_type = other RNA
                            organism = synthetic construct
SEQUENCE: 172
ctggtactgc atgcacgcaa tgctagctgc cccttcccg tcctgggtac cccgagtctc    60
ccccgacctc gggtcccagg tatgctccca cctccacctg ccccactcac cacctctgct  120
agttccagac acctccctga cagcgtgggc aacgcctgcc gcctgctctg aggcccgatc  180
cagtgggcag gccaaggcct gctgggcccc cgcggaccca ggtgctctgg gtcacggtcc  240
ctgtcccgc acccccgctt ctgtctgccc cattgtggct cctcaggctc tctcccctgc  300
tctcccacct ctacctccac ccccac                                       326

SEQ ID NO: 173              moltype = RNA   length = 278
FEATURE                     Location/Qualifiers
misc_feature                1..278
                            note = Description of Artificial Sequence:
                                SyntheticCombination of 3'-UTR sequence elements
source                      1..278
                            mol_type = other RNA
                            organism = synthetic construct
SEQUENCE: 173
ctggtactgc atgcacgcaa tgctagctgc cccttcccg tcctgggtac cccgagtctc    60
ccccgacctc gggtcccagg tatgctccca cctccacctg ccccactcac cacctctgct  120
agttccagac acctccgaga gctcgctttc ttgctgtcca atttctatta aaggttcctt  180
tgttccctaa gtccaactac taaactgggg gatattatga agggccttga gcatctggat  240
tctgcctaat aaaaaacatt tattttcatt gctgcgtc                          278

SEQ ID NO: 174              moltype = RNA   length = 278
FEATURE                     Location/Qualifiers
misc_feature                1..278
                            note = Description of Artificial Sequence:
                                SyntheticCombination of 3'-UTR sequence elements
source                      1..278
                            mol_type = other RNA
                            organism = synthetic construct
SEQUENCE: 174
ctggtactgc atgcacgcaa tgctagctgc cccttcccg tcctgggtac cccgagtctc    60
ccccgacctc gggtcccagg tatgctccca cctccacctg ccccactcac cacctctgct  120
agttccagac acctcccaag cacgcagcaa tgcagctcaa aacgcttagc ctagccacac  180
ccccacggga aacagcagtg attaaccttt agcaataaac gaaagtttaa ctaagctata  240
ctaaccccag ggttggtcaa tttcgtgcca gccacacc                          278

SEQ ID NO: 175              moltype = RNA   length = 369
FEATURE                     Location/Qualifiers
misc_feature                1..369
                            note = Description of Artificial Sequence:
                                SyntheticCombination of 3'-UTR sequence elements
source                      1..369
                            mol_type = other RNA
                            organism = synthetic construct
```

```
SEQUENCE: 175
ctggtactgc atgcacgcaa tgctagctgc cccttttccg tcctgggtac cccgagtctc    60
ccccgacctc gggtcccagg tatgctccca cctccacctg ccccactcac cacctctgct   120
agttccagac acctcccttt gcaggatgaa acacttcccc gcttggctct cattcttcca   180
caagagagac ctttctccgg acctggttgc tactggttca gcaactctgc agaaaatgtc   240
ctccccctgtg gctgcctcag ctcatgcctt tggcctgaag tcccagcatt gatggcagcc   300
cctcatcttc caagttttgt gctcccctttt acctaacgct tcctgcctcc catgcatctg   360
tactcctcc                                                            369

SEQ ID NO: 176          moltype = RNA    length = 333
FEATURE                 Location/Qualifiers
misc_feature            1..333
                        note = Description of Artificial Sequence:
                        SyntheticCombination of 3'-UTR sequence elements
source                  1..333
                        mol_type = other RNA
                        organism = synthetic construct
SEQUENCE: 176
ctgacagcgt gggcaacgcc tgccgcctgc tctgaggccc gatccagtgg gcaggccaag    60
gcctgctggg ccccgcgga cccaggtgct ctgggtcacg gtccctgtcc ccgcaccccc    120
gcttctgtct gccccattgt ggctcctcag gtctctctcc ctgctctccc acctctacct   180
ccaccccac tgcccgtcct caccaagact gactgcctgc tgctttgcta ctgcccgggc    240
ccatgagact gacttcccac tgtctgctcct gcctctcccc actgcactgg cacagcccg    300
ccttgccgct gctgatccat tgccggtgtg acc                                  333

SEQ ID NO: 177          moltype = RNA    length = 339
FEATURE                 Location/Qualifiers
misc_feature            1..339
                        note = Description of Artificial Sequence:
                        SyntheticCombination of 3'-UTR sequence elements
source                  1..339
                        mol_type = other RNA
                        organism = synthetic construct
SEQUENCE: 177
ctgacagcgt gggcaacgcc tgccgcctgc tctgaggccc gatccagtgg gcaggccaag    60
gcctgctggg ccccgcgga cccaggtgct ctgggtcacg gtccctgtcc ccgcaccccc    120
gcttctgtct gccccattgt ggctcctcag gtctctctcc ctgctctccc acctctacct   180
ccaccccac ttccagccag acaccgccc ccggccctg gctaagaagt tgcttcctgt    240
tgccagcatg acctaccctc gcctcttttga tgccatccgc tgccacctcc ttttgctcct   300
ggaccctta gcctctctgc ccttccactc tctgaccc                            339

SEQ ID NO: 178          moltype = RNA    length = 345
FEATURE                 Location/Qualifiers
misc_feature            1..345
                        note = Description of Artificial Sequence:
                        SyntheticCombination of 3'-UTR sequence elements
source                  1..345
                        mol_type = other RNA
                        organism = synthetic construct
SEQUENCE: 178
ctgacagcgt gggcaacgcc tgccgcctgc tctgaggccc gatccagtgg gcaggccaag    60
gcctgctggg ccccgcgga cccaggtgct ctgggtcacg gtccctgtcc ccgcaccccc    120
gcttctgtct gccccattgt ggctcctcag gtctctctcc ctgctctccc acctctacct   180
ccaccccac gccttggctc ctccaggaag gctcaggagc cctacctccc tgccattata    240
gctgctccc gccagaagcc tgtgccaact ctctgcattc cctgatctcc atccctgtgg    300
ctgtcaccct tggtcacctc cgtgctgtca ctgccatctc ccccc                     345

SEQ ID NO: 179          moltype = RNA    length = 326
FEATURE                 Location/Qualifiers
misc_feature            1..326
                        note = Description of Artificial Sequence:
                        SyntheticCombination of 3'-UTR sequence elements
source                  1..326
                        mol_type = other RNA
                        organism = synthetic construct
SEQUENCE: 179
ctgacagcgt gggcaacgcc tgccgcctgc tctgaggccc gatccagtgg gcaggccaag    60
gcctgctggg ccccgcgga cccaggtgct ctgggtcacg gtccctgtcc ccgcaccccc    120
gcttctgtct gccccattgt ggctcctcag gtctctctcc ctgctctccc acctctacct   180
ccaccccac ctggtactgc atgcacgcaa tgctagctgc cccttttccg tcctgggtac    240
cccgagtctc ccccgacctc gggtcccagg tatgctccca cctccacctg ccccactcac   300
cacctctgct agttccagac acctcc                                         326

SEQ ID NO: 180          moltype = RNA    length = 380
FEATURE                 Location/Qualifiers
misc_feature            1..380
                        note = Description of Artificial Sequence:
                        SyntheticCombination of 3'-UTR sequence elements
source                  1..380
```

```
                           mol_type = other RNA
                           organism = synthetic construct
SEQUENCE: 180
ctgacagcgt gggcaacgcc tgccgcctgc tctgaggccc gatccagtgg gcaggccaag    60
gcctgctggg cccccgcgga cccaggtgct ctgggtcacg gtccctgtcc ccgcaccccc   120
gcttctgtct gccccattgt ggctcctcag gctctctccc ctgctctccc acctctacct   180
ccacccccac ctgacagcgt gggcaacgcc tgccgcctgc tctgaggccc gatccagtgg   240
gcaggccaag gcctgctggg cccccgcgga cccaggtgct ctgggtcacg gtccctgtcc   300
ccgcaccccc gcttctgtct gccccattgt ggctcctcag gctctctccc ctgctctccc   360
acctctacct ccacccccac                                               380

SEQ ID NO: 181           moltype = RNA   length = 332
FEATURE                  Location/Qualifiers
misc_feature             1..332
                         note = Description of Artificial Sequence:
                           SyntheticCombination of 3'-UTR sequence elements
source                   1..332
                         mol_type = other RNA
                         organism = synthetic construct
SEQUENCE: 181
ctgacagcgt gggcaacgcc tgccgcctgc tctgaggccc gatccagtgg gcaggccaag    60
gcctgctggg cccccgcgga cccaggtgct ctgggtcacg gtccctgtcc ccgcaccccc   120
gcttctgtct gccccattgt ggctcctcag gctctctccc ctgctctccc acctctacct   180
ccacccccac gagagctcgc tttcttgctg tccaatttct attaaaggtt cctttgttcc   240
ctaagtccaa ctactaaact gggggatatt atgaagggcc ttgagcatct ggattctgcc   300
taataaaaaa catttatttt cattgctgcg tc                                 332

SEQ ID NO: 182           moltype = RNA   length = 332
FEATURE                  Location/Qualifiers
misc_feature             1..332
                         note = Description of Artificial Sequence:
                           SyntheticCombination of 3'-UTR sequence elements
source                   1..332
                         mol_type = other RNA
                         organism = synthetic construct
SEQUENCE: 182
ctgacagcgt gggcaacgcc tgccgcctgc tctgaggccc gatccagtgg gcaggccaag    60
gcctgctggg cccccgcgga cccaggtgct ctgggtcacg gtccctgtcc ccgcaccccc   120
gcttctgtct gccccattgt ggctcctcag gctctctccc ctgctctccc acctctacct   180
ccacccccac caagcacgca gcaatgcagc tcaaaacgct tagcctagcc acccccac    240
gggaaacagc agtgattaac ctttagcaat aaacgaaagt ttaactaagc tatactaacc   300
ccagggttgg tcaatttcgt gccagccaca cc                                 332

SEQ ID NO: 183           moltype = RNA   length = 423
FEATURE                  Location/Qualifiers
misc_feature             1..423
                         note = Description of Artificial Sequence:
                           SyntheticCombination of 3'-UTR sequence elements
source                   1..423
                         mol_type = other RNA
                         organism = synthetic construct
SEQUENCE: 183
ctgacagcgt gggcaacgcc tgccgcctgc tctgaggccc gatccagtgg gcaggccaag    60
gcctgctggg cccccgcgga cccaggtgct ctgggtcacg gtccctgtcc ccgcaccccc   120
gcttctgtct gccccattgt ggctcctcag gctctctccc ctgctctccc acctctacct   180
ccacccccac ctttgcagga tgaaacactt ccccgcttgg ctctcattct tccacaagag   240
agacctttct ccggacctgg ttgctactgg ttcagcaact ctgcagaaaa tgtcctcccc   300
tgtggctgcc tcagctcatg cctttggcct gaagtcccag cattgatggc agcccctcat   360
cttccaagtt ttgtgctccc ctttacctaa cgcttcctgc ctcccatgca tctgtactcc   420
tcc                                                                 423

SEQ ID NO: 184           moltype = RNA   length = 285
FEATURE                  Location/Qualifiers
misc_feature             1..285
                         note = Description of Artificial Sequence:
                           SyntheticCombination of 3'-UTR sequence elements
source                   1..285
                         mol_type = other RNA
                         organism = synthetic construct
SEQUENCE: 184
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tctgcccgtc ctcaccaaga ctgactgcct gctgctttgc   180
tactgccggg gcccatgaga ctgacttccc actgctctgc ctgcctctcc ccactgcact   240
ggcacagccc cgccttgccg ctgctgatcc attgccggtg tgacc                   285

SEQ ID NO: 185           moltype = RNA   length = 291
FEATURE                  Location/Qualifiers
misc_feature             1..291
```

```
                        note = Description of Artificial Sequence:
                        SyntheticCombination of 3'-UTR sequence elements
source                  1..291
                        mol_type = other RNA
                        organism = synthetic construct
SEQUENCE: 185
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tcttccagcc agacacccgc cccccggccc tggctaagaa   180
gttgcttcct gttgccagca tgacctaccc tcgcctcttt gatgccatcc gctgccacct   240
ccttttgctc ctggacccct tagcctctct gcccttccac tctctgaccc c            291

SEQ ID NO: 186          moltype = RNA  length = 297
FEATURE                 Location/Qualifiers
misc_feature            1..297
                        note = Description of Artificial Sequence:
                        SyntheticCombination of 3'-UTR sequence elements
source                  1..297
                        mol_type = other RNA
                        organism = synthetic construct
SEQUENCE: 186
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tcgccttggc tcctccagga aggctcagga gcccacctc    180
cctgccatta tagctgctcc ccgccagaag cctgtgccaa ctctctgcat tccctgatct   240
ccatcccgt ggctgtcacc cttggtcacc tccgtgctgt cactgccatc tccccc         297

SEQ ID NO: 187          moltype = RNA  length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 187
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tcctggtact gcatgcacgc aatgctagct gcccctttcc   180
cgtcctgggt accccgagtc tcccccgacc tcgggtccca ggtatgctcc cacctccacc   240
tgccccactc accacctctg ctagttccag acacctcc                            278

SEQ ID NO: 188          moltype = RNA  length = 332
FEATURE                 Location/Qualifiers
misc_feature            1..332
                        note = Description of Artificial Sequence:
                        SyntheticCombination of 3'-UTR sequence elements
source                  1..332
                        mol_type = other RNA
                        organism = synthetic construct
SEQUENCE: 188
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tcctgacagc gtgggcaacg cctgccgcct gctctgaggc   180
ccgatccagt gggcaggcca aggcctgctg ggccccgcg gacccaggtg ctctgggtca    240
cggtccctgt ccccgcaccc ccgcttctgt ctgccccatt gtggctcctc aggctctctc   300
ccctgctctc ccacctctac ctccacccc ac                                   332

SEQ ID NO: 189          moltype = RNA  length = 284
FEATURE                 Location/Qualifiers
misc_feature            1..284
                        note = Description of Artificial Sequence:
                        SyntheticCombination of 3'-UTR sequence elements
source                  1..284
                        mol_type = other RNA
                        organism = synthetic construct
SEQUENCE: 189
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tcgagagctc gctttcttgc tgtccaattt ctattaaagg   180
ttcctttgtt ccctaagtcc aactactaaa ctgggggata ttatgaaggg ccttgagcat   240
ctggattctg cctaataaaa aacatttatt ttcattgctg cgtc                    284

SEQ ID NO: 190          moltype = RNA  length = 284
FEATURE                 Location/Qualifiers
misc_feature            1..284
                        note = Description of Artificial Sequence:
                        SyntheticCombination of 3'-UTR sequence elements
source                  1..284
```

```
                         mol_type = other RNA
                         organism = synthetic construct
SEQUENCE: 190
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tccaagcacg cagcaatgca gctcaaacg cttagcctag    180
ccacaccccc acgggaaaca gcagtgatta acctttagca ataaacgaaa gtttaactaa   240
gctatactaa ccccagggtt ggtcaatttc gtgccagcca cacc                    284

SEQ ID NO: 191           moltype = RNA   length = 375
FEATURE                  Location/Qualifiers
misc_feature             1..375
                         note = Description of Artificial Sequence:
                           SyntheticCombination of 3'-UTR sequence elements
source                   1..375
                         mol_type = other RNA
                         organism = synthetic construct
SEQUENCE: 191
gagagctcgc tttcttgctg tccaatttct attaaaggtt cctttgttcc ctaagtccaa    60
ctactaaact gggggatatt atgaagggcc ttgagcatct ggattctgcc taataaaaaa   120
catttatttt cattgctgcg tcctttgcag gatgaaacac ttccccgctt ggctctcatt   180
cttccacaag agagaccttt ctccggacct ggttgctact ggttcagcaa ctctgcagaa   240
aatgtcctcc cctgtggctg cctcagctca tgcctttggc ctgaagtccc agcattgatg   300
gcagcccctc atcttccaag ttttgtgctc ccctttacct aacgcttcct gcctcccatg   360
catctgtact cctcc                                                    375

SEQ ID NO: 192           moltype = RNA   length = 285
FEATURE                  Location/Qualifiers
misc_feature             1..285
                         note = Description of Artificial Sequence:
                           SyntheticCombination of 3'-UTR sequence elements
source                   1..285
                         mol_type = other RNA
                         organism = synthetic construct
SEQUENCE: 192
caagcacgca gcaatgcagc tcaaaacgct tagcctagcc acacccccac gggaaacagc    60
agtgattaac ctttagcaat aaacgaaagt ttaactaagc tatactaacc ccaggggttgg  120
tcaatttcgt gccagccaca cctgcccgtc ctcaccaaga ctgactgcct gctgctttgc   180
tactgcccgg gcccatgaga ctgacttccc actgctctgc ctgcctctcc ccactgcact   240
ggcacagccc cgccttgccg ctgctgatcc attgccggtg tgacc                   285

SEQ ID NO: 193           moltype = RNA   length = 291
FEATURE                  Location/Qualifiers
misc_feature             1..291
                         note = Description of Artificial Sequence:
                           SyntheticCombination of 3'-UTR sequence elements
source                   1..291
                         mol_type = other RNA
                         organism = synthetic construct
SEQUENCE: 193
caagcacgca gcaatgcagc tcaaaacgct tagcctagcc acacccccac gggaaacagc    60
agtgattaac ctttagcaat aaacgaaagt ttaactaagc tatactaacc ccaggggttgg  120
tcaatttcgt gccagccaca ccttccagcc agacacccgc cccccggccc tggctaagaa   180
gttgcttcct gttgccagca tgacctaccc tcgcctcttt gatgccatcc gctgccacct   240
ccttttgctc ctgacccttt agcctctct gcccttccac tctctgaccc c             291

SEQ ID NO: 194           moltype = RNA   length = 297
FEATURE                  Location/Qualifiers
misc_feature             1..297
                         note = Description of Artificial Sequence:
                           SyntheticCombination of 3'-UTR sequence elements
source                   1..297
                         mol_type = other RNA
                         organism = synthetic construct
SEQUENCE: 194
caagcacgca gcaatgcagc tcaaaacgct tagcctagcc acacccccac gggaaacagc    60
agtgattaac ctttagcaat aaacgaaagt ttaactaagc tatactaacc ccaggggttgg  120
tcaatttcgt gccagccaca ccgccttggc tcctccagga aggctcagga gccctacctc   180
cctgccatta tagctgctcc ccgccagaag cctgtgccaa ctctctgcat tccctgatct   240
ccatccctgt ggctgtcacc cttggtcacc tccgtgctgt cactgccatc tcccccc      297

SEQ ID NO: 195           moltype = RNA   length = 278
FEATURE                  Location/Qualifiers
misc_feature             1..278
                         note = Description of Artificial Sequence:
                           SyntheticCombination of 3'-UTR sequence elements
source                   1..278
                         mol_type = other RNA
                         organism = synthetic construct
```

```
SEQUENCE: 195
caagcacgca gcaatgcagc tcaaaacgct tagcctagcc acaccccac gggaaacagc    60
agtgattaac ctttagcaat aaacgaaagt ttaactaagc tatactaacc ccagggttgg   120
tcaatttcgt gccagccaca ccctggtact gcatgcacgc aatgctagct gccccttcc    180
cgtcctgggt accccgagtc tccccgacc tcgggtccca ggtatgctcc cacctccacc    240
tgccccactc accacctctg ctagttccag acacctcc                           278

SEQ ID NO: 196          moltype = RNA   length = 332
FEATURE                 Location/Qualifiers
misc_feature            1..332
                        note = Description of Artificial Sequence:
                        SyntheticCombination of 3'-UTR sequence elements
source                  1..332
                        mol_type = other RNA
                        organism = synthetic construct
SEQUENCE: 196
caagcacgca gcaatgcagc tcaaaacgct tagcctagcc acaccccac gggaaacagc    60
agtgattaac ctttagcaat aaacgaaagt ttaactaagc tatactaacc ccagggttgg   120
tcaatttcgt gccagccaca ccctgacagc gtgggcaacg cctgccgcct gctctgaggc   180
ccgatccagt gggcaggcca aggcctgctg ggccccgcg gacccaggtg ctctgggtca    240
cggtccctgt ccccgcaccc ccgcttcgt ctgcccatt gtggctcctc aggctctctc     300
ccctgctctc ccacctctac ctccaccccc ac                                 332

SEQ ID NO: 197          moltype = RNA   length = 284
FEATURE                 Location/Qualifiers
misc_feature            1..284
                        note = Description of Artificial Sequence:
                        SyntheticCombination of 3'-UTR sequence elements
source                  1..284
                        mol_type = other RNA
                        organism = synthetic construct
SEQUENCE: 197
caagcacgca gcaatgcagc tcaaaacgct tagcctagcc acaccccac gggaaacagc    60
agtgattaac ctttagcaat aaacgaaagt ttaactaagc tatactaacc ccagggttgg   120
tcaatttcgt gccagccaca ccgagagctc gctttcttgc tgtccaattt ctattaaagg   180
ttcctttgtt ccctaagtcc aactactaaa ctgggggata ttatgaaggg ccttgagcat   240
ctggattctg cctaataaaa aacatttatt ttcattgctg cgtc                    284

SEQ ID NO: 198          moltype = RNA   length = 284
FEATURE                 Location/Qualifiers
misc_feature            1..284
                        note = Description of Artificial Sequence:
                        SyntheticCombination of 3'-UTR sequence elements
source                  1..284
                        mol_type = other RNA
                        organism = synthetic construct
SEQUENCE: 198
caagcacgca gcaatgcagc tcaaaacgct tagcctagcc acaccccac gggaaacagc    60
agtgattaac ctttagcaat aaacgaaagt ttaactaagc tatactaacc ccagggttgg   120
tcaatttcgt gccagccaca cccaagcacg cagcaatgca gctcaaaacg cttagcctag   180
ccacaccccc acgggaaaca gcagtgatta acctttagca ataaacgaaa gtttaactaa   240
gctatactaa ccccaggggtt ggtcaatttc gtgccagcca cacc                   284

SEQ ID NO: 199          moltype = RNA   length = 375
FEATURE                 Location/Qualifiers
misc_feature            1..375
                        note = Description of Artificial Sequence:
                        SyntheticCombination of 3'-UTR sequence elements
source                  1..375
                        mol_type = other RNA
                        organism = synthetic construct
SEQUENCE: 199
caagcacgca gcaatgcagc tcaaaacgct tagcctagcc acaccccac gggaaacagc    60
agtgattaac ctttagcaat aaacgaaagt ttaactaagc tatactaacc ccagggttgg   120
tcaatttcgt gccagccaca cccttttgcag gatgaaacac ttccccgctt ggctctcatt   180
cttccacaag agagaccttt ctccggacct ggttgctact ggttcagcaa ctctgcagaa   240
aatgtcctcc cctgtggctg cctcagctca tgcctttggc ctgaagtccc agcattgatg   300
gcagccctc atcttccaag ttttgtgctc ccctttacct aacgcttcct gcctcccatg    360
catctgtact cctcc                                                    375

SEQ ID NO: 200          moltype = RNA   length = 376
FEATURE                 Location/Qualifiers
misc_feature            1..376
                        note = Description of Artificial Sequence:
                        SyntheticCombination of 3'-UTR sequence elements
source                  1..376
                        mol_type = other RNA
                        organism = synthetic construct
SEQUENCE: 200
```

```
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tcctgcccgt   240
cctcaccaag actgactgcc tgctgctttg ctactgcccg ggcccatgag actgacttcc   300
cactgctctg cctgcctctc cccactgcac tggcacagcc ccgccttgcc gctgctgatc   360
cattgccggt gtgacc                                                   376

SEQ ID NO: 201          moltype = RNA    length = 382
FEATURE                 Location/Qualifiers
misc_feature            1..382
                        note = Description of Artificial Sequence:
                         SyntheticCombination of 3'-UTR sequence elements
source                  1..382
                        mol_type = other RNA
                        organism = synthetic construct
SEQUENCE: 201
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tccttccagc   240
cagacacccg ccccccggcc ctggctaaga agttgcttcc tgttgccagc atgacctacc   300
ctcgccttct tgatgccatc cgctgccacc tccttttgct cctggaccct ttagcctctc   360
tgcccttcca ctctctgacc cc                                            382

SEQ ID NO: 202          moltype = RNA    length = 388
FEATURE                 Location/Qualifiers
misc_feature            1..388
                        note = Description of Artificial Sequence:
                         SyntheticCombination of 3'-UTR sequence elements
source                  1..388
                        mol_type = other RNA
                        organism = synthetic construct
SEQUENCE: 202
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tccgccttgg   240
ctcctccagg aaggctcagg agccctacct ccctgccatt atagctgctc cccgccagaa   300
gcctgtgcca actctctgca ttccctgatc tccatccctg tggctgtcac ccttggtcac   360
ctccgtgctg tcactgccat ctcccccc                                      388

SEQ ID NO: 203          moltype = RNA    length = 369
FEATURE                 Location/Qualifiers
misc_feature            1..369
                        note = Description of Artificial Sequence:
                         SyntheticCombination of 3'-UTR sequence elements
source                  1..369
                        mol_type = other RNA
                        organism = synthetic construct
SEQUENCE: 203
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tccctggtac   240
tgcatgcacg caatgctagc tgccccttc ccgtcctggg taccccgagt ctcccccgac   300
ctcgggtccc aggtatgctc ccacctccac ctgccccact caccacctct gctagttcca   360
gacacctcc                                                           369

SEQ ID NO: 204          moltype = RNA    length = 423
FEATURE                 Location/Qualifiers
misc_feature            1..423
                        note = Description of Artificial Sequence:
                         SyntheticCombination of 3'-UTR sequence elements
source                  1..423
                        mol_type = other RNA
                        organism = synthetic construct
SEQUENCE: 204
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tccctgacag   240
cgtgggcaac gcctgccgcc tgctctgagg cccgatccag tgggcaggcc aaggcctgct   300
gggccccgc ggaccaggt gctgggtc acggtccctg tccccgcacc cccgccttctg      360
tctgccccat tgtggctccc caggctctct ccctgctct cccacctcta cctccacccc    420
cac                                                                 423

SEQ ID NO: 205          moltype = RNA    length = 375
FEATURE                 Location/Qualifiers
```

```
misc_feature            1..375
                        note = Description of Artificial Sequence:
                        SyntheticCombination of 3'-UTR sequence elements
source                  1..375
                        mol_type = other RNA
                        organism = synthetic construct
SEQUENCE: 205
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tccgagagct   240
cgctttcttg ctgtccaatt tctattaaag gttcctttgt tccctaagtc caactactaa   300
actggggat attatgaagg gccttgagca tctggattct gcctaataaa aacatttat    360
tttcattgct gcgtc                                                   375

SEQ ID NO: 206          moltype = RNA   length = 375
FEATURE                 Location/Qualifiers
misc_feature            1..375
                        note = Description of Artificial Sequence:
                        SyntheticCombination of 3'-UTR sequence elements
source                  1..375
                        mol_type = other RNA
                        organism = synthetic construct
SEQUENCE: 206
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tcccaagcac   240
gcagcaatgc agctcaaaac gcttagccta gccacacccc cacgggaaac agcagtgatt   300
aacctttagc aataaacgaa agtttaacta agctatacta accccagggt tggtcaattt   360
cgtgccagcc acacc                                                   375

SEQ ID NO: 207          moltype = RNA   length = 466
FEATURE                 Location/Qualifiers
misc_feature            1..466
                        note = Description of Artificial Sequence:
                        SyntheticCombination of 3'-UTR sequence elements
source                  1..466
                        mol_type = other RNA
                        organism = synthetic construct
SEQUENCE: 207
ctttgcagga tgaaacactt ccccgcttgg ctctcattct tccacaagag agacctttct    60
ccggacctgg ttgctactgg ttcagcaact ctgcagaaaa tgtcctcccc tgtggctgcc   120
tcagctcatg cctttggcct gaagtcccag cattgatggc agcccctcat cttccaagtt   180
ttgtgctccc ctttacctaa cgcttcctgc ctcccatgca tctgtactcc tcccttgca   240
ggatgaaaca cttccccgct tggctctcat tcttccacaa gagagacctt tctccggacc   300
tggttcagca actctgcaga aaatgtccct gtggt gcctcagctc                   360
atgcctttgg cctgaagtcc cagcattgat ggcagcccct catcttccaa gttttgtgct   420
cccctttacc taacgcttcc tgcctcccat gcatctgtac tcctcc                 466

SEQ ID NO: 208          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 208
ctggtactgc atggacgcaa tgctagctgc ccctttcccg tcctgggtac cccgagtcac    60
ccccgacctc gggtcccagg tatcgtccca cctccacctg cccactcac cacctctgct    120
agttccagac acctcccaag cacgcagcaa tgcagctcaa aacgcttagc atagccacac   180
ccccacggga aacagcagtg attaaccttt agcaataatc gaatgtttaa ctaagctata   240
ctaacccccag ggttggtcaa tttcgtgcca gccacacc                         278

SEQ ID NO: 209          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 209
ctcgtactgc atggacgcaa tgctagctgc ccctttcccg tcctgggtac cccgagtcac    60
caccgacctc gggtcccagg tatcgtccca cctccacgtg cccactcac cacctctgct    120
agttccagac acctcccaag cacgcagcaa tgcagctcaa aacgcttagc atagccacac   180
ccccacggga aacagtagtg attaaccttt agcaataatc gaatgtctaa ctaagctata   240
ctaacccccag ggttggatcaa ttacgtgcca gccacacc                        278
```

-continued

```
SEQ ID NO: 210          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 210
ctcgtactgc atggacgcaa tgctagctgc cccttcccg tcctgggtac cccgagtcac    60
caccgacctc gggtcccagg tatcgtccca cctccacgtg ccccactcac cacctttgct   120
agttccagac acctcccatg cacgcagcaa tgcagatcaa aacgcttagc atagccacac   180
ccccacggga aacagtagtg attaaccttt agcaataatc gaatgtctaa ctaagctata   240
ctaaccccag ggttgatcaa ttacgtgcca gccacacc                           278

SEQ ID NO: 211          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 211
gtcgtactgc atggacgcaa tgctagcagc acctttcccg tcctgggtac cccgagtcac    60
caccgacctc gggtcccagg tatcgtccca cctccacgtg ccccacccac cacctttgct   120
agttccagag acctcccatg cacgcagcaa tgcagatcaa aacgcttagc atagccacac   180
cgccacggga aacagtagtg atcaaccttt agctataatc gaatgtctaa ctaagctatt   240
ctaaccacag ggttgatcaa ttacgtgcca gccagacc                           278

SEQ ID NO: 212          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 212
ctggtactgc atgcacgcaa tgctagctgc cccaaagggc tcctgggtac cccgagtctc    60
ccccgacctc gggtcccagg tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                           278

SEQ ID NO: 213          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 213
ctggtactgc atgcacgcaa tgctagctgc cccttcccg tggtccgtac cccgagtctc     60
ccccgacctc gggtcccagg tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                           278

SEQ ID NO: 214          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 214
ctggtactgc atgcacgcaa tgctagctgc cccttcccg tggaccgtac ggcgagtctc     60
ccccgacctc gggtcccagg tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                           278

SEQ ID NO: 215          moltype = RNA   length = 278
FEATURE                 Location/Qualifiers
misc_feature            1..278
```

```
                        note = Description of Artificial Sequence:
                        SyntheticCombination of 3'-UTR sequence elements
source                  1..278
                        mol_type = other RNA
                        organism = synthetic construct
SEQUENCE: 215
ctggtactgc atgcacgcaa tgctagctgc ccctttgccg tggaccgtac gggctgtctc    60
ccccgacctc gggtcccagg tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                            278

SEQ ID NO: 216          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 216
ctggtactgc atgcacgcaa tgctagctgc ccctttgggc tggaccgtac gggctgtctc    60
ccccgacctc gggtcccagg tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                            278

SEQ ID NO: 217          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 217
ctggtactgc atgcacgcaa tgctagctgc ccctttcccg tggtccgtac cccgagtctc    60
ccccgacctc gggtcggacc tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                            278

SEQ ID NO: 218          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 218
ctggtactgc atgcacgcaa tgctagctgc ccctttcccg tggaccgtac ggcgagtctc    60
ccccgacctc gcctcggtcc tatgctccca cctccacctg ccccactcac cacctctgct   120
agttccagac acctcccaag cacgcagcaa tgcagctcaa aacgcttagc ctagccacac   180
ccccacggga aacagcagtg attaaccttt agcaataaac gaaagtttaa ctaagctata   240
ctaaccccag ggttggtcaa tttcgtgcca gccacacc                            278

SEQ ID NO: 219          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
                        organism = synthetic construct
SEQUENCE: 219
ctggtactgc atgcacgcaa tgctagctgc ccctttgccg tggaccgtac gggctgtctc    60
ccccgaccag ccctcggtcc tatgctccca cctccacctg ccccactcac cacctctgct   120
agttccagac acctcccaag cacgcagcaa tgcagctcaa aacgcttagc ctagccacac   180
ccccacggca aacagcagtg attaaccttt agcaataaac gaaagtttaa ctaagctata   240
ctaaccccag ggttggtcaa tttcgtgcca gccacacc                            278

SEQ ID NO: 220          moltype = RNA   length = 278
FEATURE                 Location/Qualifiers
misc_feature            1..278
                        note = Description of Artificial Sequence:
                        SyntheticCombination of 3'-UTR sequence elements
source                  1..278
                        mol_type = other RNA
```

```
                        organism = synthetic construct
SEQUENCE: 220
ctggtactgc atgcacgcaa tgctagctgc cccctttgggc tggaccgtac gggctgtctc   60
ccccgaccag ccctcggtcc tatgctccca cctccacctg ccccactcac cacctctgct  120
agttccagac acctcccaag cacgcagcaa tgcagctcaa aacgcttagc ctagccacac  180
ccccagccca aacagcagtg attaacctttt agcaataaac gaaagtttaa ctaagctata  240
ctaaccccag ggttggtcaa tttcgtgcca gccacacc                          278

SEQ ID NO: 221          moltype = RNA  length = 142
FEATURE                 Location/Qualifiers
misc_feature            1..142
                        note = Description of Artificial Sequence: Synthetic3'-UTR
                          sequence element
source                  1..142
                        mol_type = other RNA
                        organism = synthetic construct
SEQUENCE: 221
gagagctcgc tttcttgctg tccaatttct attaaaggtt cctttgttcc ctaagtccaa   60
ctactaaact gggggatatt atgaagggcc ttgagcatct ggattctgcc taataaaaaa  120
catttatttt cattgctgcg tc                                           142

SEQ ID NO: 222          moltype = RNA  length = 120
FEATURE                 Location/Qualifiers
misc_feature            1..120
                        note = Description of Artificial Sequence:
                          Syntheticpolynucleotide
source                  1..120
                        mol_type = other RNA
                        organism = synthetic construct
SEQUENCE: 222
aaaaaaaaaa aaaaaaaaaa aaaaaaaaaa aaaaaaaaaa aaaaaaaaaa aaaaaaaaaa   60
aaaaaaaaaa aaaaaaaaaa aaaaaaaaaa aaaaaaaaaa aaaaaaaaaa aaaaaaaaaa  120

SEQ ID NO: 223          moltype = RNA  length = 60
FEATURE                 Location/Qualifiers
misc_feature            1..60
                        note = Description of Artificial Sequence:
                          Syntheticoligonucleotide
source                  1..60
                        mol_type = other RNA
                        organism = synthetic construct
SEQUENCE: 223
aaaaaaaaaa aaaaaaaaaa aaaaaaaaaa aaaaaaaaaa aaaaaaaaaa aaaaaaaaaa   60

SEQ ID NO: 224          moltype = DNA  length = 60
FEATURE                 Location/Qualifiers
misc_feature            1..60
                        note = Description of Artificial Sequence:
                          Syntheticoligonucleotide
source                  1..60
                        mol_type = other DNA
                        organism = synthetic construct
SEQUENCE: 224
tttttttttt tttttttttt tttttttttt tttttttttt tttttttttt tttttttttt   60

SEQ ID NO: 225          moltype = RNA  length = 50
FEATURE                 Location/Qualifiers
misc_feature            1..50
                        note = Description of Artificial Sequence:
                          Syntheticoligonucleotide
source                  1..50
                        mol_type = other RNA
                        organism = synthetic construct
SEQUENCE: 225
aaaaaaaaaa aaaaaaaaaa aaaaaaaaaa aaaaaaaaaa aaaaaaaaaa              50

SEQ ID NO: 226          moltype = RNA  length = 80
FEATURE                 Location/Qualifiers
misc_feature            1..80
                        note = Description of Artificial Sequence:
                          Syntheticoligonucleotide
misc_feature            1..80
                        note = This sequence may encompass 1-80 nucleotides
misc_feature            1..80
                        note = See specification as filed for detailed description
                          ofsubstitutions and preferred embodiments
source                  1..80
                        mol_type = other RNA
                        organism = synthetic construct
```

```
SEQUENCE: 226
aaaaaaaaaa aaaaaaaaaa aaaaaaaaaa aaaaaaaaaa aaaaaaaaaa aaaaaaaaaa    60
aaaaaaaaaa aaaaaaaaaa                                                 80

SEQ ID NO: 227          moltype = RNA   length = 100
FEATURE                 Location/Qualifiers
misc_feature            1..100
                        note = Description of Artificial Sequence:
                          Syntheticpolynucleotide
misc_feature            1..100
                        note = This sequence may encompass 1-100 nucleotides
misc_feature            1..100
                        note = See specification as filed for detailed description
                          ofsubstitutions and preferred embodiments
source                  1..100
                        mol_type = other RNA
                        organism = synthetic construct
SEQUENCE: 227
aaaaaaaaaa aaaaaaaaaa aaaaaaaaaa aaaaaaaaaa aaaaaaaaaa aaaaaaaaaa    60
aaaaaaaaaa aaaaaaaaaa aaaaaaaaaa aaaaaaaaaa                          100

SEQ ID NO: 228          moltype = RNA   length = 80
FEATURE                 Location/Qualifiers
misc_feature            1..80
                        note = Description of Artificial Sequence:
                          Syntheticoligonucleotide
misc_feature            1..80
                        note = This sequence may encompass 30-80 nucleotides
misc_feature            1..80
                        note = See specification as filed for detailed description
                          ofsubstitutions and preferred embodiments
source                  1..80
                        mol_type = other RNA
                        organism = synthetic construct
SEQUENCE: 228
aaaaaaaaaa aaaaaaaaaa aaaaaaaaaa aaaaaaaaaa aaaaaaaaaa aaaaaaaaaa    60
aaaaaaaaaa aaaaaaaaaa                                                 80

SEQ ID NO: 229          moltype = RNA   length = 500
FEATURE                 Location/Qualifiers
misc_feature            1..500
                        note = Description of Artificial Sequence:
                          Syntheticpolynucleotide
misc_feature            1..500
                        note = This sequence may encompass 20-500 nucleotides
misc_feature            1..500
                        note = See specification as filed for detailed description
                          ofsubstitutions and preferred embodiments
source                  1..500
                        mol_type = other RNA
                        organism = synthetic construct
SEQUENCE: 229
aaaaaaaaaa aaaaaaaaaa aaaaaaaaaa aaaaaaaaaa aaaaaaaaaa aaaaaaaaaa    60
aaaaaaaaaa aaaaaaaaaa aaaaaaaaaa aaaaaaaaaa aaaaaaaaaa aaaaaaaaaa   120
aaaaaaaaaa aaaaaaaaaa aaaaaaaaaa aaaaaaaaaa aaaaaaaaaa aaaaaaaaaa   180
aaaaaaaaaa aaaaaaaaaa aaaaaaaaaa aaaaaaaaaa aaaaaaaaaa aaaaaaaaaa   240
aaaaaaaaaa aaaaaaaaaa aaaaaaaaaa aaaaaaaaaa aaaaaaaaaa aaaaaaaaaa   300
aaaaaaaaaa aaaaaaaaaa aaaaaaaaaa aaaaaaaaaa aaaaaaaaaa aaaaaaaaaa   360
aaaaaaaaaa aaaaaaaaaa aaaaaaaaaa aaaaaaaaaa aaaaaaaaaa aaaaaaaaaa   420
aaaaaaaaaa aaaaaaaaaa aaaaaaaaaa aaaaaaaaaa aaaaaaaaaa aaaaaaaaaa   480
aaaaaaaaaa aaaaaaaaaa                                                500

SEQ ID NO: 230          moltype = DNA   length = 18
FEATURE                 Location/Qualifiers
misc_feature            1..18
                        note = Description of Artificial Sequence:
                          Syntheticoligonucleotide
source                  1..18
                        mol_type = other DNA
                        organism = synthetic construct
SEQUENCE: 230
tttttttttt tttttttt                                                   18

SEQ ID NO: 231          moltype = RNA   length = 50
FEATURE                 Location/Qualifiers
misc_feature            1..50
                        note = Description of Artificial Sequence:
                          Syntheticoligonucleotide
misc_feature            1..50
```

```
                        note = This sequence may encompass 20-50 nucleotides
misc_feature            1..50
                        note = See specification as filed for detailed description
                         ofsubstitutions and preferred embodiments
source                  1..50
                        mol_type = other RNA
                        organism = synthetic construct
SEQUENCE: 231
aaaaaaaaaa aaaaaaaaaa aaaaaaaaaa aaaaaaaaaa aaaaaaaaaa                  50

SEQ ID NO: 232          moltype = RNA   length = 120
FEATURE                 Location/Qualifiers
misc_feature            1..120
                        note = Description of Artificial Sequence:
                         Syntheticpolynucleotide
misc_feature            1..120
                        note = See specification as filed for detailed description
                         ofsubstitutions and preferred embodiments
source                  1..120
                        mol_type = other RNA
                        organism = synthetic construct
SEQUENCE: 232
aaaaaaaaaa aaaaaaaaaa aaaaaaaaaa aaaaaaaaaa aaaaaaaaaa aaaaaaaaaa       60
aaaaaaaaaa aaaaaaaaaa aaaaaaaaaa aaaaaaaaaa aaaaaaaaaa aaaaaaaaaa      120

SEQ ID NO: 233          moltype = RNA   length = 50
FEATURE                 Location/Qualifiers
misc_feature            1..50
                        note = Description of Artificial Sequence:
                         Syntheticoligonucleotide
misc_feature            1..50
                        note = See specification as filed for detailed description
                         ofsubstitutions and preferred embodiments
source                  1..50
                        mol_type = other RNA
                        organism = synthetic construct
SEQUENCE: 233
aaaaaaaaaa aaaaaaaaaa aaaaaaaaaa aaaaaaaaaa aaaaaaaaaa                  50

SEQ ID NO: 234          moltype = RNA   length = 70
FEATURE                 Location/Qualifiers
misc_feature            1..70
                        note = Description of Artificial Sequence:
                         Syntheticoligonucleotide
misc_feature            1..70
                        note = See specification as filed for detailed description
                         ofsubstitutions and preferred embodiments
source                  1..70
                        mol_type = other RNA
                        organism = synthetic construct
SEQUENCE: 234
aaaaaaaaaa aaaaaaaaaa aaaaaaaaaa aaaaaaaaaa aaaaaaaaaa aaaaaaaaaa       60
aaaaaaaaaa                                                              70

SEQ ID NO: 235          moltype = RNA   length = 20
FEATURE                 Location/Qualifiers
misc_feature            1..20
                        note = Description of Artificial Sequence:
                         Syntheticoligonucleotide
misc_feature            1..20
                        note = See specification as filed for detailed description
                         ofsubstitutions and preferred embodiments
source                  1..20
                        mol_type = other RNA
                        organism = synthetic construct
SEQUENCE: 235
aaaaaaaaaa aaaaaaaaaa                                                   20
```

3'-UTR SEQUENCES FOR STABILIZATION OF RNA

SEQUENCE LISTING

The instant application contains a Sequence Listing which has been submitted electronically in XML format and is hereby incorporated by reference in its entirety. Said XML copy, created on Sep. 28, 2022, is named 2013237-0439_SL.xml and is 304,204 bytes in size.

The use of RNA offers an attractive alternative to DNA in order to circumvent the potential safety risks connected with the therapeutic use of DNA. In vitro-transcribed RNA (IVT-RNA) is of particular interest in therapeutic approaches. The advantages of a therapeutic use of RNA include transient expression and a non-transforming character. RNA does not need to enter the nucleus in order to be expressed and moreover cannot integrate into the host genome, thereby eliminating the risk of oncogenesis. When used for vaccination, injection of RNA can induce both cellular and humoral immune responses in vivo. However, the use of RNA for clinical applications is greatly restricted especially by the short half life of RNA.

IVT vectors may be used in a standardized manner as template for in vitro transcription. Such IVT vectors may have the following structure: a 5' RNA polymerase promoter enabling RNA transcription, followed by a gene of interest which is flanked either 3' and/or 5' by untranslated regions (UTR), and a 3' polyadenyl cassette containing A nucleotides. Prior to in vitro transcription, the circular plasmid is linearized downstream of the polyadenyl cassette by type II restriction enzymes (recognition sequence corresponds to cleavage site). The polyadenyl cassette thus corresponds to the later poly(A) sequence in the transcript.

Human immature dendritic cells (hiDCs) are widely used to develop and improve immunotherapies for cancer treatment. Loaded with in vitro transcribed (IVT)-mRNA encoding a specific tumor antigen (TA), hiDCs are able to induce an effective anti-tumor response. However, a prerequisite for an effective immune response using RNA-based cancer vaccines is high stability and translation efficiency of the RNA. Both can be improved by structural modifications of the 5'-CAP, the 3' poly(A)-tail as well as the 5' and 3' untranslated regions (UTRs). Sequence elements within the UTRs affect translational efficiency (mainly 5'-UTR) and RNA stability (mainly 3'-UTR).

In previous work we have demonstrated that two consecutive copies of the human beta-globin 3'-UTR (now called 2hBg; previously also 2βgUTR) contribute to higher transcript stability and translational efficiency (Holtkamp (2006) Blood 108:4009-4017). However, the presence of two identical copies of the human beta-globin 3'-UTR sequence in the plasmid DNA, which is ultimately used as template for the in vitro transcription of RNA, bears the risk of recombination during its propagation in *E. coli*. Similarly, any cloning approach, especially using PCR-based amplification, is very difficult. The same holds true for PCR-based amplification of the RNA-encoding region with the 2hBg at the 3'-end to be used as template for the in vitro transcription, because here mispriming, which leads to omission of one copy of the human beta-globin 3'-UTR, has been observed. To avoid these problems we sought to identify novel sequences that have a stabilizing effect on in vitro transcribed mRNA at least similar to, ideally even better than, the 2hBg sequence.

It was the object of the present invention to provide RNA with increased stability and/or translation efficiency and means for obtaining such RNA. It should be possible to obtain increased grades of expression by using said RNA in therapy.

This object is achieved according to the invention by the subject matter of the claims.

The present invention relates to stabilization of RNA, in particular mRNA, and an increase in mRNA translation. The present invention particularly relates to a modification of RNA, in particular in vitro-transcribed RNA, resulting in increased transcript stability and/or translation efficiency.

According to the invention, it was demonstrated that certain sequences in the 3'-untranslated region (UTR) of an RNA molecule improve stability and translation efficiency.

Using RNA modified according to the invention in the transfection of dendritic cells (DCs), it will be possible, for example, to increase the density of antigen-specific peptide/MHC complexes on the transfected cells and their ability to stimulate and expand antigen-specific $CD4^+$ and $CD8^+$ T cells. The invention therefore, in one embodiment, relates to a strategy for optimizing RNA vaccines for transfecting DC or RNA-transfected DC vaccines by using RNA which has been modified by the RNA modifications described according to the invention.

According to the invention, modification, and thereby stabilization and/or increase in translation efficiency, of RNA is preferably achieved by genetically modifying expression vectors which preferably serve as template for RNA transcription in vitro. These expression vectors allow transcription of RNA with a 3'-untranslated region described according to the invention, and preferably between the sequence coding for a peptide or protein (open reading frame) and the poly(A) sequence.

These vectors may also allow transcription of RNA with a poly(A) sequence which preferably has an open end in said RNA, i.e. no nucleotides other than A nucleotides flank said poly(A) sequence at its 3' end. An open-ended poly(A) sequence in the RNA can be achieved by introducing a type IIS restriction cleavage site into an expression vector which allows RNA to be transcribed under the control of a 5' RNA polymerase promoter and which contains a polyadenyl cassette, wherein the recognition sequence is located 3' of the polyadenyl cassette, while the cleavage site is located upstream and thus within the polyadenyl cassette. Restriction cleavage at the type IIS restriction cleavage site enables a plasmid to be linearized within the polyadenyl cassette. The linearized plasmid can then be used as template for in vitro transcription, the resulting transcript ending in an unmasked poly(A) sequence. Furthermore, an optional disruption of the 3' polyadenyl cassette by a random nucleotide sequence, with an equal distribution of the 4 nucleotides (linker), increases the stability of the 3' polyadenyl cassette in *E. coli*.

SUMMARY OF THE INVENTION

In one aspect, the invention relates to a nucleic acid molecule comprising in the 5'→3' direction of transcription:
(a) a promoter;
(b) a transcribable nucleic acid sequence or a nucleic acid sequence for introducing a transcribable nucleic acid sequence; and
(c) a nucleic acid sequence which, when transcribed under the control of the promoter (a), codes for a 3'-untranslated region in the transcript, said 3'-untranslated region comprising a nucleic acid sequence which is selected from the group consisting of:

(c-1) the nucleic acid sequence of the 3'-untranslated region of FCGRT, a fragment thereof, or a variant of said nucleic acid sequence or fragment,
(c-2) the nucleic acid sequence of the 3'-untranslated region of LSP1, a fragment thereof, or a variant of said nucleic acid sequence or fragment,
(c-3) the nucleic acid sequence of the 3'-untranslated region of CCL22, a fragment thereof, or a variant of said nucleic acid sequence or fragment,
(c-4) the nucleic acid sequence of the 3'-untranslated region of AES, a fragment thereof, or a variant of said nucleic acid sequence or fragment,
(c-5) the nucleic acid sequence of the 3'-untranslated region of PLD3, a fragment thereof, or a variant of said nucleic acid sequence or fragment,
(c-6) the nucleic acid sequence of the non-coding RNA of MT-RNR1, a fragment thereof, or a variant of said nucleic acid sequence or fragment,
(c-7) the nucleic sequence of the 3'-untranslated region of HLA-DRB4, a fragment thereof, or a variant of said nucleic acid sequence or fragment, and
(c-8) any combination of two or more of the nucleic acid sequences, fragments and/or variants under (c-1), (c-2), (c-3), (c-4), (c-5), (c-6) and (c-7).

In one embodiment, the nucleic acid sequences (b) and (c) under the control of the promoter (a) can be transcribed to give a common transcript in which the nucleic acid sequence transcribed from the nucleic acid sequence (c) is active so as to increase the translation efficiency and/or the stability of the nucleic acid sequence transcribed from the transcribable nucleic acid sequence (b).

In one embodiment, the nucleic acid sequences (b) and (c) are not naturally linked.

In one embodiment, (c-4) the nucleic acid sequence of the 3'-untranslated region of AES, a fragment thereof, or a variant of said nucleic acid sequence or fragment comprises a nucleic acid sequence selected from the group consisting of a nucleic acid sequence selected from SEQ ID NOs: 86 to 89, a fragment thereof, or a variant of said nucleic acid sequence or fragment.

In one embodiment, (c-4) the nucleic acid sequence of the 3'-untranslated region of AES, a fragment thereof, or a variant of said nucleic acid sequence or fragment comprises a nucleic acid sequence selected from the group consisting of the nucleic acid sequence of SEQ ID NO: 86, a fragment thereof, or a variant of said nucleic acid sequence or fragment.

In one embodiment, (c-6) the nucleic acid sequence of the non-coding RNA of MT-RNR1, a fragment thereof, or a variant of said nucleic acid sequence or fragment comprises a nucleic acid sequence selected from the group consisting of a nucleic acid sequence selected from SEQ ID NOs: 105 to 121, a fragment thereof, or a variant of said nucleic acid sequence or fragment.

In one embodiment, (c-6) the nucleic acid sequence of the non-coding RNA of MT-RNR1, a fragment thereof, or a variant of said nucleic acid sequence or fragment comprises a nucleic acid sequence selected from the group consisting of the nucleic acid sequence of SEQ ID NO: 115, a fragment thereof, or a variant of said nucleic acid sequence or fragment.

In one embodiment, the nucleic acid sequence (c-8) comprises a combination of two or more identical or different nucleic acid sequences, fragments and/or variants under (c-1), (c-2), (c-3), (c-4), (c-5), (c-6) and (c-7). In various embodiments, the nucleic acid sequence (c-8) comprises a combination of (c-1) and (c-2), (c-1) and (c-3), (c-1) and (c-4), (c-1) and (c-5), (c-1) and (c-6), (c-1) and (c-7), (c-2) and (c-3), (c-2) and (c-4), (c-2) and (c-5), (c-2) and (c-6), (c-2) and (c-7), (c-3) and (c-4), (c-3) and (c-5), (c-3) and (c-6), (c-3) and (c-7), (c-4) and (c-5), (c-4) and (c-6), (c-4) and (c-7), (c-5) and (c-6), (c-5) and (c-7), or (c-6) and (c-7).

In one embodiment, the nucleic acid sequence (c-8) comprises a combination of (c-4) the nucleic acid sequence of the 3'-untranslated region of AES, a fragment thereof, or a variant of said nucleic acid sequence or fragment, and (c-6) the nucleic acid sequence of the non-coding RNA of MT-RNR1, a fragment thereof, or a variant of said nucleic acid sequence or fragment. In one embodiment, (c-4) the nucleic acid sequence of the 3'-untranslated region of AES, a fragment thereof, or a variant of said nucleic acid sequence or fragment is located 5' to (c-6) the nucleic acid sequence of the non-coding RNA of MT-RNR1, a fragment thereof, or a variant of said nucleic acid sequence or fragment. In one embodiment, the combination of (c-4) the nucleic acid sequence of the 3'-untranslated region of AES, a fragment thereof, or a variant of said nucleic acid sequence or fragment, and (c-6) the nucleic acid sequence of the non-coding RNA of MT-RNR1, a fragment thereof, or a variant of said nucleic acid sequence or fragment comprises a nucleic acid sequence selected from the group consisting of the nucleic acid sequence of SEQ ID NO: 174, a fragment thereof, or a variant of said nucleic acid sequence or fragment.

In one embodiment, the nucleic acid molecule of the invention further comprises (d) a nucleic acid sequence which, when transcribed under the control of the promoter (a), codes for a nucleic acid sequence which is a polyadenyl sequence optionally comprising within the polyadenyl sequence a sequence of one or more consecutive nucleotides containing nucleotides other than A nucleotides. In one embodiment, said polyadenyl sequence comprises at least 20 A nucleotides, preferably at least 40, at least 80, at least 100 or at least 120 A nucleotides, preferably consecutive A nucleotides. In one embodiment, said sequence of one or more consecutive nucleotides containing nucleotides other than A nucleotides is a sequence, preferably an arbitrary sequence, of 2 or more consecutive nucleotides, wherein the first and the last nucleotide of said sequence of 2 or more consecutive nucleotides is a nucleotide other than an A nucleotide. In one embodiment, said nucleic acid sequence (d) is a nucleic acid sequence which, when transcribed under the control of the promoter (a), codes for a nucleic acid sequence which is a polyadenyl sequence comprising within the polyadenyl sequence a sequence of one or more consecutive nucleotides containing nucleotides other than A nucleotides and which exhibits higher stability upon propagation of said nucleic acid molecule in *Escherichia coli* compared to a nucleic acid molecule which comprises instead of said nucleic acid sequence (d) a nucleic acid sequence (d)' which, when transcribed under the control of the promoter (a), codes for a polyadenyl sequence of the same length as said nucleic acid sequence which is a polyadenyl sequence comprising within the polyadenyl sequence a sequence of one or more consecutive nucleotides containing nucleotides other than A nucleotides. In one embodiment, said nucleic acid sequence which is a polyadenyl sequence optionally comprising within the polyadenyl sequence a sequence of one or more consecutive nucleotides containing nucleotides other than A nucleotides comprises at least 80 nucleotides, preferably at least 90 or 100 nucleotides. In one embodiment, said nucleic acid sequence which is a polyadenyl sequence optionally comprising within the polyadenyl sequence a sequence of one or more consecutive nucleotides containing nucleotides other than A nucleotides comprises at least 90 nucleotides, preferably at least 100 nucleotides, preferably at least 110 nucleotides. In one embodiment, said nucleic acid sequence which is a polyadenyl sequence optionally comprising within the polyadenyl sequence a sequence of one or more consecutive nucleotides containing nucleotides other than A nucleotides comprises about 120 nucleotides. In particular embodiments, said nucleic acid sequence which is a polyadenyl sequence optionally comprising within the polyadenyl sequence a sequence of one or more consecutive nucleotides containing nucleotides other than A nucleotides comprises up to 200, preferably up to 150, and, in particular, up to 130 nucleotides. In one embodiment, at least 90%, preferably at least 92%, preferably at least 95%, 97% or 98% of the nucleotides of said nucleic acid sequence which is a polyadenyl sequence optionally comprising within the polyadenyl sequence a sequence of one or more consecutive nucleotides containing nucleotides other than A nucleotides are A nucleotides in said polyadenyl sequence (not including A nucleotides in said sequence of one or more consecutive nucleotides containing nucleotides other than A nucleotides).

In one embodiment, said sequence of one or more consecutive nucleotides containing nucleotides other than A nucleotides is located within a region from position 21 to position 80, preferably from position 21 to position 60, more preferably from position 31 to position 50 of said polyadenyl sequence.

In one embodiment, said sequence of one or more consecutive nucleotides containing nucleotides other than A nucleotides is preceeded by at least 20 A residues, preferably at least 30, 40 or 50 A residues in said polyadenyl sequence. In particular embodiments, said sequence of one or more consecutive nucleotides containing nucleotides other than A nucleotides is preceeded by up to 80 A residues, preferably up to 70 or 60 A residues in said polyadenyl sequence.

In one embodiment, said sequence of one or more consecutive nucleotides containing nucleotides other than A nucleotides is followed by at least 20 A residues, preferably at least 30, 40, 50, 60 or 70 A residues in said polyadenyl sequence. In particular embodiments, said sequence of one or more consecutive nucleotides containing nucleotides other than A nucleotides is followed by up to 100 A residues, preferably up to 80 A residues in said polyadenyl sequence.

In one embodiment, said sequence of one or more consecutive nucleotides containing nucleotides other than A nucleotides is preceeded by 20 to 50, preferably 30 to 40 A residues in said polyadenyl sequence and is followed by 30 to 80, preferably 40 to 70 A residues in said polyadenyl sequence.

In one embodiment, said sequence of one or more consecutive nucleotides containing nucleotides other than A nucleotides has a length of at least 3, at least 4, at least 5, at least 6, at least 8, preferably at least 10, more preferably at least 15 nucleotides.

In one embodiment, said sequence of one or more consecutive nucleotides containing nucleotides other than A nucleotides has a length of no more than 50, preferably no more than 30, more preferably no more than 20 nucleotides.

In one embodiment, said sequence of one or more consecutive nucleotides containing nucleotides other than A nucleotides does not comprise more than 3, preferably no more than 2, preferably no consecutive A residues.

In one embodiment, the nucleic acid sequences (b), (c) and (d) under the control of the promoter (a) can be transcribed to give a common transcript. In one embodiment, the nucleic acid sequences transcribed from the nucleic acid sequences (c) and optionally (d) are active so as to increase the translation efficiency and/or the stability of the nucleic acid sequence transcribed from the transcribable nucleic acid sequence (b).

In one embodiment, in the transcript said nucleic acid sequence which is a polyadenyl sequence optionally comprising within the polyadenyl sequence a sequence of one or more consecutive nucleotides containing nucleotides other than A nucleotides is located at the 3' end.

In one embodiment, the nucleic acid molecule of the invention is a DNA molecule. In one embodiment, said nucleic acid molecule is an expression vector or plasmid such as an IVT vector.

In one embodiment, the nucleic acid molecule of the invention is a closed circular molecule or a linear molecule.

In one embodiment, the transcribable nucleic acid sequence comprises a nucleic acid sequence coding for a peptide or protein and the nucleic acid sequence for introducing a transcribable nucleic acid sequence is a multiple cloning site.

In one embodiment, the nucleic acid molecule of the invention further comprises one or more members selected from the group consisting of: (i) a reporter gene; (ii) a selectable marker; and (iii) an origin of replication.

In one embodiment, the nucleic acid molecule of the invention is suitable, in particular after linearization, for in vitro transcription of RNA, in particular mRNA.

Prior to in vitro transcription, circular IVT vectors are generally linearized downstream of the polyadenyl cassette by type II restriction enzymes (recognition sequence corresponds to cleavage site). The polyadenyl cassette thus corresponds to the later poly(A) sequence in the transcript. As a result of this procedure, some nucleotides remain as part of the enzyme cleavage site after linearization and extend or mask the poly(A) sequence at the 3' end. However, it was found that RNA having an open-ended poly(A) sequence is translated more efficiently than RNA having a poly(A) sequence with a masked terminus.

Accordingly, nucleic acid molecules of the invention when used as expression vectors preferably allow transcription of RNA with a poly(A) sequence which preferably has an open end in said RNA, i.e. no nucleotides other than A nucleotides flank said poly(A) sequence at its 3' end. An open-ended poly(A) sequence in the RNA can be achieved by introducing a type IIS restriction cleavage site into an expression vector which allows RNA to be transcribed under the control of a 5' RNA polymerase promoter and which contains a polyadenyl cassette, wherein the recognition sequence is located downstream of the polyadenyl cassette, while the cleavage site is located upstream and thus within the polyadenyl cassette. Restriction cleavage at the type IIS restriction cleavage site enables a plasmid to be linearized within the polyadenyl cassette. The linearized plasmid can then be used as template for in vitro transcription, the resulting transcript ending in an unmasked poly(A) sequence.

Accordingly, in one embodiment, it is preferred that the nucleic acid molecule of the invention can be cleaved, preferably enzymatically or in another biochemical way, within the nucleic acid sequence (d) in such a way that said cleavage results in a nucleic acid molecule which comprises, in the 5'→3' direction of transcription, the promoter (a), the nucleic acid sequences (b) and (c), and at least a part of the nucleic acid sequence (d), wherein the at least a part of the nucleic acid sequence (d), when transcribed under the control of the promoter (a), codes for said nucleic acid sequence which is a polyadenyl sequence optionally comprising within the polyadenyl sequence a sequence of one or more consecutive nucleotides containing nucleotides other than A nucleotides and wherein in the transcript the 3'-terminal nucleotide is an A nucleotide of said nucleic acid sequence which is a polyadenyl sequence optionally comprising within the polyadenyl sequence a sequence of one or more consecutive nucleotides containing nucleotides other than A nucleotides.

Preferably, after cleavage, the nucleic acid molecule, at the end of the strand that serves as template for the nucleic acid sequence which is a polyadenyl sequence optionally comprising within the polyadenyl sequence a sequence of one or more consecutive nucleotides containing nucleotides other than A nucleotides, has a T nucleotide which is part of the nucleic acid sequence which serves as template for the nucleic acid sequence which is a polyadenyl sequence optionally comprising within the polyadenyl sequence a sequence of one or more consecutive nucleotides containing nucleotides other than A nucleotides.

The nucleic acid molecule of the invention is preferably a closed circular molecule prior to cleavage and a linear molecule after cleavage.

Preferably, cleavage is carried out with the aid of a restriction cleavage site which is preferably a restriction cleavage site for a type IIS restriction endonuclease.

In one embodiment, the recognition sequence for the type IIS restriction endonuclease is located 5-26 base pairs, preferably 24-26 base pairs, downstream of the 3' end of the nucleic acid sequence (d).

In one embodiment, a nucleic acid molecule according to the invention is in a closed circular conformation and preferably suitable for in vitro transcription of RNA, in particular mRNA, in particular after linearization.

In further aspects, the invention relates to a nucleic acid molecule obtainable by linearization of an above-described nucleic acid molecule, preferably by cleavage within the nucleic acid sequence (d), and to RNA obtainable by transcription, preferably in vitro transcription, with above-described nucleic acid molecules under the control of the promoter (a).

Thus, the invention in one aspect relates to RNA comprising in the 5'→3' direction:
 (a) a 5'-untranslated region;
 (b) a nucleic acid sequence coding for a peptide or protein; and
 (c) a 3'-untranslated region, said 3'-untranslated region comprising a nucleic acid sequence which is selected from the group consisting of:
 (c-1) the nucleic acid sequence of the 3'-untranslated region of FCGRT, a fragment thereof, or a variant of said nucleic acid sequence or fragment,
 (c-2) the nucleic acid sequence of the 3'-untranslated region of LSP1, a fragment thereof, or a variant of said nucleic acid sequence or fragment,
 (c-3) the nucleic acid sequence of the 3'-untranslated region of CCL22, a fragment thereof, or a variant of said nucleic acid sequence or fragment,
 (c-4) the nucleic acid sequence of the 3'-untranslated region of AES, a fragment thereof, or a variant of said nucleic acid sequence or fragment,
 (c-5) the nucleic acid sequence of the 3'-untranslated region of PLD3, a fragment thereof, or a variant of said nucleic acid sequence or fragment,
 (c-6) the nucleic acid sequence of the non-coding RNA of MT-RNR1, a fragment thereof, or a variant of said nucleic acid sequence or fragment,
 (c-7) the nucleic sequence of the 3'-untranslated region of HLA-DRB4, a fragment thereof, or a variant of said nucleic acid sequence or fragment,
 and
 (c-8) any combination of two or more of the nucleic acid sequences, fragments and/or variants under (c-1), (c-2), (c-3), (c-4), (c-5), (c-6) and (c-7).

In one embodiment, the nucleic acid sequences (b) and (c) are not naturally linked.

In one embodiment, the RNA further comprises (d) a nucleic acid sequence which is a polyadenyl sequence optionally comprising within the polyadenyl sequence a sequence of one or more consecutive nucleotides containing nucleotides other than A nucleotides. In one embodiment, said nucleic acid sequence (d) is located at the 3' end of said RNA.

In one embodiment, the nucleic acid sequences (c) and optionally (d) are active so as to increase the translation efficiency and/or the stability of the nucleic acid sequence coding for a peptide or protein.

In one embodiment, the RNA further comprises (e) a 5' Cap.

Embodiments of the 3'-untranslated region and the nucleic acid sequence which is a polyadenyl sequence optionally comprising within the polyadenyl sequence a sequence of one or more consecutive nucleotides containing nucleotides other than A nucleotides are as described above for the nucleic acid molecules of the invention.

In a further aspect, the invention relates to a method of obtaining RNA, comprising:
 (i) providing a nucleic acid molecule of the invention, and
 (ii) transcribing RNA using the nucleic acid molecule as a template.

In a further aspect, the invention relates to a method of obtaining a peptide or protein, comprising:
 (i) obtaining RNA encoding the peptide or protein according to the method of obtaining RNA of the invention, and
 (ii) translating the RNA.

In one embodiment, the method of obtaining RNA or the method of obtaining a peptide or protein further comprises, prior to transcription of the nucleic acid molecule, cleavage of the nucleic acid molecule.

In a further aspect, the invention relates to a method of obtaining RNA, comprising:
 (i) coupling a nucleic acid sequence (b) which, when transcribed, codes for a 3'-untranslated region, at the 3' end of a transcribable nucleic acid sequence (a) comprising a nucleic acid sequence coding for a peptide or protein, and
 (ii) transcribing the nucleic acid obtained, said 3'-untranslated region comprising a nucleic acid sequence which is selected from the group consisting of:
 (b-1) the nucleic acid sequence of the 3'-untranslated region of FCGRT, a fragment thereof, or a variant of said nucleic acid sequence or fragment,
 (b-2) the nucleic acid sequence of the 3'-untranslated region of LSP1, a fragment thereof, or a variant of said nucleic acid sequence or fragment,
 (b-3) the nucleic acid sequence of the 3'-untranslated region of CCL22, a fragment thereof, or a variant of said nucleic acid sequence or fragment,
 (b-4) the nucleic acid sequence of the 3'-untranslated region of AES, a fragment thereof, or a variant of said nucleic acid sequence or fragment, (b-5) the nucleic acid sequence of the 3'-untranslated region of PLD3, a fragment thereof, or a variant of said nucleic acid sequence or fragment, (b-6) the nucleic acid sequence of the non-coding RNA of MT-RNR1, a fragment thereof, or a variant of said nucleic acid sequence or fragment, (b-7) the nucleic sequence of the 3'-untranslated region of HLA-DRB4, a fragment thereof, or a variant of said nucleic acid sequence or fragment, and (b-8) any combination of two or more of the nucleic acid sequences, fragments and/or variants under (b-1), (b-2), (b-3), (b-4), (b-5), (b-6) and (b-7).

In one embodiment, the nucleic acid sequences (a) and (b) can be transcribed to give a common transcript in which the nucleic acid sequence transcribed from the nucleic acid sequence (b) is active so as to increase the translation efficiency and/or the stability of the nucleic acid sequence transcribed from the transcribable nucleic acid sequence (a).

In one embodiment, the nucleic acid sequences (a) and (b) are not naturally linked.

In one embodiment, the method further comprises coupling a nucleic acid sequence (c) which, when transcribed, codes for a nucleic acid sequence which is a polyadenyl sequence optionally comprising within the polyadenyl sequence a sequence of one or more consecutive nucleotides containing nucleotides other than A nucleotides, at the 3' end of the nucleic acid sequence (b).

In one embodiment, the nucleic acid sequences (a), (b), and (c) can be transcribed to give a common transcript in which the nucleic acid sequences transcribed from the nucleic acid sequences (b) and, optionally, (c) are active so as to increase the translation efficiency and/or the stability of the nucleic acid sequence transcribed from the transcribable nucleic acid sequence (a).

Embodiments of the 3'-untranslated region and the nucleic acid sequence which is a polyadenyl sequence optionally comprising within the polyadenyl sequence a sequence of one or more consecutive nucleotides containing nucleotides other than A nucleotides are as described above for the nucleic acid molecules of the invention.

In a further aspect, the invention relates to a method of obtaining a peptide or protein, comprising:

(i) obtaining RNA by the method of obtaining RNA of the invention, and (ii) translating the RNA.

The methods of the invention may be performed in vitro or in vivo. In one embodiment of any of the methods of the invention, transcription is carried out in vitro.

In one embodiment, the method of obtaining RNA or the method of obtaining a peptide or protein further comprises, prior to transcription of the nucleic acid molecule, cleavage of the nucleic acid molecule.

In one embodiment, cleavage is within the nucleic acid sequence which, when transcribed, codes for a nucleic acid sequence which is a polyadenyl sequence optionally comprising within the polyadenyl sequence a sequence of one or more consecutive nucleotides containing nucleotides other than A nucleotides in such a way that transcription of the nucleic acid obtained in this way generates a transcript which has at its 3'-terminal end said nucleic acid sequence which is a polyadenyl sequence optionally comprising within the polyadenyl sequence a sequence of one or more consecutive nucleotides containing nucleotides other than A nucleotides, wherein the 3'-terminal nucleotide of said transcript is an A nucleotide of the nucleic acid sequence which is a polyadenyl sequence optionally comprising within the polyadenyl sequence a sequence of one or more consecutive nucleotides containing nucleotides other than A nucleotides.

In all aspects of the methods according to the invention, cleavage is preferably carried out with the aid of a restriction cleavage site which is preferably a restriction cleavage site for a type IIS restriction endonuclease.

In one embodiment, the recognition sequence for the type IIS restriction endonuclease is 5-26 base pairs, preferably 24-26 base pairs, downstream of the 3' end of the nucleic acid sequence which, when transcribed, codes for a nucleic acid sequence which is a polyadenyl sequence optionally comprising within the polyadenyl sequence a sequence of one or more consecutive nucleotides containing nucleotides other than A nucleotides.

The invention also relates to RNA obtainable by the methods according to the invention of obtaining RNA.

The invention may be utilized, for example, for increasing expression of recombinant proteins in cellular transcription and expression. More specifically, it is possible, when producing recombinant proteins, to use expression vectors of the invention for transcription of recombinant nucleic acids and expression of recombinant proteins in cell-based systems. This includes, for example, the preparation of recombinant antibodies, hormones, cytokines, enzymes, and the like. This allows inter alia production costs to be reduced.

It is also possible to use the nucleic acid molecules of the invention for gene therapy applications.

Accordingly, a nucleic acid molecule of the invention may be a gene therapy vector and used for expression of a transgene. To this end, any nucleic acid (DNA/RNA)-based vector systems (for example plasmids, adenoviruses, poxvirus vectors, influenza virus vectors, alphavirus vectors, and the like) may be used. Cells can be transfected with these vectors in vitro, for example in lymphocytes or dendritic cells, or else in vivo by direct administration.

RNA of the invention (e.g. obtained using a nucleic acid molecule described herein as a transcription template) may be employed, for example, for transient expression of genes, with possible fields of application being RNA-based vaccines which are transfected into cells in vitro or administered directly in vivo, transient expression of functional recombinant proteins in vitro, for example in order to initiate differentiation processes in cells or to study functions of proteins, and transient expression of functional recombinant proteins such as erythropoietin, hormones, coagulation inhibitors, etc., in vivo, in particular as pharmaceuticals.

RNA of the invention may be used in particular for transfecting antigen-presenting cells and thus as a tool for delivering the antigen to be presented and for loading antigen-presenting cells, with said antigen to be presented corresponding to the peptide or protein expressed from said RNA or being derived therefrom, in particular by way of intracellular processing such as cleavage, i.e. the antigen to be presented is, for example, a fragment of the peptide or protein expressed from the RNA. Such antigen-presenting cells may be used for stimulating T cells, in particular $CD4^+$ and/or $CD8^+$ T cells.

Accordingly, in a further aspect, the invention relates to a use of the RNA of the invention for transfecting a host cell. In one embodiment, the host cell is an antigen-presenting cell, in particular a dendritic cell, a monocyte or a macrophage.

In a further aspect, the invention relates to a use of the RNA of the invention for therapy, in particular for vaccination.

In a further aspect, the invention relates to a pharmaceutical composition such as a vaccine composition comprising the RNA of the invention.

In a further aspect, the invention relates to the RNA of the invention for the uses described herein.

DETAILED DESCRIPTION OF THE INVENTION

Although the present invention is described in detail below, it is to be understood that this invention is not limited to the particular methodologies, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

In the following, the elements of the present invention will be described. These elements are listed with specific embodiments, however, it should be understood that they may be combined in any manner and in any number to create additional embodiments. The variously described examples and preferred embodiments should not be construed to limit the present invention to only the explicitly described embodiments. This description should be understood to support and encompass embodiments which combine the explicitly described embodiments with any number of the disclosed and/or preferred elements. Furthermore, any permutations and combinations of all described elements in this application should be considered disclosed by the description of the present application unless the context indicates otherwise. For example, if in a preferred embodiment a sequence of one or more consecutive nucleotides containing nucleotides other than A nucleotides is preceeded by at least 20 A residues in said polyadenyl sequence and if in another preferred embodiment a sequence of one or more consecutive nucleotides containing nucleotides other than A nucleotides is followed by at least 20 A residues in said polyadenyl sequence, it is a contemplated preferred embodiment that a sequence of one or more consecutive nucleotides containing nucleotides other than A nucleotides is preceeded and followed by at least 20 A residues in said polyadenyl sequence.

Preferably, the terms used herein are defined as described in "A multilingual glossary of biotechnological terms: (IUPAC Recommendations)", H. G. W. Leuenberger, B. Nagel, and H. Kölbl, Eds., Helvetica Chimica Acta, CH-4010 Basel, Switzerland, (1995).

The practice of the present invention will employ, unless otherwise indicated, conventional methods of chemistry, biochemistry, cell biology, immunology, and recombinant DNA techniques which are explained in the literature in the field (cf., e.g., *Molecular Cloning: A Laboratory Manual*, $2^{nd}$ Edition, J. Sambrook et al. eds., Cold Spring Harbor Laboratory Press, Cold Spring Harbor 1989).

Throughout this specification and the claims which follow, unless the context requires otherwise, the word "comprise", and variations such as "comprises" and "comprising", will be understood to imply the inclusion of a stated member, integer or step or group of members, integers or steps but not the exclusion of any other member, integer or step or group of members, integers or steps. The terms "a" and "an" and "the" and similar reference used in the context of describing the invention (especially in the context of the claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as"), provided herein is intended merely to better illustrate the invention and does not pose a limitation on the scope of the invention otherwise claimed. No language in the specification should be construed as indicating any non-claimed element essential to the practice of the invention.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

The present invention describes nucleic acid molecules such as DNA plasmids useful as RNA expression vectors comprising nucleic acid sequences encoding modified 3' untranslated regions (UTRs) in the RNA having a stabilizing effect on the RNA and/or increasing translational efficiency of the RNA.

The term "nucleic acid sequence which, when transcribed, codes for a 3'-untranslated region in the transcript" relates to a nucleic acid sequence containing a template strand coding for said 3'-untranslated region. Preferably, said nucleic acid sequence comprises a coding strand comprising the same nucleic acid sequence as said 3'-untranslated region of the RNA transcript produced (although with thymine replaced for uracil). Thus, according to the invention a "nucleic acid sequence which, when transcribed, codes for a 3'-untranslated region in the transcript", in one embodiment, comprises a coding strand comprising a 3'-untranslated region as specified herein (although with thymine replaced for uracil).

The term "FCGRT" relates to Fc fragment of IgG, receptor, transporter, alpha and includes the FCGRT gene. This gene encodes a receptor that binds the Fc region of monomeric immunoglobulin G. The encoded protein transfers immunoglobulin G antibodies from mother to fetus across the placenta. This protein also binds immunoglobulin G to protect the antibody from degradation.

The term "nucleic acid sequence of the 3'-untranslated region of FCGRT, a fragment thereof, or a variant of said nucleic acid sequence or fragment" relates to a nucleic acid sequence comprising, preferably consisting of a nucleic acid sequence selected from the group consisting of SEQ ID NOs: 1 to 50 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 1 to 50. In one particularly preferred embodiment, the term relates to a nucleic acid sequence comprising, preferably consisting of the nucleic acid sequence of SEQ ID NO: 27 or comprising, preferably consisting of a nucleic acid sequence which is at least 90%, preferably at least 95%, more preferably at least 98% identical to the nucleic acid sequence of SEQ ID NO: 27.

The term "LSP1" relates to Lymphocyte-Specific Protein 1 and includes the LSP1 gene. This gene encodes an intracellular F-actin binding protein. The protein is expressed in lymphocytes, neutrophils, macrophages, and endothelium and may regulate neutrophil motility, adhesion to fibrinogen matrix proteins, and transendothelial migration.

The term "nucleic acid sequence of the 3'-untranslated region of LSP1, a fragment thereof, or a variant of said nucleic acid sequence or fragment" relates to a nucleic acid sequence comprising, preferably consisting of a nucleic acid sequence selected from the group consisting of SEQ ID NOs: 51 to 72 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 51 to 72. In one particularly preferred embodiment, the term relates to a nucleic acid sequence comprising, preferably consisting of the nucleic acid sequence of SEQ ID NO: 52 or comprising, preferably consisting of a nucleic acid sequence which is at least 90%, preferably at least 95%, more preferably at least 98% identical to the nucleic acid sequence of SEQ ID NO: 52.

The term "CCL22" relates to Chemokine (C-C Motif) Ligand 22 and includes the CCL22 gene. The product of this gene binds to chemokine receptor CCR4. This chemokine may play a role in the trafficking of activated T lymphocytes to inflammatory sites and other aspects of activated T lymphocyte physiology.

The term "nucleic acid sequence of the 3'-untranslated region of CCL22, a fragment thereof, or a variant of said nucleic acid sequence or fragment" relates to a nucleic acid sequence comprising, preferably consisting of a nucleic acid sequence selected from the group consisting of SEQ ID NOs: 73 to 85 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 73 to 85. In one particularly preferred embodiment, the term relates to a nucleic acid sequence comprising, preferably consisting of the nucleic acid sequence of SEQ ID NO: 79 or comprising, preferably consisting of a nucleic acid sequence which is at least 90%, preferably at least 95%, more preferably at least 98% identical to the nucleic acid sequence of SEQ ID NO: 79.

The term "AES" relates to Amino-Terminal Enhancer Of Split and includes the AES gene. The protein encoded by this gene belongs to the groucho/TLE family of proteins, can function as a homooligomer or as a heteroologimer with other family members to dominantly repress the expression of other family member genes.

The term "nucleic acid sequence of the 3'-untranslated region of AES, a fragment thereof, or a variant of said nucleic acid sequence or fragment" relates to a nucleic acid sequence comprising, preferably consisting of a nucleic acid sequence selected from the group consisting of SEQ ID NOs: 86 to 89 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 86 to 89. In one particularly preferred embodiment, the term relates to a nucleic acid sequence comprising, preferably consisting of the nucleic acid sequence of SEQ ID NO: 86 or comprising, preferably consisting of a nucleic acid sequence which is at least 90%, preferably at least 95%, more preferably at least 98% identical to the nucleic acid sequence of SEQ ID NO: 86. In one particularly preferred embodiment, the term relates to a nucleic acid sequence comprising, preferably consisting of the nucleic acid sequence of positions 1 to 68, positions 1 to 102, positions 35 to 102, positions 35 to 136, or positions 68 to 136 of SEQ ID NO: 86 or comprising, preferably consisting of a nucleic acid sequence which is at least 90%, preferably at least 95%, more preferably at least 98% identical to the nucleic acid sequence of positions 1 to 68, positions 1 to 102, positions 35 to 102, positions 35 to 136, or positions 68 to 136 of SEQ ID NO: 86.

The term "PLD3" relates to Phospholipase D Family, Member 3 and includes the PLD3 gene. This gene encodes a member of the phospholipase D (PLD) family of enzymes that catalyze the hydrolysis of membrane phospholipids.

The encoded protein is a single-pass type II membrane protein and contains two PLD phosphodiesterase domains.

This protein influences processing of amyloid-beta precursor protein. Mutations in this gene are associated with Alzheimer disease risk.

The term "nucleic acid sequence of the 3'-untranslated region of PLD3, a fragment thereof, or a variant of said nucleic acid sequence or fragment" relates to a nucleic acid sequence comprising, preferably consisting of a nucleic acid sequence selected from the group consisting of SEQ ID NOs: 90 to 104 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 90 to 104. In one particularly preferred embodiment, the term relates to a nucleic acid sequence comprising, preferably consisting of the nucleic acid sequence of SEQ ID NO: 96 or comprising, preferably consisting of a nucleic acid sequence which is at least 90%, preferably at least 95%, more preferably at least 98% identical to the nucleic acid sequence of SEQ ID NO: 96.

The term "MT_RNR1" relates to Mitochondrially Encoded 12S RNA and includes the MT_RNR1 gene. This RNA gene belongs to the Mt_rRNA class. Diseases associated with MT-RNR1 include restrictive cardiomyopathy and auditory neuropathy. Among its related pathways are Ribosome biogenesis in eukaryotes and CFTR translational fidelity (class I mutations).

The term "nucleic acid sequence of the 3'-untranslated region of MT_RNR1, a fragment thereof, or a variant of said nucleic acid sequence or fragment" relates to a nucleic acid sequence comprising, preferably consisting of a nucleic acid sequence selected from the group consisting of SEQ ID NOs: 105 to 121 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 105 to 121. In one particularly preferred embodiment, the term relates to a nucleic acid sequence comprising, preferably consisting of the nucleic acid sequence of SEQ ID NO: 115 or comprising, preferably consisting of a nucleic acid sequence which is at least 90%, preferably at least 95%, more preferably at least 98% identical to the nucleic acid sequence of SEQ ID NO: 115. In one particularly preferred embodiment, the term relates to a nucleic acid sequence comprising, preferably consisting of the nucleic acid sequence of positions 1 to 71, positions 1 to 107, positions 37 to 107, positions 37 to 142, or positions 71 to 142 of SEQ ID NO: 115 or comprising, preferably consisting of a nucleic acid sequence which is at least 90%, preferably at least 95%, more preferably at least 98% identical to the nucleic acid sequence of positions 1 to 71, positions 1 to 107, positions 37 to 107, positions 37 to 142, or positions 71 to 142 of SEQ ID NO: 115.

The term "HLA-DRB4" relates to Major Histocompatibility Complex, Class II, DR Beta 4 and includes the HLA-DRB4 gene. HLA-DRB4 belongs to the HLA class II beta chain paralogues. This class II molecule is a heterodimer consisting of an alpha (DRA) and a beta (DRB) chain, both anchored in the membrane. It plays a central role in the immune system by presenting peptides derived from extracellular proteins. Class II molecules are expressed in antigen presenting cells (APC: B lymphocytes, dendritic cells, macrophages).

The term "nucleic acid sequence of the 3'-untranslated region of HLA-DRB4, a fragment thereof, or a variant of said nucleic acid sequence or fragment" relates to a nucleic acid sequence comprising, preferably consisting of a nucleic acid sequence selected from the group consisting of SEQ ID NOs: 122 to 143 of the sequence listing or a fragment thereof, or a variant of said nucleic acid sequence or fragment. In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 122 to 143. In one particularly preferred embodiment, the term relates to a nucleic acid sequence comprising, preferably consisting of the nucleic acid sequence of SEQ ID NO: 126 or comprising, preferably consisting of a nucleic acid sequence which is at least 90%, preferably at least 95%, more preferably at least 98% identical to the nucleic acid sequence of SEQ ID NO: 126.

The term "any combination of two or more of the nucleic acid sequences, fragments and/or variants" with respect to the nucleic acid sequences of the 3'-untranslated regions of certain genes, fragments thereof, or variants of said nucleic acid sequences or fragments means that 2 or more, 3 or more or 4 or more and preferably up to 6 or up to 5 of said nucleic acid sequences, fragments and/or variants are lined up head-to-tail, optionally spaced by linkers. In one embodiment, the combination of two or more of the nucleic acid sequences, fragments and/or variants comprises two or more different and/or two or more identical nucleic acid sequences, fragments and/or variants. In one embodiment, the combination of two or more of the nucleic acid sequences, fragments and/or variants comprises two or more different nucleic acid sequences, fragments and/or variants of the 3'-untranslated region of the same and/or different genes.

In one embodiment, the term relates to a nucleic acid sequence comprising, preferably consisting of a nucleic acid sequence which is at least 90%, preferably at least 95%, more preferably at least 98% identical to a nucleic acid sequence selected from the group consisting of SEQ ID NOs: 144 to 220, preferably SEQ ID NOs: 174 and 208 to 220. In one embodiment, the term relates to a nucleic acid sequence comprising, preferably consisting of a nucleic acid sequence selected from the group consisting of SEQ ID NOs: 144 to 220, preferably SEQ ID NOs: 174 and 208 to 220 or a fragment thereof, or a variant of said nucleic acid sequence or fragment. In one particularly preferred embodiment, the term relates to a nucleic acid sequence comprising, preferably consisting of the nucleic acid sequence of SEQ ID NO: 174 or comprising, preferably consisting of a nucleic acid sequence which is at least 90%, preferably at least 95%, more preferably at least 98% identical to the nucleic acid sequence of SEQ ID NO: 174.

The term "linker" according to the invention relates to a nucleic acid sequence added between two nucleic acid sequences to connect said two nucleic acid sequences.

There is no particular limitation regarding the linker sequence.

According to the invention, a nucleic acid molecule or a nucleic acid sequence refers to a nucleic acid which is preferably deoxyribonucleic acid (DNA) or ribonucleic acid (RNA). According to the invention, nucleic acids comprise genomic DNA, cDNA, mRNA, recombinantly prepared and chemically synthesized molecules. According to the invention, a nucleic acid may be in the form of a single-stranded or double-stranded and linear or covalently closed circular molecule.

In the context of the present invention, the term "RNA" relates to a molecule which comprises ribonucleotide residues and preferably being entirely or substantially composed of ribonucleotide residues. The term "ribonucleotide" relates to a nucleotide with a hydroxyl group at the 2'-position of a β-D-ribofuranosylgroup. The term "RNA" comprises double-stranded RNA, single stranded RNA, isolated RNA such as partially or completely purified RNA, essentially pure RNA, synthetic RNA, and recombinantly generated RNA such as modified RNA which differs from naturally occurring RNA by addition, deletion, substitution and/or alteration of one or more nucleotides. Such alterations can include addition of non-nucleotide material, such as to the end(s) of a RNA or internally, for example at one or more nucleotides of the RNA. Nucleotides in RNA molecules can also comprise non-standard nucleotides, such as non-naturally occurring nucleotides or chemically synthesized nucleotides or deoxynucleotides. These altered RNAs can be referred to as analogs, particularly analogs of naturally-occurring RNAs. According to the invention, RNA includes mRNA.

The term "mRNA" means "messenger-RNA" and relates to a transcript which is generated by using a DNA template and encodes a peptide or protein. Typically, mRNA comprises a 5'-UTR, a protein coding region, a 3'-UTR, and a poly(A) sequence. mRNA may be generated by in vitro transcription from a DNA template. The in vitro transcription methodology is known to the skilled person. For example, there is a variety of in vitro transcription kits commercially available. According to the invention, mRNA may be modified by further stabilizing modifications and capping, in addition to the modifications according to the invention.

In one embodiment of the present invention, RNA is self-replicating RNA, such as single stranded self-replicating RNA. In one embodiment, the self-replicating RNA is single stranded RNA of positive sense. In one embodiment, the self-replicating RNA is viral RNA or RNA derived from viral RNA. In one embodiment, the self-replicating RNA is alphaviral genomic RNA or is derived from alphaviral genomic RNA. In one embodiment, the self-replicating RNA is a viral gene expression vector. In one embodiment, the virus is Semliki forest virus. In one embodiment, the self-replicating RNA contains one or more transgenes. In one embodiment, if the RNA is viral RNA or derived from viral RNA, the transgenes may partially or completely replace viral sequences such as viral sequences encoding structural proteins. In one embodiment, the self-replicating RNA is in vitro transcribed RNA.

The term "5'-cap" refers to a cap structure found on the 5'-end of an mRNA molecule and generally consists of a guanosine nucleotide connected to the mRNA via an unusual 5' to 5' triphosphate linkage. In one embodiment, this guanosine is methylated at the 7-position. The term "conventional 5'-cap" refers to a naturally occurring RNA 5'-cap, preferably to the 7-methylguanosine cap ($m^7G$). In the context of the present invention, the term "5'-cap" includes a 5'-cap analog that resembles the RNA cap structure and is modified to possess the ability to stabilize RNA if attached thereto, preferably in vivo and/or in a cell. Providing an RNA with a 5'-cap or 5'-cap analog may be achieved by in vitro transcription of a DNA template in the presence of said 5'-cap or 5'-cap analog, wherein said 5'-cap is co-transcriptionally incorporated into the generated RNA strand, or the RNA may be generated, for example, by in vitro transcription, and the 5'-cap may be generated post-transcriptionally using capping enzymes, for example, capping enzymes of vaccinia virus.

The term "nucleic acid" according to the invention also comprises a chemical derivatization of a nucleic acid on a nucleotide base, on the sugar or on the phosphate, and nucleic acids containing non-natural nucleotides and nucleotide analogs.

"Fragment" or "fragment of a nucleic acid sequence" relates to a part of a nucleic acid sequence, i.e. a sequence which represents the nucleic acid sequence shortened at the 5'- and/or 3'-end(s). Preferably, a fragment when it replaces said nucleic acid sequence in an RNA molecule retains RNA stability and/or translational efficiency. Preferably, a fragment of a nucleic acid sequence comprises at least 80%, preferably at least 90%, 95%, 96%, 97%, 98%, or 99% of the nucleotide residues from said nucleic acid sequence.

The term "variant" with respect to, for example, nucleic acid and amino acid sequences, according to the invention includes any variants, in particular mutants, splice variants, conformations, isoforms, allelic variants, species variants and species homologs, in particular those which are naturally present. An allelic variant relates to an alteration in the normal sequence of a gene, the significance of which is often unclear. Complete gene sequencing often identifies numerous allelic variants for a given gene. A species homolog is a nucleic acid or amino acid sequence with a different species of origin from that of a given nucleic acid or amino acid sequence.

According to the invention, nucleic acid variants include single or multiple nucleotide deletions, additions, mutations and/or insertions in comparison with the reference nucleic acid. Deletions include removal of one or more nucleotides from the reference nucleic acid. Addition variants comprise 5'- and/or 3'-terminal fusions of one or more nucleotides, such as 1, 2, 3, 5, 10, 20, 30, 50, or more nucleotides. Mutations can include but are not limited to substitutions, wherein at least one nucleotide in the sequence is removed and another nucleotide is inserted in its place (such as transversions and transitions), abasic sites, crosslinked sites, and chemically altered or modified bases. Insertions include the addition of at least one nucleotide into the reference nucleic acid.

With respect to nucleic acid molecules, the term "variant" includes degenerate nucleic acid sequences, wherein a degenerate nucleic acid according to the invention is a nucleic acid that differs from a reference nucleic acid in codon sequence due to the degeneracy of the genetic code.

Preferably the degree of identity between a given nucleic acid sequence and a nucleic acid sequence which is a variant of said given nucleic acid sequence will be at least 70%, preferably at least 75%, preferably at least 80%, more preferably at least 85%, even more preferably at least 90% or most preferably at least 95%, 96%, 97%, 98% or 99%. The degree of identity is preferably given for a region of at least about 30, at least about 50, at least about 70, at least about 90, at least about 100, at least about 150, at least about 200, at least about 250, at least about 300, or at least about 400 nucleotides. In preferred embodiments, the degree of identity is given for the entire length of the reference nucleic acid sequence.

"Sequence similarity" indicates the percentage of amino acids that either are identical or that represent conservative amino acid substitutions. "Sequence identity" between two polypeptide or nucleic acid sequences indicates the percentage of amino acids or nucleotides that are identical between the sequences.

The term "% identical" is intended to refer, in particular, to a percentage of nucleotides which are identical in an optimal alignment between two sequences to be compared, with said percentage being purely statistical, and the differences between the two sequences may be randomly distributed over the entire length of the sequence and the sequence to be compared may comprise additions or deletions in comparison with the reference sequence, in order to obtain optimal alignment between two sequences. Comparisons of two sequences are usually carried out by comparing said sequences, after optimal alignment, with respect to a segment or "window of comparison", in order to identify local regions of corresponding sequences. The optimal alignment for a comparison may be carried out manually or with the aid of the local homology algorithm by Smith and Waterman, 1981, Ads App. Math. 2, 482, with the aid of the local homology algorithm by Neddleman and Wunsch, 1970, J. Mol. Biol. 48, 443, and with the aid of the similarity search algorithm by Pearson and Lipman, 1988, Proc. Natl Acad. Sci. USA 85, 2444 or with the aid of computer programs using said algorithms (GAP, BESTFIT, FASTA, BLAST P, BLAST N and TFASTA in Wisconsin Genetics Software Package, Genetics Computer Group, 575 Science Drive, Madison, Wis.).

Percentage identity is obtained by determining the number of identical positions in which the sequences to be compared correspond, dividing this number by the number of positions compared and multiplying this result by 100.

For example, the BLAST program "BLAST 2 sequences" which is available on the website http://www.ncbi.nlm.nih.gov/blast/b12seq/wblast2.cgi may be used.

A nucleic acid is "capable of hybridizing" or "hybridizes" to another nucleic acid if the two sequences are complementary with one another. A nucleic acid is "complementary" to another nucleic acid if the two sequences are capable of forming a stable duplex with one another. According to the invention, hybridization is preferably carried out under conditions which allow specific hybridization between polynucleotides (stringent conditions). Stringent conditions are described, for example, in Molecular Cloning: A Laboratory Manual, J. Sambrook et al., Editors, 2nd Edition, Cold Spring Harbor Laboratory press, Cold Spring Harbor, New York, 1989 or Current Protocols in Molecular Biology, F. M.

Ausubel et al., Editors, John Wiley & Sons, Inc., New York and refer, for example, to hybridization at 65° C. in hybridization buffer (3.5×SSC, 0.02% Ficoll, 0.02% polyvinylpyrrolidone, 0.02% bovine serum albumin, 2.5 mM NaH2PO4 (pH 7), 0.5% SDS, 2 mM EDTA). SSC is 0.15 M sodium chloride/0.15 M sodium citrate, pH 7. After hybridization, the membrane to which the DNA has been transferred is washed, for example, in 2×SSC at room temperature and then in 0.1-0.5×SSC/0.1×SDS at temperatures of up to 68° C.

A percent complementarity indicates the percentage of contiguous residues in a nucleic acid molecule that can form hydrogen bonds (e.g., Watson-Crick base pairing) with a second nucleic acid sequence (e.g., 5, 6, 7, 8, 9, 10 out of 10 being 50%, 60%, 70%, 80%, 90%, and 100% complementary). "Perfectly complementary" or "fully complementary" means that all the contiguous residues of a nucleic acid sequence will hydrogen bond with the same number of contiguous residues in a second nucleic acid sequence. Preferably, the degree of complementarity according to the invention is at least 70%, preferably at least 75%, preferably at least 80%, more preferably at least 85%, even more preferably at least 90% or most preferably at least 95%, 96%, 97%, 98% or 99%. Most preferably, the degree of complementarity according to the invention is 100%.

The term "derivative" comprises any chemical derivatization of a nucleic acid on a nucleotide base, on the sugar or on the phosphate. The term "derivative" also comprises nucleic acids which contain nucleotides and nucleotide analogs not occurring naturally. Preferably, a derivatization of a nucleic acid increases its stability.

Fragments or variants of specific nucleic acid sequences or nucleic acid sequences having a particular degree of identity to specific nucleic acid sequences preferably have at least one functional property of said specific sequences and preferably are functionally equivalent to said specific sequences, e.g. nucleic acid sequences exhibiting properties identical or similar to those of the specific nucleic acid sequences.

One important property is to retain or improve stability of an RNA molecule and/or translational efficiency and includes in particular the ability to increase, in a functional linkage to a nucleic acid which can be transcribed into RNA (transcribable nucleic acid sequence) or a nucleic acid sequence coding for a peptide or protein, the stability and/or translation efficiency of RNA produced from this nucleic acid or of the nucleic acid sequence coding for a peptide or protein in the complete RNA molecule.

In one embodiment, if a specific nucleic acid sequence is active so as to increase the translation efficiency and/or the stability of another nucleic acid sequence, a fragment or variant of the specific nucleic acid sequence or a nucleic acid sequence having a particular degree of identity to the specific nucleic acid sequence is also active so as to increase the translation efficiency and/or the stability of the another nucleic acid sequence (when it replace the specific nucleic acid sequence). A fragment or variant of the specific nucleic acid sequence or a nucleic acid sequence having a particular degree of identity to the specific nucleic acid sequence may be as active as or more active than the specific nucleic acid sequence or activity of a fragment or variant of the specific nucleic acid sequence or of a nucleic acid sequence having a particular degree of identity to the specific nucleic acid sequence may be at least 50%, at least 60%, at least 70%, at least 80%, or at least 90% of the activity of the specific nucleic acid sequence.

According to the invention, "functional linkage" or "functionally linked" relates to a connection within a functional relationship. A nucleic acid is "functionally linked" if it is functionally related to another nucleic acid sequence. For example, a promoter is functionally linked to a coding sequence if it influences transcription of said coding sequence.

Functionally linked nucleic acids are typically adjacent to one another, where appropriate separated by further nucleic acid sequences, and, in particular embodiments, are transcribed by RNA polymerase to give a single RNA molecule (common transcript). Preferably, a sequence which is a variant with respect to a specific sequence, when it replaces the specific sequence in an RNA molecule retains RNA stability and/or translational efficiency.

According to the invention, a "nucleic acid sequence which is derived from a nucleic acid sequence" refers to a nucleic acid which is a variant of the nucleic acid from which it is derived.

"3' end of a nucleic acid" refers according to the invention to that end which has a free hydroxy group. In a diagrammatic representation of double-stranded nucleic acids, in particular DNA, the 3' end is always on the right-hand side. "5' end of a nucleic acid" refers according to the invention to that end which has a free phosphate group. In a diagrammatic representation of double-strand nucleic acids, in particular DNA, the 5' end is always on the left-hand side.

5'--P-NNNNNNN-OH-3' 3' end
   3'-HO-NNNNNNN-P--5'

In particular embodiments, a nucleic acid is functionally linked according to the invention to expression control sequences which may be homologous or heterologous with respect to the nucleic acid.

A transcribable nucleic acid sequence, in particular a nucleic acid sequence coding for a peptide or protein, and an expression control sequence are "functionally" linked to one another, if they are covalently linked to one another in such a way that transcription or expression of the transcribable and in particular coding nucleic acid sequence is under the control or under the influence of the expression control sequence. If the nucleic acid sequence is to be translated into a functional peptide or protein, induction of an expression control sequence functionally linked to the coding sequence results in transcription of said coding sequence, without causing a frame shift in the coding sequence or the coding sequence being unable to be translated into the desired peptide or protein.

The term "expression control sequence" comprises according to the invention promoters, ribosome-binding sequences and other control elements which control transcription of a gene or translation of the derived RNA. In particular embodiments of the invention, the expression control sequences can be regulated. The precise structure of expression control sequences may vary depending on the species or cell type but usually includes 5'-untranscribed and 5'- and 3'-untranslated sequences involved in initiating transcription and translation, respectively, such as TATA box, capping sequence, CAAT sequence and the like. More specifically, 5'-untranscribed expression control sequences include a promoter region which encompasses a promoter sequence for transcription control of the functionally linked gene. Expression control sequences may also include enhancer sequences or upstream activator sequences.

The nucleic acid sequences specified herein, in particular transcribable and coding nucleic acid sequences, may be combined with any expression control sequences, in particular promoters, which may be homologous or heterologous to said nucleic acid sequences, with the term "homologous" referring to the fact that a nucleic acid sequence is also functionally linked naturally to the expression control sequence, and the term "heterologous" referring to the fact that a nucleic acid sequence is not naturally functionally linked to the expression control sequence.

The term "promoter" or "promoter region" refers to a DNA sequence upstream (5') of the coding sequence of a gene, which controls expression of said coding sequence by providing a recognition and binding site for RNA polymerase. The promoter region may include further recognition or binding sites for further factors involved in regulating transcription of said gene. A promoter may control transcription of a prokaryotic or eukaryotic gene. A promoter may be "inducible" and initiate transcription in response to an inducer, or may be "constitutive" if transcription is not controlled by an inducer. An inducible promoter is expressed only to a very small extent or not at all, if an inducer is absent. In the presence of the inducer, the gene is "switched on" or the level of transcription is increased. This is usually mediated by binding of a specific transcription factor.

Examples of promoters preferred according to the invention are promoters for SP6, T3 or T7 polymerase.

According to the invention, the term "expression" is used in its most general meaning and comprises production of RNA or of RNA and protein. It also comprises partial expression of nucleic acids. Furthermore, expression may be transient or stable. With respect to RNA, the term "expression" or "translation" relates to the process in the ribosomes of a cell by which a strand of messenger RNA directs the assembly of a sequence of amino acids to make a peptide or protein.

The term "nucleic acid sequences which can be transcribed to give a common transcript" means that said nucleic acid sequences are functionally linked to one another in such a way that, where appropriate after linearization such as restriction enzyme cleavage of the nucleic acid molecule comprising said nucleic acid sequences, in particular of a closed circular nucleic acid molecule, transcription under the control of a promoter results in an RNA molecule comprising the transcripts of said nucleic acid sequences covalently bound to one another, where appropriate separated by sequences located inbetween.

In the context of the present invention, the term "transcription" relates to a process, wherein the genetic code in a DNA sequence is transcribed into RNA. Subsequently, the RNA may be translated into protein.

According to the present invention, the term "transcription" comprises "in vitro transcription", wherein the term "in vitro transcription" relates to a process wherein RNA, in particular mRNA, is in vitro synthesized in a cell-free system. Preferably, cloning vectors are applied for the generation of transcripts. These cloning vectors are generally designated as transcription vectors and are according to the present invention encompassed by the term "vector". According to the present invention, RNA preferably is in vitro transcribed RNA (IVT-RNA) and may be obtained by in vitro transcription of an appropriate DNA template. The promoter for controlling transcription can be any promoter for any RNA polymerase. A DNA template for in vitro transcription may be obtained by cloning of a nucleic acid, in particular cDNA, and introducing it into an appropriate vector for in vitro transcription. The cDNA may be obtained by reverse transcription of RNA.

The term "nucleic acid sequence transcribed from a nucleic acid sequence" refers to RNA, where appropriate as part of a complete RNA molecule, which is a transcription product of the latter nucleic acid sequence.

The term "nucleic acid sequence which is active in order to increase the translation efficiency and/or stability of a nucleic acid sequence" means that the first nucleic acid sequence is capable of modifying, in a common transcript with the second nucleic acid sequence, the translation efficiency and/or stability of said second nucleic acid sequence in such a way that said translation efficiency and/or stability is increased in comparison with the translation efficiency and/or stability of said second nucleic acid sequence without said first nucleic acid sequence. In this context, the term "translation efficiency" relates to the amount of translation product provided by an RNA molecule within a particular period of time and the term "stability" relates to the half life of an RNA molecule.

Modification, and thereby stabilization and/or increase in translation efficiency, of RNA can be achieved according to the invention by genetically modifying expression nucleic acid molecules of the invention when used as expression vectors in such a way that they allow transcription of RNA with 3'-untranslated regions as described herein at its 3' end, and preferably between the sequence coding for a peptide or protein (open reading frame) and the poly(A) sequence The term "3'-untranslated region" relates to a region which is located at the 3' end of a gene, downstream of the termination codon of a protein-encoding region, and which is transcribed but is not translated into an amino acid sequence, or to the corresponding region in an RNA molecule.

According to the invention, a first polynucleotide region is considered to be located downstream of a second polynucleotide region, if the 5' end of said first polynucleotide region is the part of said first polynucleotide region closest to the 3' end of said second polynucleotide region.

The 3'-untranslated region typically extends from the termination codon for a translation product to the poly(A) sequence which is usually attached after the transcription process. The 3'-untranslated regions of mammalian mRNA typically have a homology region known as the AAUAAA hexanucleotide sequence. This sequence is presumably the poly(A) attachment signal and is frequently located from 10 to 30 bases upstream of the poly(A) attachment site.

3'-untranslated regions may contain one or more inverted repeats which can fold to give stem-loop structures which act as barriers for exoribonucleases or interact with proteins known to increase RNA stability (e.g. RNA-binding proteins).

5'- and/or 3'-untranslated regions may, according to the invention, be functionally linked to a transcribable and in particular coding nucleic acid, so as for these regions to be associated with the nucleic acid in such a way that the stability and/or translation efficiency of the RNA transcribed from said transcribable nucleic acid are increased.

The 3'-untranslated regions of immunoglobulin mRNAs are relatively short (fewer than about 300 nucleotides), while the 3'-untranslated regions of other genes are relatively long. For example, the 3'-untranslated region of tPA is about 800 nucleotides in length, that of factor VIII is about 1800 nucleotides in length and that of erythropoietin is about 560 nucleotides in length.

It can be determined according to the invention, whether a 3'-untranslated region or a nucleic acid sequence derived therefrom increases the stability and/or translation efficiency of RNA, by incorporating the 3'-untranslated region or the nucleic acid sequence derived therefrom into the 3'-untranslated region of a gene and measuring whether said incorporation increases the amount of protein synthesized.

The above applies accordingly to the case in which according to the invention a nucleic acid comprises two or more 3'-untranslated regions which are preferably coupled sequentially with or without a linker inbetween, preferably in a "head-to-tail relationship" (i.e. the 3'-untranslated regions have the same orientation, preferably the orientation naturally occurring in a nucleic acid).

According to the invention, the term "gene" refers to a particular nucleic acid sequence which is responsible for producing one or more cellular products and/or for achieving one or more intercellular or intracellular functions. More specifically, said term relates to a DNA section which comprises a nucleic acid coding for a specific protein or a functional or structural RNA molecule.

Polyadenylation is the addition of a poly(A) sequence or tail to a primary transcript RNA. The poly(A) sequence consists of multiple adenosine monophosphates. In other words, it is a stretch of RNA that has only adenine bases. In eukaryotes, polyadenylation is part of the process that produces mature messenger RNA (mRNA) for translation. It, therefore, forms part of the larger process of gene expression. The process of polyadenylation begins as the transcription of a gene finishes, or terminates. The 3'-most segment of the newly made pre-mRNA is first cleaved off by a set of proteins; these proteins then synthesize the poly(A) sequence at the RNA's 3' end. The poly(A) sequence is important for the nuclear export, translation, and stability of mRNA. The sequence is shortened over time, and, when it is short enough, the mRNA is enzymatically degraded.

The terms "polyadenyl sequence", "poly(A) sequence" or "poly(A) tail" refer to a sequence of adenyl residues which is typically located at the 3' end of an RNA molecule. The invention provides for such a sequence to be attached during RNA transcription by way of a DNA template on the basis of repeated thymidyl residues in the strand complementary to the coding strand, whereas said sequence is normally not encoded in the DNA but is attached to the free 3' end of the RNA by a template-independent RNA polymerase after transcription in the nucleus. According to the invention, in one embodiment, a poly(A) sequence has at least 20, preferably at least 40, preferably at least 80, preferably at least 100 and preferably up to 500, preferably up to 400, preferably up to 300, preferably up to 200, and in particular up to 150, A nucleotides, preferably consecutive A nucleotides, and in particular about 120 A nucleotides. The term "A nucleotides" or "A" refers to adenyl residues.

In a preferred embodiment, a nucleic acid molecule according to the invention is a vector. The term "vector" is used here in its most general meaning and comprises any intermediate vehicles for a nucleic acid which, for example, enable said nucleic acid to be introduced into prokaryotic and/or eukaryotic host cells and, where appropriate, to be integrated into a genome. Such vectors are preferably replicated and/or expressed in the cell. Vectors comprise plasmids, phagemids or virus genomes. The term "plasmid", as used herein, generally relates to a construct of extrachromosomal genetic material, usually a circular DNA duplex, which can replicate independently of chromosomal DNA.

The nucleic acids described herein may be recombinant and/or isolated molecules.

An "isolated molecule" as used herein, is intended to refer to a molecule which is substantially free of other molecules such as other cellular material. The term "isolated nucleic acid" means according to the invention that the nucleic acid has been (i) amplified in vitro, for example by polymerase chain reaction (PCR), (ii) recombinantly produced by cloning, (iii) purified, for example by cleavage and gel-electrophoretic fractionation, or (iv) synthesized, for example by chemical synthesis. An isolated nucleic acid is a nucleic acid available to manipulation by recombinant DNA techniques.

The term "recombinant" in the context of the present invention means "made through genetic engineering". Preferably, a "recombinant object" such as a recombinant cell in the context of the present invention is not occurring naturally.

The term "naturally occurring" as used herein refers to the fact that an object can be found in nature. For example, a peptide or nucleic acid that is present in an organism (including viruses) and can be isolated from a source in nature and which has not been intentionally modified by man in the laboratory is naturally occurring.

According to the invention, the term "host cell" refers to any cell which can be transformed or transfected with an exogenous nucleic acid. The term "host cell" comprises, according to the invention, prokaryotic (e.g. *E. coli*) or eukaryotic cells (e.g. yeast cells and insect cells). Particular preference is given to mammalian cells such as cells from humans, mice, hamsters, pigs, goats, primates. The cells may be derived from a multiplicity of tissue types and comprise primary cells and cell lines. Specific examples include keratinocytes, peripheral blood leukocytes, bone marrow stem cells and embryonic stem cells. In other embodiments, the host cell is an antigen-presenting cell, in particular a dendritic cell, a monocyte or a macrophage. A nucleic acid may be present in the host cell in a single or in several copies and, in one embodiment is expressed in the host cell.

*E. coli* is a gram-negative, facultatively anaerobic, rod-shaped bacterium of the genus *Escherichia* that is commonly found in the lower intestine of warm-blooded organisms. The bacterium can be grown easily and inexpensively in a laboratory setting, and has been intensively investigated for over 60 years. *E. coli* is the most widely studied prokaryotic model organism, and an important species in the fields of biotechnology and microbiology, where it has served as the host organism for the majority of work with recombinant DNA. *E. coli* strains according to the invention include: AG1, AB1157, B2155, BL21, BNN93, BNN97, BW26434, C600, CSH50, D1210, DB3.1, DH1, DH5α, DH10B, DH12S, DM1, *E. cloni*(r), *E. coli* K12 ER2738, ER2566, ER2267, HB101, IJ1126, IJ1127, JM83, JM101, JM103, JM105, JM106, JM107, JM108, JM109, JM110, JM2.300, LE392, Mach1, MC1061, MC4100, MFDpir, MG1655, OmniMAX2, RR1, RV308, SOLR, SS320, STBL2, STBL3, STBL4, SURE, SURE2, TG1, TOP10, Top10F', W3110, WM3064, XL1-Blue, XL2-Blue, XL1-Red and XL10-Gold.

According to the present invention, the term "peptide" comprises oligo- and polypeptides and refers to substances which comprise two or more, preferably 3 or more, preferably 4 or more, preferably 6 or more, preferably 8 or more, preferably 10 or more, preferably 13 or more, preferably 16 or more, preferably 20 or more, and up to preferably 50, preferably 100 or preferably 150, consecutive amino acids linked to one another via peptide bonds. The term "protein" refers to large peptides, preferably peptides having at least 151 amino acids, but the terms "peptide" and "protein" are used herein usually as synonyms.

The terms "peptide" and "protein" comprise according to the invention substances which contain not only amino acid components but also non-amino acid components such as sugars and phosphate structures, and also comprise substances containing bonds such as ester, thioether or disulfide bonds.

According to the present invention, a nucleic acid such as RNA may encode a peptide or protein. Accordingly, a transcribable nucleic acid sequence or a transcript thereof may contain an open reading frame (ORF) encoding a peptide or protein. Said nucleic may express the encoded peptide or protein. For example, said nucleic acid may be a nucleic acid encoding and expressing an antigen or a pharmaceutically active peptide or protein such as an immunologically active compound (which preferably is not an antigen).

According to the invention, the term "nucleic acid encoding a peptide or protein" means that the nucleic acid, if present in the appropriate environment, preferably within a cell, can direct the assembly of amino acids to produce the peptide or protein during the process of translation. Preferably, RNA according to the invention is able to interact with the cellular translation machinery allowing translation of the peptide or protein.

According to the invention, in one embodiment, RNA comprises or consists of pharmaceutically active RNA. A "pharmaceutically active RNA" may be RNA that encodes a pharmaceutically active peptide or protein.

A "pharmaceutically active peptide or protein" has a positive or advantageous effect on the condition or disease state of a subject when administered to the subject in a therapeutically effective amount. Preferably, a pharmaceutically active peptide or protein has curative or palliative properties and may be administered to ameliorate, relieve, alleviate, reverse, delay onset of or lessen the severity of one or more symptoms of a disease or disorder. A pharmaceutically active peptide or protein may have prophylactic properties and may be used to delay the onset of a disease or to lessen the severity of such disease or pathological condition. The term "pharmaceutically active peptide or protein" includes entire proteins or polypeptides, and can also refer to pharmaceutically active fragments thereof. It can also include pharmaceutically active analogs of a peptide or protein. The term "pharmaceutically active peptide or protein" includes peptides and proteins that are antigens, i.e., the peptide or protein elicits an immune response in a subject which may be therapeutic or partially or fully protective.

Examples of pharmaceutically active proteins include, but are not limited to, cytokines and immune system proteins such as immunologically active compounds (e.g., interleukins, colony stimulating factor (CSF), granulocyte colony stimulating factor (G-CSF), granulocyte-macrophage colony stimulating factor (GM-CSF), erythropoietin, tumor necrosis factor (TNF), interferons, integrins, addressins, seletins, homing receptors, T cell receptors, immunoglobulins, soluble major histocompatibility complex antigens, immunologically active antigens such as bacterial, parasitic, or viral antigens, allergens, autoantigens, antibodies), hormones (insulin, thyroid hormone, catecholamines, gonadotrophines, trophic hormones, prolactin, oxytocin, dopamine, bovine somatotropin, leptins and the like), growth hormones (e.g., human grown hormone), growth factors (e.g., epidermal growth factor, nerve growth factor, insulin-like growth factor and the like), growth factor receptors, enzymes (tissue plasminogen activator, streptokinase, cholesterol biosynthetic or degradative, steriodogenic enzymes, kinases, phosphodiesterases, methylases, de-methylases, dehydrogenases, cellulases, proteases, lipases, phospholipases, aromatases, cytochromes, adenylate or guanylaste cyclases, neuramidases and the like), receptors (steroid hormone receptors, peptide receptors), binding proteins (growth hormone or growth factor binding proteins and the like), transcription and translation factors, tumor growth suppressing proteins (e.g., proteins which inhibit angiogenesis), structural proteins (such as collagen, fibroin, fibrinogen, elastin, tubulin, actin, and myosin), blood proteins (thrombin, serum albumin, Factor VII, Factor VIII, insulin, Factor IX, Factor X, tissue plasminogen activator, protein C, von Wilebrand factor, antithrombin III, glucocerebrosidase, erythropoietin granulocyte colony stimulating factor (GCSF) or modified Factor VIII, anticoagulants and the like.

In one embodiment, the pharmaceutically active protein according to the invention is a cytokine which is involved in regulating lymphoid homeostasis, preferably a cytokine which is involved in and preferably induces or enhances development, priming, expansion, differentiation and/or survival of T cells. In one embodiment, the cytokine is an interleukin. In one embodiment, the pharmaceutically active protein according to the invention is an interleukin selected from the group consisting of IL-2, IL-7, IL-12, IL-15, and IL-21.

The term "immunologically active compound" relates to any compound altering an immune response, preferably by inducing and/or suppressing maturation of immune cells, inducing and/or suppressing cytokine biosynthesis, and/or altering humoral immunity by stimulating antibody production by B cells. Immunologically active compounds possess potent immunostimulating activity including, but not limited to, antiviral and antitumor activity, and can also downregulate other aspects of the immune response, for example shifting the immune response away from a TH2 immune response, which is useful for treating a wide range of TH2 mediated diseases. Immunologically active compounds can be useful as vaccine adjuvants.

If, according to the present invention, it is desired to induce or enhance an immune response by using RNA as described herein, the immune response may be triggered or enhanced by the RNA. For example, proteins or peptides encoded by the RNAs or procession products thereof may be presented by major histocompatibility complex (MHC) proteins expressed on antigen presenting cells. The MHC peptide complex can then be recognized by immune cells such as T cells leading to their activation.

In one embodiment, RNA that codes for an antigen such a disease-associated antigen is administered to a mammal, in particular if treating a mammal having a disease involving the antigen is desired. The RNA is taken up into the mammal's antigen-presenting cells (monocytes, macrophages, dendritic cells or other cells). An antigenic translation product of the RNA is formed and the product is displayed on the surface of the cells for recognition by T cells. In one embodiment, the antigen is displayed on the cell surface for recognition by CAR-engineered T cells directed to the antigen. In one embodiment, the antigen or a product produced by optional procession thereof is displayed on the cell surface in the context of MHC molecules for recognition by T cells through their T cell receptor.

Alternatively, the present invention envisions embodiments wherein RNA expressing an antigen is introduced into antigen-presenting cells ex vivo, e.g. antigen-presenting cells taken from a patient, and the antigen-presenting cells, optionally clonally propagated ex vivo, are transplanted back into the same patient. Transfected cells may be reintroduced into the patient using any means known in the art, preferably in sterile form by intravenous, intracavitary, intraperitoneal or intratumor administration.

The methods of the invention may involve an antigen presenting cell for expressing the RNA encoding the antigen. To this end, the methods of the invention may involve introduction of RNA encoding antigens into antigen presenting cells such as dendritic cells. For transfection of antigen presenting cells such as dendritic cells a pharmaceutical composition comprising RNA encoding the antigen may be used. A delivery vehicle that targets the RNA to a dendritic or other antigen presenting cell may be administered to a patient, resulting in transfection that occurs in vivo.

According to the invention it is preferred to use formulations of the RNA encoding an antigen which deliver the RNA with high selectivity to antigen presenting cells such as dendritc cells (DCs) in the spleen after systemic administration. For example, nanoparticulate RNA formulations with defined particle size wherein the net charge of the particles is close to zero or negative, such as electro-neutral or negatively charged lipoplexes from RNA and liposomes, e.g. lipoplexes comprising DOTMA and DOPE or DOTMA and Cholesterol, lead to substantial RNA expression in spleen DCs after systemic administration. A strong expression in the target cells (spleen) was determined while the expression in other organs was low.

As used herein, the term "nanoparticle" refers to any particle having a diameter making the particle suitable for systemic, in particular parenteral, administration, of, in particular, nucleic acids, typically a diameter of less than 1000 nanometers (nm). In some embodiments, a nanoparticle has a diameter of less than 600 nm. In some embodiments, a nanoparticle has a diameter of less than 400 nm.

As used herein, the term "nanoparticulate formulation" or similar terms refer to any substance that contains at least one nanoparticle. In some embodiments, a nanoparticulate composition is a uniform collection of nanoparticles. In some embodiments, nanoparticulate compositions are dispersions or emulsions. In general, a dispersion or emulsion is formed when at least two immiscible materials are combined.

The term, "lipoplex" or "nucleic acid lipoplex", in particular "RNA lipoplex", refers to a complex of lipids and nucleic acids, in particular RNA. Lipoplexes are formed spontaneously when cationic liposomes, which often also include a neutral "helper" lipid, are mixed with nucleic acids.

If the present invention refers to a charge such as a positive charge, negative charge or neutral charge or a cationic compound, negative compound or neutral compound this generally means that the charge mentioned is present at a selected pH, such as a physiological pH. For example, the term "cationic lipid" means a lipid having a net positive charge at a selected pH, such as a physiological pH. The term "neutral lipid" means a lipid having no net positive or negative charge and can be present in the form of a non-charged or a neutral amphoteric ion at a selected pH, such as a physiological pH. By "physiological pH" herein is meant a pH of about 7.5.

The nanoparticulate carriers such as lipid carriers contemplated for use in the present invention include any substances or vehicles with which nucleic acid such as RNA can be associated, e.g. by forming complexes with the nucleic acid or forming vesicles in which the nucleic acid is enclosed or encapsulated. This may result in increased stability of the nucleic acid compared to naked nucleic acid. In particular, stability of the nucleic acid in blood may be increased.

Cationic lipids, cationic polymers and other substances with positive charges may form complexes with negatively charged nucleic acids. These cationic molecules can be used to complex nucleic acids, thereby forming e.g. so-called lipoplexes or polyplexes, respectively, and these complexes have been shown to deliver nucleic acids into cells.

Nanoparticulate nucleic acid preparations for use in the present invention can be obtained by various protocols and from various nucleic acid complexing compounds. Lipids, polymers, oligomers, or amphipiles are typical complexing agents. In one embodiment, the complexing compound comprises at least one agent selected from the group consisting protamine, polyethyleneimine, a poly-L-lysine, a poly-L-arginine or a histone.

According to the invention, protamine is useful as cationic carrier agent. The term "protamine" refers to any of various strongly basic proteins of relatively low molecular weight that are rich in arginine and are found associated especially with DNA in place of somatic histones in the sperm cells of various animals (as fish). In particular, the term "protamine" refers to proteins found in fish sperm that are strongly basic, are soluble in water, are not coagulated by heat, and yield chiefly arginine upon hydrolysis. In purified form, they are used in a long-acting formulation of insulin and to neutralize the anticoagulant effects of heparin.

According to the invention, the term "protamine" as used herein is meant to comprise any protamine amino acid sequence obtained or derived from native or biological sources including fragments thereof and multimeric forms of said amino acid sequence or fragment thereof. Furthermore, the term encompasses (synthesized) polypeptides which are artificial and specifically designed for specific purposes and cannot be isolated from native or biological sources.

The protamine used according to the present invention can be sulfated protamine or hydrochloride protamine. In a preferred embodiment, the protamine source used for the production of the nanoparticles described herein is protamine 5000 which contains protamine at more than 10 mg/ml (5000 heparin-neutralizing units per ml) in an isotonic salt solution.

Liposomes are microscopic lipidic vesicles often having one or more bilayers of a vesicle-forming lipid, such as a phospholipid, and are capable of encapsulating a drug. Different types of liposomes may be employed in the context of the present invention, including, without being limited thereto, multilamellar vesicles (MLV), small unilamellar vesicles (SUV), large unilamellar vesicles (LUV), sterically stabilized liposomes (SSL), multivesicular vesicles (MV), and large multivesicular vesicles (LMV) as well as other bilayered forms known in the art. The size and lamellarity of the liposome will depend on the manner of preparation and the selection of the type of vesicles to be used will depend on the preferred mode of administration. There are several other forms of supramolecular organization in which lipids may be present in an aqueous medium, comprising lamellar phases, hexagonal and inverse hexagonal phases, cubic phases, micelles, reverse micelles composed of monolayers. These phases may also be obtained in the combination with DNA or RNA, and the interaction with RNA and DNA may substantially affect the phase state.

The described phases may be present in the nanoparticulate nucleic acid formulations of the present invention.

For formation of nucleic acid lipoplexes from nucleic acid and liposomes, any suitable method of forming liposomes can be used so long as it provides the envisaged nucleic acid lipoplexes. Liposomes may be formed using standard methods such as the reverse evaporation method (REV), the ethanol injection method, the dehydration-rehydration method (DRV), sonication or other suitable methods.

After liposome formation, the liposomes can be sized to obtain a population of liposomes having a substantially homogeneous size range.

Bilayer-forming lipids have typically two hydrocarbon chains, particularly acyl chains, and a head group, either polar or nonpolar. Bilayer-forming lipids are either composed of naturally-occurring lipids or of synthetic origin, including the phospholipids, such as phosphatidylcholine, phosphatidylethanolamine, phosphatide acid, phosphatidylinositol, and sphingomyelin, where the two hydrocarbon chains are typically between about 14-22 carbon atoms in length, and have varying degrees of unsaturation. Other suitable lipids for use in the composition of the present invention include glycolipids and sterols such as cholesterol and its various analogs which can also be used in the liposomes.

Cationic lipids typically have a lipophilic moiety, such as a sterol, an acyl or diacyl chain, and have an overall net positive charge. The head group of the lipid typically carries the positive charge. The cationic lipid preferably has a positive charge of 1 to valences, more preferably a positive charge of 1 to 3 valences, and more preferably a positive charge of 1 valence. Examples of cationic lipids include, but are not limited to 1,2-di-O-octadecenyl-3-trimethylammonium propane (DOTMA); dimethyldioctadecylammonium (DDAB); 1,2-dioleoyl-3-trimethylammonium-propane (DOTAP); 1,2-dioleoyl-3-dimethylammonium-propane (DODAP); 1,2-diacyloxy-3-dimethylammonium propanes; 1,2-dialkyloxy-3-dimethylammonium propanes; diocta-decyldimethyl ammonium chloride (DODAC), 1,2-dimyristoyloxypropyl-1,3-dimethylhydroxyethyl ammonium (DMRIE), and 2,3-dioleoyloxy-N-[2(spermine carboxamide) ethyl]-N,N-dimethyl-1-propanamium trifluoroacetate (DOSPA). Preferred are DOTMA, DOTAP, DODAC, and DOSPA. Most preferred is DOTMA.

In addition, the nanoparticles described herein preferably further include a neutral lipid in view of structural stability and the like. The neutral lipid can be appropriately selected in view of the delivery efficiency of the nucleic acid-lipid complex. Examples of neutral lipids include, but are not limited to, 1,2-di-(9Z-octadecenoyl)-sn-glycero-3-phosphoethanolamine (DOPE), 1,2-dioleoyl-sn-glycero-3-phosphocholine (DOPC), diacylphosphatidyl choline, diacylphosphatidyl ethanol amine, ceramide, sphingoemyelin, cephalin, sterol, and cerebroside. Preferred is DOPE and/or DOPC.

Most preferred is DOPE. In the case where a cationic liposome includes both a cationic lipid and a neutral lipid, the molar ratio of the cationic lipid to the neutral lipid can be appropriately determined in view of stability of the liposome and the like.

According to one embodiment, the nanoparticles described herein may comprise phospholipids. The phospholipids may be a glycerophospholipid. Examples of glycerophospholipid include, without being limited thereto, three types of lipids: (i) zwitterionic phospholipids, which include, for example, phosphatidylcholine (PC), egg yolk phosphatidylcholine, soybean-derived PC in natural, partially hydrogenated or fully hydrogenated form, dimyristoyl phosphatidylcholine (DMPC) sphingomyelin (SM); (ii) negatively charged phospholipids: which include, for example, phosphatidylserine (PS), phosphatidylinositol (PI), phosphatidic acid (PA), phosphatidylglycerol (PG) dipalmipoyl PG, dimyristoyl phosphatidylglycerol (DMPG); synthetic derivatives in which the conjugate renders a zwitterionic phospholipid negatively charged such is the case of methoxy-polyethylene, glycol-distearoyl phosphatidylethanolamine (mPEG-DSPE); and (iii) cationic phospholipids, which include, for example, phosphatidylcholine or sphingomyelin of which the phosphomonoester was O-methylated to form the cationic lipids.

Association of nucleic acid to the lipid carrier can occur, for example, by the nucleic acid filling interstitial spaces of the carrier, such that the carrier physically entraps the nucleic acid, or by covalent, ionic, or hydrogen bonding, or by means of adsorption by non-specific bonds. Whatever the mode of association, the nucleic acid must retain its therapeutic, i.e. antigen-encoding, properties.

The term "disease" refers to an abnormal condition that affects the body of an individual. A disease is often construed as a medical condition associated with specific symptoms and signs. A disease may be caused by factors originally from an external source, such as infectious disease, or it may be caused by internal dysfunctions, such as autoimmune diseases.

According to the invention, the term "disease" also refers to cancer diseases. The terms "cancer disease" or "cancer" (medical term: malignant neoplasm) refer to a class of diseases in which a group of cells display uncontrolled growth (division beyond the normal limits), invasion (intrusion on and destruction of adjacent tissues), and sometimes metastasis (spread to other locations in the body via lymph or blood). These three malignant properties of cancers differentiate them from benign tumors, which are self-limited, and do not invade or metastasize. Most cancers form a tumor, i.e. a swelling or lesion formed by an abnormal growth of cells (called neoplastic cells or tumor cells), but some, like leukemia, do not. Examples of cancers include, but are not limited to, carcinoma, lymphoma, blastoma, sarcoma, glioma and leukemia. More particularly, examples of such cancers include bone cancer, blood cancer, lung cancer, liver cancer, pancreatic cancer, skin cancer, cancer of the head or neck, cutaneous or intraocular malignant melanoma, uterine cancer, ovarian cancer, rectal cancer, cancer of the anal region, stomach cancer, colon cancer, breast cancer, prostate cancer, uterine cancer, carcinoma of the sexual and reproductive organs, Hodgkin's disease, cancer of the esophagus, cancer of the small intestine, cancer of the endocrine system, cancer of the thyroid gland, cancer of the parathyroid gland, cancer of the adrenal gland, sarcoma of soft tissue, cancer of the bladder, cancer of the kidney, renal cell carcinoma, carcinoma of the renal pelvis, neoplasms of the central nervous system (CNS), neuroectodermal cancer, spinal axis tumors, glioma, meningioma, and pituitary adenoma. The term "cancer" according to the invention also comprises cancer metastases.

The term "infectious disease" refers to any disease which can be transmitted from individual to individual or from organism to organism, and is caused by a microbial agent (e.g. common cold). Examples of infectious diseases include viral infectious diseases, such as AIDS (HIV), hepatitis A, B or C, herpes, herpes zoster (chicken-pox), German measles (rubella virus), yellow fever, dengue etc. flaviviruses, influenza viruses, hemorrhagic infectious diseases (Marburg or Ebola viruses), and severe acute respiratory syndrome (SARS), bacterial infectious diseases, such as Legionnaire's disease (*Legionella*), sexually transmitted diseases (e.g. *chlamydia* or gonorrhea), gastric ulcer (*Helicobacter*), cholera (*Vibrio*), tuberculosis, diphtheria, infections by *E. coli*, Staphylococci, *Salmonella* or Streptococci (tetanus); infections by protozoan pathogens such as malaria, sleeping sickness, leishmaniasis; toxoplasmosis, i.e. infections by *Plasmodium, Trypanosoma, Leishmania* and *Toxoplasma*; or fungal infections, which are caused e.g. by *Cryptococcus*

*neoformans, Histoplasma capsulatum, Coccidioides immitis, Blastomyces dermatitidis* or *Candida albicans*.

The term "autoimmune disease" refers to any disease in which the body produces an immunogenic (i.e. immune system) response to some constituent of its own tissue. In other words, the immune system loses its ability to recognize some tissue or system within the body as self and targets and attacks it as if it were foreign. Autoimmune diseases can be classified into those in which predominantly one organ is affected (e.g. hemolytic anemia and anti-immune thyroiditis), and those in which the autoimmune disease process is diffused through many tissues (e.g. systemic lupus erythematosus). For example, multiple sclerosis is thought to be caused by T cells attacking the sheaths that surround the nerve fibers of the brain and spinal cord. This results in loss of coordination, weakness, and blurred vision. Autoimmune diseases are known in the art and include, for instance, Hashimoto's thyroiditis, Grave's disease, lupus, multiple sclerosis, rheumatic arthritis, hemolytic anemia, anti-immune thyroiditis, systemic lupus erythematosus, celiac disease, Crohn's disease, colitis, diabetes, scleroderma, psoriasis, and the like.

According to the invention, an immune response may be stimulated by introducing into a subject a suitable mRNA which codes for an antigen or a fragment thereof, e.g., a disease-associated antigen.

The term "antigen" relates to an agent comprising an epitope against which an immune response is to be generated. The term "antigen" includes in particular proteins, peptides, polysaccharides, nucleic acids, especially RNA and DNA, and nucleotides. The term "antigen" also includes agents, which become antigenic—and sensitizing—only through transformation (e.g. intermediately in the molecule or by completion with body protein). An antigen is preferably presentable by cells of the immune system such as antigen presenting cells like dendritic cells or macrophages. In addition, an antigen or a processing product thereof is preferably recognizable by a T or B cell receptor, or by an immunoglobulin molecule such as an antibody. In a preferred embodiment, the antigen is a disease-associated antigen, such as a tumor-associated antigen, a viral antigen, or a bacterial antigen.

The term "disease-associated antigen" is used in it broadest sense to refer to any antigen associated with a disease. A disease-associated antigen is a molecule which contains epitopes that will stimulate a host's immune system to make a cellular antigen-specific immune response and/or a humoral antibody response against the disease. The disease-associated antigen may therefore be used for therapeutic purposes. Disease-associated antigens are preferably associated with infection by microbes, typically microbial antigens, or associated with cancer, typically tumors.

The term "disease involving an antigen" refers to any disease which implicates an antigen, e.g. a disease which is characterized by the presence and/or expression of an antigen. The disease involving an antigen can be an infectious disease, an autoimmune disease, or a cancer disease or simply cancer. As mentioned above, the antigen may be a disease-associated antigen, such as a tumor-associated antigen, a viral antigen, or a bacterial antigen.

In one embodiment, a disease-associated antigen is a tumor-associated antigen. In this embodiment, the present invention may be useful in treating cancer or cancer metastasis. Preferably, the diseased organ or tissue is characterized by diseased cells such as cancer cells expressing a disease-associated antigen and/or being characterized by association of a disease-associated antigen with their surface. Immunization with intact or substantially intact tumor-associated antigens or fragments thereof such as MHC class I and class II peptides or nucleic acids, in particular mRNA, encoding such antigen or fragment makes it possible to elicit a MHC class I and/or a class II type response and, thus, stimulate T cells such as CD8+ cytotoxic T lymphocytes which are capable of lysing cancer cells and/or CD4+ T cells. Such immunization may also elicit a humoral immune response (B cell response) resulting in the production of antibodies against the tumor-associated antigen. Furthermore, antigen presenting cells (APC) such as dendritic cells (DCs) can be loaded with MHC class I-presented peptides by transfection with nucleic acids encoding tumor antigens in vitro and administered to a patient. In one embodiment, the term "tumor-associated antigen" refers to a constituent of cancer cells which may be derived from the cytoplasm, the cell surface and the cell nucleus. In particular, it refers to those antigens which are produced, preferably in large quantity, intracellularly or as surface antigens on tumor cells. Examples for tumor antigens include HER2, EGFR, VEGF, CAMPATH1-antigen, CD22, CA-125, HLA-DR, Hodgkin-lymphoma or mucin-1, but are not limited thereto.

According to the present invention, a tumor-associated antigen preferably comprises any antigen which is characteristic for tumors or cancers as well as for tumor or cancer cells with respect to type and/or expression level. In one embodiment, the term "tumor-associated antigen" relates to proteins that are under normal conditions, i.e. in a healthy subject, specifically expressed in a limited number of organs and/or tissues or in specific developmental stages, for example, the tumor-associated antigen may be under normal conditions specifically expressed in stomach tissue, preferably in the gastric mucosa, in reproductive organs, e.g., in testis, in trophoblastic tissue, e.g., in placenta, or in germ line cells, and are expressed or aberrantly expressed in one or more tumor or cancer tissues. In this context, "a limited number" preferably means not more than 3, more preferably not more than 2 or 1. The tumor-associated antigens in the context of the present invention include, for example, differentiation antigens, preferably cell type specific differentiation antigens, i.e., proteins that are under normal conditions specifically expressed in a certain cell type at a certain differentiation stage, cancer/testis antigens, i.e., proteins that are under normal conditions specifically expressed in testis and sometimes in placenta, and germ line specific antigens. In the context of the present invention, the tumor-associated antigen is preferably not or only rarely expressed in normal tissues or is mutated in tumor cells. Preferably, the tumor-associated antigen or the aberrant expression of the tumor-associated antigen identifies cancer cells. In the context of the present invention, the tumor-associated antigen that is expressed by a cancer cell in a subject, e.g., a patient suffering from a cancer disease, is preferably a self-protein in said subject. In preferred embodiments, the tumor-associated antigen in the context of the present invention is expressed under normal conditions specifically in a tissue or organ that is non-essential, i.e., tissues or organs which when damaged by the immune system do not lead to death of the subject, or in organs or structures of the body which are not or only hardly accessible by the immune system. Preferably, a tumor-associated antigen is presented in the context of MHC molecules by a cancer cell in which it is expressed.

Examples for differentiation antigens which ideally fulfill the criteria for tumor-associated antigens as contemplated by the present invention as target structures in tumor immunotherapy, in particular, in tumor vaccination are the cell surface proteins of the Claudin family, such as CLDN6 and CLDN18.2. These differentiation antigens are expressed in tumors of various origins, and are particularly suited as target structures in connection with antibody-mediated cancer immunotherapy due to their selective expression (no expression in a toxicity relevant normal tissue) and localization to the plasma membrane.

Further examples for antigens that may be useful in the present invention are p53, ART-4, BAGE, beta-catenin/m, Bcr-abL CAMEL, CAP-1, CASP-8, CDC27/m, CDK4/m, CEA, CLAUDIN-12, c-MYC, CT, Cyp-B, DAM, ELF2M, ETV6-AML1, G250, GAGE, GnT-V, Gap100, HAGE, HER-2/neu, HPV-E7, HPV-E6, HAST-2, hTERT (or hTRT), LAGE, LDLR/FUT, MAGE-A, preferably MAGE-A1, MAGE-A2, MAGE-A3, MAGE-A4, MAGE-A5, MAGE-A6, MAGE-A7, MAGE-A8, MAGE-A9, MAGE-A10, MAGE-A11, or MAGE-A12, MAGE-B, MAGE-C, MART-1/Melan-A, MC1R, Myosin/m, MUC1, MUM-1, -2, -3, NA88-A, NF1, NY-ESO-1, NY-BR-1, p190 minor BCR-abL, Pm1/RARa, PRAME, proteinase 3, PSA, PSM, RAGE, RU1 or RU2, SAGE, SART-1 or SART-3, SCGB3A2, SCP1, SCP2, SCP3, SSX, SURVIVIN, TEL/AML1, TPI/m, TRP-1, TRP-2, TRP-2/INT2, TPTE and WT, preferably WT-1.

The term "viral antigen" refers to any viral component having antigenic properties, i.e. being able to provoke an immune response in an individual. The viral antigen may be a viral ribonucleoprotein or an envelope protein.

The term "bacterial antigen" refers to any bacterial component having antigenic properties, i.e. being able to provoke an immune response in an individual. The bacterial antigen may be derived from the cell wall or cytoplasm membrane of the bacterium.

"Antigen processing" refers to the degradation of an antigen into procession products, which are fragments of said antigen (e.g., the degradation of a protein into peptides) and the association of one or more of these fragments (e.g., via binding) with MHC molecules for presentation by cells, preferably antigen presenting cells to specific T cells.

The term "immune response", as used herein, relates to a reaction of the immune system such as to immunogenic organisms, such as bacteria or viruses, cells or substances. The term "immune response" includes the innate immune response and the adaptive immune response. Preferably, the immune response is related to an activation of immune cells, an induction of cytokine biosynthesis and/or antibody production. It is preferred that the immune response comprises the steps of activation of antigen presenting cells, such as dendritic cells and/or macrophages, presentation of an antigen or fragment thereof by said antigen presenting cells and activation of cytotoxic T cells due to this presentation.

The term "treat" or "treatment" relates to any treatment which improves the health status and/or prolongs (increases) the lifespan of an individual. Said treatment may eliminate the disease in an individual, arrest or slow the development of a disease in an individual, inhibit or slow the development of a disease in an individual, decrease the frequency or severity of symptoms in an individual, and/or decrease the recurrence in an individual who currently has or who previously has had a disease.

In particular, the term "treatment of a disease" includes curing, shortening the duration, ameliorating, slowing down or inhibiting progression or worsening of a disease or the symptoms thereof.

The term "immunotherapy" relates to a treatment preferably involving a specific immune reaction and/or immune effector function(s).

The term "immunization" or "vaccination" describes the process of treating a subject for therapeutic or prophylactic reasons.

The term "subject" or "individual", as used herein, preferably relates to mammals. For example, mammals in the context of the present invention are humans, non-human primates, domesticated animals such as dogs, cats, sheep, cattle, goats, pigs, horses etc., laboratory animals such as mice, rats, rabbits, guinea pigs, etc. as well as animals in captivity, such as animals of zoos. In a preferred embodiment, the subject is a human.

The term "antigen presenting cell" (APC) relates to a cell of a variety of cells capable of displaying, acquiring, and/or presenting at least one antigen or antigenic fragment on (or at) its cell surface. Antigen-presenting cells can be distinguished in professional antigen presenting cells and non-professional antigen presenting cells.

The term "professional antigen presenting cells" relates to antigen presenting cells which constitutively express the Major Histocompatibility Complex class II (MHC class II) molecules required for interaction with naive T cells. If a T cell interacts with the MHC class II molecule complex on the membrane of the antigen presenting cell, the antigen presenting cell produces a co-stimulatory molecule inducing activation of the T cell. Professional antigen presenting cells comprise dendritic cells and macrophages.

The term "non-professional antigen presenting cells" relates to antigen presenting cells which do not constitutively express MHC class II molecules, but upon stimulation by certain cytokines such as interferon-gamma. Exemplary, non-professional antigen presenting cells include fibroblasts, thymic epithelial cells, thyroid epithelial cells, glial cells, pancreatic beta cells or vascular endothelial cells.

The term "major histocompatibility complex" and the abbreviation "MHC" include MHC class I and MHC class II molecules and relate to a complex of genes which occurs in all vertebrates. MHC proteins or molecules are important for signaling between lymphocytes and antigen presenting cells or diseased cells in immune reactions, wherein the MHC proteins or molecules bind peptides and present them for recognition by T cell receptors. The proteins encoded by the MHC are expressed on the surface of cells, and display both self antigens (peptide fragments from the cell itself) and nonself antigens (e.g., fragments of invading microorganisms) to a T cell.

According to the invention the term "chimeric antigen receptor (CAR)" is synonymous with the terms "chimeric T cell receptor" and "artificial T cell receptor".

These terms relate to engineered receptors, which confer an arbitrary specificity such as the specificity of a monoclonal antibody onto an immune effector cell such as a T cell. In this way, a large number of cancer-specific T cells can be generated for adoptive cell transfer. Thus, a CAR may be present on T cells, e.g. instead of or in addition to the T cell's own T cell receptor. Such T cells do not necessarily require processing and presentation of an antigen for recognition of the target cell but rather may recognize preferably with specificity any antigen present on a target cell. Preferably, said CAR is expressed on the surface of the cells. For the purpose of the present invention T cells comprising a CAR are comprised by the term "T cell" as used herein.

According to the invention, the term "CAR" (or "chimeric antigen receptor") relates to an artificial receptor comprising a single molecule or a complex of molecules which recognizes, i.e. binds to, a target structure (e.g. an antigen) on a target cell such as a cancer cell (e.g. by binding of an antigen binding domain to an antigen expressed on the surface of the target cell) and may confer specificity onto an immune effector cell such as a T cell expressing said CAR on the cell surface. Preferably, recognition of the target structure by a CAR results in activation of an immune effector cell expressing said CAR. A CAR may comprise one or more protein units said protein units comprising one or more domains as described herein. The term "CAR" does not include T cell receptors.

In one embodiment, a single-chain variable fragment (scFv) derived from a monoclonal antibody is fused to CD3-zeta transmembrane and endodomain. Such molecules result in the transmission of a zeta signal in response to recognition by the scFv of its antigen target on a target cell and killing of the target cell that expresses the target antigen. Antigen recognition domains which also may be used include among others T cell receptor (TCR) alpha and beta single chains. In fact almost anything that binds a given target with high affinity can be used as an antigen recognition domain.

Following antigen recognition, receptors cluster and a signal is transmitted to the cell. In this respect, a "T cell signaling domain" is a domain, preferably an endodomain, which transmits an activation signal to the T cell after antigen is bound. The most commonly used endodomain component is CD3-zeta.

Adoptive cell transfer therapy with CAR-engineered T cells expressing chimeric antigen receptors is a promising anti-cancer therapeutic as CAR-modified T cells can be engineered to target virtually any tumor antigen. For example, patient's T cells may be genetically engineered (genetically modified) to express CARs specifically directed towards antigens on the patient's tumor cells, then infused back into the patient.

According to the invention a CAR may replace the function of a T cell receptor and, in particular, may confer reactivity such as cytolytic activity to a cell such as a T cell. However, in contrast to the binding of the T cell receptor to an antigen peptide-MHC complex, a CAR may bind to an antigen, in particular when expressed on the cell surface.

According to the invention, CARs may generally comprise three domains.

The first domain is the binding domain which recognizes and binds antigen.

The second domain is the co-stimulation domain. The co-stimulation domain serves to enhance the proliferation and survival of the cytotoxic lymphocytes upon binding of the CAR to a targeted moiety. The identity of the co-stimulation domain is limited only in that it has the ability to enhance cellular proliferation and survival upon binding of the targeted moiety by the CAR. Suitable co-stimulation domains include CD28, CD137 (4-1BB), a member of the tumor necrosis factor (TNF) receptor family, CD134 (OX40), a member of the TNFR-superfamily of receptors, and CD278 (ICOS), a CD28-superfamily co-stimulatory molecule expressed on activated T cells. The skilled person will understand that sequence variants of these noted co-stimulation domains can be used without adversely impacting the invention, where the variants have the same or similar activity as the domain on which they are modeled. Such variants will have at least about 80% sequence identity to the amino acid sequence of the domain from which they are derived. In some embodiments of the invention, the CAR constructs comprise two co-stimulation domains. While the particular combinations include all possible variations of the four noted domains, specific examples include CD28+ CD137 (4-1BB) and CD28+CD134 (OX40). The third domain is the activation signaling domain (or T cell signaling domain). The activation signaling domain serves to activate cytotoxic lymphocytes upon binding of the CAR to antigen. The identity of the activation signaling domain is limited only in that it has the ability to induce activation of the selected cytotoxic lymphocyte upon binding of the antigen by the CAR. Suitable activation signaling domains include the T cell CD3[zeta] chain and Fc receptor [gamma]. The skilled artisan will understand that sequence variants of these noted activation signaling domains can be used without adversely impacting the invention, where the variants have the same or similar activity as the domain on which they are modeled. Such variants will have at least about 80% sequence identity to the amino acid sequence of the domain from which they are derived.

CARs may comprise the three domains, together in the form of a fusion protein. Such fusion proteins will generally comprise a binding domain, one or more co-stimulation domains, and an activation signaling domain, linked in a N-terminal to C-terminal direction. However, CARs are not limited to this arrangement and other arrangements are acceptable and include a binding domain, an activation signaling domain, and one or more co-stimulation domains. It will be understood that because the binding domain must be free to bind antigen, the placement of the binding domain in the fusion protein will generally be such that display of the region on the exterior of the cell is achieved. In the same manner, because the co-stimulation and activation signaling domains serve to induce activity and proliferation of the cytotoxic lymphocytes, the fusion protein will generally display these two domains in the interior of the cell. The CARs may include additional elements, such as a signal peptide to ensure proper export of the fusion protein to the cells surface, a transmembrane domain to ensure the fusion protein is maintained as an integral membrane protein, and a hinge domain (or spacer region) that imparts flexibility to the binding domain and allows strong binding to antigen.

The cells used in connection with the CAR system of the present invention are preferably T cells, in particular cytotoxic lymphocytes, preferably selected from cytotoxic T cells, natural killer (NK) cells, and lymphokine-activated killer (LAK) cells. Upon activation, each of these cytotoxic lymphocytes triggers the destruction of target cells. For example, cytotoxic T cells trigger the destruction of target cells by either or both of the following means. First, upon activation T cells release cytotoxins such as perforin, granzymes, and granulysin. Perforin and granulysin create pores in the target cell, and granzymes enter the cell and trigger a caspase cascade in the cytoplasm that induces apoptosis (programmed cell death) of the cell. Second, apoptosis can be induced via Fas-Fas ligand interaction between the T cells and target cells. The cytotoxic lymphocytes will preferably be autologous cells, although heterologous cells or allogenic cells can be used.

A variety of methods may be used to introduce CAR constructs into T cells including non-viral-based DNA transfection, transposon-based systems and viral-based systems. Non-viral-based DNA transfection has low risk of insertional mutagenesis. Transposon-based systems can integrate transgenes more efficiently than plasmids that do not contain an integrating element. Viral-based systems include the use of γ-retroviruses and lentiviral vectors. γ-Retroviruses are relatively easy to produce, efficiently and permanently transduce T cells, and have preliminarily proven safe from an integration standpoint in primary human T cells. Lentiviral vectors also efficiently and permanently transduce T cells but are more expensive to manufacture. They are also potentially safer than retrovirus based systems.

The RNA described herein (e.g. obtained using a nucleic acid molecule described herein as a transcription template) is also useful in reprogramming or de-differentiating somatic cells into stem-like cells, i.e. cells having stem cell characteristics, in vitro or in vivo. This may involve the transient expression of reprogramming factors in vitro or in vivo in order to initiate reprogramming or de-differentiation processes in cells. Thus, in one embodiment, the peptide or protein encoded by a nucleic acid such as RNA described herein is a factor allowing the reprogramming of somatic cells to cells having stem cell characteristics. Stem-like cells can be provided according to the invention without generating embryos or fetuses. De-differentiation of somatic cells to cells having stem cell characteristics, in particular pluripotency, can be effected by introducing RNA encoding factors inducing the de-differentiation of somatic cells into the somatic cells (also termed reprogramming transcription factors (rTF)) and culturing the somatic cells allowing the cells to de-differentiate. After being de-differentiated, the cells could be induced to re-differentiate into the same or a different somatic cell type such as neuronal, hematopoietic, muscle, epithelial, and other cell types. Thus, such stem-like cells have medical applications for treatment of degenerative diseases by "cell therapy" and may be utilized in novel therapeutic strategies in the treatment of cardiac, neurological, endocrinological, vascular, retinal, dermatological, muscular-skeletal disorders, and other diseases.

Accordingly, the invention also relates to a method for providing cells having stem cell characteristics comprising the steps of (i) providing a cell population comprising somatic cells, (ii) introducing RNA of the invention capable of expressing one or more factors allowing the reprogramming of the somatic cells to cells having stem cell characteristics into the somatic cells, and (iii) allowing the development of cells having stem cell characteristics. In one embodiment, the method further comprises introducing into the somatic cells miRNA enhancing reprogramming of the somatic cells to cells having stem cell characteristics.

In one embodiment, the one or more factors comprise OCT4 and SOX2. The one or more factors may further comprise KLF4 and/or c-MYC and/or NANOG and/or LIN28. In one embodiment, the one or more factors comprise OCT4, SOX2, KLF4 and c-MYC and may further comprise LIN28 and optionally NANOG. In one embodiment, the one or more factors comprise OCT4, SOX2, NANOG and LIN28.

In one embodiment, the method further comprises the step of culturing the somatic cells in the presence of at least one histone deacetylase inhibitor, wherein the at least one histone deacetylase inhibitor preferably comprises valproic acid, sodium butyrate, trichostatin A and/or scriptaid.

In one embodiment, step (iii) comprises culturing the somatic cells under embryonic stem cell culture conditions.

In one embodiment, the stem cell characteristics comprise an embryonic stem cell morphology.

In one embodiment, the cells having stem cell characteristics have normal karyotypes, express telomerase activity, express cell surface markers that are characteristic for embryonic stem cells and/or express genes that are characteristic for embryonic stem cells.

In one embodiment, the cells having stem cell characteristics exhibit a pluripotent state.

In one embodiment, the cells having stem cell characteristics have the developmental potential to differentiate into advanced derivatives of all three primary germ layers.

In one embodiment, the somatic cells are fibroblasts such as lung fibroblasts, foreskin fibroblasts or dermal fibroblasts. Preferably, the somatic cells are human cells.

In one embodiment, the RNA is introduced into the somatic cells by electroporation or lipofection. In one embodiment, the RNA is introduced into the somatic cells repetitively.

In one embodiment, introduction of RNA capable of expression certain factors as disclosed herein into somatic cells results in expression of said factors for an extended period of time, preferably for at least 10 days, preferably for at least 11 days and more preferably for at least 12 days. To achieve such long term expression, RNA is preferably periodically (i.e. repetitively) introduced into the cells more than one time, preferably using electroporation. Preferably, RNA is introduced into the cells at least twice, more preferably at least 3 times, more preferably at least 4 times, even more preferably at least 5 times up to preferably 6 times, more preferably up to 7 times or even up to 8, 9 or 10 times, preferably over a time period of at least 10 days, preferably for at least 11 days and more preferably for at least 12 days to ensure expression of one or more factors for an extended period of time. Preferably, the time periods elapsing between the repeated introductions of the RNA are from 24 hours to 120 hours, preferably 48 hours to 96 hours. In one embodiment, time periods elapsing between the repeated introductions of the RNA are not longer than 72 hours, preferably not longer than 48 hours or 36 hours. In one embodiment, prior to the next electroporation, cells are allowed to recover from the previous electroporation. In any case, the conditions should be selected so that the factors are expressed in the cells in amounts and for periods of time which support the reprogramming process.

A "stem cell" is a cell with the ability to self-renew, to remain undifferentiated, and to become differentiated. A stem cell can divide without limit, for at least the lifetime of the animal in which it naturally resides. A stem cell is not terminally differentiated; it is not at the end stage of a differentiation pathway. When a stem cell divides, each daughter cell can either remain a stem cell or embark on a course that leads toward terminal differentiation.

Totipotent stem cells are cells having totipotential differentiation properties and being capable of developing into a complete organism. This property is possessed by cells up to the 8-cell stage after fertilization of the oocyte by the sperm. When these cells are isolated and transplanted into the uterus, they can develop into a complete organism.

Pluripotent stem cells are cells capable of developing into various cells and tissues derived from the ectodermal, mesodermal and endodermal layers.

Pluripotent stem cells which are derived from the inner cell mass located inside of blastocysts, generated 4-5 days after fertilization are called "embryonic stem cells" and can differentiate into various other tissue cells but cannot form new living organisms.

Multipotent stem cells are stem cells differentiating normally into only cell types specific to their tissue and organ of origin. Multipotent stem cells are involved not only in the growth and development of various tissues and organs during the fetal, neonatal and adult periods but also in the maintenance of adult tissue homeostasis and the function of inducing regeneration upon tissue damage. Tissue-specific multipotent cells are collectively called "adult stem cells".

An "embryonic stem cell" or "ESC" is a stem cell that is present in or isolated from an embryo. It can be pluripotent, having the capacity to differentiate into each and every cell present in the organism, or multipotent, with the ability to differentiate into more than one cell type.

As used herein, "embryo" refers to an animal in the early stages of it development. These stages are characterized by implantation and gastrulation, where the three germ layers are defined and established and by differentiation of the germs layers into the respective organs and organ systems. The three germ layers are the endoderm, ectoderm and mesoderm.

A "blastocyst" is an embryo at an early stage of development in which the fertilized ovum has undergone cleavage, and a spherical layer of cells surrounding a fluid-filled cavity is forming, or has formed. This spherical layer of cells is the trophectoderm. Inside the trophectoderm is a cluster of cells termed the inner cell mass (ICM). The trophectoderm is the precursor of the placenta, and the ICM is the precursor of the embryo.

An adult stem cell, also called a somatic stem cell, is a stem cell found in an adult. An adult stem cell is found in a differentiated tissue, can renew itself, and can differentiate, with some limitations, to yield specialized cell types of its tissue of origin.

Examples include mesenchymal stem cells, hematopoietic stem cells, and neural stem cells.

A "differentiated cell" is a mature cell that has undergone progressive developmental changes to a more specialized form or function. Cell differentiation is the process a cell undergoes as it matures to an overtly specialized cell type. Differentiated cells have distinct characteristics, perform specific functions, and are less likely to divide than their less differentiated counterparts.

An "undifferentiated" cell, for example, an immature, embryonic, or primitive cell, typically has a nonspecific appearance, may perform multiple, non-specific activities, and may perform poorly, if at all, in functions typically performed by differentiated cells.

"Somatic cell" refers to any and all differentiated cells and does not include stem cells, germ cells, or gametes. Preferably, "somatic cell" as used herein refers to a terminally differentiated cell.

As used herein, "committed" refers to cells which are considered to be permanently committed to a specific function. Committed cells are also referred to as "terminally differentiated cells".

As used herein, "differentiation" refers to the adaptation of cells for a particular form or function.

In cells, differentiation leads to a more committed cell.

As used herein, "de-differentiation" refers to loss of specialization in form or function. In cells, de-differentiation leads to a less committed cell.

As used herein "reprogramming" refers to the resetting of the genetic program of a cell. A reprogrammed cell preferably exhibits pluripotency.

The terms "de-differentiated" and "reprogrammed" or similar terms are used interchangeably herein to denote somatic cell-derived cells having stem cell characteristics. However, said terms are not intended to limit the subject-matter disclosed herein by mechanistic or functional considerations.

The term "RNA inducing the development of stem cell characteristics" or "RNA capable of expressing one or more factors allowing the reprogramming of the somatic cells to cells having stem cell characteristics" refers to RNA which when introduced into a somatic cell induces the cell to de-differentiate.

As used herein, "germ cell" refers to a reproductive cell such as a spermatocyte or an oocyte, or a cell that will develop into a reproductive cell.

As used herein, "pluripotent" refers to cells that can give rise to any cell type except the cells of the placenta or other supporting cells of the uterus.

Terms such as "cell having stem cell characteristics", "cell having stem cell properties" or "stem like cell" are used herein to designate cells which, although they are derived from differentiated somatic non-stem cells, exhibit one or more features typical for stem cells, in particular embryonic stem cells. Such features include an embryonic stem cell morphology such as compact colonies, high nucleus to cytoplasm ratio and prominent nucleoli, normal karyotypes, expression of telomerase activity, expression of cell surface markers that are characteristic for embryonic stem cells, and/or expression of genes that are characteristic for embryonic stem cells. The cell surface markers that are characteristic for embryonic stem cells are, for example, selected from the group consisting of stage-specific embryonic antigen-3 (SSEA-3), SSEA-4, tumor-related antigen-1-60 (TRA-1-60), TRA-1-81, and TRA-2-49/6E. The genes that are characteristic for embryonic stem cells are selected, for example, from the group consisting of endogenous OCT4, endogenous NANOG, growth and differentiation factor 3 (GDF3), reduced expression 1 (REX1), fibroblast growth factor 4 (FGF4), embryonic cell-specific gene 1 (ESG1), developmental pluripotency-associated 2 (DPPA2), DPPA4, and telomerase reverse transcriptase (TERT). In one embodiment, the one or more features typical for stem cells include pluripotency.

In one embodiment of the invention, the stem cell characteristics comprise an embryonic stem cell morphology, wherein said embryonic stem cell morphology preferably comprises morphological criteria selected from the group consisting of compact colonies, high nucleus to cytoplasm ratio and prominent nucleoli. In certain embodiments, the cells having stem cell characteristics have normal karyotypes, express telomerase activity, express cell surface markers that are characteristic for embryonic stem cells and/or express genes that are characteristic for embryonic stem cells. The cell surface markers that are characteristic for embryonic stem cells may be selected from the group consisting of stage-specific embryonic antigen-3 (SSEA-3), SSEA-4, tumor-related antigen-1-60 (TRA-1-60), TRA-1-81, and TRA-2-49/6E and the genes that are characteristic for embryonic stem cells may be selected from the group consisting of endogenous OCT4, endogenous NANOG, growth and differentiation factor 3 (GDF3), reduced expression 1 (REX1), fibroblast growth factor 4 (FGF4), embryonic cell-specific gene 1 (ESG1), developmental pluripotency-associated 2 (DPPA2), DPPA4, and telomerase reverse transcriptase (TERT).

Preferably, the cells having stem cell characteristics are de-differentiated and/or reprogrammed somatic cells. Preferably, the cells having stem cell characteristics exhibit the essential characteristics of embryonic stem cells such as a pluripotent state. Preferably, the cells having stem cell characteristics have the developmental potential to differentiate into advanced derivatives of all three primary germ layers. In one embodiment, the primary germ layer is endoderm and the advanced derivative is gut-like epithelial tissue. In a further embodiment, the primary germ layer is mesoderm and the advanced derivative is striated muscle and/or cartilage. In an even further embodiment, the primary germ layer is ectoderm and the advanced derivative is neural tissue and/or epidermal tissue. In one preferred embodiment, the cells having stem cell characteristics have the developmental potential to differentiate into neuronal cells and/or cardiac cells.

In one embodiment, the somatic cells are embryonic stem cell derived somatic cells with a mesenchymal phenotype. In a preferred embodiment, the somatic cells are fibroblasts such as fetal fibroblasts or postnatal fibroblasts or keratinocytes, preferably hair follicle derived keratinocytes. In further embodiments, the fibroblasts are lung fibroblasts, foreskin fibroblasts or dermal fibroblasts. In particular embodiments, the fibroblasts are fibroblasts as deposited at the American Type Culture Collection (ATCC) under Catalog No. CCL-186, as deposited at the American Type Culture Collection (ATCC) under Catalog No. CRL-2097 or as deposited at the American Type Culture Collection (ATCC) under Catalog No. CRL-2522, or as distributed by System Biosciences under the catalog no. PC501A-HFF. In one embodiment, the fibroblasts are adult human dermal fibroblasts. Preferably, the somatic cells are human cells. According to the present invention, the somatic cells may be genetically modified.

The term "factor" according to the invention when used in conjunction with the expression thereof by RNA includes proteins and peptides as well as derivatives and variants thereof. For example, the term "factor" comprises OCT4, SOX2, NANOG, LIN28, KLF4 and c-MYC.

The factors can be of any animal species; e.g., mammals and rodents. Examples of mammals include but are not limited to human and non-human primates. Primates include but are not limited to humans, chimpanzees, baboons, cynomolgus monkeys, and any other New or Old World monkeys. Rodents include but are not limited to mouse, rat, guinea pig, hamster and gerbil.

According to the present invention, one or more factors capable of allowing the reprogramming of somatic cells to cells having stem cell characteristics comprise an assembly of factors selected from the group consisting of (i) OCT4 and SOX2, (ii) OCT4, SOX2, and one or both of NANOG and LIN28, (iii) OCT4, SOX2 and one or both of KLF4 and c-MYC. In one embodiment, said one or more factors capable of being expressed by the RNA comprise OCT4, SOX2, NANOG and LIN28 or OCT4, SOX2, KLF4 and c-MYC. Preferably, the RNA is introduced into said somatic cells by electroporation or microinjection. Preferably, the invention further comprises allowing the development of cells having stem cell characteristics, e.g. by culturing the somatic cell under embryonic stem cell culture conditions, preferably conditions suitable for maintaining pluripotent stem cells in an undifferentiated state.

OCT4 is a transcription factor of the eukaryotic POU transcription factors and an indicator of pluripotency of embryonic stem cells. It is a maternally expressed Octomer binding protein. It has been observed to be present in oocytes, the inner cell mass of blastocytes and also in the primordial germ cell. The gene POU5F1 encodes the OCT4 protein. Synonyms to the gene name include OCT3, OCT4, OTF3 and MGC22487. The presence of OCT4 at specific concentrations is necessary for embryonic stem cells to remain undifferentiated. Preferably, "OCT4 protein" or simply "OCT4" relates to human OCT4.

Sox2 is a member of the Sox (SRY-related HMG box) gene family that encode transcription factors with a single HMG DNA-binding domain. SOX2 has been found to control neural progenitor cells by inhibiting their ability to differentiate. The repression of the factor results in delamination from the ventricular zone, which is followed by an exit from the cell cycle. These cells also begin to lose their progenitor character through the loss of progenitor and early neuronal differentiation markers. Preferably, "SOX2 protein" or simply "SOX2" relates to human SOX2.

NANOG is a NK-2 type homeodomain gene, and has been proposed to play a key role in maintaining stem cell pluripotency presumably by regulating the expression of genes critical to embryonic stem cell renewal and differentiation. NANOG behaves as a transcription activator with two unusually strong activation domains embedded in its C terminus. Reduction of NANOG expression induces differentiation of embryonic stem cells. Preferably, "NANOG protein" or simply "NANOG" relates to human NANOG.

LIN28 is a conserved cytoplasmic protein with an unusual pairing of RNA-binding motifs: a cold shock domain and a pair of retroviral-type CCHC zinc fingers.

In mammals, it is abundant in diverse types of undifferentiated cells. In pluripotent mammalian cells, LIN28 is observed in RNase-sensitive complexes with Poly(A)-Binding Protein, and in polysomal fractions of sucrose gradients, suggesting it is associated with translating mRNAs. Preferably, "LIN28 protein" or simply "LIN28" relates to human LIN28.

Krueppel-like factor (KLF4) is a zinc-finger transcription factor, which is strongly expressed in postmitotic epithelial cells of different tissues, e.g. the colon, the stomach and the skin. KLF4 is essential for the terminal differentiation of these cells and involved in the cell cycle regulation. Preferably, "KLF4 protein" or simply "KLF4" relates to human KLF4.

MYC (cMYC) is a protooncogene, which is overexpressed in a wide range of human cancers. When it is specifically-mutated, or overexpressed, it increases cell proliferation and functions as an oncogene. MYC gene encodes for a transcription factor that regulates expression of 15% of all genes through binding on Enhancer Box sequences (E-boxes) and recruiting histone acetyltransferases (HATs). MYC belongs to MYC family of transcription factors, which also includes N-MYC and L-MYC genes. MYC-family transcription factors contain the bHLH/LZ (basic Helix-Loop-Helix Leucine Zipper) domain. Preferably, "cMYC protein" or simply "cMYC" relates to human cMYC.

A reference herein to specific factors such as OCT4, SOX2, NANOG, LIN28, KLF4 or c-MYC is to be understood so as to also include all variants of these factors. In particular, it is to be understood so as to also include all splice variants, posttranslationally modified variants, conformations, isoforms and species homologs of these factors which are naturally expressed by cells.

The term "miRNA" (microRNA) relates to 21-23-nucleotide-long noncoding RNAs found in eukaryotic cells that, by inducing degradation and/or preventing translation of target mRNAs, modulate a plethora of cell functions, including those related to ESC self-renewal/differentiation and cell cycle progression. miRNAs are post-transcriptional regulators that bind to complementary sequences on target messenger RNA transcripts (mRNAs), usually resulting in translational repression or target degradation and gene silencing. It has been found that miRNAs in the right combination are capable of inducing direct cellular reprogramming of somatic cells to cells having stem cell characteristics in vitro. For example, it has been observed that miRNA cluster 302-367 enhances somatic cell reprogramming.

Preferably, the step of allowing the development of cells having stem cell characteristics comprises culturing the somatic cells under embryonic stem cell culture conditions, preferably conditions suitable for maintaining pluripotent stem cells in an undifferentiated state.

Preferably, to allow the development of cells having stem cell characteristics, cells are cultivated in the presence of one or more DNA methyltransferase inhibitors and/or one or more histone deacetylase inhibitors. Preferred compounds are selected from the group consisting of 5'-azacytidine (5'-azaC), suberoylanilide hydroxamic acid (SAHA), dexamethasone, trichostatin A (TSA), sodium butyrate (NaBu), Scriptaid and valproic acid (VPA). Preferably, cells are cultivated in the presence of valproic acid (VPA), preferably in a concentration of between 0.5 and 10 mM, more preferably between 1 and 5 mM, most preferably in a concentration of about 2 mM.

The methods of the present invention can be used to effect de-differentiation of any type of somatic cell. Cells that may be used include cells that can be de-differentiated or reprogrammed by the methods of the present invention, in particular cells that are fully or partially differentiated, more preferably terminally differentiated. Preferably, the somatic cell is a diploid cell derived from pre-embryonic, embryonic, fetal, and post-natal multi-cellular organisms. Examples of cells that may be used include but are not limited to fibroblasts, such as fetal and neonatal fibroblasts or adult fibroblasts, keratinocytes, in particular primary keratinocytes, more preferably keratinocytes derived from hair, adipose cells, epithelial cells, epidermal cells, chondrocytes, cumulus cells, neural cells, glial cells, astrocytes, cardiac cells, esophageal cells, muscle cells, melanocytes, hematopoietic cells, osteocytes, macrophages, monocytes, and mononuclear cells.

The cells with which the methods of the invention can be used can be of any animal species; e.g., mammals and rodents. Examples of mammalian cells that can be de-differentiated and re-differentiated by the present invention include but are not limited to human and non-human primate cells. Primate cells with which the invention may be performed include but are not limited to cells of humans, chimpanzees, baboons, cynomolgus monkeys, and any other New or Old World monkeys. Rodent cells with which the invention may be performed include but are not limited to mouse, rat, guinea pig, hamster and gerbil cells.

De-differentiated cells prepared according to the present invention are expected to display many of the same requirements as pluripotent stem cells and can be expanded and maintained under conditions used for embryonic stem cells, e.g. ES cell medium or any medium that supports growth of the embryonic cells. Embryonic stem cells retain their pluripotency in vitro when maintained on inactivated fetal fibroblasts such as irradiated mouse embryonic fibroblasts or human fibroblasts (e.g., human foreskin fibroblasts, human skin fibroblasts, human endometrial fibroblasts, human oviductal fibroblasts) in culture. In one embodiment, the human feeder cells may be autologous feeder cells derived from the same culture of reprogrammed cells by direct differentiation.

Furthermore, human embryonic stem cells can successfully be propagated on Matrigel in a medium conditioned by mouse fetal fibroblasts. Human stem cells can be grown in culture for extended period of time and remain undifferentiated under specific culture conditions.

In certain embodiments, the cell culture conditions may include contacting the cells with factors that can inhibit differentiation or otherwise potentiate de-differentiation of cells, e.g., prevent the differentiation of cells into non-ES cells, trophectoderm or other cell types.

De-differentiated cells prepared according to the present invention can be evaluated by methods including monitoring changes in the cells' phenotype and characterizing their gene and protein expression. Gene expression can be determined by RT-PCR, and translation products can be determined by immunocytochemistry and Western blotting. In particular, de-differentiated cells can be characterized to determine the pattern of gene expression and whether the reprogrammed cells display a pattern of gene expression similar to the expression pattern expected of undifferentiated, pluripotent control cells such as embryonic stem cells using techniques well known in the art including transcriptomics.

The expression of the following genes of de-differentiated cells can be assessed in this respect: OCT4, NANOG, growth and differentiation factor 3 (GDF3), reduced expression 1 (REX1), fibroblast growth factor 4 (FGF4), embryonic cell-specific gene 1 (ESG1), developmental pluripotency-associated 2 (DPPA2), DPPA4, telomerase reverse transcriptase (TERT), embryonic antigen-3 (SSEA-3), SSEA-4, tumor-related antigen-1-60 (TRA-1-60), TRA-1-81, and TRA-2-49/6E.

The undifferentiated or embryonic stem cells to which the reprogrammed cells may be compared may be from the same species as the differentiated somatic cells. Alternatively, the undifferentiated or embryonic stem cells to which the reprogrammed cells may be compared may be from a different species as the differentiated somatic cells.

In some embodiments, a similarity in gene expression pattern exists between a reprogrammed cell and an undifferentiated cell, e.g., embryonic stem cell, if certain genes specifically expressed in an undifferentiated cell are also expressed in the reprogrammed cell. For example, certain genes, e.g., telomerase, that are typically undetectable in differentiated somatic cells may be used to monitor the extent of reprogramming. Likewise, for certain genes, the absence of expression may be used to assess the extent of reprogramming.

Self-renewing capacity, marked by induction of telomerase activity, is another characteristic of stem cells that can be monitored in de-differentiated cells.

Karyotypic analysis may be performed by means of chromosome spreads from mitotic cells, spectral karyotyping, assays of telomere length, total genomic hybridization, or other techniques well known in the art.

Using the present invention, RNA encoding appropriate factors is incorporated into one or more somatic cells, e.g. by electroporation. After incorporation, cells are preferably cultured using conditions that support maintenance of de-differentiated cells (i.e. stem cell culture conditions). The de-differentiated cells can then be expanded and induced to re-differentiate into different type of somatic cells that are needed for cell therapy. De-differentiated cells obtained according to the present invention can be induced to differentiate into one or more desired somatic cell types in vitro or in vivo.

Preferably, the de-differentiated cells obtained according to the present invention may give rise to cells from any of three embryonic germ layers, i.e., endoderm, mesoderm, and ectoderm. For example, the de-differentiated cells may differentiate into skeletal muscle, skeleton, dermis of skin, connective tissue, urogenital system, heart, blood (lymph cells), and spleen (mesoderm); stomach, colon, liver, pancreas, urinary bladder; lining of urethra, epithelial parts of trachea, lungs, pharynx, thyroid, parathyroid, intestine (endoderm); or central nervous system, retina and lens, cranial and sensory, ganglia and nerves, pigment cells, head connective tissue, epidermis, hair, mammary glands (ectoderm). The de-differentiated cells obtained according to the present invention can be re-differentiated in vitro or in vivo using techniques known in the art.

In one embodiment of the present invention, the reprogrammed cells resulting from the methods of this invention are used to produce differentiated progeny. Thus, in one aspect, the present invention provides a method for producing differentiated cells, comprising: (i) obtaining reprogrammed cells using the methods of this invention; and (ii) inducing differentiation of the reprogrammed cells to produce differentiated cells. Step (ii) can be performed in vivo or in vitro. Furthermore, differentiation can be induced through the presence of appropriate differentiation factors which can either be added or are present in situ, e.g. in a body, organ or tissue into which the reprogrammed cells have been introduced. The differentiated cells can be used to derive cells, tissues and/or organs which are advantageously used in the area of cell, tissue, and/or organ transplantation. If desired, genetic modifications can be introduced, for example, into somatic cells prior to reprogramming. The differentiated cells of the present invention preferably do not possess the pluripotency of an embryonic stem cell, or an embryonic germ cell, and are, in essence, tissue-specific partially or fully differentiated cells.

One advantage of the methods of the present invention is that the reprogrammed cells obtained by the present invention can be differentiated without prior selection or purification or establishment of a cell line. Accordingly in certain embodiments, a heterogeneous population of cells comprising reprogrammed cells are differentiated into a desired cell type. In one embodiment, a mixture of cells obtained from the methods of the present invention is exposed to one or more differentiation factors and cultured in vitro.

Methods of differentiating reprogrammed cells obtained by the methods disclosed herein may comprise a step of permeabilization of the reprogrammed cell. For example, cells generated by the reprogramming techniques described herein, or alternatively a heterogeneous mixture of cells comprising reprogrammed cells, may be permeabilized before exposure to one or more differentiation factors or cell extract or other preparation comprising differentiation factors.

For example, differentiated cells may be obtained by culturing undifferentiated reprogrammed cells in the presence of at least one differentiation factor and selecting differentiated cells from the culture. Selection of differentiated cells may be based on phenotype, such as the expression of certain cell markers present on differentiated cells, or by functional assays (e.g., the ability to perform one or more functions of a particular differentiated cell type).

In another embodiment, the cells reprogrammed according to the present invention are genetically modified through the addition, deletion, or modification of their DNA sequence(s).

The reprogrammed or de-differentiated cells prepared according to the present invention or cells derived from the reprogrammed or de-differentiated cells are useful in research and in therapy. Reprogrammed pluripotent cells may be differentiated into any of the cells in the body including, without limitation, skin, cartilage, bone skeletal muscle, cardiac muscle, renal, hepatic, blood and blood forming, vascular precursor and vascular endothelial, pancreatic beta, neurons, glia, retinal, neuronal, intestinal, lung, and liver cells.

The reprogrammed cells are useful for regenerative/reparative therapy and may be transplanted into a patient in need thereof. In one embodiment, the cells are autologous with the patient.

The reprogrammed cells provided in accordance with the present invention may be used, for example, in therapeutic strategies in the treatment of cardiac, neurological, endocrinological, vascular, retinal, dermatological, muscular-skeletal disorders, and other diseases.

For example, and not intended as a limitation, the reprogrammed cells of the present invention can be used to replenish cells in animals whose natural cells have been depleted due to age or ablation therapy such as cancer radiotherapy and chemotherapy. In another non-limiting example, the reprogrammed cells of the present invention are useful in organ regeneration and tissue repair. In one embodiment of the present invention, reprogrammed cells can be used to reinvigorate damaged muscle tissue including dystrophic muscles and muscles damaged by ischemic events such as myocardial infarcts. In another embodiment of the present invention, the reprogrammed cells disclosed herein can be used to ameliorate scarring in animals, including humans, following a traumatic injury or surgery. In this embodiment, the reprogrammed cells of the present invention are administered systemically, such as intravenously, and migrate to the site of the freshly traumatized tissue recruited by circulating cytokines secreted by the damaged cells. In another embodiment of the present invention, the reprogrammed cells can be administered locally to a treatment site in need or repair or regeneration.

In one embodiment of the invention, nucleic acids such as RNA are administered to a patient by ex vivo methods, i.e. by removing cells from a patient, genetically modifying said cells and reintroducing the modified cells into the patient. Transfection and transduction methods are known to the skilled worker.

The term "transfection" relates to the introduction of nucleic acids, in particular RNA, into a cell. For purposes of the present invention, the term "transfection" also includes the introduction of a nucleic acid into a cell or the uptake of a nucleic acid by such cell, wherein the cell may be present in a subject, e.g., a patient. Thus, according to the present invention, a cell for transfection of a nucleic acid described herein can be present in vitro or in vivo, e.g. the cell can form part of an organ, a tissue and/or an organism of a patient. According to the invention, transfection can be transient or stable. For some applications of transfection, it is sufficient if the transfected genetic material is only transiently expressed. Since the nucleic acid introduced in the transfection process is usually not integrated into the nuclear genome, the foreign nucleic acid will be diluted through mitosis or degraded. Cells allowing episomal amplification of nucleic acids greatly reduce the rate of dilution. If it is desired that the transfected nucleic acid actually remains in the genome of the cell and its daughter cells, a stable transfection must occur. RNA can be transfected into cells to transiently express its coded protein.

According to the present invention, any technique useful for introducing, i.e. transferring or transfecting, nucleic acids into cells may be used. Preferably, RNA is transfected into cells by standard techniques. Such techniques include electroporation, lipofection and microinjection. In one particularly preferred embodiment of the present invention, RNA is introduced into cells by electroporation. Electroporation or electropermeabilization relates to a significant increase in the electrical conductivity and permeability of the cell plasma membrane caused by an externally applied electrical field. It is usually used in molecular biology as a way of introducing some substance into a cell. According to the invention it is preferred that introduction of nucleic acid encoding a protein or peptide into cells results in expression of said protein or peptide.

According to the invention, nucleic acids may be directed to particular cells. In such embodiments, a carrier used for administering a nucleic acid to a cell (e.g. a retrovirus or a liposome) may have a bound targeting molecule. For example, a molecule such as an antibody specific to a surface membrane protein on the target cell, or a ligand for a receptor on the target cell may be incorporated into or bound to the nucleic acid carrier. If administration of a nucleic acid by liposomes is desired, proteins binding to a surface membrane protein associated with endocytosis may be incorporated into the liposome formulation in order to enable targeting and/or absorption. Such proteins include capsid proteins or fragments thereof which are specific to a particular cell type, antibodies to proteins that are internalized, proteins targeting an intracellular site, and the like.

"Reporter" relates to a molecule, typically a peptide or protein, which is encoded by a reporter gene and measured in a reporter assay. Conventional systems usually employ an enzymatic reporter and measure the activity of said reporter.

The term "multiple cloning site" refers to a nucleic acid region containing restriction enzyme sites, any one of which may be used for cleavage of, for example, a vector and insertion of a nucleic acid.

According to the invention, two elements such as nucleotides or amino acids are consecutive, if they are directly adjacent to one another, without any interruption. For example, a sequence of x consecutive nucleotides N refers to the sequence $(N)_x$.

"Restriction endonuclease" or "restriction enzyme" refers to a class of enzymes that cleave phosphodiester bonds in both strands of a DNA molecule within specific base sequences. They recognize specific binding sites, referred to as recognition sequences, on a double-stranded DNA molecule. The sites at which said phosphodiester bonds in the DNA are cleaved by said enzymes are referred to as cleavage sites. In the case of type IIS enzymes, the cleavage site is located at a defined distance from the DNA binding site. According to the invention, the term "restriction endonuclease" comprises, for example, the enzymes SapI, EciI, BpiI, AarI, AloI, BaeI, BbvCI, PpiI and PsrI, BsrD1, BtsI, EarI, BmrI, BsaI, BsmBI, FauI, BbsI, BciVI, BfuAI, BspMI, BseRI, EciI, BtgZI, BpuEI, Bsgl, MmeI, CspCI, BaeI, BsaMI, Mva1269I, PctI, Bse3DI, BseMI, Bst6I, Eam1104I, Ksp632I, BfiI, Bso31I, BspTNI, Eco31I, Esp3I, BfuI, Acc36I, AarI, Eco57I, Eco57MI, GsuI, AloI, Hin4I, PpiI, and PsrI.

The term "stability" of RNA relates to the "half-life" of RNA. "Half-life" relates to the period of time which is needed to eliminate half of the activity, amount, or number of molecules. In the context of the present invention, the half-life of a RNA is indicative for the stability of said RNA.

The nucleic acids such as RNA described herein, in particular when used for the treatments described herein, may be present in the form of a pharmaceutical composition or kit comprising the nucleic acid and optionally one or more pharmaceutically acceptable carriers, diluents and/or excipients.

Pharmaceutical compositions are preferably sterile and contain an effective amount of the nucleic acid.

Pharmaceutical compositions are usually provided in a uniform dosage form and may be prepared in a manner known in the art. The pharmaceutical composition may, e.g., be in the form of a solution or suspension.

The pharmaceutical composition may comprise salts, buffer substances, preservatives, carriers, diluents and/or excipients all of which are preferably pharmaceutically acceptable. The term "pharmaceutically acceptable" refers to the non-toxicity of a material which does not interfere with the action of the active component(s) of the pharmaceutical composition.

Salts which are not pharmaceutically acceptable may be used for preparing pharmaceutically acceptable salts and are included in the invention. Pharmaceutically acceptable salts of this kind comprise, in a non-limiting way, those prepared from the following acids: hydrochloric, hydrobromic, sulfuric, nitric, phosphoric, maleic, acetic, salicylic, citric, formic, malonic, succinic acids, and the like. Pharmaceutically acceptable salts may also be prepared as alkali metal salts or alkaline earth metal salts, such as sodium salts, potassium salts or calcium salts.

Suitable buffer substances for use in the pharmaceutical composition include acetic acid in a salt, citric acid in a salt, boric acid in a salt and phosphoric acid in a salt.

Suitable preservatives for use in the pharmaceutical composition include benzalkonium chloride, chlorobutanol, paraben and thimerosal.

The term "carrier" refers to an organic or inorganic component, of a natural or non-natural (synthetic) nature, with which the active component is combined in order to facilitate, enhance or enable application. According to the invention, the term "carrier" also includes one or more compatible solid or liquid fillers, diluents or encapsulating substances, which are suitable for administration to a patient.

Possible carrier substances for parenteral administration are, e.g., sterile water, glucose solutions, Ringer, Ringer lactate, sterile sodium chloride solution, polyalkylene glycols, hydrogenated naphthalenes and, in particular, biocompatible lactide polymers, lactide/glycolide copolymers or polyoxyethylene/polyoxy-propylene copolymers.

The term "excipient" when used herein is intended to indicate all substances which may be present in a pharmaceutical composition and which are not active ingredients such as, e.g., carriers, binders, lubricants, thickeners, surface active agents, preservatives, emulsifiers, buffers, flavoring agents, or colorants.

The pharmaceutical compositions described herein may be administered via any conventional route, such as by parenteral administration including by injection or infusion. Administration is preferably parenterally, e.g. intravenously, intraarterially, subcutaneously, in the lymph node, intradermally or intramuscularly.

Compositions suitable for parenteral administration usually comprise a sterile aqueous or non-aqueous preparation of the active compound, which is preferably isotonic to the blood of the recipient. Examples of compatible carriers and solvents are Ringer's solution and isotonic sodium chloride solution. In addition, usually sterile, fixed oils are used as solution or suspension medium.

The agents and compositions described herein are preferably administered in effective amounts. An "effective amount" refers to the amount which achieves a desired reaction or a desired effect alone or together with further doses. In the case of treatment of a particular disease or of a particular condition, the desired reaction preferably relates to inhibition of the course of the disease. This comprises slowing down the progress of the disease and, in particular, interrupting or reversing the progress of the disease. The desired reaction in a treatment of a disease or of a condition may also be delay of the onset or a prevention of the onset of said disease or said condition.

An effective amount of an agent or composition described herein will depend on the condition to be treated, the severeness of the disease, the individual parameters of the patient, including age, physiological condition, size and weight, the duration of treatment, the type of an accompanying therapy (if present), the specific route of administration and similar factors. Accordingly, the doses administered of the agents described herein may depend on several of these parameters. In the case that a reaction in a patient is insufficient with an initial dose, higher doses (or effectively higher doses achieved by a different, more localized route of administration) may be used.

The present invention is described in detail by the following figures and examples which should be construed by way of illustration only and not by way of limitation. On the basis of the description and the examples, further embodiments are accessible to the skilled worker and are likewise within the scope of the invention.

FIGURES

FIG. 1: Overview of the in vivo selection process A: To prepare the starting library, human immature dendritic cells were grown in the presence of Actinomycin D, an inhibitor of transcription, for five hours to preselect stable RNAs. The remaining cellular mRNA was extracted and purified using the Poly(A)Purist Kit (Ambion) and next fragmented with Nuclease P1 (Roche). For this, 10 μg RNA were incubated for 45 min with 0.3 U NP-1 in 8 μL 50 mM NaAc buffer (pH 5.5) in a total reaction volume of 24 μL. After purification with RNeasy columns (Qiagen) the fragments were ready to be reverse transcribed into cDNA. First and second strand synthesis were done using and following the protocol of the RevertAid Premium 1st strand cDNA synthesis Kit (Fermentas) and a hexamer-primer with a defined primer sequence and a NotI-restriction site. To fill-in 5'-overhangs and remove 3'-overhangs the cDNA was next incubated with 12.5 U T4 DNA polymerase for 5 min at 15° C. Reaction was terminated adding 5 μL 0.5 mM EDTA, pH 8.0 and cDNA was purified using NucleoBond columns (Macherey-Nagel). Digest of cDNA-library with NotI (NEB) produced fragments with a blunt and sticky end.

Fragments were additionally size selected via gel preparation to ensure removal of all fragments smaller 150 bps. For the cloning of the library the vector as shown in panel A was digested with EcoRV and NotI leaving a blunt and sticky end respectively. In the next step the library was ligated into the vector using the T4 DNA ligase (Fermentas). The ligation mixture was directly used as template for PCR as given in Tab. 4 using the Phusionm Hot Start High-Fidelity DNA Polymerase (Finnzymes). After purification, PCR-product was used as template for T7-transcription as shown in Tab. 5. Incubation was done at 37° C. After every 30 min 0.75 μL 100 mM GTP were added to the reaction. Reaction was stopped after 2.5h by adding TURBO DNase (2U/μL, Ambion) and incubating for another 15 min at 37° C. Reaction was finally cleaned up via RNeasy columns (Qiagen). The RNA-library could then be used for the selection procedure starting with electroporation of the RNA into hiDCs as described previously (Kuhn et al, 2010). After the cultivation for selection, extraction and purification of the RNA was done using RNeasy columns (Qiagen) and following manufacturer's instructions. RNA was next used as template for cDNA synthesis using the Superscript II Reverse transcriptase (Invitrogen) and following manufacturer's instructions and a dT18-primer. cDNA was next used as template for PCR as described above. B: Finally, the PCR products could be used as template for T7-transcription (see above) to start the next selection round (panel B). Quality controls of DNA/cDNA and RNA samples were done via agarose gel and AGILENT 2100 bioanalyzer respectively.

Figure 2:
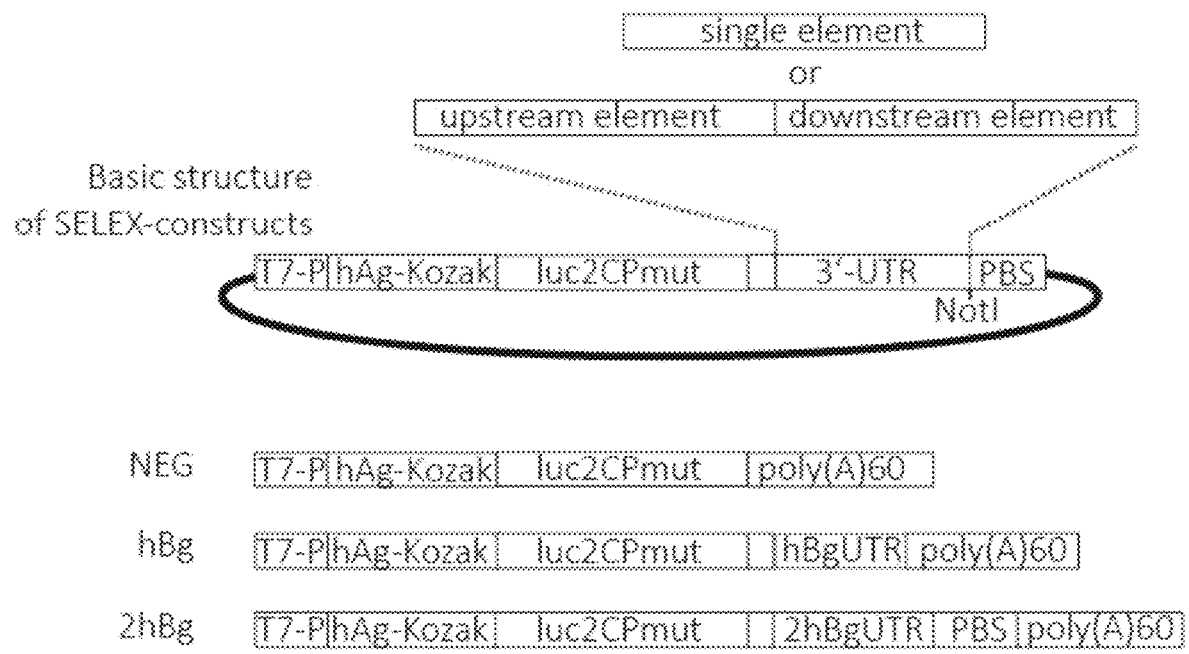
Figure 2:
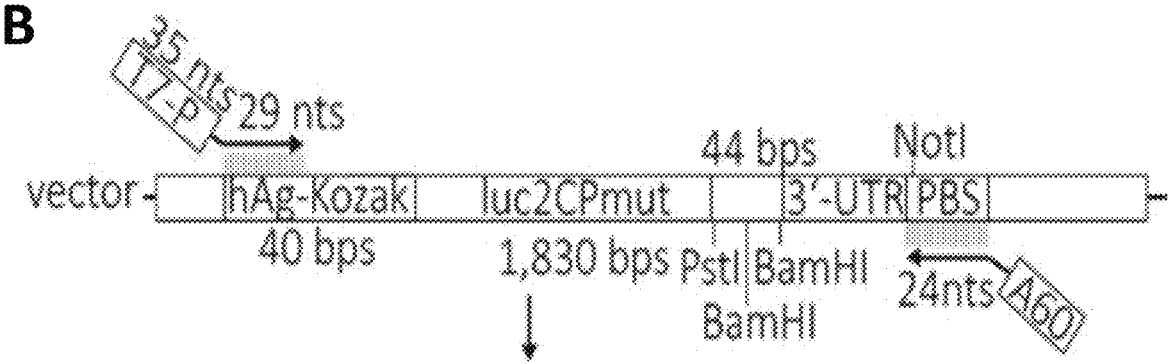

FIG. 2: Schematic of sample appearance within the luc2CPmut-vector

A: A single element or two (upstream and downstream) elements were cloned as 3'-UTRs into the vector as given. Shown are also control samples NEG (negative control without insertion of a 3' UTR), hBg and 2hBg. Preparation of RNA for selection rounds. B: For electroporation in hiDCs vector was used as template for PCR using elongated primers comprising the T7-promotor and the poly(A)-tail. PCR-product was next used as template for 17-in vitro synthesis to produce the respective IVT-RNA.

Figure 3:
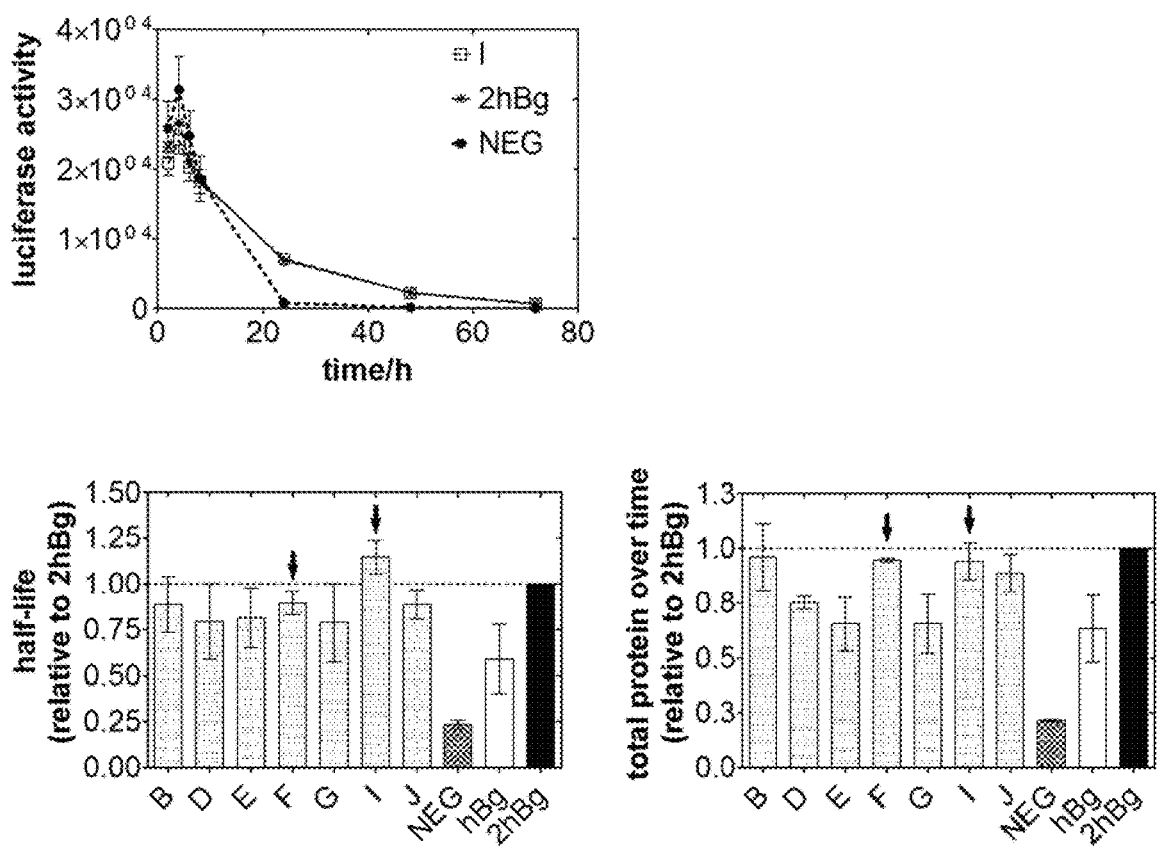

FIG. 3: Effect of the selected sequences on the stability of RNAs encoding luc2CPmut Results showing luciferase activity, half-life and total protein over time of RNAs containing the selected sequences as 3' UTRs compared to our gold-standard 2hBg upon electroporation into human immature dendritic cells (NEG is as defined in FIG. 2). The upper panel gives the time courses of three exemplary RNAs with 3' UTRs as indicated. In the lower left panel, the half-life of the RNAs with the respective 3' UTR as indicated relative to an RNA with 2hBg is shown. Similarly, the relative total protein expression compared to an RNA with 2hBG is given in the lower right panel.

Figure 4:
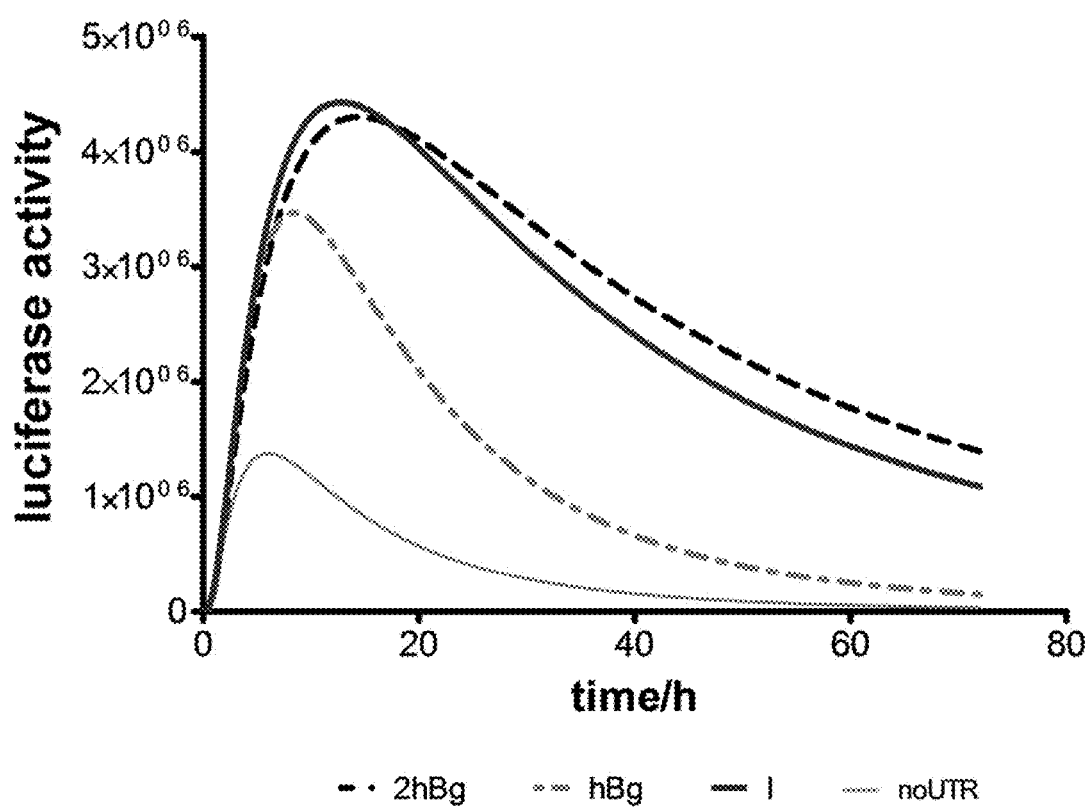

FIG. 4: Representative luciferase activity using luc2mut as reporter gene and newly selected 3'-UTRs After electroporation of RNAs with 3' UTRs as indicated into human immature dendritic cells, luciferase activity was measured over 72h.

Figure 5:
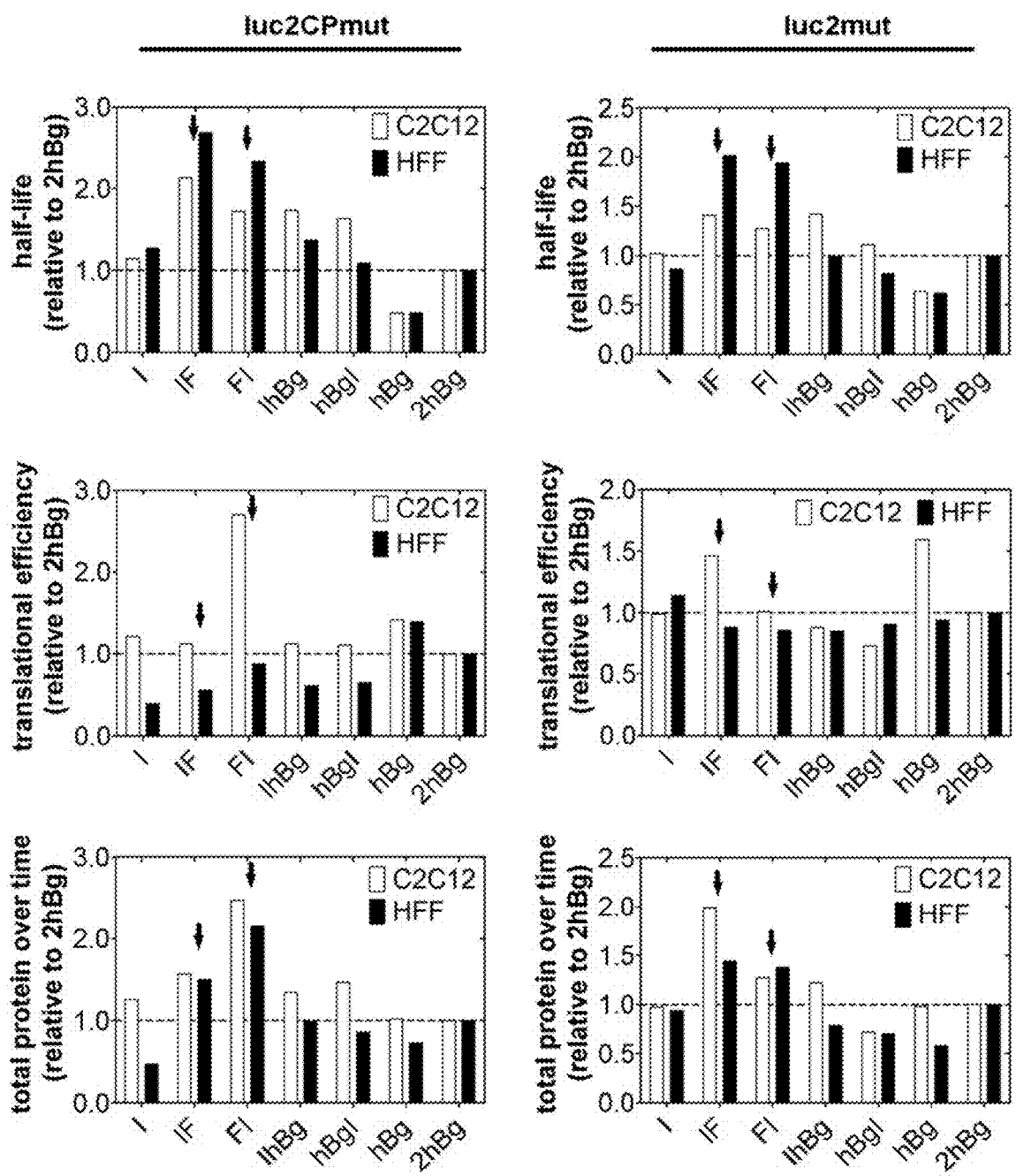
Figure 6:
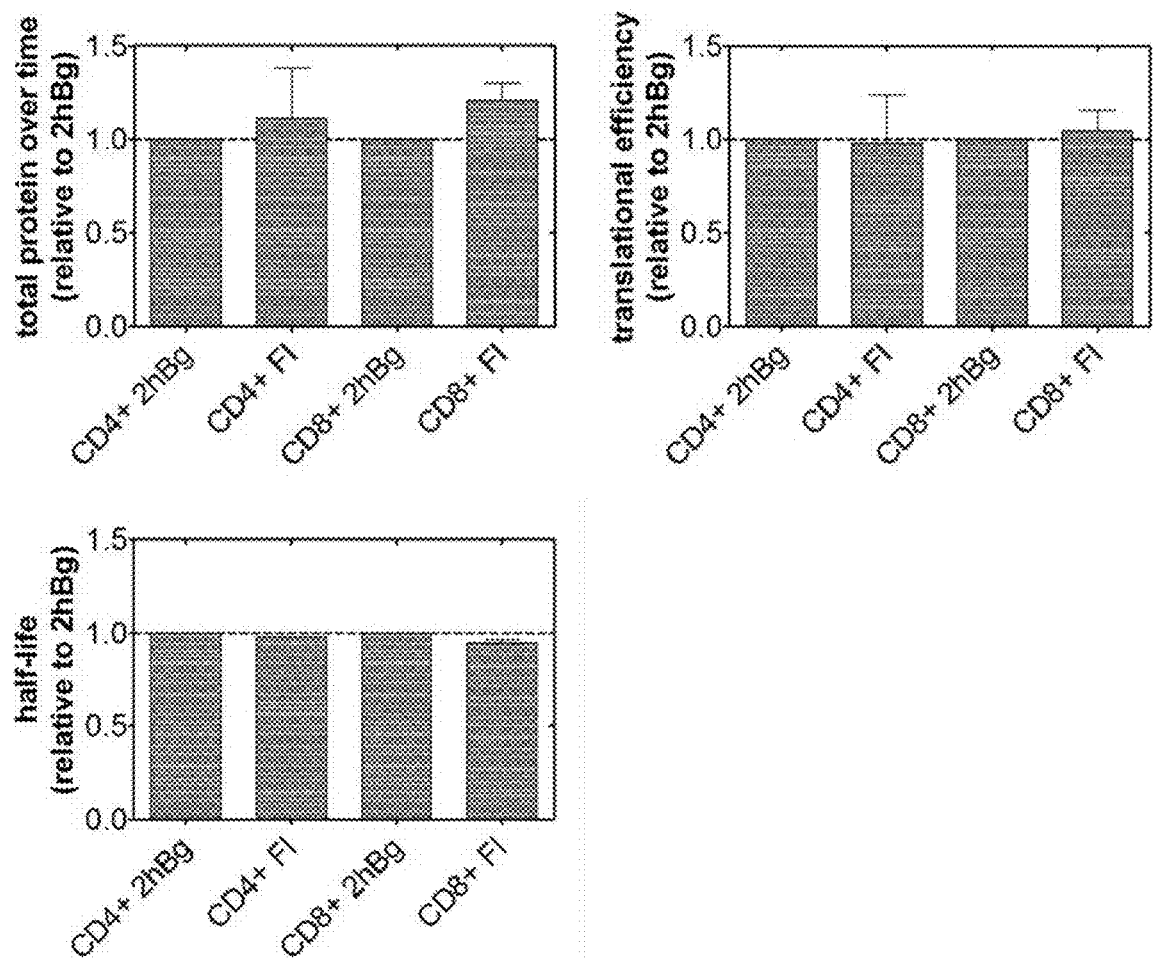

FIG. 5: Representative results of electroporation with IVT-RNAs into fibroblasts left panel: luc2CPmut based vector. right panel: luc2mut based vector FIG. 6: Representative results of electroporation with IVT-RNAs into T cells The leftmost panel gives the relative total protein expression of an RNA with the FI 3' UTR compared to an RNA with 2hBG in CD4+ and CD8+ T cells. Similarly, the relative translation efficiency and mRNA half-life of an RNA with the FI 3' UTR compared to an RNA with 2hBG in CD4+ and CD8+ T cells is given in the middle and rightmost panel, respectively.

Figure 7:
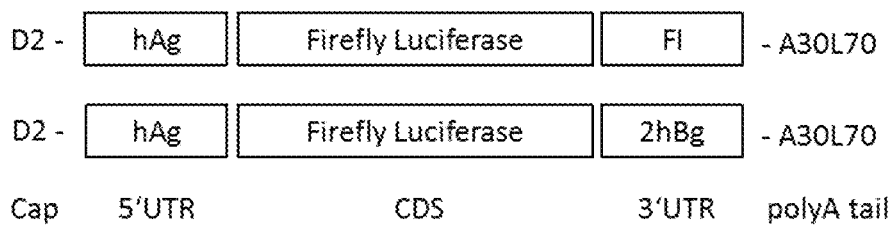

FIG. 7: RNA architecture and integrity for testing RNAs with modified nucleotides A: The RNAs used in the Luciferase assays were constructed as depicted here. As 5' cap β-S-ARCA(D2) was used. As 5'UTR the human alpha globin 5'UTR was used, including a Kozak sequence. After the Firefly Luciferase gene, the two 3'UTRs to be compared were cloned. As polyA-tail, an A30L70 sequence was used.

B: Before transfection, the RNAs were checked for their integrity on a 2100 Bioanalyzer (Agilent). All RNAs had a sufficiently high and also comparable integrity and could therefore be used in the experiments.

Figure 8:
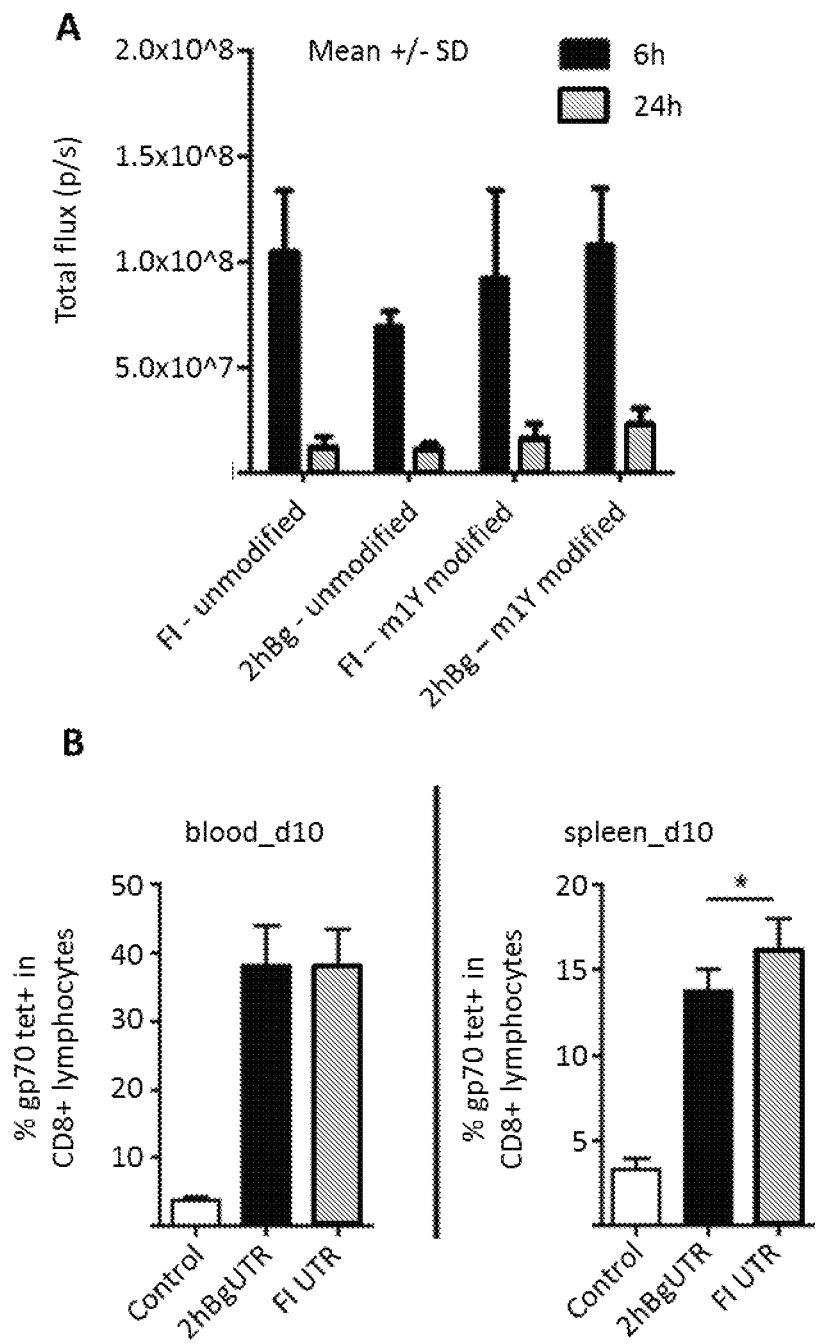

FIG. 8: Effect of the FI 3' UTR an RNA stability and functionality in vivo

Luciferase and gp70 mRNA containing the FI 3'UTR or the 2hBg 3'UTR were formulated with F12 and administered i.v. into BALB/c mice. After Luciferase mRNA administration, expression was monitored after 6 h and 24 h; gp70 mRNA was administered at day 0 and day 6 and immune activation was analyzed at day 10 via CD8 and gp70 tet+ staining.

A: Shows the Luciferase Expression levels at 6 h and 24 h post injection of unmodified and m1Y modified mRNA containing the FI 3'UTR or the 2hBg 3'UTR. Both unmodified and m1Y modified Luciferase mRNA containing the FI 3'UTR show comparable expression levels as the corresponding mRNA containing the 2hBg 3'UTR.

B: Shows the percentage of gp70-specific CD8 T cells in response to gp70 mRNA containing the FI 3'UTR or the 2hBg 3'UTR. The two 3'UTRs perform equally well in inducing antigen-specific immunity after two immunizations, with a significant increase of antigen-specific CD8 T cells in the spleen of those mice that had received gp70 mRNA containing the FI 3'UTR.

Statistics: One-way ANOVA and Tukey's post test, *p<0.05.

Figure 9:
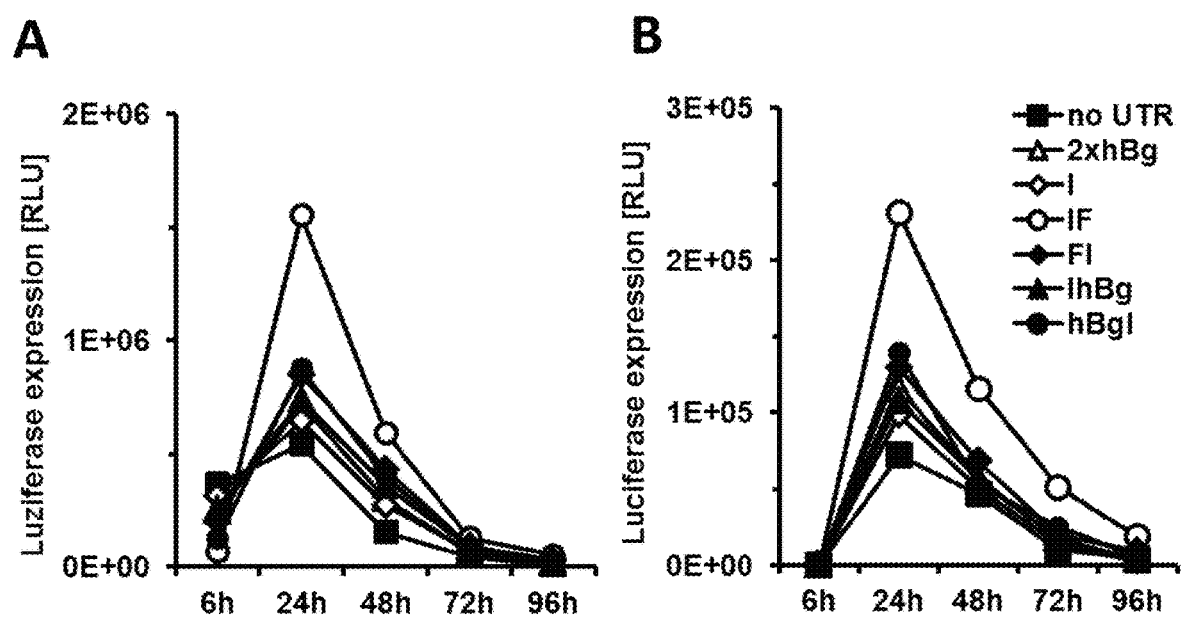

FIG. 9: Effect of stabilizing UTRs on stability of self-replicating RNA

Destabilized Luciferase (Luc2CP) was cloned immediately upstream of the 3'conserved sequence element of a non-cytotoxic Semliki Forest virus derived self-replicating (replicon) RNA. Replicon RNA was prepared by in vitro transcription from a corresponding linearized plasmid and electroporated into cells. Luciferase expression was measured by adding luminescent substrate for 96 h to 120 h.

A: Time course of luciferase expression in a representative experiment with BHK21 cells.

B: Time course of luciferase expression in a representative experiment with human foreskin fibroblasts (HFF). To reduce cytotoxicity of released type I interferons, Vaccinia virus B18R mRNA was cotransfected in each sample. To inhibit protein kinase R activation and increase the overall level of translation, Vaccinia virus E3 mRNA was cotransfected in each sample.

FIG. 10: homology stretches in the FI Element.

The underlined sequence stretches were predicted to base-pair with each other. For the "8nt mutation" construct, the first element was mutated to aaagggcu to disrupt interactions with the second element.

Figure 11:
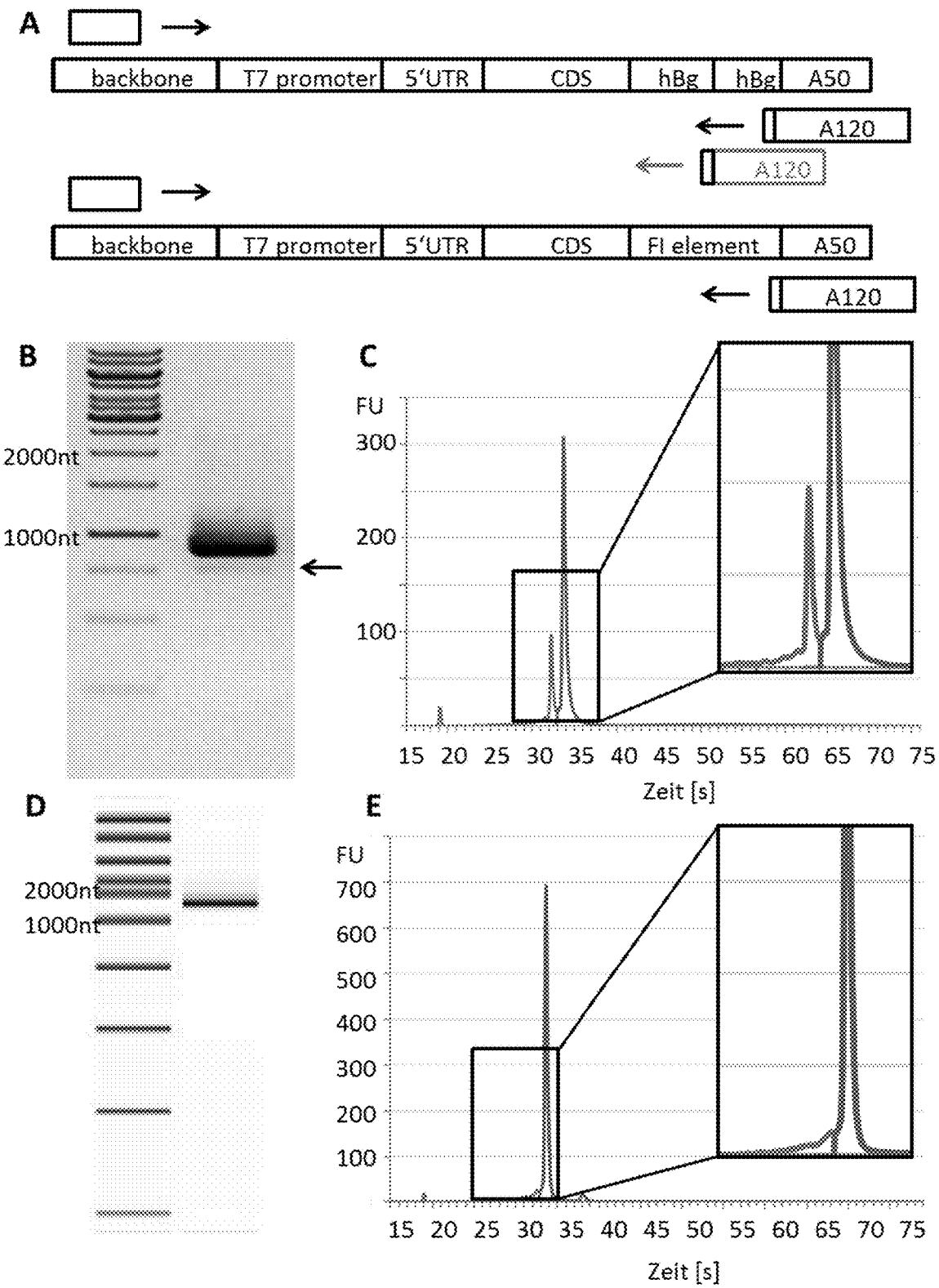

FIG. 11: Artefacts in PCR-template based IVT using 2hBgUTR.

A: Schematic representation of IVT template generation via PCR. The 5' primer anneals upstream of the T7 Promoter, the 3' primer contains a 120nt polyA tail and anneals to the plasmid-encoded polyA and part of the 3'UTR. In case of the 2hBgUTR, mispriming by annealing to the first repeat can occur.

B: PCR products from a plasmid containing the 2hBgUTR. The red arrow depicts the side product, representing a 1hBg truncation. C: The RNA transcribed from such a PCR product thus also presents a shortened by-product (arrow). D: PCR products from a plasmid containing the FI element as 3'UTR. No side product is visible. E: The resulting mRNA is of the expected high integrity without any additional side-peaks.

Figure 12:
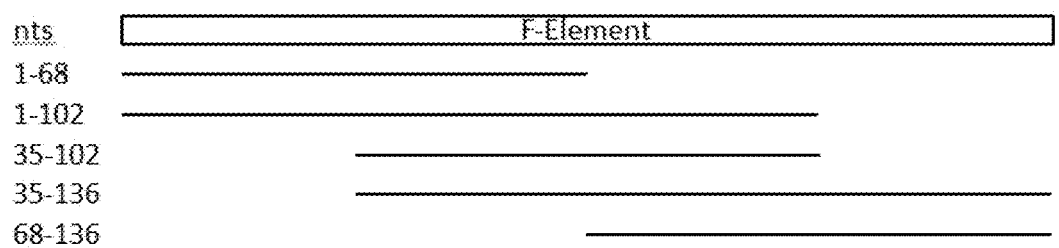
Figure 12:
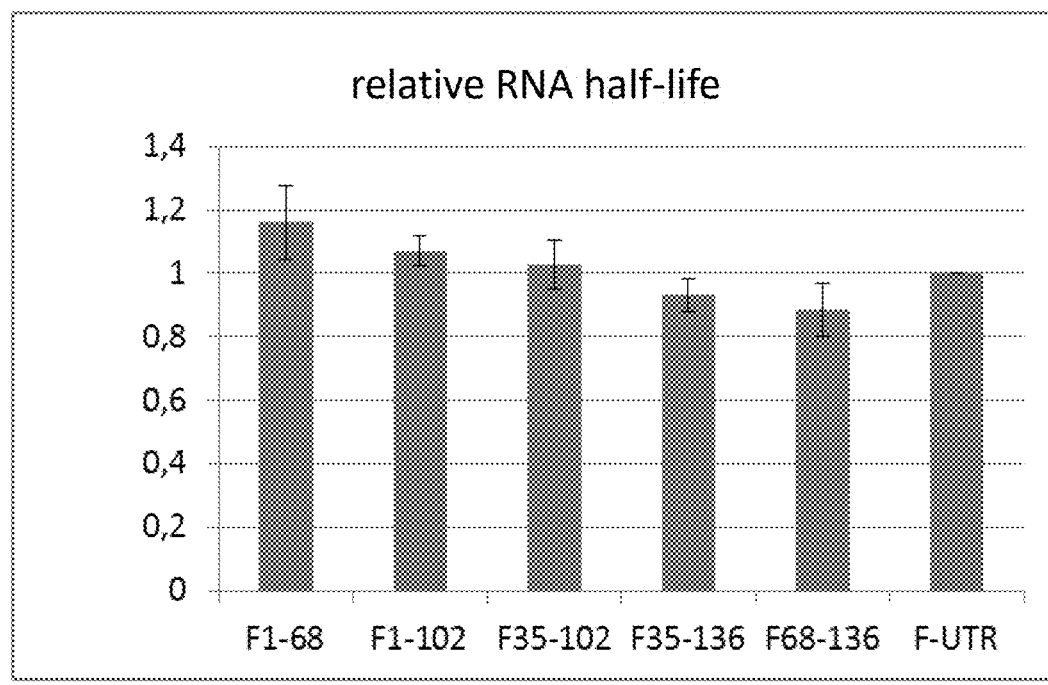
Figure 12:
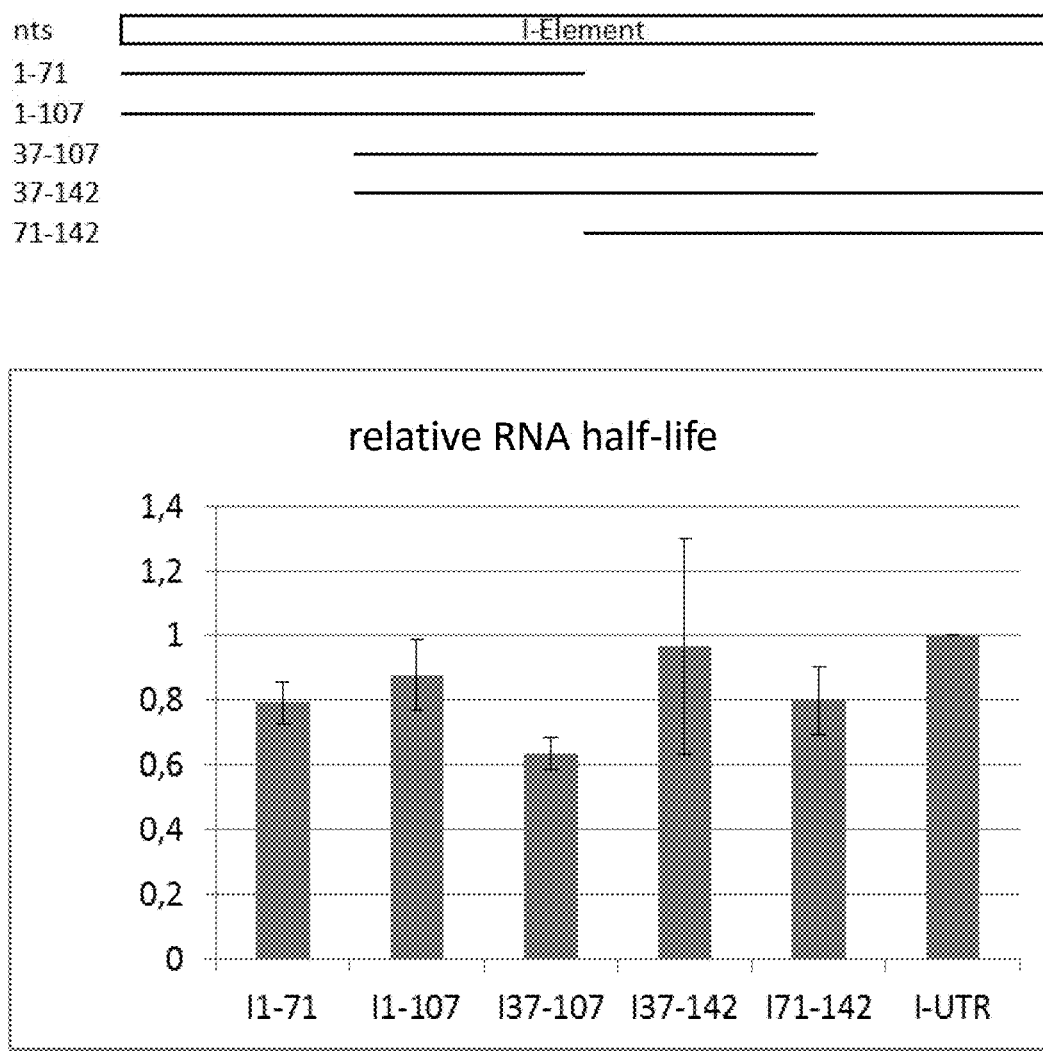

FIG. 12: Schematic representation of the truncated UTR elements and half-life of corresponding mRNA constructs.

A: The upper panel shows a schematic representation of the truncated UTR elements in reference to the nucleic acid positions of the full length sequence of the F-element SEQ ID NO: 86 covered by those truncated variants.

The lower panel shows the relative half-life of mRNA comprising the truncated UTR in reference to mRNA comprising the full length sequence of the F-element SEQ ID NO: 86. The mRNAs encoding a Luciferase reporter were electroporated into hiDCs and their expression was followed over time by Luciferase measurements to determine relative RNA half-life.

B: The upper panel shows a schematic representation of the truncated UTR elements in reference to the nucleic acid positions of the full length sequence of the I-element SEQ ID NO: 115 covered by those truncated variants.

The lower panel shows the relative half-life of mRNA comprising the truncated UTR in reference to mRNA comprising the full length sequence of the I-element SEQ ID NO: 115. The mRNAs encoding a Luciferase reporter were electroporated into hiDCs and their expression was followed over time by Luciferase measurements to determine relative RNA half-life.

Figure 13:
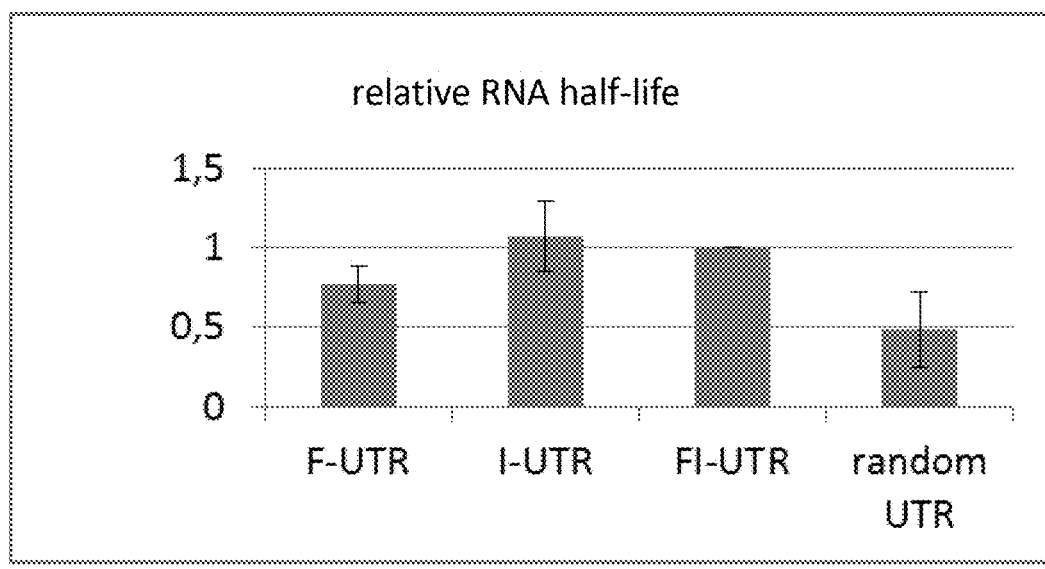
Figure 13:
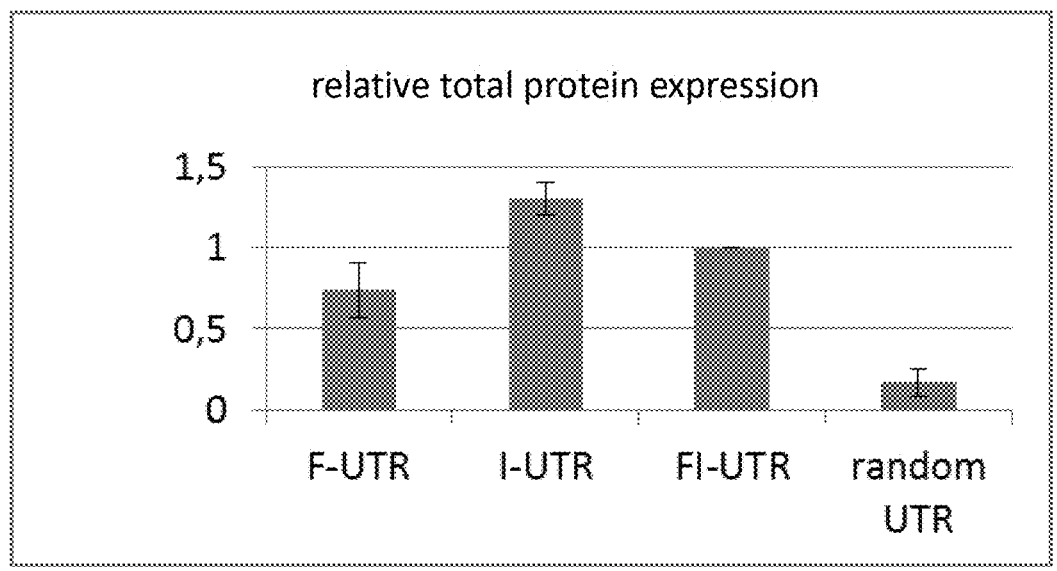

FIG. 13: Relative half-life and protein expression from mRNA constructs comprising of F, I or FI elements towards random UTRs.

FIG. 13 shows the relative half-life and protein expression from mRNA constructs comprising of F, I or FI elements towards random UTRs. For this full length individual F and I elements as well as the FI combination were compared towards a random 3' UTR (257nt in length). All elements were cloned into luciferase-encoding constructs, in vitro transcribed to mRNA, electroporated into hiDCs, luciferase expression measured over time, and the relative half-lifes and total protein expression calculated.

Figure 14:
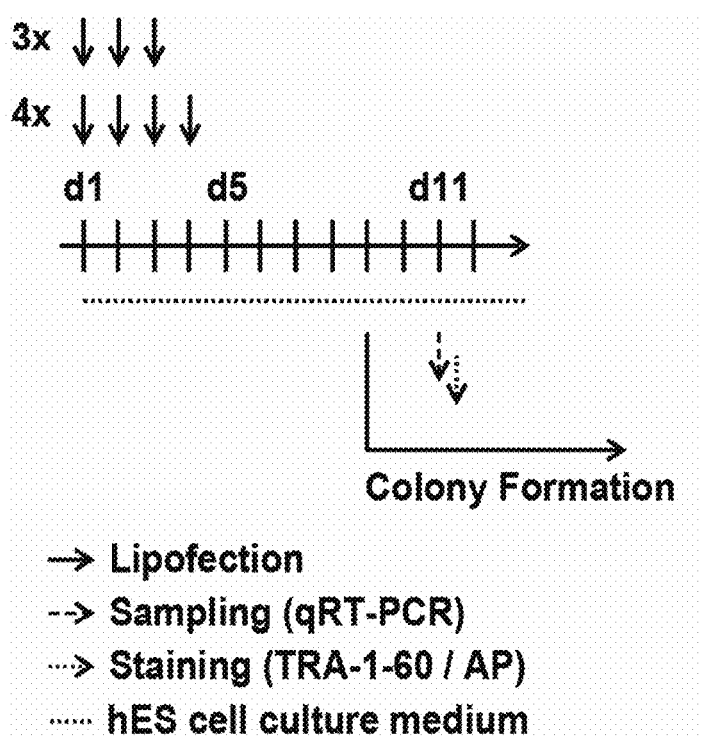
Figure 14:
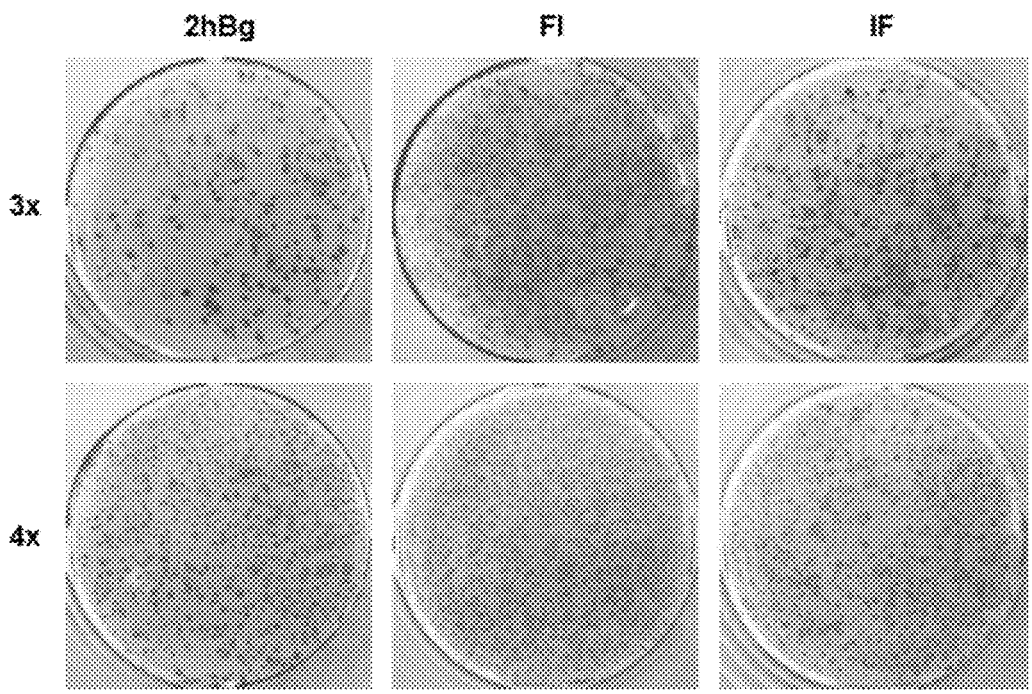
Figure 14:
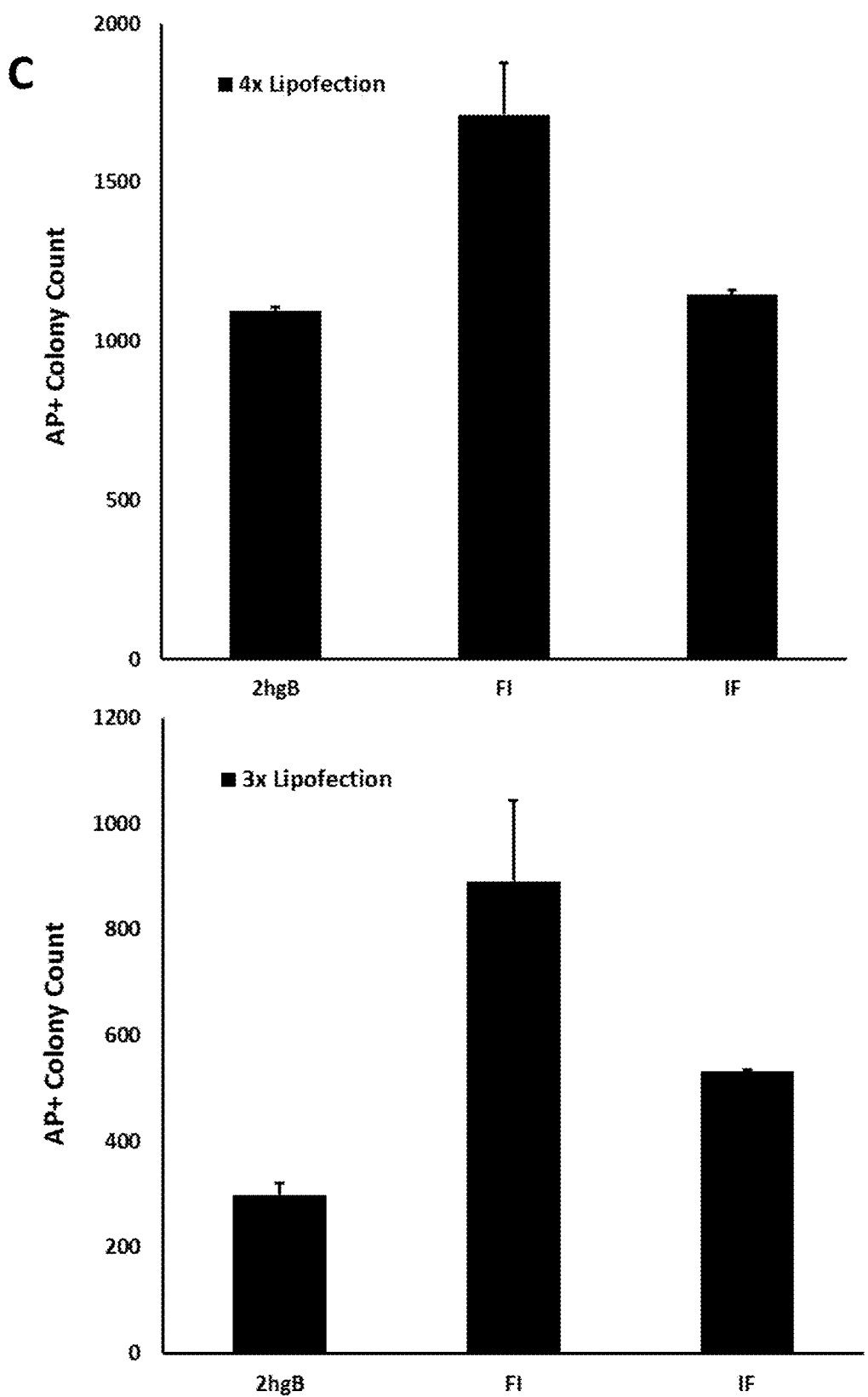
Figure 14:
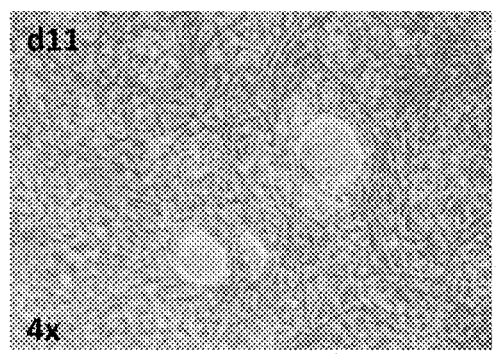
Figure 14:
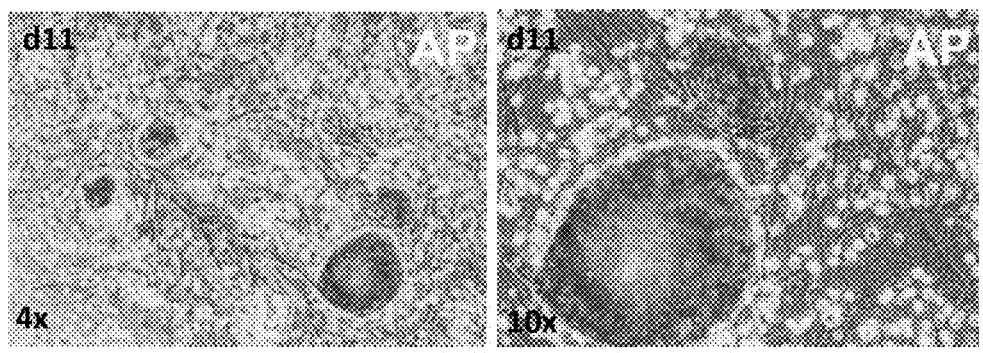
Figure 14:
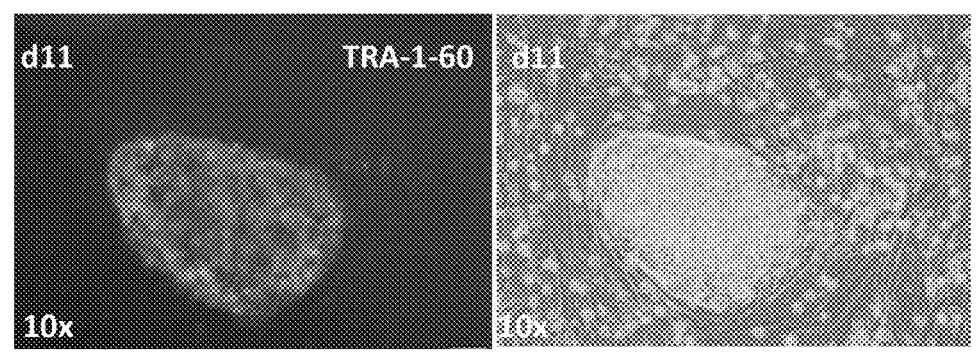
Figure 14:
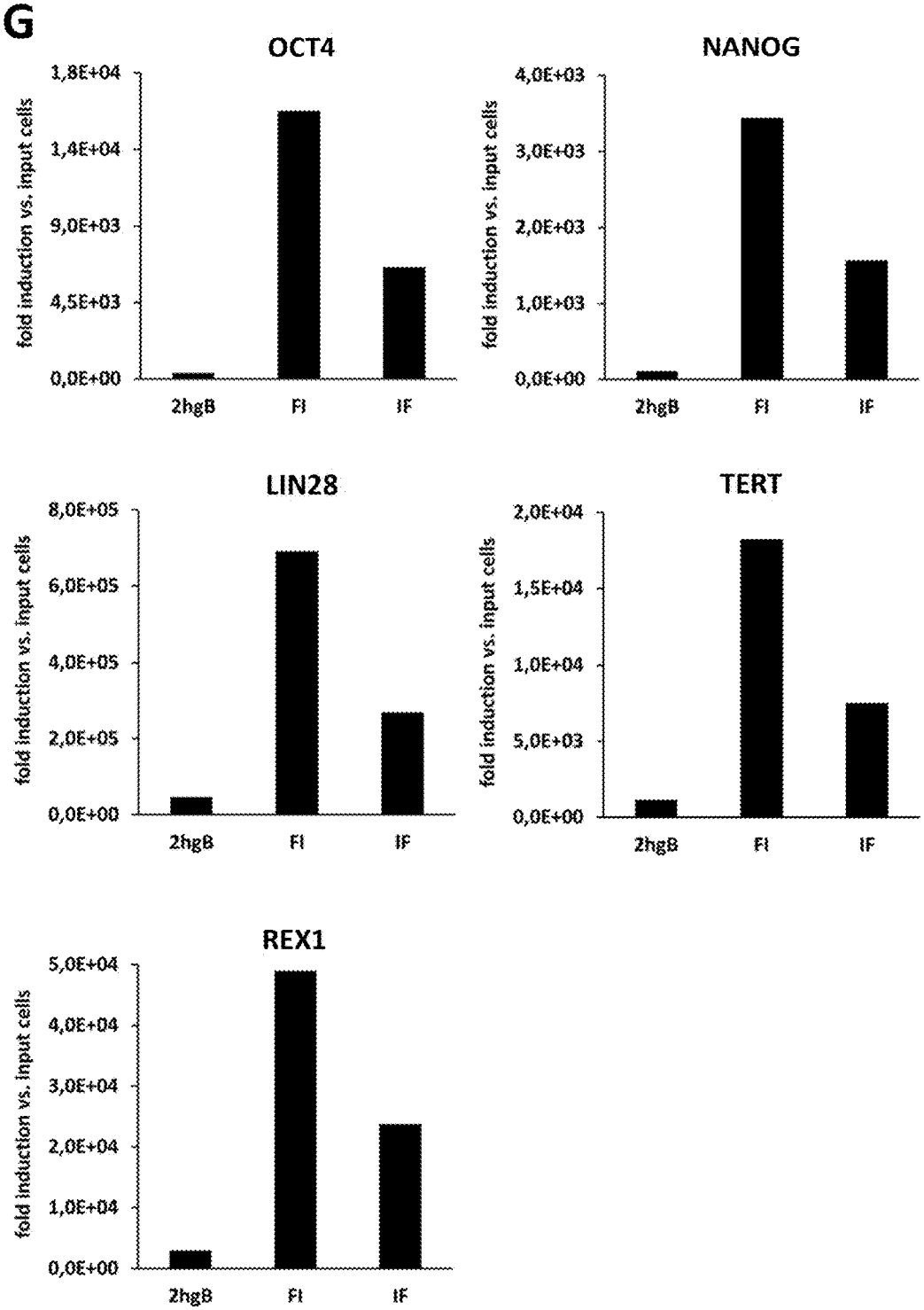

FIG. 14: UTR elements for cellular reprogramming.

A: shows the timeline for the reprogramming of primary human foreskin fibroblasts. 40,000 cells were plated into a 12-well-plate and lipofected for three (3×) or four (4×) consecutive days with mRNA mixtures that were composed of 0.33 µg unmodified in vitro transcribed (IVT)-RNA encoding the reprogramming TF OCT4, SOX2, KLF4, cMYC, NANOG and LIN28 (OSKMNL) (1:1:1:1:1:1) with 0.08 µg of each B18R, E3 and K3 (EKB) and 0.17 µg of a miRNA mixture composed of miRNAs 302a-d and 367 (1:1:1:1:1:1). The RNA-constructs thereby only differed in their 3'UTR consisting of a tandem repeat of the human β-globin 3'UTR (2hBg), the F-I-element (FI) or I-F-element (IF). From day 9 on, colony formation was observed and analysis of colonies were performed on d11.

B: shows a alkaline phosphatase (AP) staining of the established colonies.

C: shows a corresponding bar chart representing the counted numbers of the AP positive colonies.

D: shows the morphology of resulting iPS-cell colonies using RNAs containing the FI-UTR. It was hES cell-like with tightly packed small cells in distinct colonies and well-defined borders.

E: shows the colonies prepared as in D stained positive for AP in four- and tenfold magnification.

F: shows colonies prepared as in D in a live staining of the hES cell surface marker TRA-1-60.

G: shows the mRNA-expression of the hES-markers OCT4 (endogenous), NANOG (endogenous), LIN28 (endogenous), TERT and REX1 evaluated by pelleting the colonies, isolating total RNA and quantifying by qRT-PCR.

EXAMPLES

Example 1: Identification of Sequence Elements that Stabilize mRNAs

To identify novel sequence elements that stabilize mRNAs, we have developed an in vivo selection process using hiDCs as selective environment for the in vitro transcribed RNA. The starting RNA-library was built using naturally occurring mRNA sequences derived from hiDCs. Prior to RNA isolation, the cells were grown for hours in the presence of the transcription inhibitor Actinomycin D (ActD) to preselect stable RNAs. The remaining mRNA was then extracted and reduced to fragments of 200-800 nucleotides, reverse transcribed, and cloned as 3'-UTR in a vector bearing a hAg 5'UTR sequence and a reporter gene, which was chosen as the basis of the selection process. The DNA template used for subsequent library mRNA transcription was amplified via PCR, during which a T7 promotor was introduced via the 5'- and an A60 polyA-tail via the 3' primer. The transcribed mRNA was then introduced in the in vivo selection process, which is comprised of several rounds of in vitro transcription of the library, electroporation of the corresponding RNAs into hiDCs, and extraction and amplification of stable sequences after defined time points. Amplification of the selected sequences was performed via PCR with specific primers, after cDNA synthesis. The resulting PCR products were subsequently used as templates for the new mRNA library. This was done for six rounds, with extraction of the remaining RNAs after 24 hours in round 1, 48 hours in rounds 2 and 3, 72 hours in rounds 4 and 5, and finally 96 hours as well as one and two weeks in round 6 (upon electroporation, the cells were split into three parts and then harvested individually at the time points given).

Monitoring of the selection process after rounds 1 through 5 demonstrated a significant increase of the average half-life of the corresponding RNA pool, which is indicative for an enrichment of stabilizing 3'-UTR-elements (Tab. 1). Nevertheless, the increase in stability was less pronounced with higher rounds. Therefore, the selection process was stopped after a final sixth round, in which the RNA was extracted from cells after 96 hours, one week, and two weeks. To characterize the selected sequences, more than 350 individual clones were sequenced, 108 from round 5, 88 from round 6/96 hours, 110 from round 6/1 week, and 96 from round 6/2 weeks. All sequences were compared to each other as well as BLASTed to identify their genomic origin. Here, it was especially looked at, whether the sequences were derived from endogenous 5'- or 3'-UTRs or from the coding region. Finally, their expression level in hiDCs was downloaded from NextBio (Illumina). In total, seven groups could be identified, (i) for which multiple sequences were found, (ii) which originated from the 3'-UTRs of endogenous RNAs or from an endogenous non-coding RNA, and (iii) which were clearly expressed in hiDCs (Tab. 2). These are derived from the following genes: Fc fragment of IgG, receptor, transporter, alpha (B, FCGRT, NM_001136019), Lymphocyte specific protein 1 (D, LSP1, NM_002339), Chemokine ligand 22 (E, CCL22, NM_002990), Amino-terminal enhancer of split (F, AES, NM_198969), Phospholipase D family member 3 (G, PLD3, NM_001031696), Mitochondrially encoded 12S RNA (I, MT_RNR1, NC 012920), Major histocompatibility complex class II DR beta 4 (J, HLA-DRB4, NM_021983). Note that for simplicity the capital letters B to I given in parentheses are used in the following as abbreviations for these elements. Importantly, in all cases the clones for one sequence differ in their exact 5'- and 3'-ends, demonstrating that these come from different starting clones and are not simply artificially enriched during the process (see appendices for a complete listing of all sequences identified in the screening).

Example 2: Characterization of Individual Sequence Elements Identified

For characterization of the identified sequence elements, a representative candidate of each group was chosen (detailed sequences are marked in the appendix). This sequence was then cloned as 3'-UTR in a vector with a luciferase reporter gene, whose expression level can be analyzed over time upon transfer into cells. It has been previously demonstrated that from the expression pattern observed for the protein the relative stability and translational efficiency of the RNA can be accurately inferred (Kuhn 2010 Gene Ther.). The specific reporter used in this experiment, luc2CPmut, is a destabilized form of luciferase (Promega). This allows detecting even small changes in the stability of the RNA. The in vitro transcribed RNA coming from these vectors was then compared with our gold-standard-mRNA, i.e. containing the 2hBg 3'-UTR, regarding RNA stability and translational efficiency. As control samples an in vitro transcribed RNA without a 3'-UTR (i.e. only containing sequences used for cloning the inserts) and one with only a single Beta-globin element (1hB) were used.

Starting with the UTR containing vectors, the region to be transcribed was amplified by PCR using a 5' primer containing the T7 promoter and a 3' primer with a poly(A)-tail of 60 nucleotides. Cleanup of PCR fragments was done using AGENCOURT AMPURE XP (Beckman Coulter). 0.6 volume of beads were added to each PCR reaction and mixed. After a 15 min incubation at RT PCR, PCR products bound to the beads were separated via magnetic stand from excess primers, nucleotides, salts, and enzymes. Beads were washed twice for 30s with 80% ethanol to further remove contaminants. The desired PCR products were finally eluted twice with 30 μL ddH2O and used as template for in vitro transcription of the corresponding RNAs. For in vitro transcriptions T7 RNA polymerase (Fermentas), the respective reaction buffer and 6 mM NTPs were used. For efficient capping of the RNA the GTP concentration was lowered to 1.5 mM and 6 mM of β-S-ARCA(D2) were added to the reaction and incubated for 2.5 h at 37° C. RNA was purified via carboxylated magnetic beads (Invitrogen) and RNA concentration and quality were assessed by spectrophotometry and analysis on a 2100 Bioanalyzer (Agilent).

Consistent with their identification in the screening approach, all of the new sequences showed very similar characteristics compared to 2hBg regarding RNA stability with group I (mtRNR1) as the best (FIG. 3; Tab. 3). Importantly, each individual element conferred RNA stabilization compared to the RNA without a 3'-UTR and even compared to the RNA with only a single copy of the Beta-globin element. The translation efficiency was not significantly affected, as observed by the direct correlation between RNA stability and total protein expressed over time.

Example 3: Combination of Individual Sequence Elements

In a further experiment, single sequences of each group were combined with each other in a pair-wise manner (FIG. 2). The rationale behind this was our previous observation that the combination of two 3'-UTRs had an additional effect on the stability and translational efficiency of the RNA (Holtkamp et al. 2006). Stability and translational efficiency of the RNA were calculated in R by interpolating the measured Luciferase values with a spline, from which the steepest rising slope was defined as translational efficiency and the half-life of the signal as stability. The integral of the interpolated spline is interpreted as total protein expression. In total 64 combinations were cloned, i.e. all possible combinations of the seven newly identified sequences and of the human beta-globin 3'-UTR (Tab. 6). As described above, RNA was prepared from these template DNAs, and then electroporated in hiDCs. As controls, RNAs containing the individual elements were also included. For the majority of the seven new elements it was observed that at least one combination with another element gives an RNA with a higher stability than with just the single element (Tab. 7 to Tab. 13). Interestingly, in most cases the combination with the I element (mtRNR1) increased the half-life of the RNA. Here, the stability of the RNA was generally even higher compared to an RNA with the 2hBg 3'-UTR (Tab. 7 to Tab. 13). Almost all combinations had a positive effect on the translational efficiency of the RNA. In total, the combined effects on RNA stability and translational efficiency result in an increase of the total protein expression of up to 1.74-fold. Thus, we could identify single elements (with lengths below 233 nucleotides) as well as combinations of two different elements that give rise to RNAs with increased stability and/or translational efficiency, but at the same time avoiding the problems with having two identical copies of one element as described above for 2hBg.

To verify the results obtained with the destabilized form of luciferase, the previous experiments were repeated with RNAs bearing the standard luciferase (Promega), and the following selected 3'-UTRs: mtRNR1 (I), mtRNR1-AES (IF), AES-mtRNR1 (FI), mtRNR1-hBg (IhBg) and hBg-mtRNR1 (IhBg). As shown in FIG. 4 and Tab. 14, equivalent results as observed above could be obtained, verifying that the new elements, individually or in combination, increase mRNA stability and/or translational efficiency similarly as the 2hBg element.

Example 4: Analysis of mRNAs Bearing Selected Sequence Elements in Other Cell Types The newly selected 3'-UTRs mtRNR1 and AES were also tested in different cell types and cell lines to see if there is a hiDC-specificity. The sequences were tested in human fibroblasts (HFF), murine myoblasts (C2C12) (FIG. 5) and T cells (FIG. 6) to assess whether they are also stabilizing in these cells.

HFF and C2C12 cells were harvested and prepared for electroporation. 2.0 µg IVT-RNA were next electroporated together with 1.0 µg GFP encoding RNA containing the indicated 3'UTRs. After electroporation cells were splitted. 5000 cells per well were distributed into a 96-well plate in triplicates for in total 7 time points (2, 4, 8, 24, 48 and 72 h) to measure luciferase activity. 2E+05 cells per well were plated into 6-well plates to harvest for FACS after 24 h (GFP-signal). This allowed monitoring of transfection efficiencies. These differed between 72 and 90% and could be included into calculation of half-life. Results obtained with HFF and C2C12 as well as T cells confirmed results obtained previously with hiDC. The combination of I with F was in particular 2- to 3-fold better in half-life compared to 2hBg. Moreover, FI showed a 3-fold better translational efficiency in C2C12 cells and a 2-fold better protein production over time compared to our gold-standard. These results showed, that I and F are not hiDC-specific, but do also enhance mRNA stability and translational efficiency in other cells.

Example 5: The FI 3'UTR Increases Expression from Modified mRNA

For some applications, including protein replacement therapy, mRNAs with modified nucleotides are preferable to unmodified ones due to their decreased immunogenicity (Kariko et al., 2008). However, base modifications might have an effect on the stability of an mRNA either by directly influencing the interaction with a corresponding RNA binding protein or by altering secondary structure formation of the RNA. Accordingly, the selected 3' UTRs might behave differently in the context of modified mRNAs. Therefore, we compared the combination of F and I with the 2hBgUTR in the context of m1Y modified mRNA in hiDCs, HFFs, CD8+ and CD4+ T-cells and in murine MEFs, C2C12 and bmDCs. As reporter, Luciferase was used (see FIG. 7, A for construct design). For generation of modified mRNAs, U was completely replaced by m1Y in the IVT reaction. In all experiments, unmodified RNA was included as a control. The integrities of the obtained mRNAs were not affected by the exchange of UTP for m1YTP (FIG. 7, B). Cells were electroporated using the settings described in Tab. 15, and Luciferase levels were measured at 3, 6, 12, 24, 48, 72 and 96 h.

Electroporation of unmodified Luciferase mRNA could reproduce the effects seen before: In all cell types the FI element was equal to or superior to the 2hBg control in conveying RNA stability (Tab.16A). Whereas in murine DCs and human T-cells the mRNA half-lifes were comparable between the two 3'UTR, the FI element increased mRNA half-lifes up to 1.69-fold in HFF cells. The total protein amount was increased in all cell lines, most prominently in HFF cells (2.45 fold).

With modified mRNA, the FI element also led to an increase in mRNA half-life compared to 2hBg in hiDCs, the total protein amount was increased more than two-fold (Tab. 16B). The results in other cell types are also similar to the ones obtained with unmodified mRNA: The FI element was superior to 2hBg in all experiments involving HFF, MEF and C2C12 cells and comparable in T-cells and murine DCs (Tab. 16B). Therefore, U modification does not alter the ability of the FI element to stabilize the mRNA.

Example 6: The FI 3'UTR Increases Expression from mRNA Irrespective of the Transfection Method So far, all experiments were done with electroporation as transfection method. With electroporation, the delivered mRNA arrives directly in the cytoplasm, under circumvention of an endosomal uptake route, which is taken upon transfection via lipofection. To see whether the FI element also functions under these conditions, cells were lipofected with the same FI and 2hBg containing Luciferase mRNAs as used in previous experiments using RNAiMAX as a transfection reagent. Also upon lipofection, the FI element increased Luciferase expression, though the increase was less pronounced compared to experiments where the RNA was delivered via electroporation (Tab. 16C). Therefore, the transfection method does not have an impact on the stabilizing effect of the FI element.

Example 7: FI 3'UTR and the 2hBgUTR Containing mRNA Lead to Comparable Protein Expression and Immune Activation In Vivo To assess protein expression from mRNA containing the FI 3'UTR in vivo, the same FI and 2hBg containing Luciferase mRNAs as used in previous experiments were formulated with F12 and administered i.v. into BALB/c mice. As shown in FIG. 8, luciferase expression was comparable for both 3'UTRs. Antigen specific immune response was also induced to a comparable extent, with the effect of the FI 3'UTR containing mRNA being slightly stronger in the spleen.

Example 8: IF UTR Leads to Increased Stability of Self-Replicating RNA In Vitro

In vitro transcribed self-replicating RNA (replicon RNA) derived from alphaviral genomes are potent vaccine vectors. Replicon RNA encodes on the first two thirds the enzyme complex necessary for cytoplasmic replication (replicase) of the replicon RNA. This replicase recognizes an internal RNA structure that acts as subgenomic promoter for the replicase-dependent synthesis of subgenomic RNAs. Transgenes or antigens for vaccination are encoded on this subgenomic RNA which is significantly shorter than the whole replicon. Overall, both genomic (i.e. the full length replicon RNA) and subgenomic RNA ressembles cellular mRNA. Both are flanked by UTRs, both are capped and poly-adenylated. The enzymes responsible for capping and poly-adenylation are contained in the replicase enzyme complex. Conserved sequence elements (CSE) within the UTRs—overlapping with the ORF of the replicase in case of the 5'CSE—are required for binding of replicase and act as promoters for minus strand synthesis (3'CSE) or plus-strand synthesis (5'CSE).

To assess whether the novel stabilizing UTRs identified and validated for non-replicating in vitro transcribed mRNA provide greater stability, and thereby higher transgene expression, of replicon RNA, we cloned the respective sequences into replicon RNA template vectors. As the 3'CSE needs to be located immediately adjacent to the poly-A tail we inserted the novel UTRs immediately upstream of the 3'CSE of a replicon encoding destabilized luciferase (Luc2CP). Replicon RNA was synthesized by in vitro transcription of linearized template plasmids similar to IVT mRNA. The replicon RNA was introduced into cells (BHK21 and HFF) by electroporation, and luciferase expression was assessed. As shown in FIG. 9, all inserted UTRs increased the translation of Luc2CP in both cell lines used. Interestingly the "IF" UTR combination resulted in an outstanding increase of translation.

Example 9: Nucleotide Exchanges Up to 90% Homology have No Impact on the Stabilizing Properties of the FI Element Due to the selection procedure that was applied to identify novel stabilizing UTR elements, sequences in a certain size range were obtained. The identification of the same sequences with prolonged 5' and 3' ends gave a first indication for the minimal length required. However, the minimal region required for each element to exert its stabilizing effect might be even shorter. In addition, slight variations of the sequences might still be functional, i.e. identity of any individual nucleotide might not be of the utmost importance to the stabilizing properties of the FI element. To see to which degree the elements are robust against nucleotide exchanges, 3' UTR sequences with 97.5%, 95.0%, 92.5% and 90.0% homology to the original FI element were tested for total protein expression and mRNA half-life in hiDCs. The nucleotides that were changed were chosen randomly over the whole sequence length (sequences 208-211, random modifications). Luciferase mRNAs with these modified elements as 3'UTR were in vitro transcribed, electroporated in hiDCs and their expression was followed over time by Luciferase measurements after 3, 6, 24, 48, and 72 h. Luciferase mRNAs with the modified FI element yielded the same overall protein amount and had approximately the same half-life (Tab. 17). In addition to the random substitutions with increasing degrees as described above, another set of modified FI elements were generated by rationally introducing nucleotide substitutions which are likely to disrupt the secondary structure of the FI element. For multiple natural 3' UTR sequences it is known that their secondary structure is of importance because it provides binding sites for regulatory proteins, which influence mRNA stability (Addess et al., 1997; Putland et al., 2002; Crucs et al., 2000; Adams et al., 2003) Two 8nt sequences which are perfectly complementary to each other are present in the FI element, one in the F and the other in the I element (FIG. 10). Base pairing of these two regions can also be seen in most mfold predictions. mFold (Zuker, 2003) is a computer program allowing secondary structure predictions of input sequences. To check for the importance of this specific secondary structure element, the sequence was changed in a way that abolishes base pairing (sequence 212, 8nt mutation). Besides this rather long complementary sequences, mfold predictions for the FI 3'UTR were screened for structure elements present in most of the output folds, which should therefore have a high probability of forming in vivo. The nucleotides involved in base-pairing of these folds were changed to 97.5%, 95.0%, 92.5% and 90.0% homology to the original FI sequences by swapping them with their base-pairing partners, thereby retaining the secondary structure of the sequence (sequences 217-220, structure retaining modifications). In addition, the same sequences were exchanged on only one strand of the double-stranded part, thereby deliberately destroying the secondary structure. In these cases, the identity to the original sequence was 98.75%, 97.50%, 96.25%, and 95.00%, respectively (sequences 213-216, structure destabilizing modifications).

Luciferase RNAs with the described modified 3' UTR elements were in vitro transcribed, electroporated in hiDCs and their expression was followed over time by Luciferase measurements after 3, 6, 24, 48 and 72 h.

With neither modification strategy any significant impact on mRNA half-life could be observed. Therefore, the stabilizing properties of the FI element seem to be robust against changes in its nucleotide sequence or secondary structure at least up to 10.0% varied nucleotides. Also, no decline in total protein amount could be observed upon modification of the FI sequence (Tab. 18 A and B).

Example 10: Using the FI Element Instead of 2hBg Avoids Mispriming in PCR-Based Amplification of the RNA-Encoding Region As has been shown, the FI element is equal or superior to the 2hBg 3'UTR with regard to mRNA stability and translation efficiency. Another advantage of the FI Element is its non-repetitive sequence, whereas the two copies of the hBg 3'UTR can cause problems in some instances.

This is most obvious, when the DNA template for RNA transcription is amplified by PCR. In such cases, the full-length polyA-tail is added with the 3' primer oligo that binds at the very 3' end of the 3' UTR (FIG. 11, A). In the case of the 2hBgUTR, truncated side-products emerge during the PCR, which after sequencing turned out to consist of mRNA with only 1hBg repeat in the UTR (FIG. 11, B). After transcription, the truncation is also visible in the mRNA (FIG. 11, C). This phenomenon occurs in the majority of PCR reactions with constructs containing the 2hBgUTR element and cannot be abolished completely via optimization efforts including primer annealing temperature, buffer composition, primer sequence or alternative polymerases. Even after insertion of an unique linker sequence between the 3' UTR and the polyA-tail, the problem remains. Importantly, the strength of the side-peak correlated with the PCR reaction yield, indicating mispriming of short truncated PCR fragments, which increase with each PCR cycle, as probable cause of the problem. Therefore, no satisfactory conditions could be identified for DNA templates coding for RNAs with the 2hBg 3'-UTR.

In contrast, PCR of DNA templates with the FI element did not yield any truncated side-products (FIG. 11, D), and also the resulting mRNA showed no additional peak in the Bioanalyzer profile (FIG. 11, E). Therefore, the FI element constitutes a considerable improvement as a 3'UTR compared with the 2hBgUTR with regard to PCR template integrity and corresponding RNA quality.

Example 11: RNA-Stabilizing Properties of Subfragments of the F and I Elements Due to the selection procedure that was applied to identify novel stabilizing UTR elements, sequences in a certain size range were obtained. The identification of the same sequences with prolonged 5' and 3' ends gave a first indication for the minimal length required. However, the minimal region required for each element to exert its stabilizing effect might even be shorter. To this end, for both the F and I element five Luciferase reporter constructs were designed, each containing a shortened UTR covering a different fragment of the original element shortened at the 5' and/or 3' end (see FIG. 12 upper panels A and B, respectively). These reporter constructs were in vitro transcribed, electroporated into hiDCs and their expression was followed over time by Luciferase measurements 3, 6, 24, 48 and 72 h after electroporation. The resulting expression curves were analyzed for relative RNA half-life with the RNA containing the respective full-length set to 1 (see FIG. 12 lower panels A and B, respectively).

For the F-element, no significantly decreased mRNA half-life could be observed for any subsequence tested, indicating a redundant, non-cooperative involvement of various subsequences along the F-element in its stabilizing role. A similar result could be obtained for the I-element, though here a slight drop in performance could be observed when only the central region (nt37-107) was used as 3'UTR.

To put these results into perspective, full length individual F and I elements as well as the FI combination were compared to a randomly selected 3' UTR from the starting library (257nt in length) This was obtained by cloning the starting DNA pool and selecting a single random clone. As described above luciferase-encoding RNAs with the respective UTR sequences were electroporated into hiDCs, luciferase expression measured over time, and the relative half-lifes and total protein expression calculated. Compared to the F, I, and FI elements, the RNA with the randomly selected 3' UTR is significantly less stable (FIG. 13, upper panel). The effect of the selected UTRs is even more pronounced for the total protein expression (FIG. 13, lower panel). This clearly indicates that the effect of the fragments of the F and I elements as described above are specific for the selected sequences and not simply caused by the presence of a 3' UTR sequence. This is in-line with the observed increase in RNA stability of the pool during selection (see above).

Example 12: Use of Stabilizing UTR Elements for Stem Cell Reprogramming 40,000 cells were plated into a 12-well-plate and lipofected for three (3×) or four (4×) consecutive days with mRNA mixtures that were composed of 0.33 µg unmodified in vitro transcribed (IVT)-RNA encoding the reprogramming TF OCT4, SOX2, KLF4, cMYC, NANOG and LIN28 (OSKMNL) (1:1:1:1:1:1) with 0.08 µg of each B18R, E3 and K3 (EKB) and 0.17 µg of a miRNA mixture composed of miRNAs 302a-d and 367 (1:1:1:1:1:1). The RNA-constructs thereby only differed in their 3'UTR consisting of a tandem repeat of the human β-globin 3'UTR (2hBg), the F-I-element (FI) or I-F-element (IF). Cells were cultivated in human embryonic stem (hES) cell medium and lipofections using RNAiMAX were performed according to the manufacturers instructions. From day 9 on, colony formation was observed and analysis of colonies were performed on d11 (see FIG. 14, A for timeline overview). Established colonies were stained for alkaline phosphatase (AP) on day 11 using an AP Staining Kit. For an overview representative stainings are shown in FIG. 14, B. It became obvious that the incorporation of the FI-element results in higher amounts of AP positive colonies (dark). Colonies stained for AP were counted and results from the overview was confirmed: In comparison to the previously used 2hBg-UTR, replacement with the FI-UTR leads to a 3-4 fold excess of colonies when cells were lipofected 3 times. Replacement with the IF-UTR results in an 2 fold excess. With four transfections these effects are less pronounced. No improvement is here observed with the IF-UTR. On one side the process seems to be in a saturation with four transfections whereas on the other side counting of colonies is here to some extent biased due to overgrowth of colonies (see FIG. 14, C). Colony morphology of resulting iPS-cell colonies using RNAs containing the FI-UTR was hES cell-like with tightly packed small cells in distinct colonies and well-defined borders (FIG. 14, D). These colonies could be stained positive for AP (FIG. 14, E) and the hES cell surface marker TRA-1-60 (FIG. 14, F). TRA-1-60 live staining was performed with the Stain-Alive TRA-1-60 antibody (Stemgent) according to the manufacturers instructions. Representative pictures of colonies are shown. To further assess pluripotency of colonies, cells were pelleted, total RNA isolated and mRNA-expression of the hES-markers OCT4 (endogenous), NANOG (endogenous), LIN28 (endogenous), TERT and REX1 was quantified by qRT-PCR. mRNA expression was normalized to that of HPRT and is shown as fold induction compared to the transcript levels of input cells. Analysis of colonies after 3 lipofections is shown in FIG. 14, G. All analyzed markers were highly expressed compared to input cells indicating pluripotency of reprogrammed cells. Superiority of FI-containing synthetic mRNA was confirmed by a higher endogenous marker expression compared to reprogramming with the 2hBg- and IF-containing mRNAs.

These results show, that replacement of the 2hBg-UTR with the FI-UTR results in a more rapid and efficient RNA-based reprogramming technology. This is probably based on the longer and higher expression of reprogramming transcription factors resulting from the substitution with the FI-element. Orientation of the FI element seems thereby indispensable since the benefit was not observed with the IF-constructs. Successful reprogramming of cells by FI-containing mRNAs was confirmed by hES-cell like morphology, AP-activity and the expression of hES-cell surface and endogenous markers of resulting iPS-cell colonies.

TABLE 1 mRNA half-life in hours (h) calculated from data of real-time reverse transcriptase-PCR (RT-PCR) experiments to monitor progress of selection. mRNAs were quantified 8, 24, and 48 hours after electroporation. In experiment I (left), each sample was analysed only once. Accordingly, no standard deviation is given.

| Sample | mRNA half life | Sample | mRNA half life |
|---|---|---|---|
| 2hBg | 7.5 h | 2hBg | 13.5 ± 0.2 h |
| lib | 4.5 h | Rn4 | 13.9 ± 0.7 h |
| Rn1 | 4.9 h | Rn5 | 16.5 ± 0.7 h |
| Rn2 | 6.7 h | | |
| Rn3 | 7.5 h | | |

TABLE 2

Overview of the 7 main groups with the binding region (BR) within the 3'-UTR of the BLASTed sequence. Shown are group abbreviation, number of clones identified for the group (no.), genomic origin with respective abbreviation (Abbr.), NCBI code and position within the sequence with respect to the coding region. According to NextBio all sequences are upregulated in hiDC.

| Group | no. | BLAST-result with representative sequence of each group. Homo Sapiens | Abbr. | NCBI code | BR |
|---|---|---|---|---|---|
| B | 50 | Fc fragment of IgG. receptor. transporter. alpha. mRNA (cDNA clone) | FCGRT | NM_001136019 | 3'-UTR |
| D | 22 | Lymphocyte-specific protein 1. mRNA | LSP1 | NM_002339 | 3'-UTR |
| E | 13 | Chemokine (C-C motif) ligand 22. mRNA | CCL22 | NM_002990 | 3'-UTR |
| F | 4 | Amino-terminal enhancer of split. mRNA | AES | NM_198969 | 3'-UTR |
| G | 15 | Phospholipase D family. member 3. mRNA | PLD3 | NM_001031696 | CDS + 3'-UTR |
| I | 17 | Mitochondrially encoded 12S RNA | MT-RNR1 | NC_012920 | ncRNA |
| J | 22 | Major histocompatibility complex. class II. DR beta 4. mRNA | HLA-DRB4 | NM_021983 | 3'-UTR |

TABLE 3

Values calculated relative to our gold-standard 2hBg for half-life and total protein over time. Shown are group-name and respective gene.

| | | Relative to 2hBg | |
|---|---|---|---|
| Gene | RefSeq | Half-life | Total protein over time |
| Fc fragment of IgG, receptor, transporter, alpha | NM_001136019 | 0.89 ± 0.15 | 0.96 ± 0.15 |
| Lymphocyte specific protein 1 | NM_002339 | 0.80 ± 0.21 | 0.75 ± 0.03 |
| Chemokine ligand 22 | NM_002990 | 0.82 ± 0.16 | 0.66 ± 0.12 |
| Amino-terminal enhancer of split | NM_198969 | 0.90 ± 0.06 | 0.95 ± 0.01 |
| Phospholipase D family member 3 | NM_001031696 | 0.79 ± 0.21 | 0.66 ± 0.13 |
| Mitochondrially encoded 12S RNA | NC_012920 | 1.15 ± 0.09 | 0.94 ± 0.08 |
| Major histocompatibility complex class II DR beta 4 | NM_021983 | 0.89 ± 0.08 | 0.89 ± 0.09 |

TABLE 4

PCR-conditions for amplification of library and subsequent selection rounds.

| Time | Temperature | Step |
|---|---|---|
| 1 min 30 s | 98° C. | Initial denaturation |
| 20 s | 98° C. | Denaturation |
| 30 s | 65° C. | Annealing |
| 45 s | 72° C. | Extension |
| 5 min | 72° C. | Final Extension |
| ∞ | 4° C. | Hold |

TABLE 5

IVT-T7-transcription reaction.

| | Conc./Vol. | End Conc. |
|---|---|---|
| ddH2O | | Ad 50 μL |
| D1 cap | Variabel | 6.0 mM |
| ATP/CTP/UTP | 100 mM | 7.5 mM |
| GTP | 100 mM | 1.5 MM |
| T7 buffer | 10% | 1x |
| PCR-product | Variabel | 0.05 μg/μL |
| T7 enzyme mlx HC | 10x | 1x |

TABLE 6

Combinations cloned and compared with our gold-standard 2hBg (lower right corner). Single elements cloned twice are shown with asterisks.

| | I | G | B | D | J | E | F | hBg |
|---|---|---|---|---|---|---|---|---|
| I | II* | GI | BI | DI | JI | EI | FI | hBgI |
| G | IG | GG* | BG | DG | JG | EG | FG | hBgG |
| B | IB | GB | BB* | DB | JB | EB | FB | hBgB |
| D | ID | GD | BD | DD* | JD | ED | FD | hBgD |
| J | IJ | GJ | BJ | DJ | JJ* | EJ | FJ | hBgJ |
| E | IE | GE | BE | DE | JE | EE* | FE | hBgE |
| F | IF | GF | BF | DF | JF | EF | FF* | hBgF |
| hBg | IhBg | GhBg | BhBg | DhBg | JhBg | EhBg | FhBg | 2hBg* |

TABLE 7

Result of FCGRT (group B) cloned as single or upstream element combined with one of the other group sequences as downstream element. Bold values are >1.0. Values are relative to 2hBg

| | Relative to 2hBg | | |
|---|---|---|---|
| Sample | Half-life | Translational efficiency | Total protein over time |
| B | 0.840 | 1.320 | 1.300 |
| BB | 0.580 | 1.530 | 0.900 |
| BI | 0.920 | 1.750 | 1.410 |
| BG | 0.780 | 2.300 | 1.430 |
| BD | 0.730 | 1.970 | 1.220 |
| BJ | 0.710 | 1.910 | 1.190 |
| BE | 0.720 | 1.500 | 1.030 |
| BF | 0.760 | 1.720 | 1.220 |
| BhBg | 0.970 | 2.200 | 1.740 |
| hBgB | 0.640 | 1.750 | 1.030 |
| 2hBg | 1.000 | 1.000 | 1.000 |

TABLE 8

Result of LSP1 (group D) cloned as single or upstream element combined with one of the other group sequences as downstream element. Bold values are >1.0. Values are relative to 2hBg.

| | Relative to 2hBg | | |
|---|---|---|---|
| Sample | Half-life | Translational efficiency | Total protein over time |
| D | 0.770 | 0.860 | 1.250 |
| DD | 0.680 | 1.130 | 1.000 |
| DI | 0.960 | 1.440 | 1.270 |
| DG | 0.700 | 1.530 | 1.110 |
| DB | 0.640 | 0.900 | 0.760 |
| DJ | 0.640 | 1.040 | 0.890 |
| DE | 0.690 | 1.000 | 0.970 |
| DF | 0.750 | 1.080 | 1.000 |
| DhBg | 0.840 | 1.120 | 1.020 |
| hBgD | 0.820 | 1.490 | 1.160 |
| 2hBg | 1.000 | 1.000 | 1.000 |

TABLE 9

Result of CCL22 (group E) cloned as single or upstream element combined with one of the other group sequences as downstream element. Bold values are >1.0. Values are relative to 2hBg.

| | Relative to 2hBg | | |
|---|---|---|---|
| Sample | Half-life | Translational efficiency | Total protein over time |
| E | 0.760 | 0.970 | 0.940 |
| EE | 0.600 | 0.950 | 0.670 |
| EI | 0.890 | 1.120 | 0.960 |
| EG | 0.680 | 1.590 | 0.940 |
| EB | 0.570 | 1.470 | 0.850 |
| ED | 0.650 | 1.350 | 0.950 |
| EJ | 0.600 | 1.230 | 0.760 |
| EF | 0.760 | 1.100 | 0.860 |
| EhBp | 0.690 | 1.190 | 0.780 |
| hBgE | 0.880 | 1.630 | 1.050 |
| 2hBg | 1.000 | 1.000 | 1.000 |

TABLE 10

Result of AES (group F) cloned as single or upstream element combined with one of the other group sequences as downstream element. Bold values are >1.0. Values are relative to 2hBg.

| | Relative to 2hBg | | |
|---|---|---|---|
| Sample | Half-life | Translational efficiency | Total protein over time |
| F | 0.500 | 1.760 | 0.970 |
| FF | 0.910 | 1.770 | 1.410 |
| FI | 1.100 | 1.490 | 1.290 |
| FG | 0.850 | 1.680 | 0.980 |
| FB | 0.720 | 1.360 | 0.860 |
| FD | 0.490 | 1.350 | 0.620 |
| FJ | 0.780 | 1.720 | 1.090 |
| FE | 0.730 | 1.660 | 1.080 |
| FhBg | 1.050 | 1.900 | 1.530 |
| hBgF | 0.940 | 2.250 | 1.500 |
| 2hBg | 1.000 | 1.000 | 1.000 |

TABLE 11

Result of PLD3 (group G) cloned as single or upstream element combined with one of the other group sequences as downstream element. Bold values are >1.0. Values are relative to 2hBg.

| | Relative to 2hBg | | |
|---|---|---|---|
| Sample | Half-life | Translational efficiency | Total protein over time |
| G | 0.740 | 1.260 | 1.110 |
| GG | 0.480 | 1.080 | 0.690 |
| GI | 0.990 | 1.010 | 1.000 |
| GB | 0.520 | 0.970 | 0.620 |
| GD | 0.630 | 1.170 | 0.780 |
| GJ | 0.520 | 0.940 | 0.640 |
| GE | 0.500 | 0.730 | 0.550 |
| GF | 0.620 | 0.790 | 0.680 |
| GhBg | 0.740 | 0.990 | 0.860 |
| hBgG | 0.720 | 1.160 | 0.910 |
| 2hBg | 1.000 | 1.000 | 1.000 |

TABLE 12

Result of mtRNR1 (group I) cloned as single or upstream element combined with one of the other group sequences as downstream element. Bold values are. Values are relative to 2hBg.

| | Relative to 2hBg | | |
|---|---|---|---|
| Sample | Half-life | Translational efficiency | Total protein over time |
| I | 1.080 | 1.020 | 1.440 |
| II | 1.170 | 0.830 | 1.030 |
| IG | 1.040 | 1.250 | 1.310 |
| IB | 1.100 | 1.200 | 1.180 |
| ID | 1.190 | 1.580 | 1.510 |
| IJ | 1.080 | 1.430 | 1.330 |
| IE | 1.060 | 1.000 | 1.070 |
| IF | 1.220 | 1.130 | 1.290 |
| IhBg | 1.230 | 1.110 | 1.210 |
| hBgI | 1.210 | 1.420 | 1.270 |
| 2hBg | 1.000 | 1.000 | 1.000 |

TABLE 13

Result of HLA-DRB4 (group J) cloned as single or upstream element combined with one of the other group sequences as downstream element. Bold values are >1.0. Values are relative to 2hBg.

| | Relative to 2hBg | | |
|---|---|---|---|
| Sample | Half-life | Translational efficiency | Total protein over time |
| J | 0.790 | 0.930 | 0.920 |
| JJ | 0.490 | 0.960 | 0.540 |
| JI | 0.880 | 1.110 | 0.900 |
| JG | 0.420 | 1.280 | 0.630 |
| JB | 0.480 | 1.000 | 0.520 |
| JD | 0.500 | 1.370 | 0.830 |
| JE | 0.420 | 0.950 | 0.520 |
| JF | 0.570 | 1.190 | 0.800 |
| JhBg | 0.730 | 1.100 | 0.800 |
| hBgJ | 0.770 | 1.530 | 1.080 |
| 2hBg | 1.000 | 1.000 | 1.000 |

TABLE 14

Representative results using luc2mut as reporter gene and newly selected 3'-UTRs after electroporation into hiDC. Luciferase activity was measured over 96 h. Values are relative to 2hBg.

| | Relative to 2hBg | | |
|---|---|---|---|
| Sample | Half-life | Translational efficiency | Total protein over time |
| noUTR | 0.300 | 0.694 | 0.139 |
| hBg | 0.360 | 1.216 | 0.437 |
| I | 0.800 | 1.132 | 0.936 |
| IF | 1.110 | 1.050 | 1.133 |
| FI | 1.020 | 0.818 | 0.847 |
| IhBg | 0.880 | 0.860 | 0.792 |
| hBgI | 0.840 | 0.776 | 0.681 |
| 2hBg | 1.000 | 1.000 | 1.000 |

TABLE 15

Electroporation settings

The table summarizes the details of the electroporation protocol for all cell types used. The amount of cells stated under cell count was mixed with the amount of RNA stated either in μg or pmol either in electroporation cuvettes or 96-well electroporation plates (as indicated under format) in X-VIVO15 media (Lonza). Electroporation was performed by applying a pulse with the designated length and the voltage listed under V. Afterwards, the cell suspension was diluted in growth medium and distributed in 96-wells with the density listed under cells/time point.

| | Format | gap size | cell count | RNA [μg] | RNA [pmol] | cells/time point | V | pulse |
|---|---|---|---|---|---|---|---|---|
| hiDCs | cuvette | 4 mm | 1.00E+06 | | 10 | 5.00E+04 | 300 | 1 × 12 ms |
| HFF | 96-well | 4 mm | 7.00E+04 | 2 | | 1.00E+04 | 200 | 1 × 24 ms |
| CD8+ | cuvette | 4 mm | 2.50E+06 | | 10 | 1.67E+05 | 500 | 1 × 3 ms |
| CD4+ | cuvette | 4 mm | 2.50E+06 | | 10 | 1.67E+05 | 500 | 1 × 3 ms |
| MEF | 96-well | 4 mm | 7.00E+04 | 2 | | 1.00E+04 | 200 | 5 × 6 ms/400 ms |
| C2C12 | 96-well | 4 mm | 7.00E+04 | 2 | | 1.00E+04 | 240 | 5 × 5 ms/400 ms |
| bmDCs | cuvette | 4 mm | 1.00E+06 | | 10 | 5.00E+04 | 400 | 1 × 5 ms |

TABLE 16

Half-lifes and total protein of FI-element relative to 2hBgUTR containing unmodified and modified mRNA upon electroporation and unmodified RNA upon lipofection. Plasmids coding for the firefly luciferase gene containing either FI or 2hBg as 3'UTR were linearized downstream of the poly(dA:dT) with a classIIS restriction enzyme thereby generating a template with no additional nucleotide past the poly(dA:dT). Linearized plasmid DNA was purified using carboxylated magnetic beads (Invitrogen), quantified spectrophotometrically and subjected to in vitro transcriptions. For in vitro transcriptions home-made T7 RNA polymerase supplemented with RNase inhibitors and pyrophosphatase was used with 7.5 mM NTPs in a 125 mM Hepes pH 8.35, 34 mM MgOAc2, 10 mM DTT and 2 mM Spermidin buffer. For efficient capping of the RNA 6 mM of β-S-ARCA(D2) was added to the reaction and the initial GTP concentration was lowered to 1.5 mM, which was adjusted to 7.5 mM in a fed-batch process during 2.5 h at 37° C. RNA was purified via carboxylated magnetic beads (Invitrogen) and RNA concentration and quality were assessed by spectrophotometry and analysis on a 2100 Bioanalyzer (Agilent).

| | A<br>Unmodified mRNA<br>relative to 2hBg | | B<br>m1Y modified mRNA<br>relative to 2hBg | | C<br>Lipofection<br>relative to 2hBg | |
|---|---|---|---|---|---|---|
| | Half-life | total protein | Half-life | total protein | Half-life | total protein |
| hiDCs | | | 1.29 | 2.24 | | |
| C2C12 | 1.64 | 2.24 | 1.58 | 2.32 | 1.09 | 1.82 |
| HFF | 1.69 | 2.45 | 1.83 | 2.21 | 1.14 | 2.22 |
| MEF | 1.39 | 2.15 | 1.18 | 1.52 | 1.11 | 2.24 |
| CD4+ | 1.04 | 1.32 | 1.02 | 1.46 | | |
| CD8+ | 0.96 | 1.29 | 1.05 | 1.33 | | |
| bmDC | 0.87 | 1.98 | 1.09 | 1.34 | | |

A Shows that the Half-lifes of unmodified mRNAs containing the FI element are higher or comparable to those containing the 2hBg 3'UTR in several human and murine cell lines. The amount of human fibroblasts (HFFs), CD8+ and CD4+ T-cells, murine embryonic fibroblast (MEF), myoblastoma cells (C2C12) and murine DCs as listed in Tab. 15 were mixed with the respective amount of RNA (Tab. 15) in X-VIVO15 media (Lonza) and subjected to electroporation. The indicated number of cells was plated in 96 well dishes in 100 μl of appropriate growth medium with additives. At 2, 6, 24, 48, 72 and 96 hours after seeding firefly luciferase activities were determined by addition of Luciferin (Promega) in a fluorescence reader (TECAN).
B Shows that the Half-lifes of m1Y modified mRNAs containing the FI element are higher or comparable to those containing the 2hBg 3'UTR in different human and murine cell lines. The amount of human immature dendritic cells (iDC), fibroblasts (HFFs), CD8+ and CD4+ T-cells, murine embryonic fibroblast (MEF), myoblastoma cells (C2C12) and murine DCs as listed in Tab. 15 were mixed with the respective amount of m1Y modified RNA (Tab. 15) in X-VIVO15 media (Lonza) and subjected to electroporation. The indicated number of cells was plated in 96 well dishes in 100 μl of appropriate growth medium with additives. At 2, 6, 24, 48, 72 and 96 hours after seeding firefly luciferase activities were determined by addition of Luciferin (Promega) in a fluorescence reader (TECAN).
C Shows that the Half-lifes of unmodified mRNAs containing the FI element are higher or comparable to those containing the 2hBg 3'UTR in different cell lines also when the RNA was transfected via lipofection. 50 ng RNA was incubated for 15-30 min with 0.2 μl RNAiMAX and given on 1E04 HFF, MEF or C2C12 cells in 96wells. Luciferase levels were measured at 3, 6, 12, 24, 48, 72 and 96 h by addition of Luciferin (Promega) in a fluorescence reader (TECAN).

TABLE 17

10 μg RNA coding for firefly luciferase containing either the FI element or variations of the FI element with the designated homology to the original FI sequence as 3'UTRs were electroporated into hiDCs in a 96-well format. Luciferase expression was followed over time at 3, 6, 24, 48, and 72 h, and from the resulting expression curve the mRNA half-life and the total protein amount translated from the RNA were calculated.

| | relative to FI sequence | |
|---|---|---|
| | Half-life | total protein |
| % Homology | | |
| 97.5 | 1.0 −/− 0.1 | 1.3 +/− 0.2 |
| 95.0 | 1.0 −/− 0.0 | 1.2 +/− 0.2 |
| 92.5 | 1.1 −/− 0.1 | 1.4 +/− 0.1 |
| 90.0 | 0.9 −/− 0.1 | 1.1 +/− 0.2 |

TABLE 18

10 μg RNA coding for firefly luciferase containing either the FI element or variations of the FI element containing structure retaining or destroying mutations and with the designated homology to the original FI sequence as 3'UTRs were electroporated in hiDCs in a 96-well format. Luciferase expression was followed over time at 3, 6, 24, 48, and 72 h, and from the resulting expression curve the mRNA half-life and the total protein amount were calculated.

| A<br>Structure retaining modifications | | | B<br>Structure destabilizing modifications | | |
|---|---|---|---|---|---|
| | relative to FI sequence | | | relative to FI sequence | |
| | Half-life | total protein | | Half-life | total protein |
| % Homology | | | % Homology | | |
| 97.5 | 1.2 +/− 0.1 | 1.6 +/− 0.3 | 98.75 | 1.1 +/− 0.1 | 1.5 +/− 0.1 |
| 95.0 | 1.1 +/− 0.1 | 1.7 +/− 0.3 | 97.50 | 1.1 +/− 0.1 | 1.4 +/− 0.1 |
| 92.5 | 1.1 +/− 0.1 | 1.5 +/− 0.3 | 96.25 | 1.0 +/− 0.1 | 1.5 +/− 0.1 |
| 90.0 | 1.1 +/− 0.2 | 1.4 +/− 0.1 | 95.00 | 1.0 +/− 0.0 | 1.1 +/− 0.2 |
| | | | 8nt mutation | 0.9 +/− 0.0 | 1.3 +/− 0.4 |

Sequences described herein are as follows:

| Group B |
|---|

```
>Rn5-2p1-A4_For2
CAUCCUGCUGCUGCUGCUGCUGCUGCGGGUCUUCCUGGAAUCUGACCAUUCGUUGUC
UGCUAUGCCCGUCCUCACCAAGACUGACUGCCUGCUGCUUUGCUACUGCCCGGGCCCAUG
AGACUGACUUCCACUGCUCUGCCUGCCUCUCCCCACUGCACUGGCACAGCCCCGCCUUG
CCGCUGCUGAUCCAUUGCCGGUGUGACC

>Rn5-2p1-A3_For2
GCUGCUGCUGCUGCUGCUGCUGCGGGUCUUCCUGGAAUCUGACCAUUCGUUGUCUGCUAU
GCCCGUCCUCACCAAGACUGACUGCCUGCUGCUUUGCUACUGCCCGGGCCCAUGAGACUG
ACUUCCACUGCUCUGCCUGCCUCUCCCCACUGCACUGGCACAGCCCCGCCUUGCCGCUG
CUGAUCCAUUGCCGGUGUGACC

>Rn5C5_For2
UUCCUGCUGCUGCUGCUGCUGCUGCUGCUGCGGGUCUUCCUAGAAUCUGACCAUUCGUUG
UCUGCUAUGCCCGUCCUCACCAAGACUGACUGCCUGCUGCUUUGCUACUGCCCGGGCCCA
UGAGACUGACUUCCCACUGCUCUGCCUGCCUCUCCCCACUGCACUGGCACAGCCCCGCCU
UGCCGCUGCUGAUCCAUUGCCGGUGUGAGACC
```

>Rn5E6_For2
UGCUGCUGCUGCUGCGGGUCUUCCUGGAAUCUGACCAUUCGUUGUCUGCUAUGCCCGUCC
UCACCAAGACUGACUGCCUGCUGCUUUGCUACUGCCCGGGCCCAUGAGACUGACUUCCCA
CUGCUCUGCCUGCCUCUCCCCACUGCACUGGCACAGCCCCGCCUUGCCGCUGCUGAUCCA
UUGCCGGCGGACA

>Rn6-1WoC3_For2
GCUGCUGCGGGUCUUCCUGGAAUCUGACCAUUCGUUGUCUGCUAUGCCCGUCCUCACCAA
GACUGACUGCCUGCUGCUUUGCUACUGCCCGGGCCCAUGAGACUGACUUCCCACUGCUCU
GCCUGCCUCUCCCCACUGCACUGGCACAGCCCCGCCUUGCCGCUGCUGAUCCAUUGCCGG
CGUACC

>Rn6-1WoB12_For2
CUGGAAUCUGACCAUUCGUUGUCUGCUAUGCCCGUCCUCACCAAGACUGACUGCCUGCUG
CUUUGCUACUGCCCGGGCCCAUGAGACUGACUUCCCACUGCUCUGCCUGCCUCUCCCCAC
UGCACUGGCACAGCCCCGCCUUGCCGCUGCUGAUCCAUUGCCGGCGGACC

>Rn6-1WoB1_For2
UCCUGCUGCUGCUGCUGCUGCUGCUGCGGGUCUUCCUGGAAUCUGACCAUUCGUUGUCUG
CUAUGCCCGUCCUCACCAAGACUGACUGCCUGCUGCUUUGCUACUGCCCGGGCCCAUGAG
ACUGACUUCCCACUGCUCUGCCUGCCUCUCCCCACUGCACUGGCACAGCCCCGCCUUGCC
GCUGCUGAUCCAUUGCCGGUGGGACC

>Rn6-1WoF3_For2
CUGCCUGCUGCUUUGCUACUGCCCGGGCCCAUGAGACUGACUUCCCACUGCUCUGCCUGC
CUCUCCCCACUGCACUGGCACAGCCCCGCCUUGCCGCUGCUGAUCCAUUGCCGGUAGAAC
C

>Rn6-1Wo_H11_b
UCCUGCUGCUGCUGCUGCUGCUGCUGCGGGUCUUCCUGGAAUCUGACCAUUUGUUGUCUG
CUAUGCCCGUCCUCACCAAGACUGACUGCCUGCUGCUUUGCUACUGCCCGGGCCCAUGAG
ACUGACUUCCCACUGCUCUGCCUGCCUCUCCCCACUGCACUGGCACAGCCCCGCCUUGCC
GCUGCUGAUCCAUUGCCGGUGGGACC

>Rn6-2WoG8_b
GCUGCUGCUGCUGCUGCGGGUCUUCCUGGAAUCUGACCAUUCGUUGUCUGCUAUGCCCGU
CCUCACCAAGACUGACUGCCUGCUGCUUUGCUACUGCCCGGGCCCAUGAGACUGACUUCC
CACUGCUCUGCCUGCCUCUCCCCACUGCACUGGCACAGCCCCGCCUUGCCGCUGCUGAUC
CAUUGCCGGUGUGACC

>Rn5-2p1-B3_For2
UCUGGCCUCACUGAGUCUGAAGAGCUGUUAACUACCAUGGCCAGUCCUCCCUGAGUCUGA
CCAUCUUCCAUCCUGCUGCUGCUGCUGCUGCUGCGGGUCUUCCUGGAAUCUGACCAU
UCGUUGUCUGCUAUGCCCGUCCUCACCAAGACUGACUGCCUGCUGCUUUGCUACUGCCCG
GGCCCAUGAGACUGACUUCCCACUGCUCUGCCUGCCUCUCCCCACUGCACUGGCACAGCC
CCGCCUUGCCGCUGCUGAUCCAUUGCCGGUGUGACC

>Rn5_F5_b
UCUGGCCUCACUGAGUCUGAAGAGCUGUUAACUACCAUGGCCAGUCCUCCCUGAGUCUGA
CCAUCUUCCAUCCUGCUGCUGCUGCUGCUGCUGCUGCGGGUCUUCCUGGAAUCUGACCAU
UCGUUGUCUGCUAUGCCCGUCCUCACCAAGACUGACUGCCUGCUGCUUUGCUACUGCCCG
GGCCCAUGAGACUGACUUCCCACUGCUCUGCCUGCCUCUCCCCACUGCACUGGCACAGCC
CCGCCUUGCCGCUGCUGAUCCAUUGCCGGUGUGACC

>Rn5B8_For2
CUACCAUGGCCAGUCCUCCCUGAGUCUGACCAUCUUCCAUCCUGCUGCUGCUGCUGCUGC
UGCUGCGGGUCUUCCUGGAAUCUGACCAUUCGUUGUCUGCUAUGCCCGUCCUCACCAAGA
CUGACUGCCUGCUGCUUUGCUACUGCCCGGGCCCAUGAGACUGACUUCCCACUGCUCUGC
CUGCCUUUCCCCACUGCACUGGCACAGCCCCGCCUUGCCGCUGCUGAUCCAUUGCCGGUG
UGACC

>Rn6-1WoH9_For2
GUCCUCCCUGAGUCUGACCAUCUUCCAUCCUGCUGCUGCUGCUGCUGCUGCUGCGGGUCU
UCCUGGAAUCUGACCAUUCGUUGUCUGCUAUGCCCGUCCUCACCAAGACUGACUGCCUGC
UGCUUUGCUACUGCCCGGGCCCAUGAGACUGACUUCCCACUGCUCUGCCUGCCUCUCCCC
ACUGCACUGGCACAGCCCCGCCUUGCCGCUGCUGAUCCAUUGCCGGUCUGACA

>Rn6-2WoC11_For2
GUCCUCCCUGAGUCUGACCAUCUUCCAUCCUGCUGCUGCUGCUGCUGCUGCUGCGGGUCU
UCCUGGAAUCUGACCAUUUGUUGUCUGCUAUGCCCCUCCUCACCAAGACUGACUGCCUGC
UGCUUUGCUACUGCCCGGGCCCAUGAGACUGACUUCCCACUGCUCUGCCUGCCUUCCCCA
CUGCACUGGCACAGCCCCGCCUUGCCGCUGCUGAUCCAUUGCCGGUGUGACC

>Rn5_C3_b
CCAUCCUGCUGCUGCUGCUGCUGCUGCUGCGGGUCUUCCUGGAAUCUGACCAUUCGUUGU
CUGCUAUGCCCGUCCUCACCAAGACUGACUGCCUGCUGCUUGCUACUGCCCGGGCCCAUG
AGACUGACUUCCCACUGCUCUGCCUGCCUCUCCCCACUGCACUGGCACAGCCCCGCCUUG
CCGCUGCUGAUCCAUUGCCGGUGUGACC

>Rn6-2WoH5_For2
GCCAGUCCUCCCUGAGUCUGACCAUCUUCCAUCCUGCUGCUGCUGCUGCUGCUGCGG
GUCUUCCUGGAAUCUGACCAUUCGUUGUCUGCUAUGCCCGUCCUCACCAAGACUGACUGC
CUGCUGAUUUGCUACUGCCCGGGCCCAUGAGACUGACUUCCACUGCUCUGCCUGCCUCU
CCCCACUGCACUGGCACAGCCCCGCCUUGCCGCUGCUGAUCCAUUGCCGGUGUGACC

>Rn6-96hE12_For2
UGCCUUCCGUCUCCUGCUGCUUCUGGCCUCACUGAGUCUGAAGAGCUGUUAACUACCAUG
GCCAGUCCUCCCUGAGUCUGACCAUCUUCCAUCCUGCUGCUGCUGCUGCUGCUGCUGCGG
GUCUUCCUGGAAUCUGACCAUUCGUUGUCUGCUAUGCCCGUCCUCACCAAGACUGACUGC
CUGCUGCUUUGCUACUGCCCGGGCCCAUGAGACUGACUUCCCACUGCUCUGCCUGCCUCU
CCCCACUGCACUGGCACAGCCCCGCCUUGCCGCUGCUGAUCCAUUGCCGGUGUGACC

>Rn6-96h-2pl-E9_F
GGCCAGUCCUCCCUGAGUCUGACCAUCUUCCAUCCUGCUGCUGCUGCUGCUGCUGCUGCG
GGUCUUCCUGGAAUCUGACCAUUCGUUGUCUGCUAUGCCCGUCCUCACCAAGACUGACUG
CCUGCUGCUUUGCUACUGCCCGGGCCCAUGAGACUGACUUCCCACUGCUCUGCCUGCCUC
UCCCCACUGCACUGGCACAGCCCCGCCUUGCCGCUGCUGAUCCAUUGCCGGUGUGACC

>Rn6-96h-2pl-H10_
GGCCAGUCCUCCCUGAGUCUGACCAUCUUCCAUCCUGCUGCUGCUGCUGCUGCUGCGG
GGUCUUCCUGGAAUCUGACCAUUCGUUGUCUGCUAUGCCCGUCCUCACCAAGACUGACUG
CCUGCUGCUUUGCUACUGCCCGGGCCCAUGAGACUGACUUCCACUGCUCUGCCUGCCUC
UCCCCACUGCACUGGCACAGCCCCGCCUUGCCGCUGCUGAUCCAUUGCCGGUGUGACC

>Rn6-1WoB11_For2
UGACCAUCUUCCAUCCUGCUGCUGCUGCUGCUGCUGCUGCGGGUCUUCCUGGAAUCUGAC
CAUUCGUUGUCUGCUAUGCCCGUCCUCACCAAGACUGACUGCCUGCUGCUUUGCUACUGC
CCGGGCCCAUGAGACUGACUUCCCACUGCUCUGCCUGCCUCUCCCCACUGCACUGGCACA
GCCCCGCCUUGCCGCUGCUGAUCCAUUGCCGGUGUGACC

>Rn6-1WoF7_For2
CCAGUCCUCCCUGAGUCUGACCAUCUUCCAUCCUGCUGCUGCUGCUGCUGCUGCUGCGGG
UCUUCCUGGAAUCUGACCAUUCGUUGUCUGCUAUGCCCGUCCUCACCAAGACUGACUGCC
UGCUGCUUUGCUACUGCCCGGGCCCAUGAGACUGACUUCCCUCUGCUCUGCCUGCCUCUC
CCCACUGCACUGGCACAGCCCCGCCUUGCCGCUGCUGAUCCAUUGCCUGUGUGACCA

>Rn6-1WoA7_For2
UGACCAUCUUCCAUCCUGCUGCUGCUGCUGCUGCGGGUCUUCCUGGAAUCUGACCAUUCG
UUGUCUGCUAUGCCCGUCCUUACCAAGACUGACUGCCUGCUGCUUUGCUACUGCCCGGGC
CCAUGAGACUGACUUCCCACUGCUCUGCCUGCCUCUCCCCACUGCACUGGCACAGCCCCG
CCUUGUCGCUGCUGAUCCAUUGCCGGUGUGACAC

>Rn6-2WoD11_b
GACUGACUGCCUGCUGCUUUGCUACUGCCCGGGCCCAUGAGACUGACUUCCCACUGCUCU
GCCUGCCUCUCCCCACUGCACUGGCACAGCCCCGCCUUGCCGCUGCUGAUCCAUUGCCGG
UGUGACCC

>Rn6-2WoG3_For2
CUCCCUGAGUCUGACCAUCUUCCAUCCUGCUGCUGCUGCUGCUGCUGCUGCGGGUCUUCC
UGGAAUCUGACCAUUCGUUGUCUGCUAUGCCCGUCCUCACCAAGACUGACUGCCUGCUGC
UUUGCUACUGCCCGGGCCCAUGAGACUGACUUCCCACUGCUCUGCCUGCCUCUCCCCACU
GCACUGGCACAGCCCCGCCUUGCCGCUGCUGAUCCAUUGCCGGUGUGACC

>Rn6-2WoC2_For2
UUCCAUCCUGCUGCUGCUGCUGCUGCUGCUGCGGGUCUUCCUGGAAUCUGACCAUUCGUU
GUCUGCUAUGCCCGUCCUCACCAAGACUGACUGCCUGCUGCUUUGCUACUGCCCGGGCCC
AUGAGACUGACUUCCCACUGCUCUGCCUGCCUCUCCCCACUGCACUGGCACAGCCCCGCC
UUGCCGCUGCUGAUCCAUUGCCGGUGUGACC

>Rn6-1WoD6_For2
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACC

>Rn6-1WoD10_For2
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACC

>Rn6-2WoG5_For2
GCGGGUCUUCCUGGAAUCUGAACAUUCGUUGUCUGCUAUGCCCGUCCUCACCAAGACUGA
CUGCCUGCUGCUUUGCUACUGCCCGGGCCCAUGAGACUGACUUCCCACUGCUCUGCCUGC
CUCUCCCCACUGCACUGGCACAGCCCCGCCUUGCCGCUGCUGAUCCAUUGCCGGUGUGAC
C

```
>Rn6-96h-2p1-G8_F
GUUGUCUGCUAUGCCCGUCCUCACCAAGACUGACUGCCUGCUGCUUUGCUACUGCCCGGG
CCCAUGAGACUGACUUCCCACUGCUCUGCCUGCCUCUCCCCACUGCACUGGCACAGCCCC
GCCUUGCCGCUGCUGAUCCAUUGCCGGUGUGACC

>Rn6-1WoE7_For2
CAAGACUGACUGCCUGCUGCUUUGCUACUGCCCGGGCCCAUGAGACUGACUUCCCACUGC
UCUGCCUGCCUCUCCCCACUGCACUGGCACAGCCCCGCCUUGCCGCUGCUGAUCCAUUGC
CGGUGUGACC

>Rn6-1Wo_A12_b
CCUCACCAAGACUGACUGCCUGCUGCUUUGCUACUGCCCGGACCCAUGAGACUGACUUCC
CACUGCUCUGCCUGCCUCUCCCCACUGCACUGGCACAGCCCCGCCUUGCCGCUGCUGAUC
CAUUGCCGGUGUGACUGC

>Rn6-1WoG11_For2
CUUCCAUCCUGCUGCUGCUGCUGCUGCUGCGGGUCUUCCUGGAAUCUGACCAUUCGU
UGUCUGCUAUGCCCGUCCUCACCAAGACUGACUGCCUGCUGCUUUGCUACUGCCCGGGCC
CAUGAGACUGACUUCCCACUGCUCUGCCUGCCUCUCCCCACUGCACUGGCACAGCCCCGC
CUUGCCGCUGCUGAUCCAUUGCCGGUGUGACCCC

>Rn6-1WoH5_For2
CUCACCAAGACUGACUGCCUGCUGCUUUGCUACUGCCCGGGCCCAUGAGACUGACUUCCC
ACUGCUCUGCCUGCCUCUCCCCACUGCACUGGCACAGCCCCGCCUUGCCGCUGCUGAUCC
AUUGCCGGUGUGACC

>Rn6-1WoH4_For2
AAGACUGACUGCCUGCUGCUUUGCUACUGCCCGGGCCCAUGAGACUGACUUCCCACUGCU
CUGCCUGCCUCUCCCCACUGCACUGGCACAGCCCCGCCUUGCCGCUGCUGAUCCAUUGCC
GGUGUGACC

>Rn6-2WoB4_For2
CUCCAGCUCGCUUCCAUUUGCUUGCAGAAGUUCUCGCUGUGCUCACGAAGCUUGCGCUCC
UUGGAGGCCUCAGCAACAGCAUCAUCAAGCUGAGCUUCCAGCUCUUUCCUGAGCUUCUCA
GCUCUCCGCAUUUCCUGCCGCAUGGCGUCCACCUUCUGCGUGGCCACCUCCAUCUCCUCC
UCCUUGUCUCGCAGCUGCCGGGACACCUUCUGCGCUAAGAUGGGAUACGGCAUUGAGGGA
UCAAUGUGUAAGGAUCCGAUCUGCUUCUGGCCUCACUGAGUCUGAAGAGCUGUUAACUAC
CAUGGCCAGUCCUCCCUGAGUCUGACCAUCUUCCAUCCUGCUGCUGCUGCUGCUGCUGCU
GCGGGUCUUCCUGGAAUCUGACCAUUCGUUGUCUGCUAUGUCCGUCCUCACCAAGACUGA
CUGCCUGCUGCUUUGCUACUGCCCGGGCCCAUGAGACUGACUUCCCACUGCUCUGCCUGC
CUCUCCCCACUGCACUGGCACAGCCCCGCCUUGCCGCUGCUGAUCCAUUGCCGGUGUGAC
C

>Rn6-96h-2p1-A5_F
CUGACUGCCUGCUGCUUUGCUACUGCCCGGGCCCAUGAGACUGACUUCCCACUGCUCUGC
CUGCCUCUCCCCACUGCACUGGCACAGCCCCGCCUUGCCGCUGCUGAUCCAUUGCCGGUG
UGACC

>Rn6-1WoC8_For2
CCAAGACUGACUGCCUGCUGCUUUGCUACUGCCCGGGCCCAUGAGACUGACUUCCCACUG
CUCUGCCUGCCUCUCCCCACUGCACUGGCACAGCCCCGCCUUGCCGCUGCUGAUCCAUUG
ACGGUGUGACC

>Rn5D1_For2
UAACUACCAUGGCCAGUCCUCCCUGAGUCUGACCAUCUUCCAUCCUGCUGCUGCUGCUGC
UGCUGCGGGUCUUCCUGGAAUCUGACCAUUCGUUGUCUGCUAUGCCCGUCCUCACCAAGA
CUGACUGCCUGCUGCUUUGCUACUGCCCGGGCCCAUGAGACUGACUUCCCACUGCUCUGC
CUGCCUCUCCCCACUGCACUGGCACAGCCCCGCCUUGCCGCUGUUGAUCCAUUGCCGGUG
UGACC

>Rn6-2WoG10_For2
CCAAGACUGACUGCCUGCUGCUUUGCUACUGCCCGGGCCCAUGAGACUGACUUCCCACUG
CUCUGCCUGCCUCUCCCCACUGCACUGGCACAGCCCCGCCUUGCCGCUGUUGAUCCAUUG
UCGGUGUGACC

>Rn6-1Wo_E4_b
CCAAGACUGACUGCCUGCUGCUUUGCUACUGCCCGGGCCCAUGAGACUGACUUCCCACUG
CUCUGCCUGCCUCUCCCCACUGCACUGGCACAGCCCCGCCUUGCCGCUGCUGAUCCAUUG
CCGGUGUGACC

>Rn6-2WoF3_For2
CUGCUAUGCCUGUCCUCACCAAGACUGACUGCCUGCUGCUUUGCUACUGCCCGGGCCCAU
GAGACUGACUUCCCACUGCUCUGCCUGCCUCUCCCCAAUGCACUGGCACAGCCCCGCCUU
GCCGCUGCUGAUCCAUUGCCGGUGUGACC
```

```
>Rn6-96h-2pl-B10
CUGCUAUGCCCGUCCUCACCAAGACUGACUGCCUGCUGCUUUGCUACUGCCCGGGCCCAU
GAGACUGACUUCCCACUGCUCUGCCUGCCUCUCCCCACUGCACUGGCACAGCCCCGCCUU
GCCGCUGCUGAUCCAUUGCCGGUGUGACC

>Rn6-96h-2pl-C10
GCUAUGCCCGUCCUCACCAAGACUGACUGCCUGCUGCUUUGCUACUGCCCGGGCCCAUGA
GACUGACUUCCCACUGCUCUGCCUGCCUCUCCCCACUGCACUGGCACAGCCCCGCCUUGC
CGCUGCUGAUCCAUUGCCGGUGUGACC

>Rn6-1WoB6_For2
UCUUCCUGGAAUCUGACCAUUCGUUGUCUGCUAUGCCCGUCCUCACCAAGACUGACUGCC
UGCUGCUUUGCUACUGCCCGGGCCCAUGAGACUGACUUCCCACUGCUCUGCCUGCCUCUC
CCCACUGCACUGGCACAGCCCCGCCUUGCCGCUGCUGAUCCAUUGCCGGUGUGACC

>Rn6-96h-2pl-D6_F
CUGGAAUCUGACCAUUCGUUGUCUGCUAUGCCCGUCCUCACCAAGACUGACUGCCUGCUG
CUUUGCUACUGCCCGGGCCCAUGAGACUGACUUCCCACUGCUCUGCCUGCCUCUCCCCAC
UGCACUGGCACAGCCCCGCCUUGCCGCUGCUGAUCCAUUGCCGGUGUGACC

>Rn6-96h-2pl-E6_F
CUGGAAUCUGACCAUUCGUUGUCUGCUAUGCCCGUCCUCACCAAGACUGACUGCCUGCUG
CUUUGCUACUGCCCGGGCCCAUGAGACUGACUUCCCACUGCUCUGCCUGCCUCUCCCCAC
UGCACUGGCACAGCCCCGCCUUGCCGCUGCUGAUCCAUUGCCGGUGUGACC

>Rn6-2WoF10_For2
GGAAUCUGACCAUUCGUUGUCUGCUAUGCCCGUCCUCACCAAGACUGACUGCCUGCUGCU
UUGCUACUGCCCGGGCCCAUGAGACUGACUUCCCACUGCUCUGCCUGCCUCUCCCCACUG
CACUGGCACAGCCCCGCCUUGCCGCUGCUGAUCCAUUGCCGGUGUGACC

>Rn6-1WoG9_For2
CCAAGACUGACUGCCUGCUGCUUUGCUACUGCCCGGGCCCAUGAGACUGACUUCCCACUG
CUCUGCCUGCCUCUCCCCACUGCACUGGCAUAGCCCCGCCUUGCCGCUGCUGAUCCAUUG
CCGGUGUGACC

>Rn6-96hC12_For2
CUUCCUGGAAUCUGACCAUUCGUUGUCUGCUAUGCCCGUCCUCACCAAGACUGACUGCCU
GCUGCUUUGCUACUGCCCGGGCCCAUGAGACUGACUUCCCACUGCUCUGCCUGCCUCUCC
CCACUGCACUGGCAUAGCCCCGCCUUGCCGCUGCUGAUCCAUUUCCGGUGUGACC
```

Group D

```
>Rn6-1WoF2_For2
CAGACACCCGCCCCCCGGCCCUGGCUAAGAAUUUGCUUCCUGUUGCCAGCAUGACCUACC
CUCGCCUCUUUGAUGCCAUCCGCUGCCACCUCCUUUUGCUCCUGGACCCUUUAGCCUCUC
UGCCCUUCCACUCUCUGACC

>Rn6-2WoD8_For2
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCC

>Rn6-1WoD5_For2
CUCGCUUCCUGGGUCUGCAGGUCCAGCCGGCUGGCACCCUCCAUGUACCCAGGGGAGAUU
CCAGCCAGACACCCGCCCCCCGGCCCUGGCUAAGAAGUUGCUUCCUGUUGCCAGCAUGAC
CUACCCUCGCCUCUUUGAUGCCAUCCGCUGCCACCUCCUUUUGCUCCUGGACCCUUUAGC
CUCUCUGCCCUUCCACUCUCUGACCACCGCCC

>Rn5-2pl-D3_For2
UCCAGCCAGACACCCGCCCCCCGGCCCUGGCUAAGAAGUUGCUUCCUGUUGCCAGCAUGA
CCUACCCUCGCCUCUUUGAUGCCAUCCGCUGCCACCUCCUUUUGCUCCUGGACCCUUUAG
CUUCUCUGCCCUUCCACUCUCUGG

>Rn6-2WoA8_For2
CGCUUCCUGGGUCUGCAGGUCCAGCCGGCUGGCACCCUCCACGUACCCAGGGGAGAUUCC
AGCCAGACACCCGCCCCCCGGCCCUGGCUAAGAAGUUGCUUCCUGUUGCCAGCAUGACCU
ACCCUCGCCUCUUUGAUGCCAUCCGCUGCCACCUCCUUUUGCUCCUGGACCCUUUAGCCU
CUCUGCCCUUCCACUCUCUGACCACCG

>Rn6-2WoD7_For2
CAUGUACCCAGGGGAGAUUCCAGCCAGACACCCGCCCCCCGGCCCUGGCUAAGAAGUUGC
UUCCUGUUGCCAGCAUGACCUACCCUCGCCUCUUUGAUGCCAUCCGCUGCCACCUCCUUU
UGCUCCUGGACCCUUUAGCCUCUCUGCCCUUCCACUCG
```

>Rn6-2WoB8_For2
CUCGCUUCCUGGGUCUGCAGGUCCAGCCGGCUGGCACCCUCCAUGUACCCAGGGGAGAUU
CCAGCCAGACACCCGCCCCCGGCCCUGGCUAAGAAGUUGCUUCCUGUUGCCAGCAUGAC
CUACCCUCGCCUCUUUGAUGCCAUCCGCUGCCACCUCCUUUUGCUCCUGGACCCUUUAGC
CUCUCUGCCCCCCGAU

>Rn6-96h-2p1-H6_F
CCCAGCUCCCUAGGCGUCCCAUCUCGCUUCCUGGGUCUGCAGGUCCAGCCGGCUGGCACC
CUCCAUGUACCCAGGGGAGAUUCCAGCCAGACACCCGCCCCCGGCCCUGGCUAAGAAGU
UGCUUCCUGUUGCCAGCAUGACCUACCCUCGCCUCUUUGAUGCCAUCCGCUGCCACCUCC
UUUUGCUCCUGGACCCUUUAGCCUCUCUGCCCUUCCACUCUUUGACCCCCAUCUUA

>Rn6-96h-2p1-F10
GGCCACCGGGCAUGGGAAGUAUGAGAAGGUGCUUGUGGAAGGGGGCCCGGCUCCCUAGGC
GUCCCAUCUCGCUUCCUGGGUCUGCAGGUCCAGCCGGCUGGCACCCUCCAUGUACCCAGG
GAGAUUCCAGCCAGACACCCGCCCCCGGCCCUGGCUAAGAAGUUGCUUCCUGUUGCCAG
CAUGACCUACCCUCGCCUCUUUGAUGCCAUCCGCUGCCACCUCCUUUUGCUCCUGGACCC
UUUAGCCUCUCUGCCCUUCCACUCUCUGACCCC

>Rn5H3_For2
UGUACCCAGGGGAGAUUCCAGCCAGACACCCGCCCCCCGGCCCUGGCUAAGAAGUUGCUU
CCUGUUGCCAGCAUGACCUACCCUCGCCUCUUUGAUGCCAUCCGCUGCCACCUCCUUUUG
CUCCUGGACCCUUUAGCCUCUCUGCCCUUCCACUCUCUGACCACCACCCCC

>Rn5G7_For2
CCGGCCCUGGCUAAGAAGUUGCUUCCUGUUGCCAGCAUGACCUACCCUCGCCUCUUUGAU
GCCAUCCGCUGCCACCUCCUUUUGCUCCUGGACCCUUUAGCCUCUCUGCCCUUCCACUCU
CUGACCACAGCCCC

>Rn6-1WoG5_For2
CCCCGGCCCUGGCUAAGAAGUUGCUUCCUGUUGCCAGCAUGACCUACCCUCGCCUCUUUG
AUGCCAUCCGCUGCCACCUCCUUUUGCUCCUGGACCCUUUAGCCUCUCUGCCCUUCCACU
CUCUGACCACCGCCCCCGCC

>Rn6-1WoA8_For2
CCGGCUGGCACCCUCCAUGUACCCAGGGGAGAUUCCAGCCAGACACCCGCCCCCCGGCCC
UGGCUAAGAAGUUGCUUCCUGUUGCCAGCAUGACCUACCCUCGCCUCUUUGAUGCCAUCC
GCUGCCACCUCCUUUUGCUCCUGGACCCUUUAGCCUCUCUGCCCUUCCACUCUCUGACCA
CCGCCCCC

>Rn6-96h_D3_b
GCCGGCUGGCACCCUCCAUGUACCCAGGGGAGAUUCCAGCCAGACACCCGCCCCCGGCC
CUGGCUAAGAAGUUGCUUCCUGUUGCCAGCAUGACCUACCCUAGCCUCUUUGAUGCCAUC
CGCUGCCACCUCCUUUUGCUCCUGGACCCUUUAGCCUCUCUGCCCUUCCACUCUCUGAC
CACCGCCCCC

>Rn6-96hC11_For2
UCCAGCCAGACACCCGCCCCCGGCCCUGGCUAAGAAGUUGCUUCCUGUUGCCAGCAUGA
CCUACCCUCGCCUCUUUGAUGCCAUCCGCUGCCACCUCCUUUUGCUCCUGGACCCUUUAG
CCUCUCUGCCCUUCCACUCUCUGACCACCACCCCC

>Rn5H1_For2
GCCAGACACCCGCCCCCGGCCCUGGCUAAGAAGUUGCUUCCUGUUGCCAGCAUGACCUA
CCCUCGCCUCUUUGAUGCCAUCCGCUGCCACCUCCUUUUGCUCCUGGACCCUUUAGCCUC
UCUGCCCUUCCACUCUCUGACCCCCC

>Rn6-1WoG2_For2
UCCAGCCAGACACCCGCCCCCCGGCCCUGGCUAAGAAGUUGCUUCCUGUUGCCAGCAUGA
CCUACCCUCGCCUCUUUGAUGCCAUCCGCUGCCACCUCCUUUUGCUCCUGGACCCUUUAG
CCUCUCUGCCCUUCCACUCUCUGACCCCCC

>Rn6-1WoG7_For2
CGGCUCCCUAGGCGUCCCAUCUCGCUUCCUGGGUCUGCAGGUCCAGCCGGCUGGCACCCU
CCAUGUACCCAGGGGAGAUUCCAGCCAGACACCCGCCCCCCGGCCCUGGCUAAGAAGUUG
CUUCCUGUUGCCAGCAUGACCUACCCUCGCCUCUUUGAUGCCAUCCGCUGCCACCUCCUU
UUGCUCCUGGACCCUUUAGCCUCUCUGCCCUUCCACUCUCUGACCACUGCCCC

>Rn6-96hB11_For2
UGCAGGUCCAGCCGGCUGGCACCCUCCAUGUACCCAGGGGAGAUUCCAGCCAGACACCA
CCCCCGGCCCUGGCUAAGAAGUUGCUCCUGUUGCCAGCAUGACCUACCCUCGCCUCUUU
GAUGCCAUCCGCUGCCACCUCCUUUUGCUCCUGGACCCUUUAGCCUCUCUGCCCUUCCAC
UCUCUGACCACUACCCC

>Rn6-2WoF8_For2
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCACUGCCCC

>Rn6-96h_A9_b
CCCGCCCCCGGCCCUGGCUAAGAAGUUGCUUCCUGUUGCCAGCAUGACCUACCCUCGCC
UCUUUGAUGCCAUCCGCUGCCACCUCCUUUUGCUCCUGGACCCUUUAGCCUCUCUGCCCU
UCCACUCUCUGACC

>Rn6-1WoH3_For2
CAGCCAGACACCCGCCCCCGGCCCUGGCUAAGAAGUUGCUUCCUGUUGCCAGCAUGACC
UACCCUCGCCUCUUUGAUGCCAUCCGCUGCCACCUCCUUUUGCUCCUGGACCCUUUAGCC
UCUCUGCCCUUCCACUCUCUGAACACC

Group E

>Rn6-2WoE2_For2
GAGCCUACUCUGAUGACCGUGGCCUUGGCUCCUCCAGGAAGGCUCAGGAGCCCUACCUCC
CUGCCAUUAUAGCUGCUCCCCGCCAGAAGCCUGUGCCAACUCUCUGCAUUCCCUGAUCUC
CUGUGGCUGUCACCCUUGGUCACCUCCGUGCUGUCACUGCCAUCUCCCCCCUGACCCCUC
GAACCCAUCCUA

>Rn6-1WoD3_For2
GAGCCUACUCUGAUGACCGUGGCCUUGGCUCCUCCAGGAAGGCUCAGGCGCCCUACCUCC
CUGCCAUUAUAGCUGCUCCCCGCCAGAAGCCUGUGCCAACUCUCUGCAUUCCCUGAUCUC
CAUCCCUGUGGCUGUCACCCUUGGUCACCUCCGUGCUGUCACUGCCAUCUCCCCCCUGAC
CCCUCUAACCC

>Rn6-2WoG7_For2
GCCUACUCUGAUGACCGUGGCCUUGGCUCCUCCAGGAAGGCUCAGGAGCCCUACCUCCCU
GCCAUUAUAGCUGCUCCCCGCCAGAAGCCUGUGCCAACUCUCUGCAUUCCCUGAUCUCCA
UCCCUGUGGCUGUCACCCUUGGUCCACUGCCAUCUCCCCCCC

>Rn6-2WoH2_For2
GAGCCUACUCUGAUGACCGUGGCCUUGGCUCCUCCAGGAAGGCUCAGGAGCCCUACCUCC
CUGCCAUUAUAGCUGCUCCCCGCCAGAAGCCUGUGCCAACUCUCUGCAUUCCCUGAUCUC
CAUCCCUGUGGCUGUCACCCUUGGUCACCUCCGUGCUGUUACUGCCAUCUCCCCCCUGAC
CCC

>Rn6-2WoC1_For2
GAAGAGCCUACUCUGAUGACCGUGGCCUUGGCUCCUCCAGGAAGGCUCAGGAGCCCUACC
UCCCUGCCAUUAUAGCUGCUCCCCGCCAGAAGCCUGUGCCAACUCUCUGCAUUCCCUGAU
CUCCAUCCCUGUGGCUGUCAUCCUUGGUCACCUCCGUGCUGUCACUGCCAUCUCCCCCCU
GACCCCUCUAACCCAUCCUCUGCCUCCCUCCCUGCAGUCAGAGGGUCCUGUUCCCAACCA

>Rn6-1Wo_C12_b
UGUGGCCUUGGCUCCUCCAGGAAGGCUAAGGAGCCCUACCUCCCUGCCAUUAUAGCUGCU
CCCCGCCAGAAGCCUGUGCCAACUCUCUGCAUUCCCUGAUCUCCAUCCCUGUGGCUGUCA
CCCUUGGUCACCUCCGUGCUGUCACUGCCAUCUCCCCCCUGACCCC

>Rn6-1WoE12_For2
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCC

>Rn6-2WoF5_For2
AGAGCCUACUCUGAUGACCGUGGCCUUGGCUCCUCCAGGAAGGCUCAGGAGCCCUACCUC
CCUGCCAUUAUAGCUGCUCCCCGCCAGAAGCCUGUGCCAACUCUCUGCAUUCCCUGAUCU
CCAUCCCUGUGGCUGUCACCCUUGGUCACCUCCGUGCUGUCACUGCCAUCUCCCCCCUGA
CCCCUCUAACCCAUCCUCUGCCUCCCUCCCUGCAGUCAGAGGGUCCUGUUCCCAUCAGCG
AUUCCCCUGCUUAAACCCUUCCAUGACUCCCCACUGCCCUAAGCUGAGGUCAGUCUCCCA
AGCCUGACAU

>Rn5-2p1-H3_For2
UAUAGCUGCUCCCCGCCAGAAGCCUGUGCCAACUCUCUGCAUUCCCUGAUCUCCAUCCCU
GUGGCUGUCACCCUUGGUCACCUCCGUGCUGUCACUGCCAUCUCCCCCCUGACCCCUCUA
ACCCAUCCUCUGCCUCCCUCCCUGCAGUCAGAGGGUCCUGUUCCCAUCAGCGAUUCCCCU
GCUUAAACCCUUCCAUGACAGCCC

>Rn6-2WoA3_For2
UCUGCAUUCCCUGAUCUCCAUCCCUGUGGCUGUCACCCUUGGUCACCUCCGUGCUGUCAC
UGCCAUCUCCCCCCUGACCCCUCUAACCCAUCCUCUGCCUCCCUCCCUGCAGUCAGAGGG
UCCUGUUCCCAUCAGCGAUUCCCCUGCUUAAGCCCUUCCAUGACUCCCC

>Rn6-96hF12_For2
CUCCCUGCCAUUAUAGCUGCUCCCCGCCAGAAGCCUGUGCCAACUCUCUGCAUUCCCUGA
UCUCCAUCCCUGUGGCUGUCACCCUUGGUCACCUCCGUGCUGUCACUGCCAUCUCCCCCC
UGACCCCUCUAACCCAUCCUCUGCCUCCCUCCCUGCAGUCAGAGGGUCCUGUUCCCAUCA
GCGAUUCCCCUGCUUAAACCCUUCCAUGACUCCCCAA

>Rn6-96hE11_For2
GCCUACUCUGAUGACCGUGGCCUUGGGUCCUCCAGGAAGGCUCAGGAGCCCUACCUCCCU
GCCAUUAUAGCUGCUCCCCGCCAGAAGUCUGUGCCAACUCUCUGCAUUCCCUGAUCUCCA

-continued

UCCCUGUGGCUGUCACCCUUGGUCACCUCCGUGCUGUCACUGCCAUCUCCCCCCUGACCC
CUCUAACCCAUCCUCUGCCUCCCUCCCUGCAGUCAGAGGGUCCUGUUCCCAUCAGCGAUU
CCCCUGCUUAAACCCUUCCAUGACUCCCCUCU

>Rn6-96h-2pl-A11
CUACCUCCCUGCCAUUAUAGCUGCUCCCCGCCAGAAGCCUGUGCCAACUCUCUGCAUUCC
CUGAUCUCCAUCCCUGUGGCUGUCACCCUUGGUCACCUCCGUGCUGUCACUGCCAUCUCC
CCCCUGACCCC

Group F

>Rn6-1WoB5_For2
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCC

>Rn6-2WoE11_a
CCGGCCCUUCCCCCGUUUUGAACAUGUGUAACCGACAGUCUGCCUGGGCCACAGCCCUCU
CACCCUGGUACUGCAUGCACGCAAUGCUAGCUGCCCUUUCCCGUCCUGGGCACCCCGAG
UCUCCCCCGACCCCGGGUCCCAGGUAUGCUCCCACCUCCACCUGCCCCACUCACCACCUC
UGCUAGUUCCAGACACCCCGCG

>Rn6-96h_E3_b
CCUUCCCCCGUUUUGAACAUGUGUAACCGACAGUCUGCCUGGGCCACAGCCCUCUCACCC
UGGUACUGCAUGCACGCAAUGCUAGCUGCCCCUUUCCCGCCCUGGGCACCCCGAGUCUCC
CCCGACCCCGGGUCCCAGGUAUGCUCCCACCUCCACCUGCCCCACUCACCACCUCUGCUA
GUUCCAGACACCUCCAC

>Rn6-96h-2pl-B6_F
UCUGCCUGGGCCACAGCCCUCUCACCCUGGUACUGCAUGCACGCAAUGCUAGCUGCCCCU
UUCCCGUCCUGGGCACCCCGAGUCUCCCCCGACCCCGGGUCCCAGGUAUGCUCCCACCUC
CACCUGCCCCACUCACCACCUCUGCUAGUUCCAGACACCUCCACGCCCACCUGGUCCUCU
CCCAUCGCCCACAAAAGGGGGGGCACGAGGGACGAGCUUAGCUGAGCUGGGAGGAGCAGG
GUGAGGGUGGGCGACCCAGGAUUCCCCCACCCC

Group G

>Rn5_D5_b
UGACACCUCAGCUGACAGCGUGGGCAACGCCUGCCGCCUGCUCUGAGGCCCGAUCCAGUG
GGCAGGCCAAGGCCUGCUGGGCCCCCGCGGACCCAGGUGCUCUGGGUCACGGUCCCUGUC
CCCGCACCCCCGCUUCUGUCUGCCCCAUUGUGGCUCCUCAGGCUCUCUCCCCUGCUCUCC
CACCUCUACCUCCACCCCA

>Rn5B2_For2
CUCAGCUGACAGCGUGGGCAACGCCUGCCGCCUGCUCUGAGGCCCGAUCCAGUGGGCAGG
CCAAGGCCUGCUGGGCCCCCGCGGACCCAGGUGCUCUGGGUCACGGUCCCUGUCCCCGCA
CCCCCGCUUCUGUCUGCCCCAUUGUGGCUCCUCAGGCUCUCUCCCCUGCUCUCCCACCUC
UACCUCCACUCCC

>Rn5G3_For2
UCUGAGGCCCGAUCCAGUGGGCAGGCCAAGGCCUGCUGGGCCCCCGCGGACCCAGGUGCU
CUGGGUCACGGUCCCUGUCCCCGCACCCCCGCUUCUGUCUGCCCCAUUGUGGCUCCUCAG
GCUCUCUCCCCUGCUCUCCCACCUCUACCUCCACCCCC

>Rn6-96hF11_For2
GGCCCGAUCCAGUGGGCAGGCCAAGGCCUGCUGGGCCCCCGCGGACCCAGGUGCUCUGGG
UCACGGUCCCUGUCCCCGCACCCCCGCUUCUGUCUGCCCCAUUGUGGCUCCUCAGGCUCU
CUCCCCUGCUCUCCCACCUCUACCUCCACCCCC

>Rn6-96h-2pl-D8_F
GCCUGCUGGGCCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCGCCCCC

>Rn5C4_For2
CGCGGACCCAGGUGCUCUGGGUCACGGUCCCUGUCCCCGCACCCCCGCUUCUGUCUGCCC
CAUUGUGGCUCCUUAGGCUCUCUCCCCUGCUCUCCCACCUUUACCUCCACCCCUAC

>Rn6-2WoD3_For2
CUGACAGCGUGGGCAACGCCUGCCGCCUGCUCUGAGGCCCGAUCCAGUGGGCAGGCCAAG
GCCUGCUGGGCCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCAC

>Rn6-96h-2pl-C6_F
CUGACAGCGUGGGCAACGCCUGCCGCCUGCUCUGAGGCCCGAUCCAGUGGGCAGGCCAAG
GCCUGCUGGGCCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCAAC

>Rn6-96h-2p1-C7_F
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCAAC

>Rn6-96h-2p1-F8_F
CGUGGGCAACGCCUGCCGCCUGCUCUGAGGCCCGAUCCAGUGGGCAGGCCAAGGCCUGCU
GGGCCCCGCGGACCCAGGUGCUCUGGGUCACGGUCCCUGUCCCCGCACCCCCGCUUCUG
UCUGCCCCAUUGUGGCUCCUCAGGCUCUCUCCCCUGCUCUCCCACCUCUACCUCCACCCA
CACC

>Rn6-96hH9_For2
UCCUGAGGGACUGGGACUCCCCUUACAGCCAUGACCUUGACACCUCAGCUGACAGCGUGG
GCAACGCCUGCCGCCUGCUCUGAGGCCCGAUCCAGUGGGCAGGCCAAGGCCUGCUGGGCC
CCCGCGGACCCAGGUGCUCUGGGUCACGGUCCCUGUCCCCGCACCCCCGCUUCUGUCUGC
CCCAUUGUGGCUCCUCAGGCUCUCUCCCCUGCUCUCCCACCUCUACCUCCACGCCCAC

>Rn5_F10_b
CUGAGGGACUGGGACUCCCCUUACAGCCAUGACCUUGACACCUCAGCUGACAGCGUGGGC
AACGCCUGCCGCCUGCUCUGAGGCCCGAUCCAGUGGGCAGGCCAAGGCCUGCUGGGCCCC
CGCGGACCCAGGUGCUCUGGGUCACGGUCCCUGUCCCCGCACCCCCGCUUCUGUCUGCCC
CAUUGUGGCUCCUCAGGCUCUCUCCCCUGCUCUCCCACCUCUACCUCCACACCU

>Rn6-2WoF11_For2
UGCGGAGCCAGCUGGAGGCCAUUUUCCUGAGGGACUGGGACUCCCCUUACAGCCAUGACC
UUGACACCUCAGCUGACAGCGUGGGCAACGCCUGCCGCCUGCUCUGAGGCCCGAUCCAGU
GGGCAGGCCAAGGCCUGCUGGGCCCCCGCGGACCCAGGUGCUCUGGGUCACGGUCCCUGU
CCCCGCACCCCCGCUUCUGUCUGCCCCAUUGUGGCUCCUCAGGCUCUCUCCCCUGCUCUC
CCACCUCUACCUCCACCC

>Rn6-1WoA9_For2
CUGGAGGCCAUUUCCUGAGGGACUGGGACUCCCCUUACAGCCAUGACCUUGACACCUCA
GCUGACAGCGUGGGCAACGCCUGCCGCCUGCUCUGAGGCCCGAUCCAGUGGGCAGGCCAA
GGCCUGCUGGGCCCCGCGGACCCAGGUGCUCUGGGUCACGGUCCCUGUCCCCGCACCCCC
CGCUUCUGUCUGCCCCAUUGUGGCUCCUCAGGCUCUCUCCCCUGCUCUCCCACCUCUACC
UCCCCCCAC

>Rn6-1WoF9_For2
CUGGGACUCCCCUUACAGCCAUGACCUUGACACCUCAGCUGACAGCGUGGGCAACGCCUG
CCGCCUGCUCUGAGGCCCAAUCCAGUGGGCAGGCCAAGGCCUGCUGGGCCCCGCGGACC
CAGGUGCUCUGGGUCACGGUCCCUGUCCCCGCACCCCCGCUUCUGUCUGCCCCAUUGUGC
CUCCUUAGGCUCUCUCCCCUGCUCUCCACCUCUACCUCCACCCCC

Group I

>Rn5_A7_b
GCAGCAAUGCAGCUCAAAACGCUUAGCCUAGCCACACCCCCACGGUAAACAGCAGUGAUU
AACUUUUAGCAAUAAACGAAAGUUUAACUAAGCUAUACUAACCCCAGGGUUGGUCAAUUU
CGUGCCAGCCACC

>Rn5_B6_b
CUUUCUAUUAGCUCUUAGUAAGAUUACACAUGCAAGCAUCCCCGUUCCAGUGAGUUCACC
CUCUAAAUCACCACGAUAAAAAGGGACAAGCAUCAAGCACGCAGCAAUGCAGCUCAAAAC
GCUUAGCCUAGCCACACCCCCACGGGAAACAGCAGUGAUUAACCUUUAGCAAUAAACGAA
AGUUUAACUAAGCUAUACUAACCCCAGGGUUGGUCAAUUUCGUGCCAGCUACC

>Rn5D4_For2
GUUCCAGUGAGUUCACCCUCUAAAUCACCACGAUCAAAAGGGACAAGCAUCAAGCACGCA
GCAAUGCAGCUCAAAACGCUUAGCCUAGCCACACCCCCACGGGAAACAGCAGUGAUUAAC
CUUUAGCAAUAAACGAAAGUUUAACUAAGCUAUACUAACCCCAGGGUUGGUCAAUUUCGU
GCCAGCCACC

>Rn5D2_For2
AAAGGGACAAGCAUCAAGCACGCAGCAAUGCAGCUCAAAACGCUUAGCCUAGCCACACCC
CCACGGGAAACAGCAGUGAUUAACCUUUAGCAAUAAACGAAAGUUUAACUAAGCUAUACU
AACCCCAGGGUUGGUCAAUUUCGUGCCAGCCACC

>Rn6-1Wo_D7_b
UCAAAAGGGACAAGCAUCAAGCACGCAACAAUGCAGCUCAAAAACGCUUAGCCUAGCCAC
ACCCCCACGGGAAACAGCAGUGAUUAACCUUUAGCAAUAAACGAAAGUUUAACUAAGCUA
CACUAACCCCAGGGUUGGUCAAUUUCGUGCCAGCCACC

>Rn6-96h-2p1-A9_F
UACACAUGCAAGCAUCCCCGUUCCAGUGAGUUCACCCUCUAAAUCACCACGAUCAAAAGG
GACAAGCAUCAAGCACGCAGCAAUGCAGCUCAAAACGCUUAGCCUAGCCACACCCCCAC
GGGAAACAGCAGUGAUUAACCUUUAGCAAUAAACGAAAGUUUAACUAAGCUAUACUAACC
CCAGGGUUGGUCAAUUUCGUGCCAGCCACC

>Rn6-2WoH3_For2
CAUCAAGCACGCAGCAAUGCAGCUCAAAACGCUUAGCCUAGCCACACCCCCACGGGAAAC
AGCAGUGAUUAACCUUUAGCAAUAAACGAAAGUUUAACUAAGCUAUACUAACCCCAGGGU
UGGUCAAUUUCGUGCCAACCACC

>Rn6-96hG11_For2
AAAGGGACAAGCAUCAAGCACGCAGCAAUGCAGCUCAAAACGCUUAGCCUAGCCACACCC
CCACGGGAAACAGCAGUGAUUAACCUUUAGCAAUAAACGAAAGUUUAACUAAGCUAUACU
AACCCCAGGGUUGGUCAAUUUCGUGCCAACCACC

>Rn5E1_For2
CAAGCACGCAACAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAACCACC

>Rn6-1WoA11_For2
CAUCAAGCACGCAGCAAUGCAGCUCAAAACGCUUAGCCUAGCCACACCCCCAUGGGAAAC
AGCAGUGAUUAACCUUUAGCAAUAAACGAAAGUUUAACUAAGCUAUACUAACCCCAGGGU
UGGUCAAUUUCGUGCCAGCUCACC

>Rn6-2WoE7_For2
CAAGCACGCAGCAAUGCAGCUCAAAACGCUUAGCCUAGCCACACCCCACGGGAAACAGC
AGUGAUUAACCUUUAGCAAUAAACGAAAGUUUAACUAAGCUAUACUAACCCCAGGGUUGG
UCAAUUUCGUGCCAGCCACACC

>Rn6-96h-2p1-B5_F
CAAGCACGCAGCAAUGCAGCUCAAAACGCUUAGCCUAGCCACACCCCACGGGAAACAGC
AGUGAUUAACCUUUAGCAAUAAACGAAAGUUUAACUAAGCUAUACUAACCCCAGGGUUGG
UCAAUUUCGUGCCAGCCACC

>Rn5H2_For2
CACGAUCAAAAGGGACAAGCAUCAAGCACGCAGCAAUGCAGCUCAAAACGCUUAGCCUAG
CCACACCCCCACGGGAAACAGCAGUGAUUAACCUUUAGCAAUAAACGAAAGUUUAACUAA
GCUAUACUAACCCCAGGGUUGGUCAAUUUCGUGCCAGCCACC

>Rn6-1WoF11_For2
UAAAUCACCACGAUCAAAAGGGACAAGCAUCAAGCACGCAGCAAUGCAGCUCAAAACGCU
UAGCCUAGCCACACCCCCACGGGAAACAGCAGUGAUUAACCUUUAGCAAUAAACGAAAGU
UUAACUAAGCUAUACUAACCCCAGGGUUGGUCAAUUUCGUGCCAGCCACC

>Rn6-2WoB11_For2
AGCCUUUCUAUUAGCUCUUAGUAAGAUUACACAUGCAAGCAUCCCCGUUCCAGUGAGUUC
ACCCUCUAAAUCACCACGAUCAAAAGGGACAAGCAUCAAGCACGCAGCAAUGCAGCUCAA
AACGCUUAGCCUAGCCACACCCCCACGGGAAACAGCAGUGAUUAACCUUUAGCAAUAAAC
GAAAGUUUAACUAAGCUAUACUAACCCCAGGGUUGGUCAAUUUCGUGCCAGCCACC

>Rn6-1WoA3_For2
GGGACAAGCAUCAAGCACGCAGCAAUGCAGCUCAAAACGCUUAGCCUAGCCACACCCCCA
CGGGAAACAGCAGUGAUUAACCUUUAGCAAUAAACGAAAGUUUAACUAAGCUAUACUAAC
CCCAGGGUUGGUCAAUUUCGUGCCAGCCACC

>Rn6-1Wo_D2_b
GGGACAAGCAUCAAGCACGCAGCAAUGCAGCUCAAAACGCUUAGCCUAGCCACACCCCA
CGGGAAACAGCAGUGAUUAACCUUUAGCAAUAAACGAAAGUUUAACUAAGCUAUACUAAC
CCCAGGGUUGGUCAAUUUCGUGCCAGCCACC

---
Group J

>Rn5A1_For2
UUCUGCCCCAGCUUUGCAGGAUGAAACACUUCCCCGCUUGGCUCUCAUUCUUCCACAAGA
GAGACCUUUCUCCGGACCUGGUUGCUACUGGUUCAGCAACUCUGCAGAAAAUGUCCUCCC
CUGUGGCUGCCUCAGCUCAUGCCUUUGGCCUGAAGUCCCAGCAUUGAUGGCAGCCCCUCA
UCUUCCAAGUUUUGUGCUCCCCUUUACCUAACGCUUCCUGCCUCCCAUGCAUCUGUACUC
CUUCUGUGCCACU

>Rn5B1_For2
UUCUGCCCCAGCUUUGCAGGAUGAAACACUUCCCCGCUUGGCUCUCAUUCUUCCACAAGA
GAGACCUUUCUCCGGACCUGGUUGCUACUGGUUCAGCAACUCUGCAGAAAAUGUCCUCCC
CUGUGGCUGCCUCAGCUCAUGCCUUUGGCCUGAAGUCCCAGCAUUGAUGGCAGCCCCUCA
UCUUCCAAGUUUUGUGCUCCCCUUUACCUAACGCUUCCUGCCUCCCAUGCAUCUGUACUC
CUUCUGUGCCACU

>Rn5_A10_b
CCCCAGCUUUGCAGGAUGAAACACUUCCCCGCUUGGCUCUCAUUCUUCCACAAGAGAGAC
CUUUCUCCGGACCUGGUUGCUACUGGUUCAGCAACUCUGCAGAAAAUGUCCUCCCCUGUG
GCUGCCUCAGCUCAUGCCUUUGGCCUGAAGUCCCAGCAUUGAUGGCAGCCCCUCAUCUUC
CAAGUUUUGUGCUCCCCUUUACCUAACGCUUCCUGCCUCCCAUGCAUCUGUACUCCUCCU
GUGCCACAAA

-continued

>Rn5_G1_b
CCCCAGCUUUGCAGGAUGAAACACUUCCCCGCUUGGCUCUCAUUCUUCCACAAGAGAGAC
CUUUCUCCGGACCUGGUUGCUACUGGUUCAGCAACUCUGCAGAAAAUGUCCUCCCCUGUG
GCUGCCUCAGCUCAUGCCUUUGGCCUGAAGUCCCAGCAUUGAUGGCAGCCCCUCAUCUUC
CAAGUUUUGUGCUCCCCUUUACCUAACGCUUCCUGCCUCCCAUGCAUCUGUACUCCUCCU
GUGCCACAAA

>Rn6-1WoF5_For2
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCC

>Rn6-2WoA5_For2
UGCAGGAUGAAACACUUCCCCGCUUGGCUCUCAUUCUUCCACAGGAGAGACCUUUCUCCG
GACCUGGUUGCUACUGGUUCAGCAACUCUGCAGAAAAUGUCCUCCCCUGUGGCUGCCUCA
GCUCAUGCCUUUGGCCUGAAGUCCCAGCAUUGAUGGCAGCCCCUCAUCUUCCAAGUUUUG
UGCUCCCCUUUACCUAACGCUUCCUGCCUCCCAUGCAUCUGUACUCCA

>Rn6-2WoA7_For2
GUGAAGAUGACCACAUUCAAGGAAGAACCUUCUGCCCCAGCUUUGCAGGAUGAAACACUU
CCCCGCUUGGCUCUCCUUCUUCCACAAGAGAGACCUUUCUCCGGACCUGGUUGCUACUGG
UUCAGCAGCUCUGCAGAAAAUGUCCUCCCUUGUGGCUGCCUCAGCUCGUACCUUUGGCCU
GAAGUCCCAGCAUUAAUGGCAGCCCCUCAUCUUCCAAGUUUUGUGCUCCCCUUUACCUAA
UGCUUCCUGCCUCCCAUGCAUCUGUACUCCUGCUGUGCCA

>Rn6-2WoG2_For2
UCCACAAGAGAGACCUUUCUCCGGACCUGGCUGCUACUGGUUCAGCAGCUCUGCAGAAAA
UGUCCUCCCUUGUGGCUGCCUCAGCUCGUACCUUUGGCCUGAAGUCCCAGCAUUAAUGGC
AGCCCCUCAUCUUCCAAGUUUUGUGCUCCCCUUUACCUAAUGCUUCCUGCCUCCCAUGCA
UCUGUACUCCUGCUGUGCCACAAACAC

>Rn6-2WoH10_For2
UCCACAAGAGAGACCUUUCUCCGGACCUGGCUGCUACUGGUUCAGCAGCUCUGCAGAAAA
UGUCCUCCCUUGUGGCUGCCUCAGCUCGUACCUUUGGCCUGAAGUCCCAGCAUUAAUGGC
AGCCCCUCAUCUUCCAAGUUUUGUGCUCCCCUUUACCUAAUGCUUCCUGCCUCCCAUGCA
UCUGUACUCCUGCUGUGCCACAAACAC

>Rn6-96h-2pl-G7_F
GCUACUGGUUCAGCAGCUCUGCAGAAAAUGUCCUCCCUUGUGGCUGCCUCAGCUCGUACC
UUUGGCCUGAAGUCCCAGCAUUAAUGGCAGCCCCUCAUCUUCCAAGUUUUGUGCUCCCCU
UUACCUAAUGCUUCCUGCCUCCCAUGCAUCUGUACUCCUGCGU

>Rn5-2pl-B2_For2
AGAACCUUCUGCCCCAGCUUUGCAGGAUGAAACACUUCCCCGCUUGGCUCUCAUUCUUCC
ACAAGAGAGACCUUUCUCCGGACCUGGUUGCUACUGGUUCAGCAGCUCUGCAGAAAAUGU
CCUCCCUUGUGGCUGCCUCAGCUCGUACCUUUGGCCUGAAGUCCCAGCAUUAAUGGCAGC
CCCUCAUCUUCCAAGUUUUGUGCUCCCCUUUACCUAAUGCUUCCUGCCUCCCAUGCAUCU
GUACUCCUG

>Rn5-2pl-D1_For2
AGAACCUUCUGCCCCAGCUUUGCAGGAUGAAACACUUCCCCGCUUGGCUCUCAUUCUUCC
ACAAGAGAGACCUUUCUCCGGACCUGGUUGCUACUGGUUCAGCAGCUCUGCAGAAAAUGU
CCUCCCUUGUGGCUGCCUCAGCUCGUACCUUUGGCCUGAAGUCCCAGCAUUAAUGGCAGC
CCCUCAUCUUCCAAGUUUUGUGCUCCCCUUUACCUAAUGCUUCCUGCCUCCCAUGCAUCU
GUACUCCUG

>Rn6-1WoA5_For2
UGAAGAUGACCACAUUCAAGGAAGAACCUUCUGCCCCAGCUUUGCAGGAUGAAACACUUC
CCCGCUUGGCUCUCAUUCUUCCACAAGAGAGACCUUUCUCCGGACCUGGUUGUUCAGCAG
CUCUGCAGAAAAUGUCCUCCCUUGUGGCUGCCUCAGCUCGUACCUUUGGCCUGAAGUCCC
AGCAUUAAUGGCAGCCCCUCAUCUUCCAAGUUUUGUGCUCCCCUUUACCUAAUGCUUCCU
GCCUCCCAUGCAUCUGUACUCCUG

>Rn6-1Wo_G10_b
UGAAGAUGACCACAUUCAAGGAAGAACCUUCUGCCCCAGCUUUGCAGGAUGAAACACUUC
CCCGCUUGGCUCUCAUUCUUCCACAAGAGAGACCUUUCUCCGGACCUGGUUGCUACUGGU
UCAGCAGCUCUGCAGAAAAUGUCCUCCCUUGUGGCUGCCUCAGCUCGUACCUUUGGCCUG
AAGUCCCAGCAUUAAUGGCAGCCCCUCAUCUUCCAAGUUUUGUGCUCCCCUUUACCUAAU
GCUUCCUGCCUCCCAUGCAUCUGUACUCCC

>Rn6-2WoE4_For2
CCACAUUCAAGGAAGAACCUUCUGCCCCAGCUUUGCAGGAUGAAACACUUCCCCGCUUGG
CUCUCAUUCUUCCACAAGAGAGACCUUUCUCCGGACCUGGUUGCUACUGGUUCAGCAGCU
CUGCAGAAAAUGUCCUCCCUUGUGGCUGCCUCAGCUCGUACCUUUGGCCUGAAGUCCCAG
CAUUAAUGGCAGCCCCUCAUCUUCCAAGUUUUGUGCUCCCCUUUACCUAAUGCUUCCUGC
CCCCC

-continued

>Rn6-96hG12_For2
GUGAAGAUGACCACAUUCAAGGAAGAACCUUCUGCCCCAGCUUUGCAGGAUGAAACACUU
CCCCGCUUGGCUCUCAUUCUUCCACAAGAGAGACCUUUCUCCGGACCUGGUUGCUACUGG
UUCAGCAGCUCUGCAGAAAAUGUCCUCCCUUGUGGCUGCCUCAGCUCGUACCUUUGGCCU
GAAGUCCCAGCAUUAAUGGCAGCCCCUCAUCUUCCAAGUUUUGUGCUCCCCUUUACCUAA
UGCUUCCUGCCCCCCAU

>Rn6-96h-2pl-C12
AGAACCUUCUGCCCCAGCUUUGCAGGAUGAAACACUUCCCCGCUUGGCUCUCAUUCUUCC
ACAAGAGAGACCUUUCUCCGGACCUGGUUGCUACUGGUUCAGCAGCUCUGCAGAAAAUGU
CCUCCCUUGUGGCUGCCUCAGCUCGUACCUUUGGCCUGAAGUCCCAGCAUUAAUGGCAGC
CCCUCAUCUUCCAAGUUUUGUGCUCCCCC

>Rn6-96h-2pl-A6_F
CUGAAGUGAAGAUGACCACAUUCAAGGAAGAACCUUCUGCCCCAGCUUUGCAGGAUGAAA
CACUUCCCCGCUUGGCUCUCAUUCUUCCACAAGAGAGACCUUUCUCCGGACCUGGUUGCU
ACUGGUUCAGCAGCUCUGCAGAAAAUGUCCUCCCUUGUGGCUGCCUCAGCUCGUACCUUU
GGCCUGAAGUCCCAGCAUUAAUGGCAGCCCCUCAUCUUCCAAGUUUUGUGCUCCCCUUUA
CCUAAUGCUUCCUGCCUCCCAUGCAUCUGUACUCCU

>Rn6-96h-2pl-H5_F
CUGAAGUGAAGAUGACCACAUUCAAGGAAGAACCUUCUGCCCCAGCUUUGCAGGAUGAAA
CACUUCCCCGCUUGGCUCUCAUUCUUCCACAAGAGAGACCUUUCUCCGGACCUGGUUGCU
ACUGGUUCAGCAGCUCUGCAGAAAAUGUCCUCCCUUGUGGCUGCCUCAGCUCGUACCUUU
GGCCUGAAGUCCCAGCAUUAAUGGCAGCCCCUCAUCUUCCAAGUUUUGUGCUCCCCUUUA
CCUAAUGCUUCCUGCCUCCCAUGCAUCUGUACUCCU

>Rn6-2WoG1_For2
AAGAUGACCACAUUCAAGGAAGAACCUUCUGCCCCAGCUUUGCAGGAUGAAACACUUCCC
CGCUUGGCUCUCAUUCUUCCACAAGAGAGACCUUUCUCCGGACCUGGUUGCUACUGGUUC
AGCAGCUCUGCAGAAAAUGUCCUCCCUUGUGGCUGCCUCAGCUCGUACCUUUGGCCUGAA
GUCCCAGCAUUAAUGGCAGCCCCUCAUCUUCCAAGUUUUGUGCUCCCCUUUACCUAAUGC
UUCCUGCCUCCCAUGCAUCUGUACUCCUGC

>Rn6-96h-2pl-D11
CCCCGCUUGGCUCUCAUUCUUCCACAAGAGAGACCUUUCUCCGGACCUGGUUGCUACUGG
UUCAGCAGCUCUGCAGAAAAUGUCCUCCCUUGUGGCUGCCUCAGCUCGUACCUUUGGCCU
GAAGUCCCAGCAUUAAUGGCAGCCCCUCAUCUUCCAAGUUUUGUGCUCCCCUUUACCUAA
UGCUUCCUGCCUCCCAUGCAUCUGUACUCCU

>Rn6-96h-2pl-F9_F
CCCCGCUUGGCUCUCAUUCUUCCACAAGAGAGACCUUUCUCCGGACCUGGUUGCUACUGG
UUCAGCAGCUCUGCAGAAAAUGUCCUCCCUUGUGGCUGCCUCAGCUCGUACCUUUGGCCU
GAAGUCCCAGCAUUAAUGGCAGCCCCUCAUCUUCCAAGUUUUGUGCUCCCCUUUACCUAA
UGCUUCCUGCCUCCCAUGCAUCUGUACUCCU

>hBg:
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUC

>noUTR:

>BB
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACCUGCCCGUCCUCACCAAGACUGACUGCCUGCUGCUUUG
CUACUGCCCGGGCCCAUGAGACUGACUUCCCACUGCUCUGCCUGCCUCUCCCCACUGCAC
UGGCACAGCCCCGCCUUGCCGCUGCUGAUCCAUUGCCGGUGUGACC

>BD
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACCUUCCAGCCAGACACCCGCCCCCGGCCCUGGCUAAGA
AGUUGCUUCCUGUUGCCAGCAUGACCUACCCUCGCCUCUUUGAUGCCAUCCGCUGCCACC
UCCUUUUGCUCCUGGACCCUUUAGCCUCUCUGCCCUUCCACUCUCUGACCCC

>BE
UGCCCGUCCUCACCAAGACUGACUGCCUGCUGCUUUGCUACUGCCCGGGCCCAUGAGACU
GACUUCCCACUGCUCUGCCUGCCUCUCCCACUGCACUGGCACAGCCCCGCCUUGCCGCU
GCUGAUCCAUUGCCGGUGUGACCGCCUUGGCUCCUCCAGGAAGGCUCAGGAGCCCUACCU
CCCUGCCAUUAUAGCUGCUCCCCGCCAGAAGCCUGUGCCAACUCUCUGCAUUCCCUGAUC
UCCAUCCCUGUGGCUGUCACCCUUGGUCACCUCCGUGCUGUCACUGCCAUCUCCCCCCC

>BF
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU

```
GCUGAUCCAUUGCCGGUGUGACCCUGGUACUGCAUGCACGCAAUGCUAGCUGCCCCUUUC
CCGUCCUGGGUACCCCGAGUCUCCCCCGACCUCGGGUCCCAGGUAUGCUCCCACCUCCAC
CUGCCCCACUCACCACCUCUGCUAGUUCCAGACACCUCC

>BG
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACCCUGACAGCGUGGGCAACGCCUGCCGCCUGCUCUGAGG
CCCGAUCCAGUGGGCAGGCCAAGGCCUGCUGGGCCCCGCGGACCCAGGUGCUCUGGGUC
ACGGUCCCUGUCCCCGCACCCCCGCUUCUGUCUGCCCCAUUGUGGCUCCUCAGGCUCUCU
CCCCUGCUCUCCACCUCUACCUCCACCCCAC

>BhBg
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACCGAGAGCUCGCUUUCUUGCUGUCCAAUUUCUAUUAAAG
GUUCCUUUGUUCCCUAAGUCCAACUACUAAACUGGGGGAUAUUAUGAAGGGCCUUGAGCA
UCUGGAUUCUGCCUAAUAAAAAACAUUUAUUUUCAUUGCUGCGUC

>BI
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACCCAAGCACGCAGCAAUGCAGCUCAAAACGCUUAGCCUA
GCCACACCCCCACGGGAAACAGCAGUGAUUAACCUUUAGCAAUAAACGAAAGUUUAACUA
AGCUAUACUAACCCCAGGGUUGGUCAAUUUCGUGCCAGCCACACC

>BJ
UGCCCGUCCUCACCAAGACUGACUGCCUGCUGCUUUGCUACUGCCCGGGCCCAUGAGACU
GACUUCCCACUGCUCUGCCUGCCUCUCCCCACUGCACUGGCACAGCCCCGCCUUGCCGCU
GCUGAUCCAUUGCCGGUGUGACCCUUUGCAGGAUGAAACACUUCCCCGCUUGGCUCUCAU
UCUUCCACAAGAGAGACCUUUCUCCGGACCUGGUUGCUACUGGUUCAGCAACUCUGCAGA
AAAUGUCCUCCCCUGUGGCUGCCUCAGCUCAUGCCUUUGGCCUGAAGUCCCAGCAUUGAU
GGCAGCCCCUCAUCUUCCAAGUUUUGUGCUCCCCUUUACCUAACGCUUCCUGCCUCCCAU
GCAUCUGUACUCCUCC

>DB
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCUGCCCGUCCUCACCAAGACUGACUGCCUGCU
GCUUUGCUACUGCCGGGCCCAUGAGACUGACUUCCCACUGCUCUGCCUGCCUCUCCCCA
CUGCACUGGCACAGCCCCGCCUUGCCGCUGCUGAUCCAUUGCCGGUGUGACC

>DD
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCUUCCAGCCAGACACCCGCCCCCCGGCCCUGG
CUAAGAAGUUGCUUCCUGUUGCCAGCAUGACCUACCCUCGCCUCUUUGAUGCCAUCCGCU
GCCACCUCCUUUUGCUCCUGGACCCUUUAGCCUCUCUGCCCUUCCACUCUCUGACCCC

>DE
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCGCCUUGGCUCCUCCAGGAAGGCUCAGGAGCC
CUACCUCCCUGCCAUUAUAGCUGCUCCCCGCCAGAAGCCUGUGCCAACUCUCUGCAUUCC
CUGAUCUCCAUCCCUGUGGCUGUCACCCUUGGUCACCUCCGUGCUGUCACUGCCAUCUCC
CCCC

>DF
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCUGGUACUGCAUGCACGCAAUGCUAGCUGCC
CCUUUCCCGUCCUGGGUACCCCGAGUCUCCCCCGACCUCGGGUCCCAGGUAUGCUCCCAC
CUCCACCUGCCCCACUCACCACCUCUGCUAGUUCCAGACACCUCC

>DG
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCUGACAGCGUGGGCAACGCCUGCCGCCUGCU
CUGAGGCCCGAUCCAGUGGGCAGGCCAAGGCCUGCUGGGCCCCGCGGACCCAGGUGCUC
UGGGUCACGGUCCCUGUCCCCGCACCCCCGCUUCUGUCUGCCCCAUUGUGGCUCCUCAGG
CUCUCUCCCCUGCUCUCCACCUCUACCUCCACCCCAC

>DhBg
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCGAGAGCUCGCUUUCUUGCUGUCCAAUUUCUA
UUAAAGGUUCCUUUGUUCCCUAAGUCCAACUACUAAACUGGGGGAUAUUAUGAAGGGCCU
UGAGCAUCUGGAUUCUGCCUAAUAAAAAACAUUUAUUUUCAUUGCUGCGUC
```

```
>DI
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCCAAGCACGCAGCAAUGCAGCUCAAAACGCUU
AGCCUAGCCACACCCCACGGGAAACAGCAGUGAUUAACCUUUAGCAAUAAACGAAAGUU
UAACUAAGCUAUACUAACCCCAGGGUUGGUCAAUUUCGUGCCAGCCACACC

>DJ
UUCCAGCCAGACACCCGCCCCCCGGCCCUGGCUAAGAAGUUGCUUCCUGUUGCCAGCAUG
ACCUACCCUCGCCUCUUUGAUGCCAUCCGCUGCCACCUCCUUUUGCUCCUGGACCCUUUA
GCCUCUCUGCCCUUCCACUCUCUGACCCCCUUUGCAGGAUGAAACACUUCCCCGCUUGGC
UCUCAUUCUUCCACAAGAGAGACCUUUCUCCGGACCUGGUUGCUACUGGUUCAGCAACUC
UGCAGAAAAUGUCCUCCCCUGUGGCUGCCUCAGCUCAUGCCUUUGGCCUGAAGUCCCAGC
AUUGAUGGCAGCCCCUCAUCUUCCAAGUUUUGUGCUCCCCUUUACCUAACGCUUCCUGCC
UCCCAUGCAUCUGUACUCCUCC

>EB
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCUGCCCGUCCUCACCAAGACUGACUG
CCUGCUGCUUUGCUACUGCCCGGGCCCAUGAGACUGACUUCCCACUGCUCUGCCUGCCUC
UCCCCACUGCACUGGCACAGCCCCGCCUUGCCGCUGCUGAUCCAUUGCCGGUGUGACC

>ED
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCUUCCAGCCAGACACCCGCCCCCCGG
CCCUGGCUAAGAAGUUGCUUCCUGUUGCCAGCAUGACCUACCCUCGCCUCUUUGAUGCCA
UCCGCUGCCACCUCCUUUUGCUCCUGGACCCUUUAGCCUCUCUGCCCUUCCACUCUCUGA
CCCC

>EE
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCGCCUUGGCUCCUCCAGGAAGGCUCA
GGAGCCCUACCUCCCUGCCAUUAUAGCUGCUCCCCGCCAGAAGCCUGUGCCAACUCUCUG
CAUUCCCUGAUCUCCAUCCCUGUGGCUGUCACCCUUGGUCACCUCCGUGCUGUCACUGCC
AUCUCCCCCC

>EF
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCCUGGUACUGCAUGCACGCAAUGCUA
GCUGCCCCUUUCCCGUCCUGGGUACCCCGAGUCUCCCCCGACCUCGGGUCCCAGGUAUGC
UCCCACCUCCACCUGCCCCACUACCACCUCUGCUAGUUCCAGACACCUCC

>EG
>GCCUUGGCUCCUCCAGGAAGGCUCAGGAGCCCUACCUCCCUGCCAUUAUAGCUGCUCCCC
CGCCAGAAGCCUGUGCCAACUCUCUGCAUUCCCUGAUCUCCAUCCCUGUGGCUGUCACCCC
UUGGUCACCUCCGUGCUGUCACUGCCAUCUCCCCCCUGACAGCGUGGGCAACGCCUGCC
GCCUGCUCUGAGGCCCGAUCCAGUGGGCAGGCCAAGGCCUGCUGGGCCCCCGCGGACCCA
GGUGCUCUGGGUCACGGUCCCUGUCCCCGCACCCCCGCUUCUGUCUGCCCCAUUGUGGCU
CCUCAGGCUCUCUCCCCUGCUCUCCCACCUCUACCUCCACCCCCAC

>EhBg
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCGAGAGCUCGCUUUCUUGCUGUCCAA
UUUCUAUUAAAGGUUCCUUUGUUCCCUAAGUCCAACUACUAAACUGGGGGAUAUUAUGAA
GGGCCUUGAGCAUCUGGAUUCUGCCUAAUAAAAAACAUUUAUUUUCAUUGCUGCGUC

>EI
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCAAGCACGCAGCAAUGCAGCUCAAA
ACGCUUAGCCUAGCCACACCCCACGGGAAACAGCAGUGAUUAACCUUUAGCAAUAAACG
AAAGUUUAACUAAGCUAUACUAACCCCAGGGUUGGUCAAUUUCGUGCCAGCCACACC

>EJ
GCCUUGGCUCCUCCAGGAAGGCUCAGGAGCCCUACCUCCCUGCCAUUAUAGCUGCUCCCC
GCCAGAAGCCUGUGCCAACUCUCUGCAUUCCCUGAUCUCCAUCCCUGUGGCUGUCACCCU
UGGUCACCUCCGUGCUGUCACUGCCAUCUCCCCCCUUUGCAGGAUGAAACACUUCCCCG
CUUGGCUCUCAUUCUUCCACAAGAGAGACCUUUCUCCGGACCUGGUUGCUACUGGUUCAG
CAACUCUGCAGAAAAUGUCCUCCCCUGUGGCUGCCUCAGCUCAUGCCUUUGGCCUGAAGU
CCCAGCAUUGAUGGCAGCCCCUCAUCUUCCAAGUUUUGUGCUCCCCUUUACCUAACGCUU
CCUGCCUCCCAUGCAUCUGUACUCCUCC
```

```
>FB
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCUGCCCGUCCUCACCAAGACUGACUGCUGCUGCUUUGCUACUGC
CCGGGCCCAUGAGACUGACUUCCCACUGCUCUGCCUGCCUCUCCCCACUGCACUGGCACA
GCCCCGCCUUGCCGCUGCUGAUCCAUUGCCGGUGUGACC

>FD
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCUUCCAGCCAGACACCCGCCCCCGGCCCUGGCUAAGAAGUUGCU
UCCUGUUGCCAGCAUGACCUACCCUCGCCUCUUUGAUGCCAUCCGCUGCCACCUCCUUUU
GCUCCUGGACCCUUUAGCCUCUCUGCCCUUCCACUCUCUGACCCC

>FE
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCGCCUUGGCUCCUCCAGGAAGGCUCAGGAGCCCUACCUCCCUGCC
AUUAUAGCUGCUCCCCGCCAGAAGCCUGUGCCAACUCUCUGCAUUCCCUGAUCUCCAUCC
CUGUGGCUGUCACCCUUGGUCACCUCCGUGCUGUCACUGCCAUCUCCCCCC

>FF
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCUGGUACUGCAUGCACGCAAUGCUAGCUGCCCCUUUCCCGUCCU
GGGUACCCCGAGUCUCCCCGACCUCGGGUCCCAGGUAUGCUCCCACCUCCACCUGCCCC
ACUCACCACCUCUGCUAGUUCCAGACACCUCC

>FG
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCCUGACAGCGUGGGCAACGCCUGCCGCCUGCUCUGAGGCCCGAUC
CAGUGGGCAGGCCAAGGCCUGCUGGGCCCCGCGGACCCAGGUGCUCUGGGUCACGGUCC
CUGUCCCCGCACCCCCGCUUCUGUCUGCCCAUUGUGGCUCCUCAGGCUCUCUCCCCUGC
UCUCCCACCUCUACCUCCACCCCCAC

>FhBg
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCGAGAGCUCGCUUUCUUGCUGUCCAAUUUCUAUUAAAGGUUCCUU
UGUUCCCUAAGUCCAACUACUAAACUGGGGGAUAUUAUGAAGGGCCUUGAGCAUCUGGAU
UCUGCCUAAUAAAAAACAUUUAUUUUCAUUGCUGCGUC

>FI
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC

>FJ
CUGGUACUGCAUGCACGCAAUGCUAGCUGCCCCUUUCCCGUCCUGGGUACCCCGAGUCUC
CCCCGACCUCGGGUCCCAGGUAUGCUCCCACCUCCACCUGCCCCACUCACCACCUCUGCU
AGUUCCAGACACCUCCUUUGCAGGAUGAAACACUUCCCGCUGGCUCUCAUUCUUCCA
CAAGAGAGACCUUUCUCCGGACCUGGUUGCUACUGGUUCAGCAACUCUGCAGAAAAUGUC
CUCCCCUGUGGCUGCUCAGCUCAUGCCUUUGGCCUGAAGUCCCAGCAUUGAUGGCAGCC
CCUCAUCUUCCAAGUUUUGUGCUCCCCUUUACCUAACGCUUCCUGCCUCCCAUGCAUCUG
UACUCCUCC

>GB
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACUGCCCGUCCUCACCAAGACUGACUGCUGCUGCUUUGCUACUGCCCGGGC
CCAUGAGACUGACUUCCACUGCUCUGCCUGCCUCUCCCCACUGCACUGGCACAGCCCCG
CCUUGCCGCUGCUGAUCCAUUGCCGGUGUGACC

>GD
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACUUCCAGCCAGACACCCGCCCCCGGCCCUGGCUAAGAAGUUGCUUCCUGU
UGCCAGCAUGACCUACCCUCGCCUCUUUGAUGCCAUCCGCUGCCACCUCCUUUUGCUCCU
GGACCCUUUAGCCUCUCUGCCCUUCCACUCUCUGACCCC

>GE
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
```

```
GCUUCUGUCUGCCCCAUUGUGGCUCCUCAGGCUCUCUCCCCUGCUCUCCCACCUCUACCU
CCACCCCCACGCCUUGGCUCCUCCAGGAAGGCUCAGGAGCCCUACCUCCCCUGCCAUUAUA
GCUGCUCCCCGCCAGAAGCCUGUGCCAACUCUCUGCAUUCCCUGAUCUCCAUCCCUGUGG
CUGUCACCCUUGGUCACCUCCGUGCUGUCACUGCCAUCUCCCCCC

>GF
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACCUGGUACUGCAUGCACGCAAUGCUAGCUGCCCCUUUCCCGUCCUGGGUAC
CCCGAGUCUCCCCCGACCUCGGGUCCCAGGUAUGCUCCCACCUCCACCUGCCCCACUCAC
CACCUCUGCUAGUUCCAGACACCUCC

>GG
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACCUGACAGCGUGGGCAACGCCUGCCGCCUGCUCUGAGGCCCGAUCCAGUGG
GCAGGCCAAGGCCUGCUGGGCCCCGCGGACCCAGGUGCUCUGGGUCACGGUCCCUGUCC
CCGCACCCCCGCUUCUGUCUGCCCCAUUGUGGCUCCUCAGGCUCUCUCCCCUGCUCUCCC
ACCUCUACCUCCACCCCCAC

>GhBg
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACGAGAGCUCGCUUUCUUGCUGUCCAAUUUCUAUUAAAGGUUCCUUUGUUCC
CUAAGUCCAACUACUAAACUGGGGGAUAUUAUGAAGGGCCUUGAGCAUCUGGAUUCUGCC
UAAUAAAAACAUUUAUUUUCAUUGCUGCGUC

>GI
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACCAAGCACGCAGCAAUGCAGCUCAAAACGCUUAGCCUAGCCACACCCCCAC
GGGAAACAGCAGUGAUUAACCUUUAGCAAUAAACGAAAGUUUAACUAAGCUAUACUAACC
CCAGGGUUGGUCAAUUUCGUGCCAGCCACACC

>GJ
CUGACAGCGUGGGCAACGCCUGCCGCCUGCUCUGAGGCCCGAUCCAGUGGGCAGGCCAAG
GCCUGCUGGGCCCCGCGGACCCAGGUGCUCUGGGUCACGGUCCCUGUCCCCGCACCCCC
GCUUCUGUCUGCCCCAUUGUGGCUCCUCAGGCUCUCUCCCCUGCUCUCCCACCUCUACCU
CCACCCCCACCUUUGCAGGAUGAAACACUUCCCCGCUUGGCUCUCAUUCUUUCCACAAGAG
AGACCUUUCUCCGGACCUGGUUGCUACUGGUUCAGCAACUCUGCAGAAAAUGUCCUCCCC
UGUGGCUGCCUCAGCUCAUGCCUUUGGCCUGAAGUCCCAGCAUUGAUGGCAGCCCCUCAU
CUUCCAAGUUUUGUGCUCCCCUUUACCUAACGCUUCCUGCCUCCCAUGCAUCUGUACUCC
UCC

>hBgB
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCUGCCCGUCCUCACCAAGACUGACUGCCUGCUGCUUUGC
UACUGCCCGGGCCCAUGAGACUGACUCCCACUGCUCUGCCUGCCUCUCCCCACUGCACU
GGCACAGCCCCGCCUUGCCGCUGCUGAUCCAUUGCCGGUGUGACC

>hBgD
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCUUCCAGCCAGACACCCGCCCCCGGCCUGGCUAAGAA
GUUGCUUCCUGUUGCCAGCAUGACCUACCCUCGCCUCUUUGAUGCCAUCCGCUGCCACCU
CCUUUUGCUCCUGGACCCUUUAGCCUCUCUGCCCUUCCACUCUCUGACCCC

>hBgE
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCGCCUUGGCUCCUCCAGGAAGGCUCAGGAGCCCUACCUC
CCUGCCAUUAUAGCUGCUCCCCGCCAGAAGCCUGUGCCAACUCUCUGCAUUCCCUGAUCU
CCAUCCCUGUGGCUGUCACCCUUGGUCACCUCCGUGCUGUCACUGCCAUCUCCCCCC

>hBgF
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCUGGUACUGCAUGCACGCAAUGCUAGCUGCCCCUUUCC
CGUCCUGGGUACCCCGAGUCUCCCCCGACCUCGGGUCCCAGGUAUGCUCCCACCUCCACC
UGCCCCACUCACCACCUCUGCUAGUUCCAGACACCUCC

>hBgG
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
```

CAUUUAUUUCAUUGCUGCGUCCUGACAGCGUGGGCAACGCCUGCCGCCUGCUCUGAGGC
CCGAUCCAGUGGGCAGGCCAAGGCCUGCUGGGCCCCGCGGACCCAGGUGCUCUGGGUCA
CGGUCCCUGUCCCCGCACCCCGCUUCUGUCUGCCCCAUUGUGGCUCCUCAGGCUCUCUC
CCCUGCUCUCCCACCUCUACCUCCACCCCAC

>hBghBg
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCGAGAGCUCGCUUUCUUGCUGUCCAAUUUCUAUUAAAGG
UUCCUUUGUUCCCUAAGUCCAACUACUAAACUGGGGGAUAUUAUGAAGGGCCUUGAGCAU
CUGGAUUCUGCCUAAUAAAAAACAUUUAUUUUCAUUGCUGCGUC

>hBgI
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCCAAGCACGCAGCAAUGCAGCUCAAAACGCUUAGCCUAG
CCACACCCCCACGGGAAACAGCAGUGAUUAACCUUUAGCAAUAAACGAAAGUUUAACUAA
GCUAUACUAACCCCAGGGUUGGUCAAUUUCGUGCCAGCCACACC

>hBgJ
GAGAGCUCGCUUUCUUGCUGUCCAAUUUCUAUUAAAGGUUCCUUUGUUCCCUAAGUCCAA
CUACUAAACUGGGGGAUAUUAUGAAGGGCCUUGAGCAUCUGGAUUCUGCCUAAUAAAAAA
CAUUUAUUUUCAUUGCUGCGUCCUUUGCAGGAUGAAACACUUCCCCGCUUGGCUCUCAUU
CUUCCACAAGAGAGACCUUUCUCCGGACCUGGUUGCUACUGGUUCAGCAACUCUGCAGAA
AAUGUCCUCCCCUGUGGCUGCCUCAGCUCAUGCCUUUGGCCUGAAGUCCCAGCAUUGAUG
GCAGCCCCUCAUCUUCCAAGUUUUGUGCUCCCCUUUACCUAACGCUUCCUGCCUCCCAUG
CAUCUGUACUCCUCC

>IB
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCUGCCCGUCCUCACCAAGACUGACUGCCUGCUGCUUUGC
UACUGCCCGGGCCCAUGAGACUGACUUCCCACUGCUCUGCCUGCCUCUCCCCACUGCACU
GGCACAGCCCCGCCUUGCCGCUGCUGAUCCAUUGCCGGUGUGACC

>ID
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCUUCCAGCCAGACACCCGCCCCCCGGCCCUGGCUAAGAA
GUUGCUUCCUGUUGCCAGCAUGACCUACCCUCGCCUCUUUGAUGCCAUCCGCUGCCACCU
CCUUUUGCUCCUGGACCCUUUAGCCUCUCUGCCCUUCCACUCUCUGACCCC

>IE
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCGCCUUGGCUCCUCCAGGAAGGCUCAGGAGCCCUACCUC
CCUGCCAUUAUAGCUGCUCCCCGCCAGAAGCCUGUGCCAACUCUCUGCAUUCCCUGAUCU
CCAUCCCUGUGGCUGUCACCCUUGGUCACCUCCGUGCUGUCACUGCCAUCUCCCCCC

>IF
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCCUGGUACUGCAUGCACGCAAUGCUAGCUGCCCCUUUCC
CGUCCUGGGUACCCCGAGUCUCCCCCGACCUCGGGUCCCAGGUAUGCUCCCACCUCCACC
UGCCCCACUCACCACCUCUGCUAGUUCCAGACACCUCC

>IG
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCCUGACAGCGUGGGCAACGCCUGCCGCCUGCUCUGAGGC
CCGAUCCAGUGGGCAGGCCAAGGCCUGCUGGGCCCCGCGGACCCAGGUGCUCUGGGUCA
CGGUCCCUGUCCCCGCACCCCGCUUCUGUCUGCCCCAUUGUGGCUCCUCAGGCUCUCUC
CCCUGCUCUCCCACCUCUACCUCCACCCCAC

>IhBg
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCGAGAGCUCGCUUUCUUGCUGUCCAAUUUCUAUUAAAGG
UUCCUUUGUUCCCUAAGUCCAACUACUAAACUGGGGGAUAUUAUGAAGGGCCUUGAGCAU
CUGGAUUCUGCCUAAUAAAAAACAUUUAUUUUCAUUGCUGCGUC

>II
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCCAAGCACGCAGCAAUGCAGCUCAAAACGCUUAGCCUAG
CCACACCCCCACGGGAAACAGCAGUGAUUAACCUUUAGCAAUAAACGAAAGUUUAACUAA
GCUAUACUAACCCCAGGGUUGGUCAAUUUCGUGCCAGCCACACC

```
>IJ
CAAGCACGCAGCAAUGCAGCUCAAAACGCUUAGCCUAGCCACACCCCCACGGGAAACAGC
AGUGAUUAACCUUUAGCAAUAAACGAAAGUUUAACUAAGCUAUACUAACCCCAGGGUUGG
UCAAUUUCGUGCCAGCCACACCCUUUGCAGGAUGAAACACUUCCCCGCUUGGCUCUCAUU
CUUCCACAAGAGAGACCUUUCUCCGGACCUGGUUGCUACUGGUUCAGCAACUCUGCAGAA
AAUGUCCUCCCCUGUGGCUGCCUCAGCUCAUGCCUUUGGCCUGAAGUCCCAGCAUUGAUG
GCAGCCCCUCAUCUUCCAAGUUUUGUGCUCCCCUUUACCUAACGCUUCCUGCCUCCCAUG
CAUCUGUACUCCUCC

>JB
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCUGCCCGU
CCUCACCAAGACUGACUGCCUGCUGCUUUGCUACUGCCCGGGCCCAUGAGACUGACUUCC
CACUGCUCUGCCUGCCUCUCCCCACUGCACUGGCACAGCCCCGCCUUGCCGCUGCUGAUC
CAUUGCCGGUGUGACC

>JD
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCUUCCAGC
CAGACACCCGCCCCCGGCCCUGGCUAAGAAGUUGCUUCCUGUUGCCAGCAUGACCUACC
CUCGCCUCUUUGAUGCCAUCCGCUGCCACCUCCUUUUGCUCCUGGACCCUUUAGCCUCUC
UGCCCUUCCACUCUCUGACCCC

>JE
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCGCCUUGG
CUCCUCCAGGAAGGCUCAGGAGCCCUACCUCCCUGCCAUUAUAGCUGCUCCCCGCCAGAA
GCCUGUGCCAACUCUCUGCAUUCCCUGAUCUCCAUCCCUGUGGCUGUCACCCUUGGUCAC
CUCCGUGCUGUCACUGCCAUCUCCCCCC

>JF
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCCUGGUAC
UGCAUGCACGCAAUGCUAGCUGCCCCUUUCCGUCCUGGGUACCCCGAGUCUCCCCCGAC
CUCGGGUCCCAGGUAUGCUCCCACCUCCACCUGCCCCACUCACCACCUCUGCUAGUUCCA
GACACCUCC

>JG
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCCUGACAG
CGUGGGCAACGCCUGCCGCCUGCUCUGAGGCCCGAUCCAGUGGGCAGGCCAAGGCCUGCU
GGGCCCCGCGGACCCAGGUGCUCUGGGUCACGGUCCCUGUCCCCGCACCCCCGCUUCUG
UCUGCCCCAUUGUGGCUCCUCAGGCUCUCUCCCCUGCUCUCCCACCUCUACCUCCACCCC
CAC

>JhBg
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCGAGAGCU
CGCUUUCUUGCUGUCCAAUUUCUAUUAAAGGUUCCUUUGUUCCCUAAGUCCAACUACUAA
ACUGGGGGAUAUUAUGAAGGGCCUUGAGCAUCUGGAUUCUGCCUAAUAAAAAACAUUUAU
UUUCAUUGCUGCGUC

>JI
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCCAAGCAC
GCAGCAAUGCAGCUCAAAACGCUUAGCCUAGCCACACCCCCACGGGAAACAGCAGUGAUU
AACCUUUAGCAAUAAACGAAAGUUUAACUAAGCUAUACUAACCCCAGGGUUGGUCAAUUU
CGUGCCAGCCACACC

>JJ
CUUUGCAGGAUGAAACACUUCCCCGCUUGGCUCUCAUUCUUCCACAAGAGAGACCUUUCU
CCGGACCUGGUUGCUACUGGUUCAGCAACUCUGCAGAAAAUGUCCUCCCCUGUGGCUGCC
UCAGCUCAUGCCUUUGGCCUGAAGUCCCAGCAUUGAUGGCAGCCCCUCAUCUUCCAAGUU
UUGUGCUCCCCUUUACCUAACGCUUCCUGCCUCCCAUGCAUCUGUACUCCUCCCUUUGCA
```

-continued

GGAUGAAACACUUCCCCGCUUGGCUCUCAUUCUUCCACAAGAGAGACCUUUCUCCGGACC
UGGUUGCUACUGGUUCAGCAACUCUGCAGAAAAUGUCCUCCCCUGUGGCUGCCUCAGCUC
AUGCCUUUGGCCUGAAGUCCCAGCAUUGAUGGCAGCCCCUCAUCUUCCAAGUUUUGUGCU
CCCCUUUACCUAACGCUUCCUGCCUCCCAUGCAUCUGUACUCCUCC

>FI UTR 97, 5% homology (random modifications)
CUGGUACUGCAUGGACGCAAUGCUAGCUGCCCCUUUCCCGUCCUGGGUACCCCGAGUCAC
CCCCGACCUCGGGUCCCAGGUAUCGUCCCACCUCCACCUGCCCCACUCACCACCUCUGCU
AGUUCCAGACACCUCCCAAGCACGCAGCAAUGCAGCUCAAAACGCUUAGCAUAGCCACAC
CCCCACGGGAAACAGCAGUGAUUAACCUUUAGCAAUAAUCGAAUGUUUAACUAAGCUAUA
CUAACCCCAGGGUUGGUCAAUUUCGUGCCAGCCACACC >FI UTR 95% homology (random modifications)
CUCGUACUGCAUGGACGCAAUGCUAGCUGCCCCUUUCCCGUCCUGGGUACCCCGAGUCAC
CACCGACCUCGGGUCCCAGGUAUCGUCCCACCUCCACGUGCCCCACUCACCACCUCUGCU
AGUUCCAGACACCUCCCAAGCACGCAGCAAUGCAGCUCAAAACGCUUAGCAUAGCCACAC
CCCCACGGGAAACAGUAGUGAUUAACCUUUAGCAAUAAUCGAAUGUCUAACUAAGCUAUA
CUAACCCCAGGGUUGAUCAAUUACGUGCCAGCCACACC >FI UTR 92, 5% homology (random modifications)
CUCGUACUGCAUGGACGCAAUGCUAGCUGCCCCUUUCCCGUCCUGGGUACCCCGAGUCAC
CACCGACCUCGGGUCCCAGGUAUCGUCCCACCUCCACGUGCCCCACUCACCACCUUUGCU
AGUUCCAGACACCUCCCAUGCACGCAGCAAUGCAGAUCAAAACGCUUAGCAUAGCCACAC
CCCCACGGGAAACAGUAGUGAUUAACCUUUAGCAAUAAUCGAAUGUCUAACUAAGCUAUA
CUAACCCCAGGGUUGAUCAAUUACGUGCCAGCCACACC >FI UTR 90% homology (random modifications)
GUCGUACUGCAUGGACGCAAUGCUAGCAGCACCUUUCCCGUCCUGGGUACCCCGAGUCAC
CACCGACCUCGGGUCCCAGGUAUCGUCCCACCUCCACGUGCCCCACCCACCACCUUUGCU
AGUUCCAGAGACCUCCCAUGCACGCAGCAAUGCAGAUCAAAACGCUUAGCAUAGCCACAC
CGCCACGGGAAACAGUAGUGAUCAACCUUUAGCUAUAAUCGAAUGUCUAACUAAGCUAUU
CUAACCACAGGGUUGAUCAAUUACGUGCCAGCCAGACC >FI 8 nt mutation
CUGGUACUGCAUGCACGCAAUGCUAGCUGCCCCAAAGGGCUCCUGGGUACCCCGAGUCUC
CCCCGACCUCGGGUCCCAGGUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 98.75% homology (structure destabilizing modifications)
CUGGUACUGCAUGCACGCAAUGCUAGCUGCCCCUUUCCCGUGGUCCGUACCCCGAGUCUC
CCCCGACCUCGGGUCCCAGGUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 97.5% homology (structure destabilizing modifications)
CUGGUACUGCAUGCACGCAAUGCUAGCUGCCCCUUUCCCGUGGACCGUACGGCGAGUCUC
CCCCGACCUCGGGUCCCAGGUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 96.25% homology (structure destabilizing modifications)
CUGGUACUGCAUGCACGCAAUGCUAGCUGCCCCUUUGCCGUGGACCGUACGGGCUGUCUC
CCCCGACCUCGGGUCCCAGGUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 95% homology (structure destabilizing modifications)
CUGGUACUGCAUGCACGCAAUGCUAGCUGCCCCUUUGGGCUGGACCGUACGGGCUGUCUC
CCCCGACCUCGGGUCCCAGGUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 97, 5% homology (structure retaining modifications)
CUGGUACUGCAUGCACGCAAUGCUAGCUGCCCCUUUCCCGUGGUCCGUACCCCGAGUCUC
CCCCGACCUCGGGUCGGACCUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGGAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 95% (structure retaining modifications)
CUGGUACUGCAUGCACGCAAUGCUAGCUGCCCCUUUCCCGUGGACCGUACGGCGAGUCUC
CCCCGACCUCGCCUCGGUCCUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC >FI UTR 92,5% (structure retaining modifications)
CUGGUACUGCAUGCACGCAAUGCUAGCUGCCCCUUUGCCGUGGACCGUACGGGCUGUCUC
CCCCGACCAGCCCUCGGUCCUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCACGGCAAACAGCAGUGAUUAACCUUUAGCAAUAAACGAAAGUUUAACUAAGCUAUA
CUAACCCCAGGGUUGGUCAAUUUCGUGCCAGCCACACC >FI UTR 90% (structure retaining modifications)
CUGGUACUGCAUGCACGCAAUGCUAGCUGCCCCUUUGGGCUGGACCGUACGGGCUGUCUC
CCCCGACCAGCCCUCGGUCCUAUGCUCCCACCUCCACCUGCCCCACUCACCACCUCUGCU
AGUUCCAGACACCUCCCAAGCACGCAGCAAUGCAGCUCAAAACGCUUAGCCUAGCCACAC
CCCCAGCCCAAACAGCAGUGAUUAACCUUUAGCAAUAAACGAAAGUUUAACUAAGCUAUA
CUAACCCCAGGGUUGGUCAAUUUCGUGCCAGCCACACC

The invention claimed is:

1. A method of expressing a polypeptide in a subject by administering an RNA molecule to the subject, wherein said RNA molecule comprises, in the 5'→3' direction:
   (a) a 5'-untranslated region;
   (b) a nucleic acid sequence coding for a peptide or protein; and
   (c) a 3'-untranslated region which is not naturally linked to the nucleic acid sequence of (b), said 3'-untranslated region comprising:
   a nucleic acid sequence of the 3'-untranslated region of Amino-Terminal Enhancer of Split (AES), which comprises (A) a nucleic acid sequence selected from the group consisting of SEQ ID NOs: 86 to 89, (B) a fragment comprising at least 80% of any one of SEQ ID NOs: 86 to 89, or (C) a variant comprising a nucleic acid sequence that is at least 90% identical to the nucleic acid sequence (A) or the fragment (B).

2. The method of claim 1, wherein the RNA molecule further comprises (d) a polyadenyl sequence.

3. The method of claim 2, wherein the polyadenyl sequence (d) is located at the 3' end of said RNA molecule.

4. The method of claim 2, wherein the polyadenyl sequence (d) comprises a sequence of consecutive nucleotides, which sequence contains one or more nucleotides other than A nucleotides.

5. The method of claim 2, wherein the polyadenyl sequence (d) comprises at least 120 A nucleotides.

6. The method of claim 2, wherein the polyadenyl sequence (d) comprises an unmasked polyadenyl sequence.

7. The method of claim 1, wherein the 3'-untranslated region (c) is active so as to increase the translation efficiency and/or the stability of the nucleic acid sequence coding for a peptide or protein (b).

8. The method of claim 2, wherein the 3'-untranslated region (c) and the polyadenyl sequence (d) are active so as to increase the translation efficiency and/or the stability of the nucleic acid sequence coding for a peptide or protein (b).

9. The method of claim 1, wherein the RNA molecule further comprises (d) a 5' Cap.

10. The method of claim 9, wherein the 5' cap is β-S-ARCA.

11. The method of claim 1, wherein the 5'-untranslated region comprises the 5'-untranslated region of human alpha globin and a Kozak sequence.

12. The method of claim 1, wherein the peptide or protein encoded by the nucleic acid sequence (b) is a tumor-associated antigen, which antigen is not expressed in normal tissues or is mutated in tumor cells.

13. The method of claim 1, wherein the peptide or protein encoded by the nucleic acid sequence (b) is a disease antigen.

14. The method of claim 13, wherein the disease antigen is selected from the group consisting of a tumor-associated antigen, a viral antigen, and a bacterial antigen.

15. The method of claim 1, wherein the nucleic acid sequence of the 3'-untranslated region of AES is set forth in SEQ ID NO: 86.

16. The method of claim 1, wherein the 3'-untranslated region (c) comprises a nucleic acid sequence of the non-coding RNA of MT-RNR1 as set forth in SEQ ID NO: 115.

17. The method of claim 1, wherein the 3'-untranslated region
(c) comprises a nucleic acid sequence of the non-coding RNA of MT-RNR1, and wherein the nucleic acid sequence of the 3'-untranslated region of AES is located 5' to the nucleic acid sequence of the non-coding RNA of MT-RNR1.

18. The method of claim 1, wherein the RNA molecule comprises, in the 5'→3' direction:
(a) the 5'-untranslated region;
(b) the nucleic acid sequence coding for a peptide or protein; and
(c) the 3'-untranslated region which is not naturally linked to the nucleic acid sequence (b), said 3'-untranslated region comprising a combination of a nucleic acid sequence of the 3'-untranslated region of Amino-Terminal Enhancer of Split (AES) and a nucleic acid sequence of the non-coding RNA of MT-RNR1, which combination has the nucleic acid sequence of SEQ ID NO: 174.

19. The method of claim 1, wherein the subject is a human.

20. The method of claim 1, wherein the 3'-untranslated region (c) further comprises a second nucleic acid sequence selected from the group consisting of:

(i) a nucleic acid sequence of the non-coding RNA of Mitochondrially Encoded 12S RNA (MT-RNR1), which comprises (A) a nucleic acid sequence selected from the group consisting of SEQ ID NOs: 105 to 121, (B) a fragment comprising at least 80% of any one of SEQ ID NOs: 105 to 121, or (C) a variant comprising a nucleic acid sequence that is at least 90% identical to the nucleic acid sequence (A) or the fragment (B);

(ii) a second nucleic acid sequence of the 3'-untranslated region of AES, which comprises (A) a nucleic acid sequence selected from the group consisting of SEQ ID NOs: 86 to 89, (B) a fragment comprising at least 80% of any one of SEQ ID NOs: 86 to 89, or (C) a variant comprising a nucleic acid sequence that is at least 90% identical to the nucleic acid sequence (A) or the fragment (B);

(iii) a nucleic acid sequence of the 3'-untranslated region of Fc Fragment of IgG (FCGRT), which comprises (A) a nucleic acid sequence selected from the group consisting of SEQ ID NOs: 1 to 50, (B) a fragment comprising at least 80% of any one of SEQ ID NOs: 1 to 50, or (C) a variant comprising a nucleic acid sequence that is at least 90% identical to the nucleic acid sequence (A) or the fragment (B);

(iv) a nucleic acid sequence of the 3'-untranslated region of Lymphocyte Specific Protein 1 (LSP1), which comprises (A) a nucleic acid sequence selected from the group consisting of SEQ ID NOs: 51 to 72, (B) a fragment comprising at least 80% of any one of SEQ ID NOs: 51 to 72, or (C) a variant comprising a nucleic acid sequence that is at least 90% identical to nucleic acid sequence (A) or the fragment (B);

(v) a nucleic acid sequence of the 3'-untranslated region of Chemokine Ligand 22 (CCL22), which comprises (A) a nucleic acid sequence selected from the group consisting of SEQ ID NOs: 73 to 85, (B) a fragment comprising at least 80% of any one of SEQ ID NOs: 73 to 85, or (C) a variant comprising a nucleic acid sequence that is at least 90% identical to the nucleic acid sequence (A) or the fragment (B);

(vi) a nucleic acid sequence of the 3'-untranslated region of Phospholipase D Family Member 3 (PLD3), which comprises (A) a nucleic acid sequence selected from the group consisting of SEQ ID NOs: 90 to 104, (B) a fragment comprising at least 80% of any one of SEQ ID NOs: 90 to 104, or (C) a variant comprising a nucleic acid sequence that is at least 90% identical to the nucleic acid sequence (A) or the fragment (B); and (vii) a nucleic acid sequence of the 3'-untranslated region of Major Histocompatibility Complex Class II DR Beta 4 (HLA-DRB4), which comprises (A) a nucleic acid sequence selected from the group consisting of SEQ ID NOs: 122 to 143, (B) a fragment comprising at least 80% of any one of SEQ ID NOs: 122 to 143, or (C) a variant comprising a nucleic acid sequence that is at least 90% identical to the nucleic acid sequence (A) or the fragment (B).

* * * * *